(12) United States Patent
Pacella

(10) Patent No.: US 12,297,656 B2
(45) Date of Patent: May 13, 2025

(54) FOLDABLE PLAYARD HAVING X-FRAME ASSEMBLIES, OVAL-SHAPED LEG ASSEMBLIES, AND CANOPY COVER

(71) Applicant: WONDERLAND SWITZERLAND AG, Steinhausen (CH)

(72) Inventor: Jonathan M. Pacella, Gap, PA (US)

(73) Assignee: Wonderland Switzerland AG, Steinhausen (CH)

( * ) Notice: Subject to any disclaimer, the term of this patent is extended or adjusted under 35 U.S.C. 154(b) by 69 days.

(21) Appl. No.: 17/782,064

(22) PCT Filed: Dec. 4, 2020

(86) PCT No.: PCT/US2020/063427
§ 371 (c)(1),
(2) Date: Jun. 2, 2022

(87) PCT Pub. No.: WO2021/113723
PCT Pub. Date: Jun. 10, 2021

(65) Prior Publication Data
US 2023/0010207 A1    Jan. 12, 2023

Related U.S. Application Data

(60) Provisional application No. 62/943,409, filed on Dec. 4, 2019.

(51) Int. Cl.
*E04H 15/64* (2006.01)
*A47C 7/66* (2006.01)
(Continued)

(52) U.S. Cl.
CPC .............. *E04H 15/64* (2013.01); *A47C 7/66* (2013.01); *A47C 29/003* (2013.01);
(Continued)

(58) Field of Classification Search
CPC .... A47D 13/06; A47D 13/061; A47D 13/063; A47D 13/065; A47D 13/066; A47D 9/00;
(Continued)

(56) References Cited

U.S. PATENT DOCUMENTS

| 244,217 A | 7/1881 | Fenner |
|---|---|---|
| 316,062 A | 4/1885 | Riessner |

(Continued)

FOREIGN PATENT DOCUMENTS

| CN | 1328803 A | 1/2002 |
|---|---|---|
| CN | 1572185 A | 2/2005 |

(Continued)

OTHER PUBLICATIONS

Venture All Stars JOY Foldable Playpen. Venture UK. First found on Oct. 30, 2020. Last accessed at https://www.ventureuk.com/product/venture-all-stars-joy-baby-playpen-grey/ on Mar. 18, 2021. 3 pages.

(Continued)

*Primary Examiner* — George Sun
(74) *Attorney, Agent, or Firm* — Volpe Koenig

(57) ABSTRACT

A foldable playard includes a frame defining an interior space when unfolded and soft goods partially disposed within the interior space to define a partially enclosed space for a child to play and/or sleep. The frame includes multiple oval-shaped leg support assemblies and multiple X-frame assemblies that couple adjacent leg support assemblies together. The X-frame assembly is positioned near the top of the frame when the playard is unfolded such that the X-frame assembly functions as a top rail to mechanically reinforce the playard. In this manner, the playard does not include a separate compliant or rigid top rail or a bottom support structure, thus reducing the number of parts for manufacture. Additionally, the playard includes a single (Continued)

latch mechanism to maintain the playard in the unfolded configuration. The playard may also include an optional canopy cover assembly mounted to the frame to provide shade for the child.

24 Claims, 107 Drawing Sheets

(51) Int. Cl.
  *A47C 29/00* (2006.01)
  *A47D 13/06* (2006.01)
  *A47D 15/00* (2006.01)
  *E04H 15/40* (2006.01)
  *F16B 7/04* (2006.01)

(52) U.S. Cl.
  CPC ........... *A47D 13/063* (2013.01); *A47D 15/00* (2013.01); *E04H 15/40* (2013.01); *F16B 7/0433* (2013.01)

(58) Field of Classification Search
  CPC .......... A47D 9/005; A47D 7/00; A47D 7/002; A47D 15/00; A47C 7/66; A47C 29/003; E04H 15/40; E04H 15/64; F16B 7/0433
  See application file for complete search history.

(56) References Cited

U.S. PATENT DOCUMENTS

| | | |
|---|---|---|
| 406,715 A | 7/1889 | Fenner |
| 609,491 A | 8/1898 | Ashwell |
| 927,738 A | 7/1909 | Malaby |
| 1,264,078 A | 4/1918 | Jaureguy |
| 1,950,603 A | 3/1934 | Fischer |
| 2,243,984 A | 6/1941 | Singewald |
| 2,357,056 A | 8/1944 | Nelson |
| 2,471,540 A | 5/1949 | Phillips |
| 2,624,054 A | 1/1953 | Plant |
| 2,698,443 A | 1/1955 | Ralick |
| 2,820,468 A | 1/1958 | Park et al. |
| 3,206,772 A | 9/1965 | Sarasin |
| 3,521,332 A | 7/1970 | Kramer |
| 4,030,748 A | 6/1977 | Brock |
| 4,186,454 A | 2/1980 | Cone |
| 4,389,057 A | 6/1983 | Richard, Jr. |
| 4,651,367 A | 3/1987 | Osher et al. |
| 4,790,340 A | 12/1988 | Mahoney |
| 4,809,724 A | 3/1989 | Fuser |
| 4,871,141 A | 10/1989 | Chen |
| 5,000,210 A | 3/1991 | Worthington, Jr. |
| 5,022,420 A | 6/1991 | Brim |
| 5,099,866 A | 3/1992 | Solis et al. |
| 5,203,363 A | 4/1993 | Kidwell et al. |
| 5,290,050 A | 3/1994 | Kim |
| 5,339,470 A | 8/1994 | Shamie |
| 5,396,915 A | 3/1995 | Bomar |
| 5,431,364 A | 7/1995 | Etter |
| 5,517,707 A | 5/1996 | Lamantia |
| D371,262 S | 7/1996 | Forbes, Sr. |
| 5,697,129 A | 12/1997 | Newville |
| 5,778,465 A | 7/1998 | Myers |
| 5,957,436 A | 9/1999 | Ristau |
| 6,035,877 A | 3/2000 | Losi, Jr. et al. |
| 6,067,676 A | 5/2000 | Carnahan et al. |
| 6,231,119 B1 | 5/2001 | Zheng |
| 6,279,208 B1 | 8/2001 | Gillis |
| 6,438,773 B1 | 8/2002 | Hsia |
| 6,467,107 B1 | 10/2002 | Glover et al. |
| 6,494,427 B1 | 12/2002 | Smith |
| 6,764,133 B2 | 7/2004 | Osato |
| 6,865,756 B2 | 3/2005 | Clapper et al. |
| 6,915,545 B2 | 7/2005 | Chen |
| 6,925,664 B1 | 8/2005 | Twigg |
| 6,948,197 B1 | 9/2005 | Chen |
| 7,096,874 B2 | 8/2006 | Forshpan |
| 7,226,126 B1 | 6/2007 | Spanovich |
| 7,243,990 B1 | 7/2007 | Wahl |
| 7,401,367 B2 | 7/2008 | Gehr et al. |
| 7,418,746 B2 | 9/2008 | Gehr et al. |
| 7,422,026 B2 | 9/2008 | Kim |
| 7,458,115 B2 | 12/2008 | Chen et al. |
| 7,568,243 B2 | 8/2009 | Gehr et al. |
| 7,617,550 B2 | 11/2009 | Gehr et al. |
| 7,694,361 B1 | 4/2010 | Chen |
| 7,752,693 B2 | 7/2010 | Espenshade |
| 7,770,245 B2 | 8/2010 | Cheng et al. |
| 7,891,369 B2 | 2/2011 | Carter |
| 8,024,825 B2 | 9/2011 | Harrison et al. |
| 8,186,368 B2 | 5/2012 | Troutman et al. |
| 8,388,501 B2 | 3/2013 | Myers et al. |
| 8,464,379 B1 | 6/2013 | Zajac |
| D725,424 S | 3/2015 | Cohen |
| 8,967,171 B2 | 3/2015 | Horst |
| 8,973,180 B2 | 3/2015 | Zeng et al. |
| 8,984,682 B2 | 3/2015 | Zhao |
| 8,997,770 B1 | 4/2015 | Martin |
| 9,066,607 B1 | 6/2015 | Ransil et al. |
| 9,089,225 B2 | 7/2015 | Fiore, III et al. |
| 9,113,723 B2 | 8/2015 | Gregor et al. |
| 9,144,325 B1 * | 9/2015 | Sousa .................... A47D 7/002 |
| 9,345,339 B2 | 5/2016 | Wang et al. |
| 9,770,118 B2 | 9/2017 | Mountz |
| 9,955,801 B2 | 5/2018 | Yu |
| 10,006,195 B2 | 6/2018 | Matsuoka |
| 10,194,755 B1 | 2/2019 | Flannery et al. |
| RE47,525 E | 7/2019 | Sousa et al. |
| 10,448,752 B1 | 10/2019 | Flannery et al. |
| 10,674,835 B1 | 6/2020 | Flannery et al. |
| 10,704,290 B1 | 7/2020 | Flannery et al. |
| RE48,148 E | 8/2020 | Wang et al. |
| 11,185,167 B1 | 11/2021 | Holland |
| 11,266,253 B1 | 3/2022 | Flannery et al. |
| 11,596,242 B1 | 3/2023 | Flannery et al. |
| 11,696,652 B2 | 7/2023 | Pacella |
| 2004/0237191 A1 | 12/2004 | Clapper et al. |
| 2005/0034232 A1 | 2/2005 | Martin |
| 2005/0150046 A1 | 7/2005 | Gehr et al. |
| 2006/0037274 A1 | 2/2006 | Perez et al. |
| 2006/0253980 A1 | 11/2006 | Paesang et al. |
| 2007/0163041 A1 | 7/2007 | Cheng et al. |
| 2007/0271697 A1 | 11/2007 | Martin |
| 2008/0018146 A1 * | 1/2008 | Wahl ........................ A47C 7/66 |
| | | 297/184.15 |
| 2008/0034498 A1 | 2/2008 | Chen et al. |
| 2008/0098530 A1 | 5/2008 | Chen et al. |
| 2008/0149157 A1 * | 6/2008 | Carter .................... E04H 15/50 |
| | | 135/139 |
| 2008/0289103 A1 | 11/2008 | Gehr et al. |
| 2008/0289673 A1 | 11/2008 | Roden et al. |
| 2009/0019637 A1 * | 1/2009 | Gehr .................... A47D 13/063 |
| | | 5/99.1 |
| 2009/0113625 A1 | 5/2009 | Hutchinson et al. |
| 2009/0188039 A1 | 7/2009 | Shan et al. |
| 2009/0188540 A1 | 7/2009 | Mallookis et al. |
| 2009/0217959 A1 | 9/2009 | Carter |
| 2010/0045081 A1 | 2/2010 | Efthimiou |
| 2010/0139729 A1 * | 6/2010 | Carter .................... E04H 15/50 |
| | | 135/145 |
| 2010/0229301 A1 | 9/2010 | Arnold, IV et al. |
| 2011/0140061 A1 | 6/2011 | Cheng et al. |
| 2011/0283457 A1 | 11/2011 | Son et al. |
| 2012/0037869 A1 | 2/2012 | Fiore et al. |
| 2012/0110730 A1 | 5/2012 | Sousa et al. |
| 2012/0233770 A1 | 9/2012 | Greger et al. |
| 2012/0235103 A1 | 9/2012 | Greger et al. |
| 2013/0050975 A1 * | 2/2013 | Carpenter ............. F02B 63/048 |
| | | 361/807 |
| 2013/0074257 A1 | 3/2013 | Mendes et al. |
| 2013/0092207 A1 * | 4/2013 | Lovley. II ............... E04H 15/46 |
| | | 135/122 |
| 2014/0068856 A1 | 3/2014 | Thomson et al. |

(56) References Cited

U.S. PATENT DOCUMENTS

| | | | |
|---|---|---|---|
| 2014/0102497 A1* | 4/2014 | Ma | E04H 15/58 135/122 |
| 2014/0165288 A1 | 6/2014 | Wang et al. | |
| 2014/0208505 A1 | 7/2014 | Burkholder et al. | |
| 2014/0359938 A1 | 12/2014 | Burns et al. | |
| 2015/0021453 A1 | 1/2015 | Brassard et al. | |
| 2015/0060605 A1 | 3/2015 | Tserodze et al. | |
| 2016/0066705 A1 | 3/2016 | Yaacoby et al. | |
| 2016/0242566 A1* | 8/2016 | Tadipatri | A47D 13/066 |
| 2016/0309914 A1 | 10/2016 | Burns et al. | |
| 2016/0369524 A1 | 12/2016 | Huang | |
| 2017/0280892 A1 | 10/2017 | Zhang et al. | |
| 2017/0290444 A1 | 10/2017 | Mao | |
| 2017/0367492 A1 | 12/2017 | Thomson et al. | |
| 2018/0014662 A1 | 1/2018 | He et al. | |
| 2018/0142493 A1 | 5/2018 | Choi | |
| 2018/0192785 A1 | 7/2018 | Horst et al. | |
| 2018/0192786 A1 | 7/2018 | Horst et al. | |
| 2018/0238075 A1 | 8/2018 | Yang et al. | |
| 2018/0332977 A1 | 11/2018 | Sozzo | |
| 2019/0142183 A1 | 5/2019 | Mountz | |
| 2019/0200781 A1 | 7/2019 | McGittigan | |
| 2019/0335917 A1 | 11/2019 | Taylor et al. | |
| 2019/0338552 A1 | 11/2019 | Jun | |
| 2020/0002968 A1 | 1/2020 | Ferrari et al. | |
| 2020/0077807 A1 | 3/2020 | Taylor et al. | |
| 2020/0352353 A1 | 11/2020 | Fusco et al. | |
| 2020/0407999 A1 | 12/2020 | Huang | |
| 2021/0040766 A1 | 2/2021 | Sun et al. | |
| 2021/0085098 A1* | 3/2021 | Pacella | A47D 7/007 |
| 2021/0372444 A1 | 12/2021 | Staidl et al. | |
| 2023/0007889 A1 | 1/2023 | Pacella | |
| 2023/0010207 A1 | 1/2023 | Pacella | |
| 2023/0175283 A1* | 6/2023 | Liu | A47D 9/005 |

FOREIGN PATENT DOCUMENTS

| | | |
|---|---|---|
| CN | 2682940 | 3/2005 |
| CN | 100551304 | 10/2009 |
| CN | 201670256 U | 12/2010 |
| CN | 301602286 | 7/2011 |
| CN | 202858551 | 4/2013 |
| CN | 203332191 U | 12/2013 |
| CN | 103565169 A | 2/2014 |
| CN | 103859873 A | 6/2014 |
| CN | 104398070 A | 3/2015 |
| CN | 204445034 | 7/2015 |
| CN | 204970498 | 1/2016 |
| CN | 103156444 | 2/2016 |
| CN | 205093999 U | 3/2016 |
| CN | 106150324 A | 11/2016 |
| CN | 107865517 A | 4/2018 |
| CN | 208676779 U | 4/2019 |
| CN | 208676799 | 4/2019 |
| CN | 208973109 | 6/2019 |
| CN | 209053512 U | 7/2019 |
| CN | 209331573 | 9/2019 |
| CN | 209331574 | 9/2019 |
| EP | 1593324 A1 | 11/2005 |
| EP | 1911376 | 4/2008 |
| EP | 3088065 | 11/2017 |
| EP | 3979880 A1 | 4/2022 |
| EP | 4069039 A1 | 10/2022 |
| EP | 4069040 A1 | 10/2022 |
| FR | 1053010 | 1/1954 |
| FR | 2361846 | 3/1978 |
| GB | 2471540 | 1/2011 |
| JP | S49003850 U | 4/1947 |
| JP | S60146452 U | 9/1985 |
| JP | 5408962 B2 | 2/2014 |
| JP | 2019030388 | 2/2019 |
| WO | 198201984 A1 | 6/1982 |
| WO | 1999020160 A1 | 4/1999 |
| WO | 2009002188 A1 | 12/2008 |
| WO | 2013096595 A1 | 6/2013 |
| WO | 2016/062164 | 4/2016 |
| WO | 2021023873 A1 | 2/2021 |
| WO | 2021113720 A1 | 6/2021 |
| WO | 2021113723 A1 | 6/2021 |

OTHER PUBLICATIONS

International Search Report and Written Opinion mailed Jun. 2, 2021 for PCT International Application No. PCT/US2021/013831.

Wash & Fold Portable Baby Circle. Nihon Ikuji. First found on Feb. 22, 2021. Last accessed at https://nihonikuji.com/item/araetetatameru_circle_cf/ on Mar. 17, 2021.12 pages.

International Search Report and Written Opinion mailed Mar. 12, 2021 for PCT International Application No. PCT/EP2020/083517.

OVERSTOCK(TM): "Overstock.com: Online Shopping—Bedding, Furniture, Electronics, Jewelry, Clothing & more", May 23, 2017 (May 23, 2017), XP055780628, Retrieved from the Internet <URL:https://www.overstock.com/Baby/Summer-Infant-Pop-N-Play-Shade-Canopy-Portable-Playard/10406172/product.html?utm_source=pinterest.com&utm_medium=referral&utm_campaign=pin_button> [retrieved on Mar. 1, 2021], Available at: https://web.archive.org/web/20160512031529/https://www.overstock.com/Baby/Summer-Infant-Pop-N-Play-Portable-Playard/9561718/product.html.

International Search Report and Written Opinion mailed Oct. 14, 2021 for PCT International Application No. PCT/US2021/031634.

US Provisional U.S. Appl. No. 62/883,716, (filed Aug. 7, 2019).

US Provisional U.S. Appl. No. 62/979,728, (filed Feb. 21, 2020).

International Search Report and Written Opinion in International Patent Application No. PCT/US2020/063424 mailed Mar. 9, 2021, 27 pages.

10 Best Baby Playpens 2018. Ezvid Wiki Apr. 13, 2018 Youtube. Accessed at https://www.youtube.com/watch?u=qzvuGglUma48't=99s. 1 page.

2017 Hot Sale Indoor and Outdoor Foldable Baby Safety Fence Playpen. Ningbo Sunnuo International Trade Co. First found on Oct. 30, 2020. Last accessed at http://sunnuotrade.waimaotong.com/product/2017-Hot-Sale-Indoor-and-Dutdoor-Foldable-Baby-Safety-Fence-Playpen_m1227918m.html on Mar. 17, 2021. 6 pages.

5 Comfiest Playpens and Playards for Your Child's Rest and Play. Cool Things Youtube Jun. 8, 2019. Accessed at hittps://www.youtube.com/watch?v=rTcyfrHr6Ao&t=42s. 1 page.

Baby Delight Go With Me Nod Travel Crib Product Page. Baby Delight. First found on Feb. 4, 2021. Last accessed at https://babydelight.com/product/go-with-me-nod-deluxe-portable-travel-crib-charcoal-tweed/ on Mar. 17, 2021. 11 pages.

Baby Delight Go with Me Nod Deluxe Portable Travel Crib. Target. First found on Feb. 1, 2021. Last accessed at https://www.target.com/p/baby-delight-go-with-me-nod-deluxe-portable-travel-crib/-/A-80369220#lnk=sametab on Mar. 17, 2021.8 pages.

Baby Delight Go With Me Nod JPMA 2019. Albee Baby Youtube Apr. 29, 2019. Accessed at https://www.youtube.com/watch?v=OsbKtzVEL-8&t=5s. 1 page.

Cove Aire Instructions. Nuna created Dec. 10, 2019. 15 pages.

Deluxe Foldaway Playpen. Koo Di. First found on Oct. 30, 2020. Last accessed at https://koo-di.com/products/deluxe-foldaway-playpen on Mar. 17, 2021. 3 pages.

Evenflo Play-Away Portable Playard Deluxe, Wayfarer. Evenflo Walmart. First found on Jul. 15, 2020. Last accessed at https://www.walmart.com/ip/Evenflo-Play-Away-Portable-Playard-Deluxe-Wayfarer/154959146 on Mar. 17, 2021. 8 pages.

Go With Me Nod Travel Crib Care & Instructions. Baby Delight 2018. Accessed at https://mkObabydelightbwx00d.kinstacdn.com/wp-content/uploads/2019-10-27_BD05350_GWM-Nod-Travel-CribUB.pdf. 8 pages.

Hexa Playpen. Tutti Bambini. First found on Oct. 30, 2020. Last accessed at https://www.tuttibambini.com/hexaplaypen-grey.html on Mar. 17, 2021.4 pages.

How to Set Up a Nuna SENA Aire Travel Crib—Babylist. Babylist Youtube Jul. 4, 2018. Accessed at https://www.youtube.com/watch?v=y4NoFgd_10M&t=35s. 1 page.

(56) References Cited

OTHER PUBLICATIONS

International Search Report and Written Opinion in International Patent Application No. PCT/EP2020/072290 mailed Dec. 2, 2020, 22 pages.
Jetsetter Playard Owner's Manual. Graco Apr. 2015. 44 pages.
Nuna COVET Aire Travel Crib. Pottery Barn Kids. First found on Jan. 11, 2021. Last accessed at https://www.potterybaraids.com/products/nuna-cove-aire-travel-crib/ on Mar. 17, 2021. 2 pages.
Nuna Sena Playard Review—Baby Gizmo. Baby Gizmo Youtube Jan. 21, 2013. Accessed at https://www.youtube.com/watch?v=UHN7nsyE7gs&t=20s. 1 page.
Onyx Playpen User Manual. Dream on Me created Oct. 10, 2019. 1 page.
Onyx Playpen. Dream on Me. First found on Aug. 12, 2020. Last accessed at https://dreamonme.com/products/Baby-gears/playpens-playards/onyx-playpen/ on Mar. 18, 2021.3 pages.
Pack 'n Play® On the Go TM Playard with Folding Bassinet. Graco. First found on Jan. 11, 2021. Last accessed at https://www.gracobaby.com/home-and-gear/pack-n-play-playards-and-bassinets/pack-n-play-playards/pack-n-play-onhe-go-playard-with-folding-bassinet/SAP_2120159.html on Mar. 17, 2021.4 pages.
Pack 'n Play Care Suite Bassinet Playard Owner's Manual. Graco Jun. 2020. 32 pages.
Pack'n Play On the Go Playard Owner's Manual. Graco Apr. 30, 2020. 28 pages.
Pack'n Play On the Go Playard Owner's Manual. Graco Jun. 2011. 28 pages.
Pack 'n Play Sport Playard Owner's Manual. Graco Dec. 12, 2014. 20 pages.
Pack 'n Play® Sport Playard. Graco. First found on Jul. 15, 2020. Last accessed at https://www.gracobaby.com/home-and-gear/pack-n-play-playards-and-bassinets/pack-n-play-playards/pack-n-play-sport-playard/SAP_1926867. html on Mar. 17, 2021.
Pop 'N Play® Lite Playard. Summer Infant, Inc. First found on Jul. 15, 2020. Last accessed at https://www.summerinfant.com/all-safety-health/pop-%E2%80%98n-play-lite-playard on Mar. 17, 2021. 5 pages.
Pop 'N Play LITE Playard Owner's Manual. Summer Infant, Inc. Nov. 4, 2019.2 pages.
Portable Playard Play Pen for Infants and Babies. Babyseater. First found on Jul. 15, 2020. Last accessed at https://babyseaterus/product/portable-playard-play-pen-for-infants-and-babies-lightweight-mesh-baby-playpen-with-carryingaase-easily-opens-with-1-hand-turquoise/ on Mar. 17, 2021.8 pages.
Portable Playpen. Deryan. First found on Oct. 30, 2020. Last accessed at https://deryan.shop/en/product/portableplaypen/ on Mar. 17, 2021.3 pages.
Portable Playpen. MTVVML Amazon. First found on Oct. 30, 2020. Last accessed at https://www.amazon.sg/Portable-Playpen-Foldable-Washable-Lightweight/dp/B07XKYPYHH on Mar. 17, 2021. 3 pages.
Quick Connect Portable Seat Playard Owner's Manual. Graco Nov. 2019.40 pages.
Sena Aire Instructions. Nuna created Feb. 8, 2017. 23 pages.
Sena Aire Instructions. Nuna Jul. 2019. 13 pages.
Sena Aire Mini Product Page. Nuna. First found on Jan. 11, 2021. Last accessed at https://www.nunababy.com/usa/sena-aire-mini on Mar. 17, 2021.8 pages.
Sena Aire Product Page. Nuna. First found on Jan. 11, 2021. Last accessed at https://www.nunababy.com/en/ on Mar. 17, 2021.7 pages.
Sena Product Page. Nuna. First found on Jan. 11, 2021. Last accessed at https://www.nunababy.com/en/sena on Mar. 17, 2021.8 pages.
Sunnuo 2019 Foldable Baby Safety Fence Playpen. Sunnuo Mar. 31, 2019. Accessed at Wayback machine at http://www.sunnuotrade.com/product/60697008483305426022/2019_Hot_Sale_Indoor_and_Outdoor_Foldable_Baby_Safety_Fence_Playpen.html. 9 pages.
Office Action and Search Report issued in corresponding Chinese Application No. 202011389121.1 dated Mar. 20, 2024.
Canadian Office Action for Application No. 3,160,783 dated Aug. 30, 2023.
Canadian Office Action for Application No. 3,149,329 dated Sep. 1, 2023.
Canadian Office Action for Application No. 3,160,780 dated Sep. 13, 2023.
Australian Examination Report for Application No. 2021207544 dated Sep. 11, 2023.
Non-Final Office Action for U.S. Appl. No. 18/158,246 dated Jul. 19, 2023.
Japanese Office Action for Application No. 2022-506425 dated Jul. 4, 2023. English Machine Translation Provided.
International Search Report and Written Opinion for PCT/US2020/063427 dated Apr. 28, 2021.
Office Action issued in Taiwanese Application No. 111119166 dated Mar. 9, 2023.
European Search Report for Application No. 20895722.5-1005 / 4069039 PCT/U.S. Pat. No. 2020063427 dated Jan. 26, 2024.
Non-Final Office Action issued in corresponding U.S. Appl. No. 17/781,939 dated Mar. 12, 2024.
Examination Report issued in corresponding Australian Application No. 202107544 dated Feb. 20, 2024.
"Written Opinion Issued in Corresponding Singapore Patent Application No. 11202251276J", Mailed Date: Jul. 8, 2024, 6 pages.
"Search Report Issued in Corresponding Singapore Patent Application No. 11202251276J", Mailed Date: Jul. 8, 2024, 3 pages.
"First Office Action Issued in Corresponding Chinese Patent Application No. 202080095666.3", Mailed Date: Jul. 12, 2024, 9 pages.
"Search Report Issued in Corresponding Chinese Patent Application No. 202080095666.3", Mailed Date: Jul. 11, 2024, 3 pages.
"Notice of Allowance Issued in Corresponding Japanese Patent Application No. 2022-543566", Mailed Date: Jul. 16, 2024, 3 pages.
"First Office Action Issued in Corresponding Chinese Patent Application No. 202080095723.8", Mailed Date: Aug. 10, 2024, 13 pages.
"Office Action Issued in Corresponding U.S. Appl. No. 18/158,246", Mailed Date: Jul. 17, 2024, 12 pages.
Office Action issued in corresponding Taiwanese Application No. 112146385 dated Apr. 18, 2024.
Extended European Search Report issued in corresponding application No. 20895722.5 dated Apr. 30, 2024.
"Extended European Search Report Issued in Corresponding European Patent Application No. 21740798.0", Mailed Date: Jun. 4, 2024, 9 pages.
"Office Action Issued in Corresponding Vietnamese Patent Application No. 1-2022-03843", Mailed Date: Apr. 24, 2024, 4 pages.
"Non-Final Office Action for U.S. Appl. No. 18/349,553", Mailed Date: May 28, 2024, 15 pages.
"First Office Action Issued in Corresponding Chinese Patent Application No. 2020800561141", Mailed Date: Aug. 9, 2024, 22 pages.
"Office Action Issued in Corresponding Korean Patent Application No. 10-2022-7028309", Mailed Date: Sep. 13, 2024, 19 pages.
"Notice of Allowance and Fees Due Issued in Corresponding U.S. Appl. No. 18/349,553", Mailed Date: Sep. 18, 2024, 8 pages.
"Notice of Allowance and Fees Due Issued in Corresponding U.S. Appl. No. 17/782,070", Mailed Date: Sep. 18, 2024, 10 pages.
"Final Office Action Issued in Corresponding U.S. Appl. No. 17/781,939", Mailed Date: Aug. 29, 2024, 12 pages.
"Office Action Issued in Corresponding U.S. Appl. No. 17/792,847", Mailed Date: Oct. 25, 2024, 18 pages.
Second Office Action for corresponding Chinese Application No. 202080056114.1 filed Aug. 7, 2020 mailed Feb. 18, 2025, 19 pages.

* cited by examiner

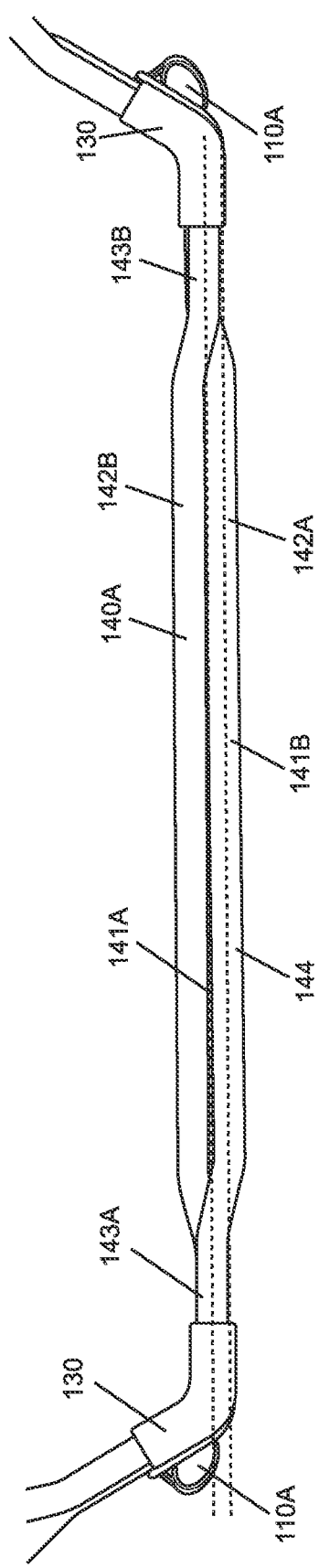

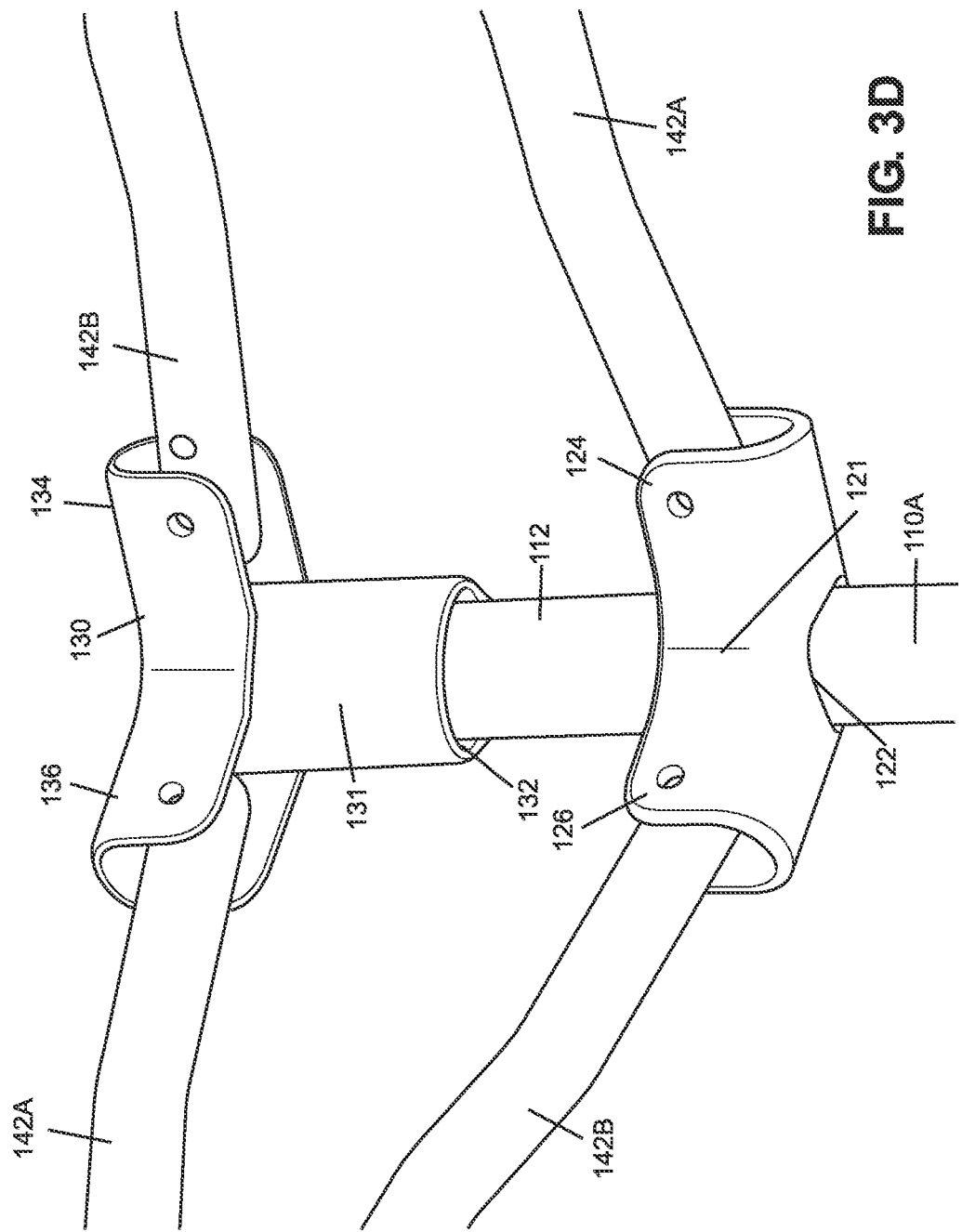

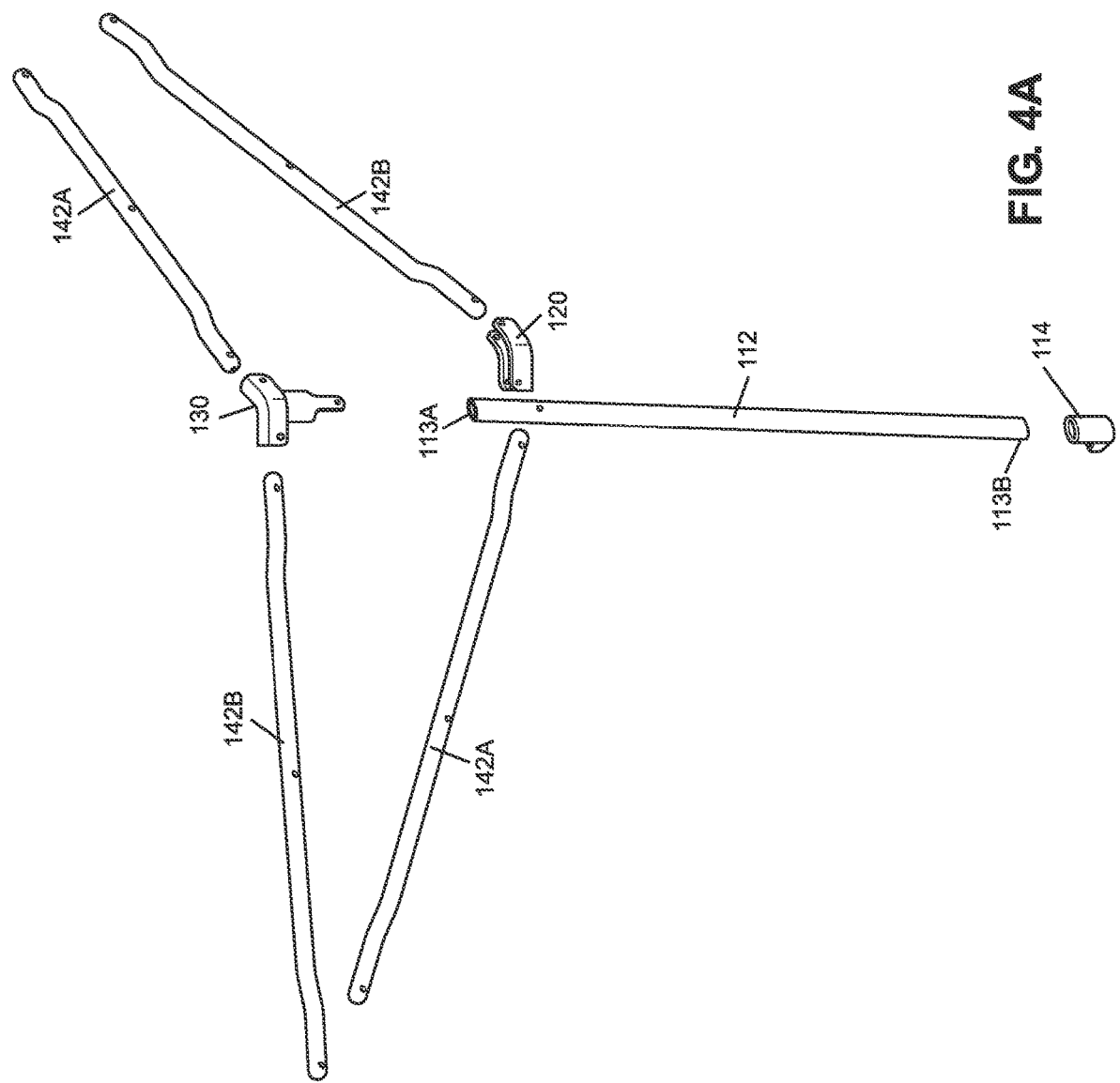

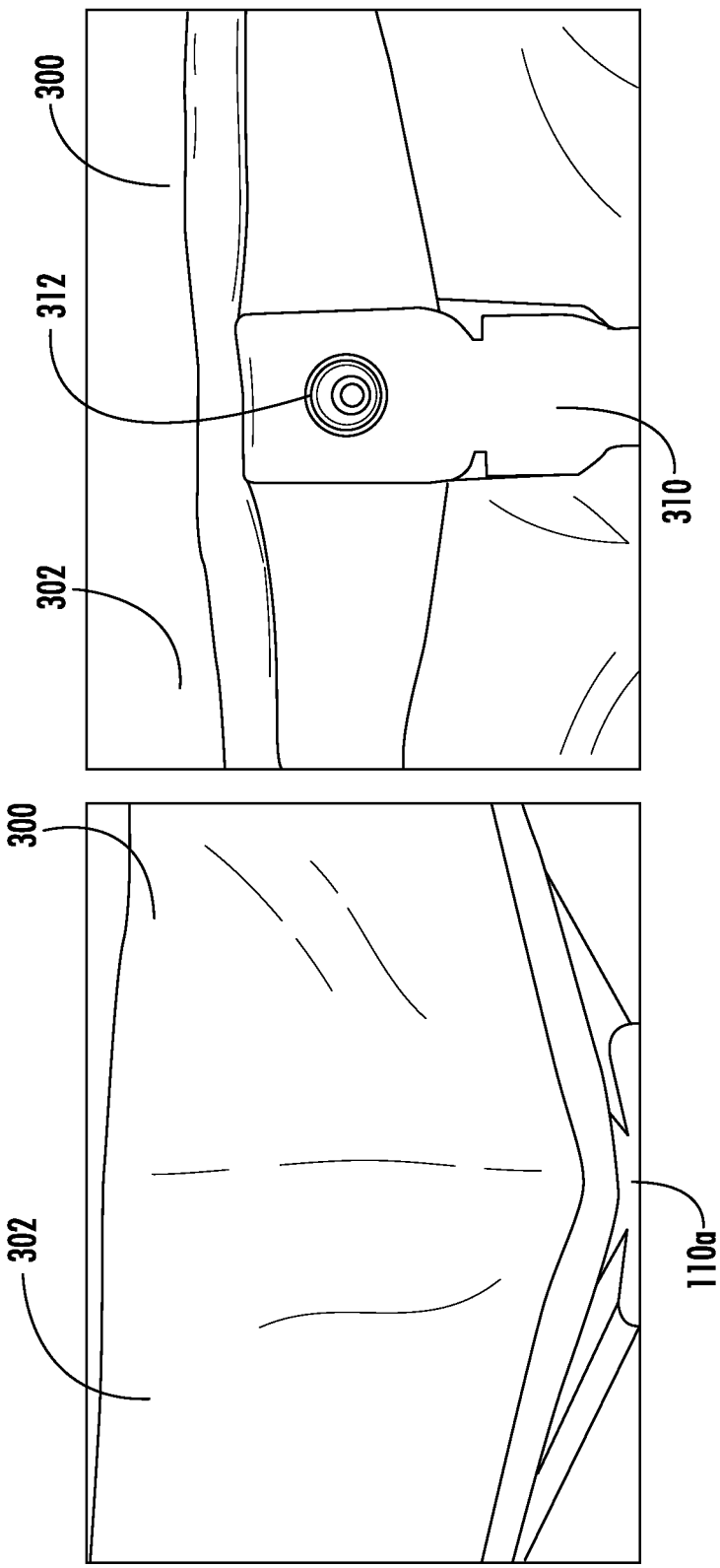

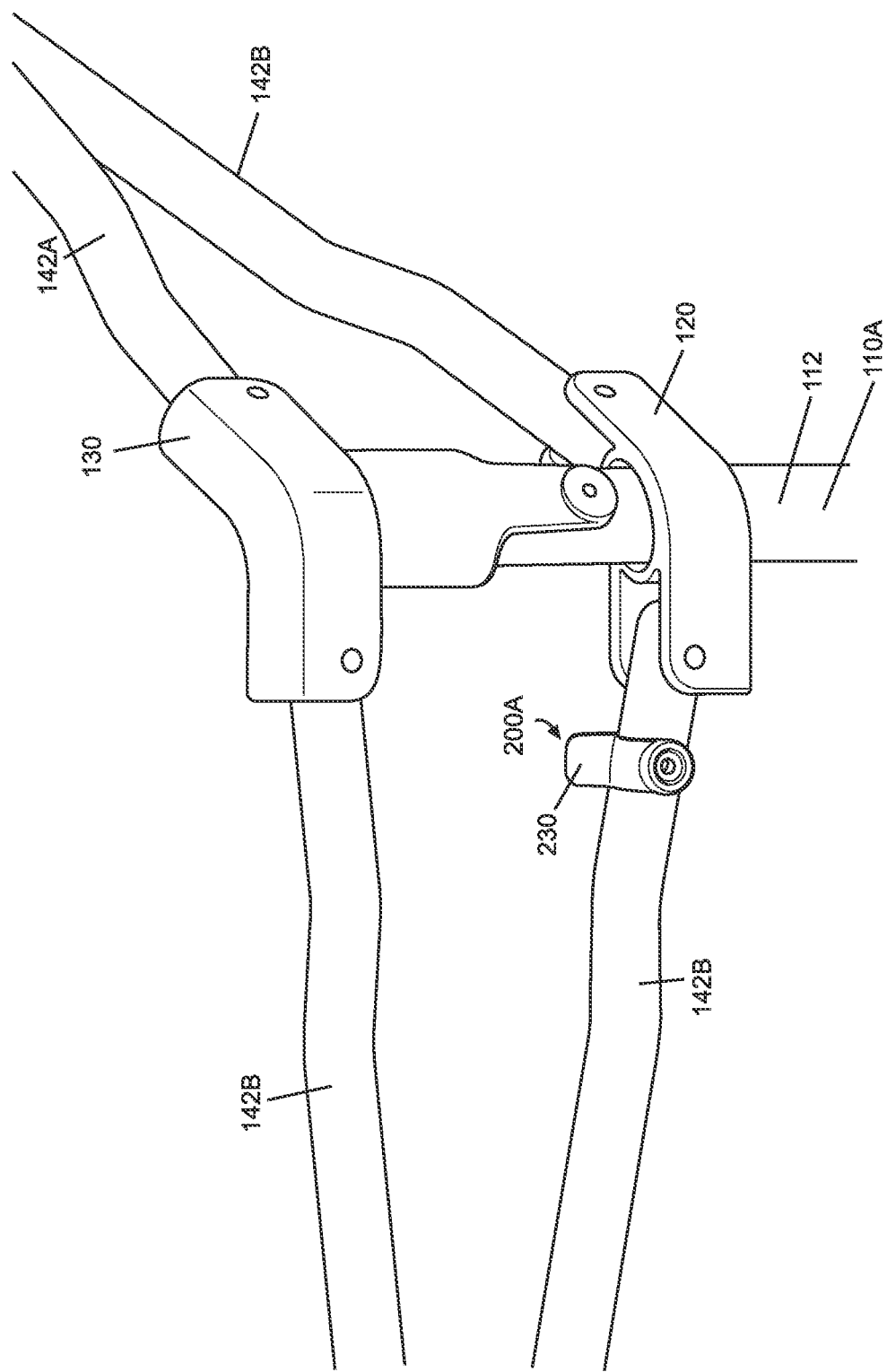

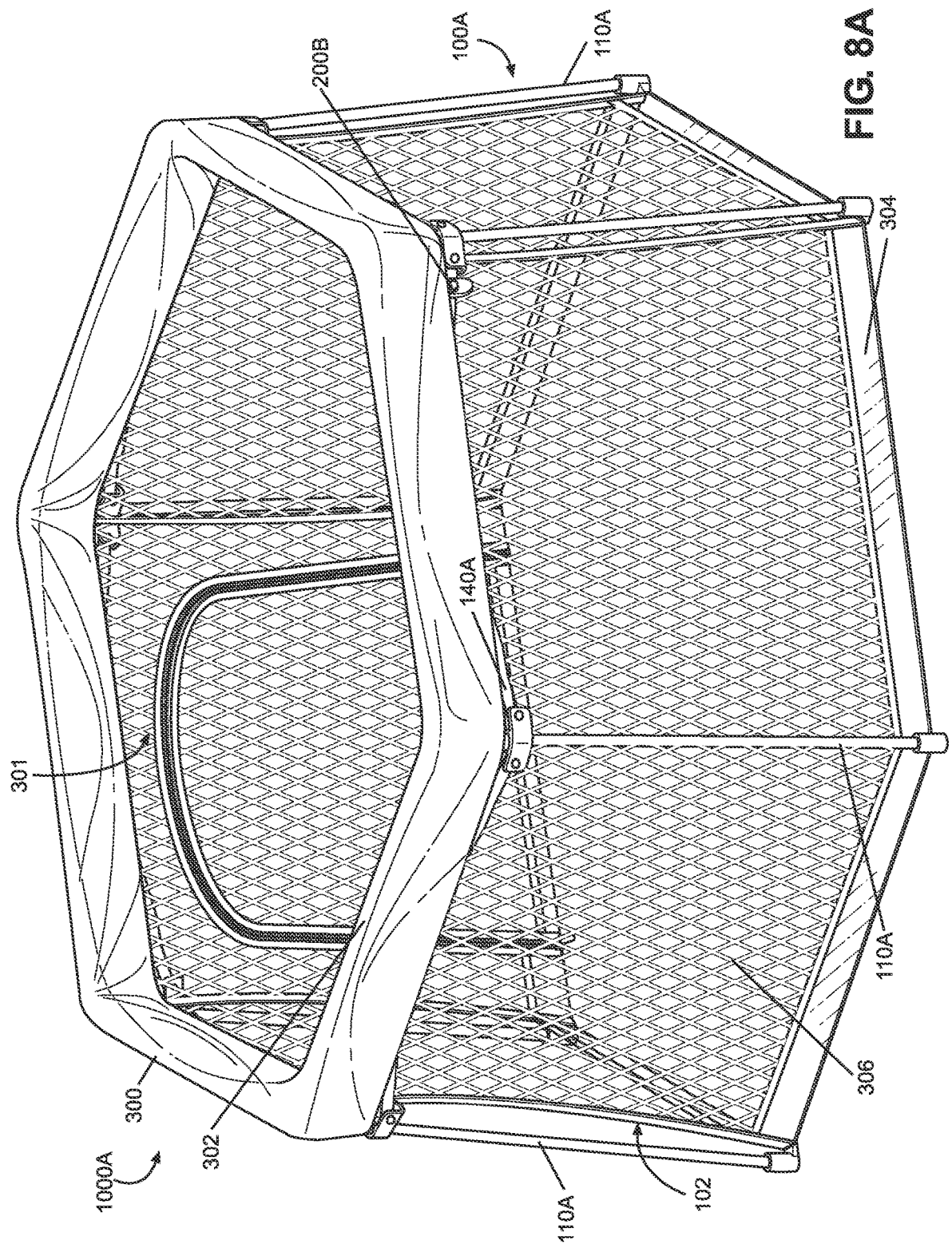

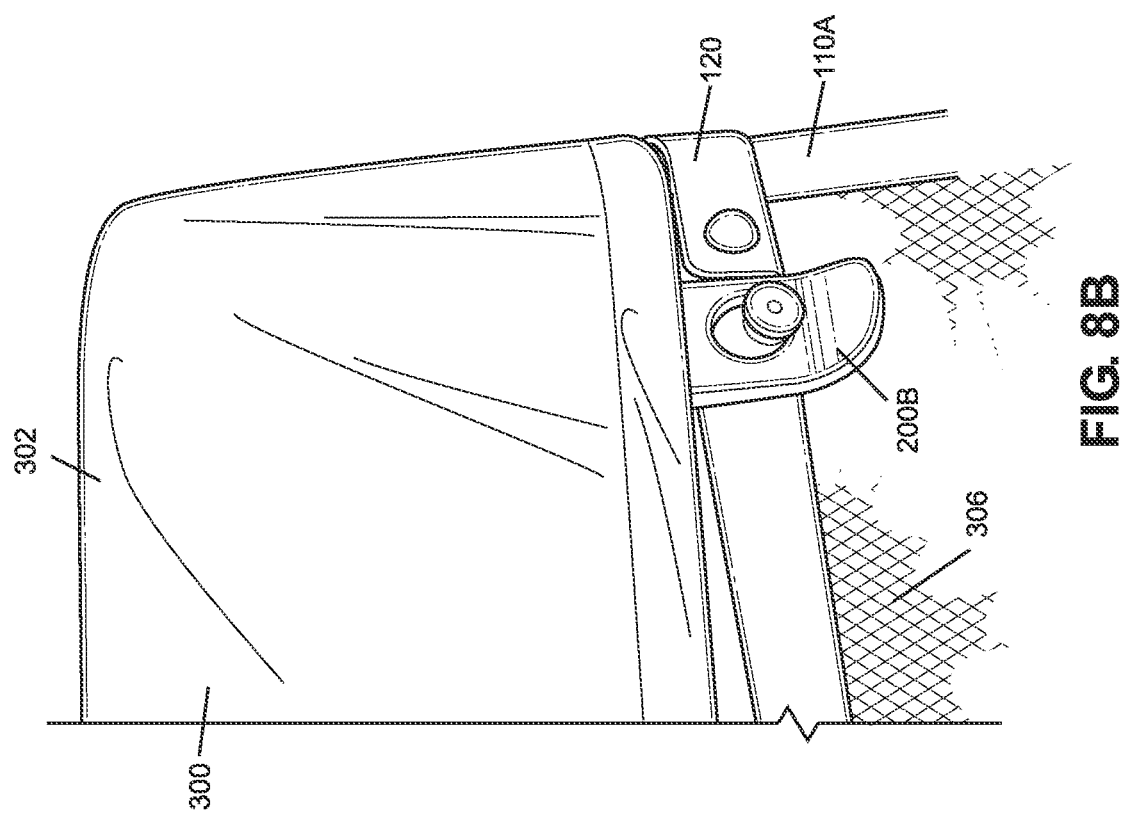

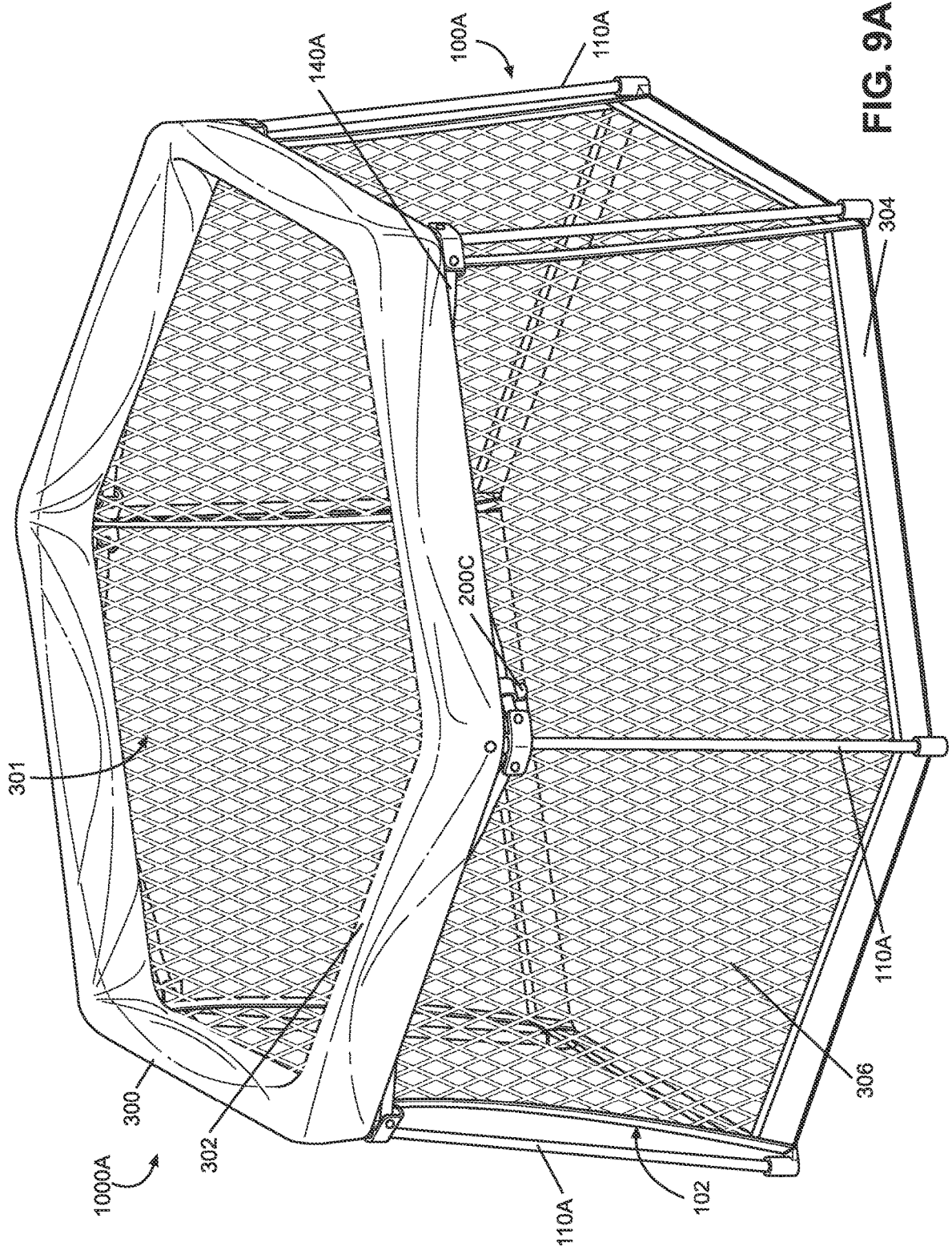

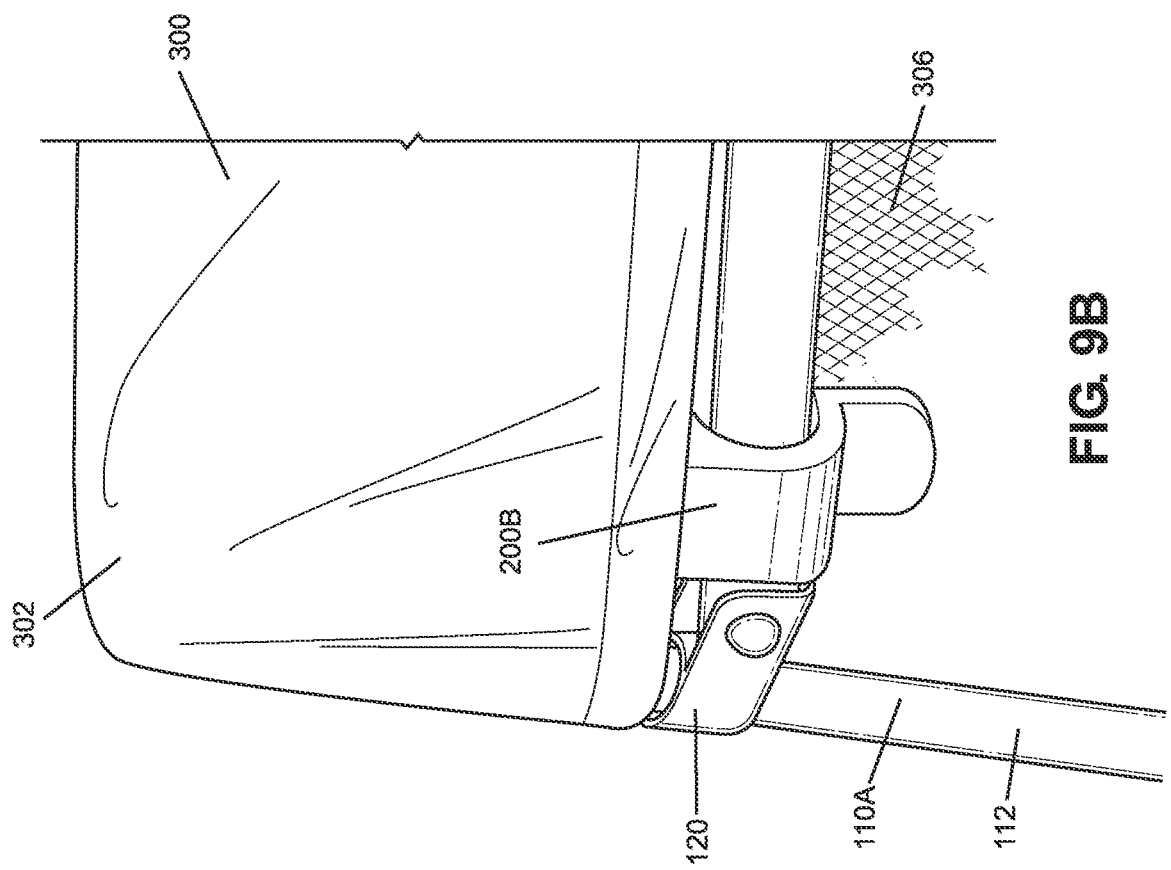

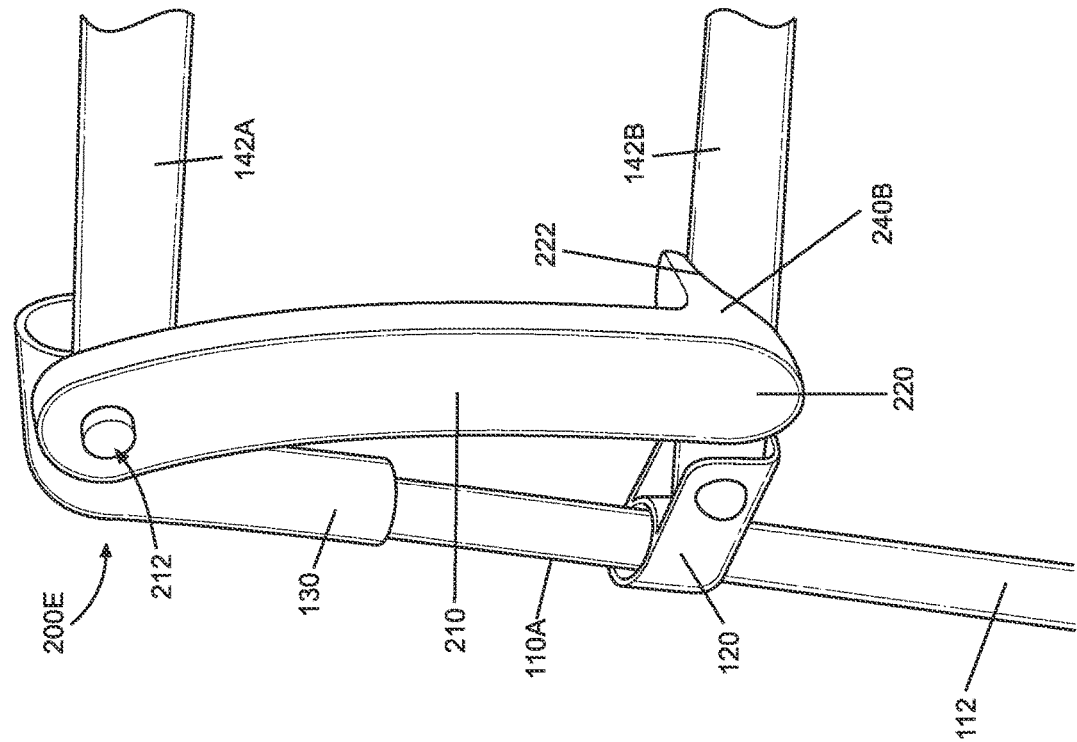
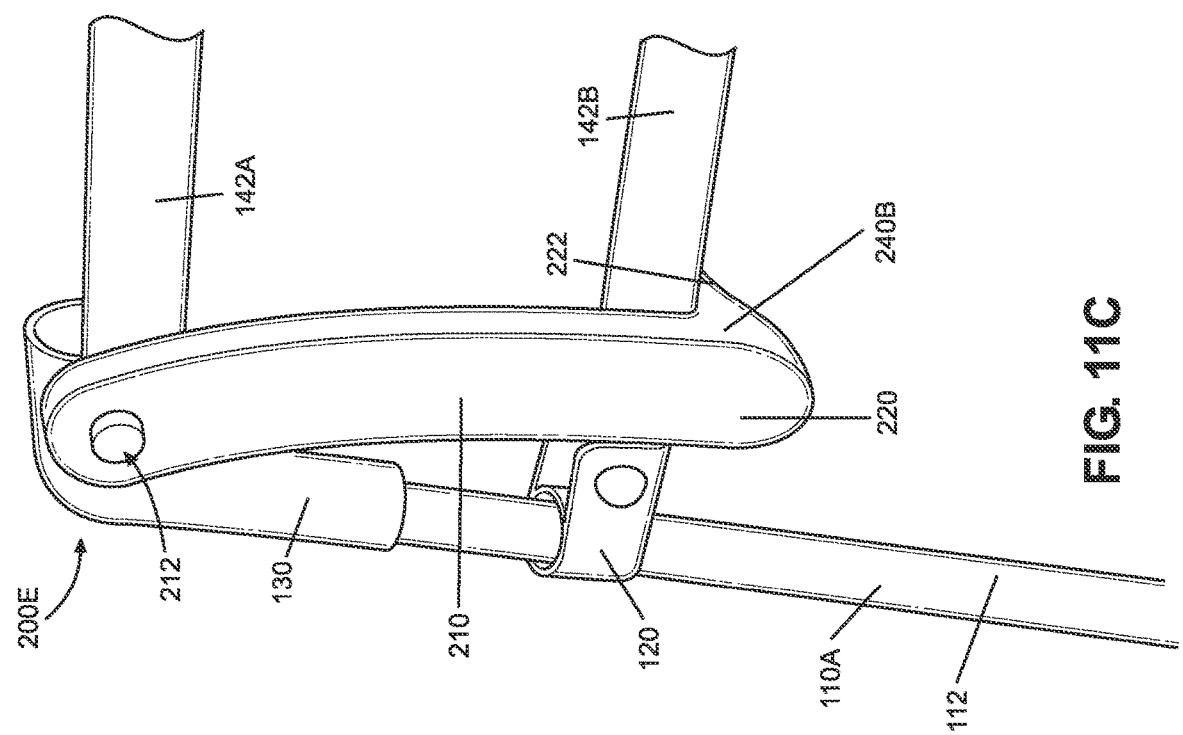
FIG. 11D
FIG. 11C

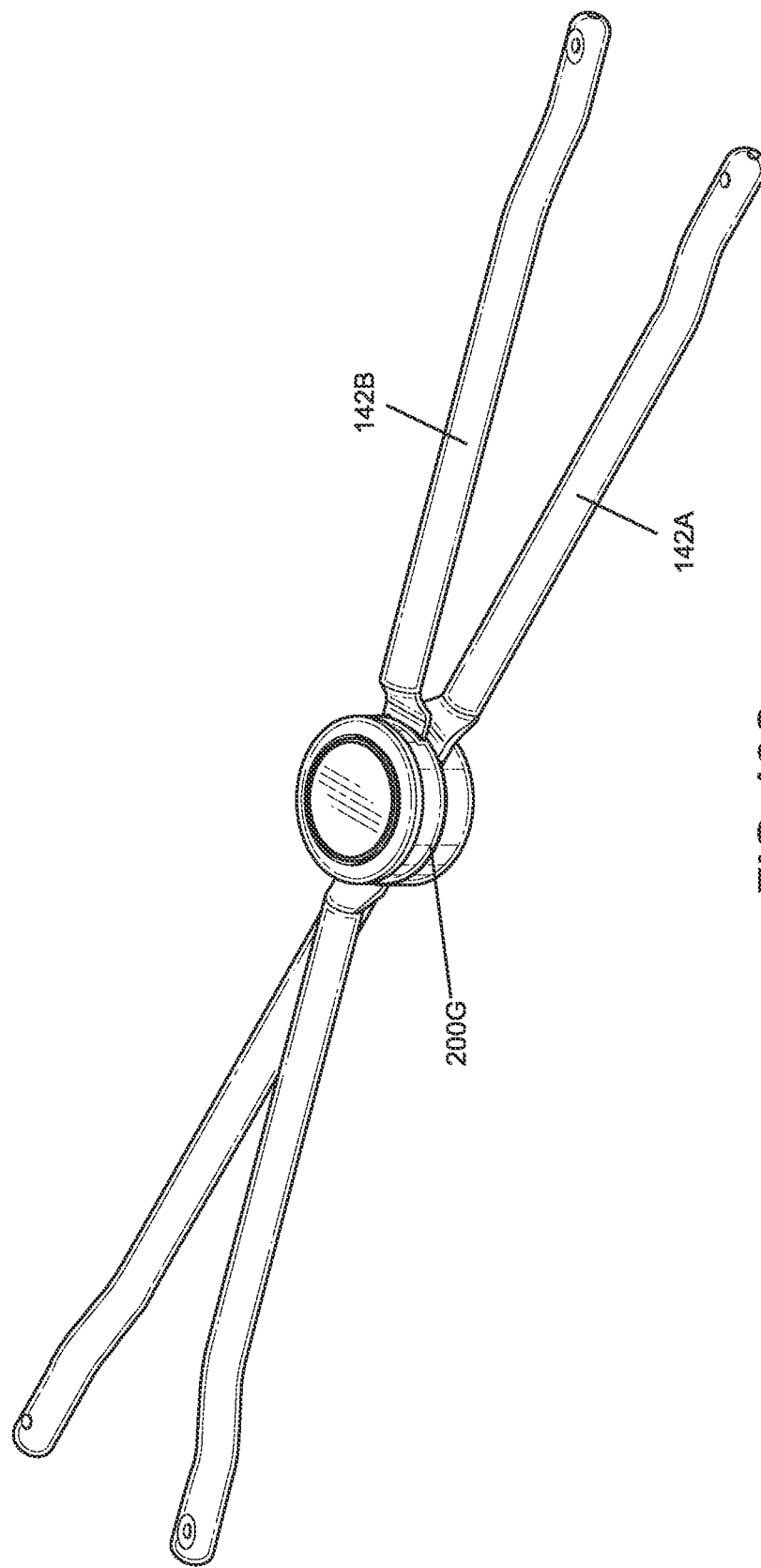

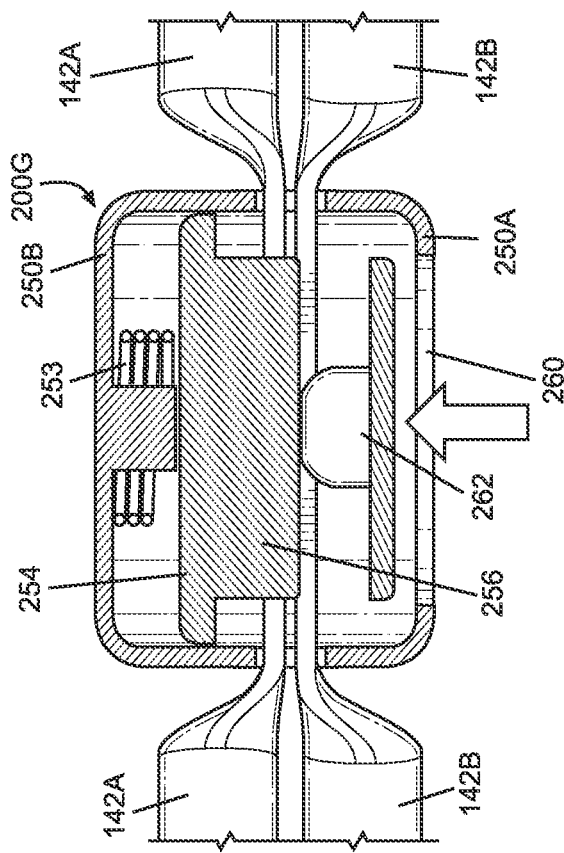
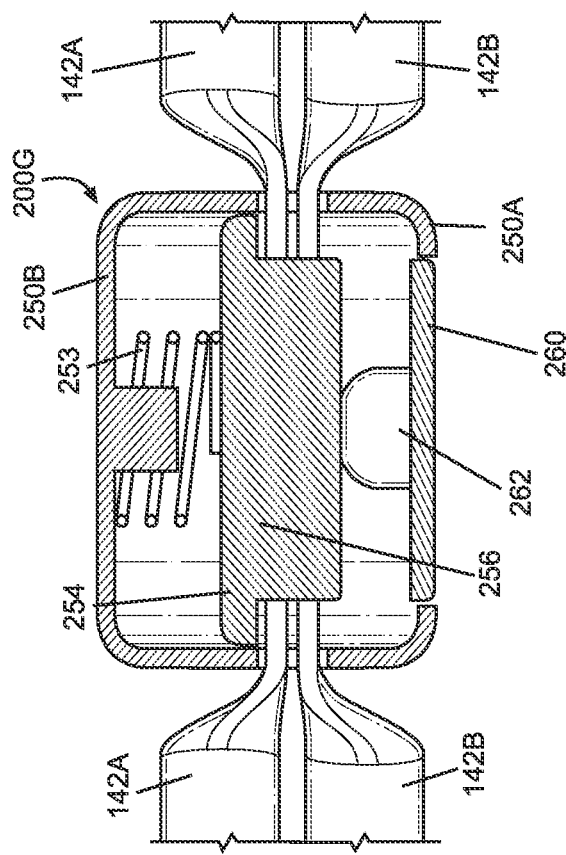

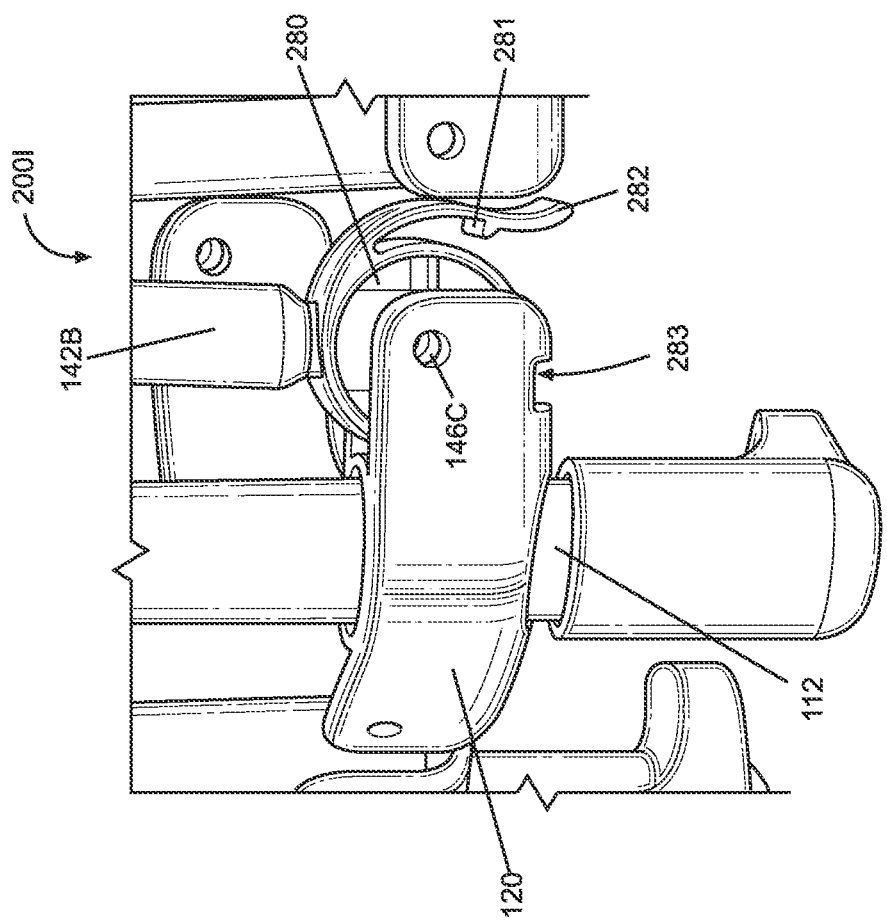

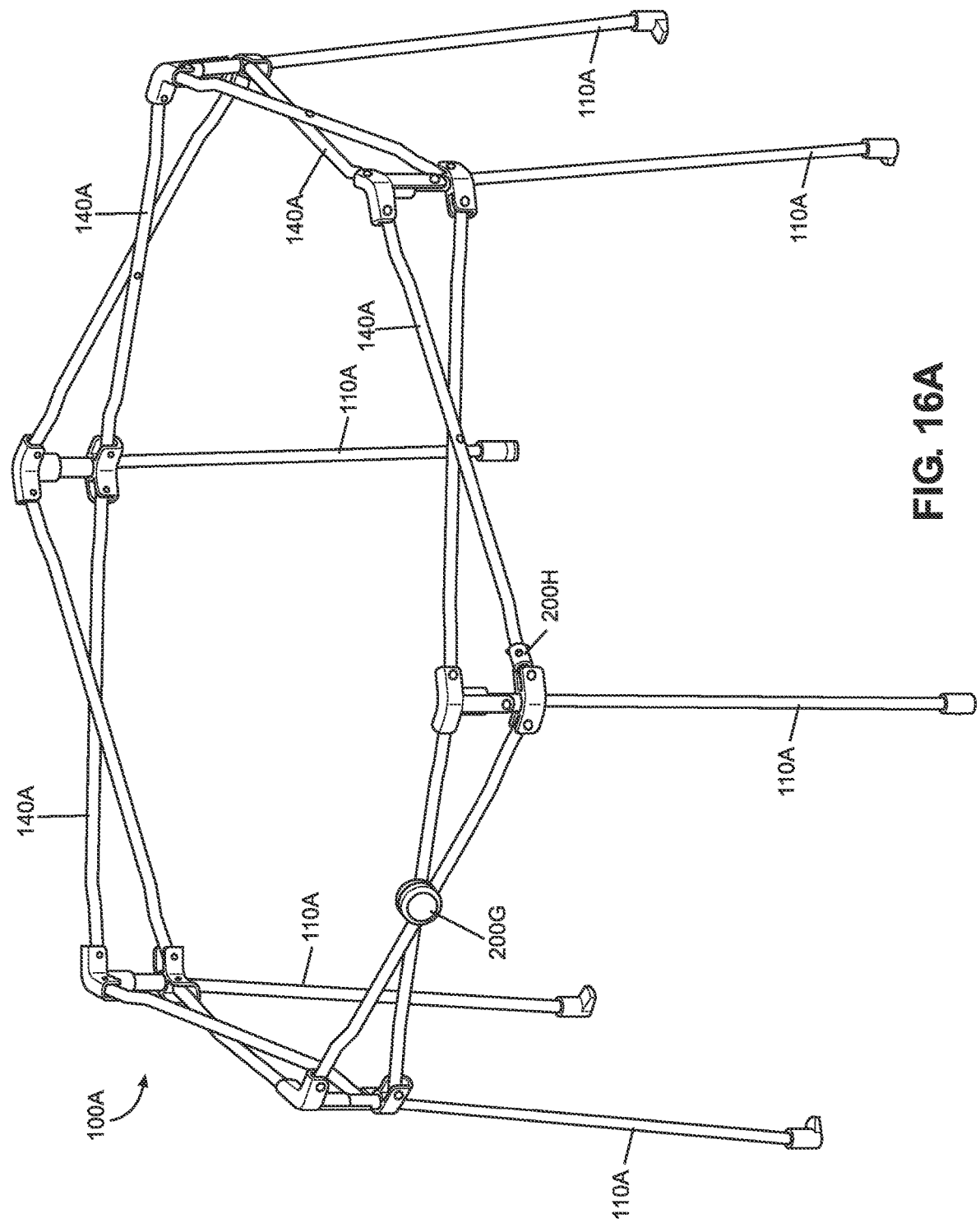

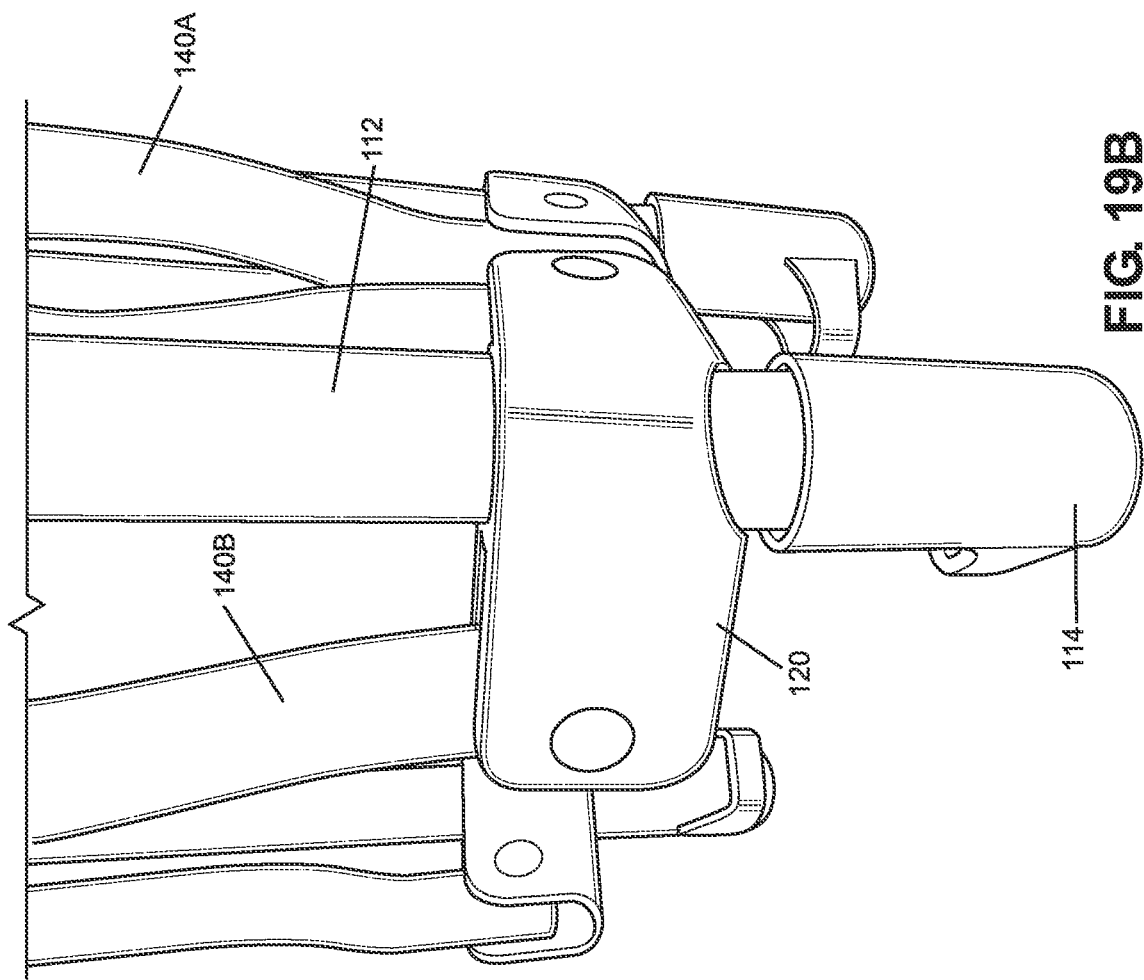

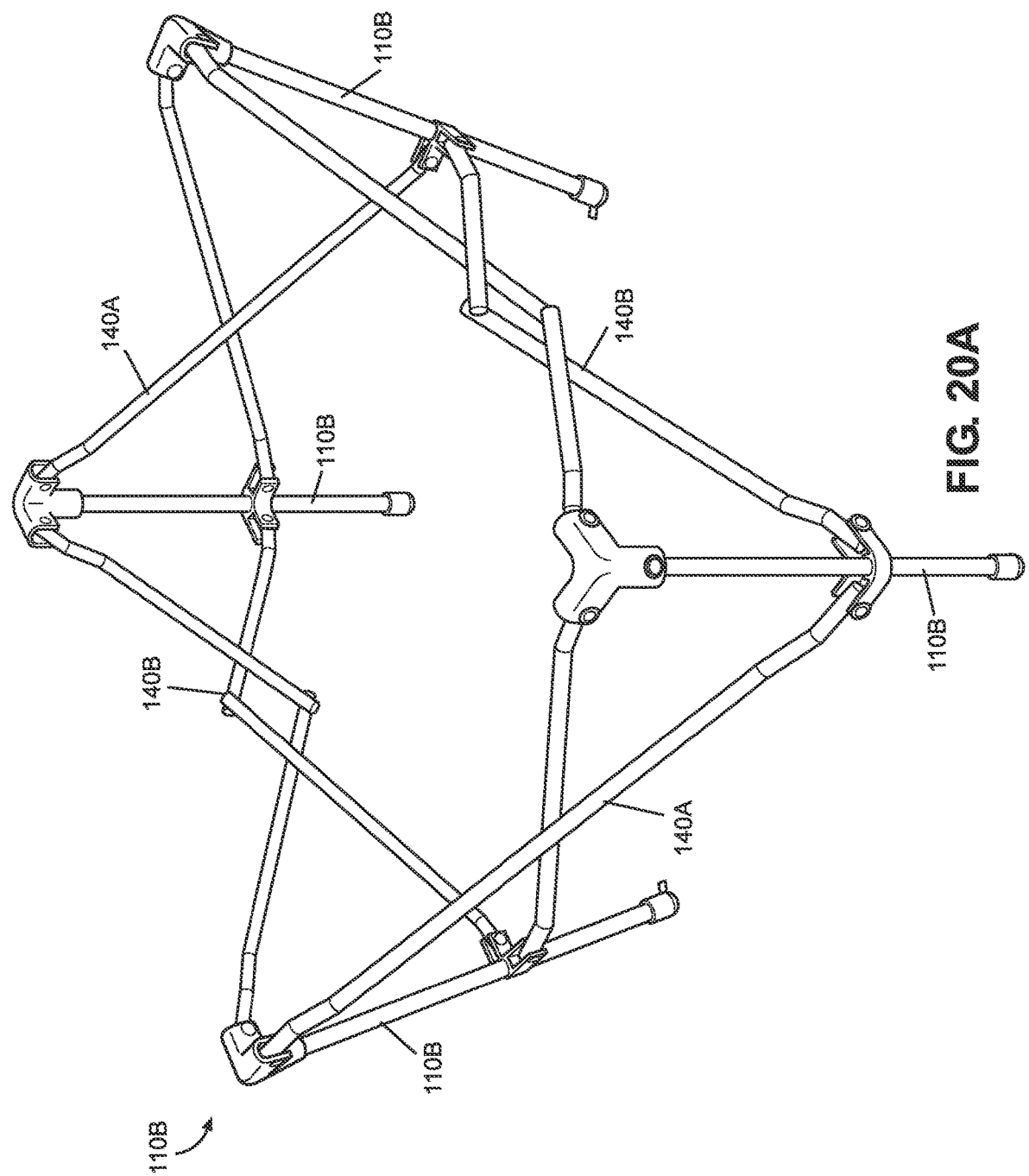

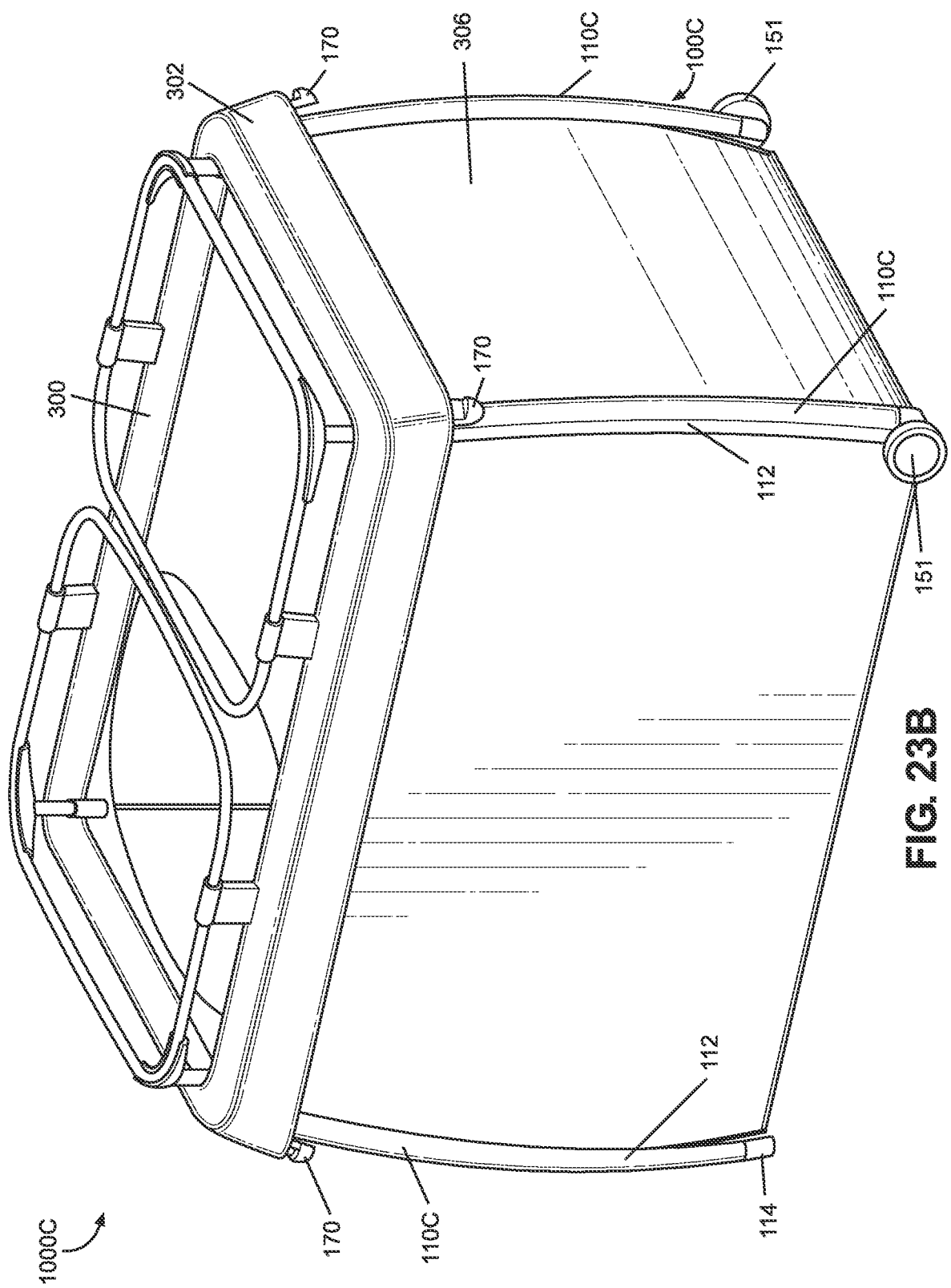

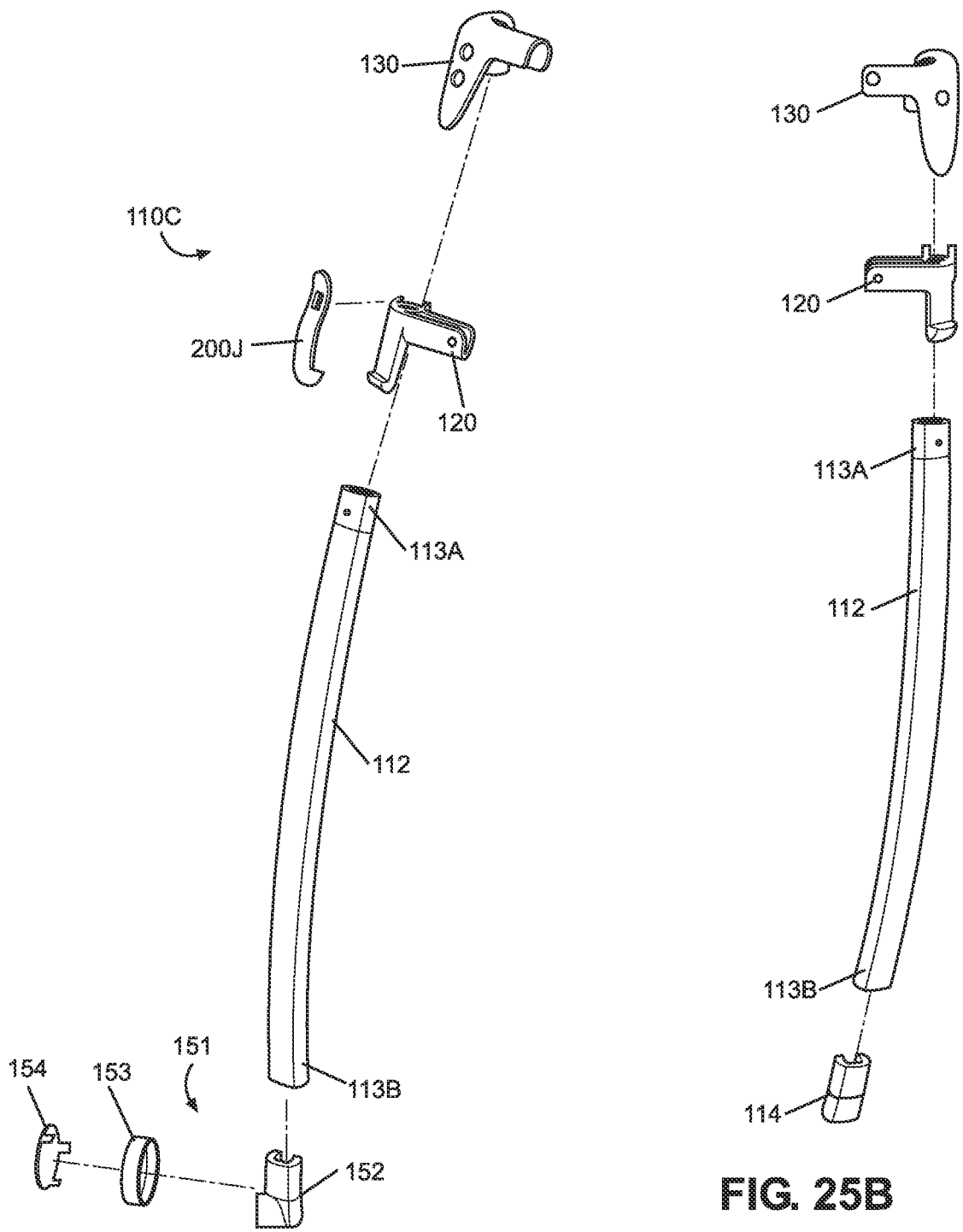
FIG. 25A  FIG. 25B

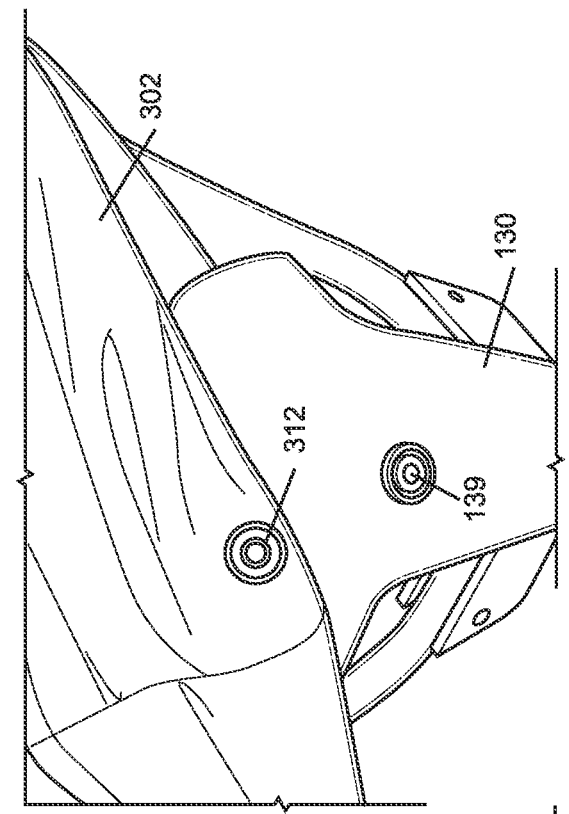
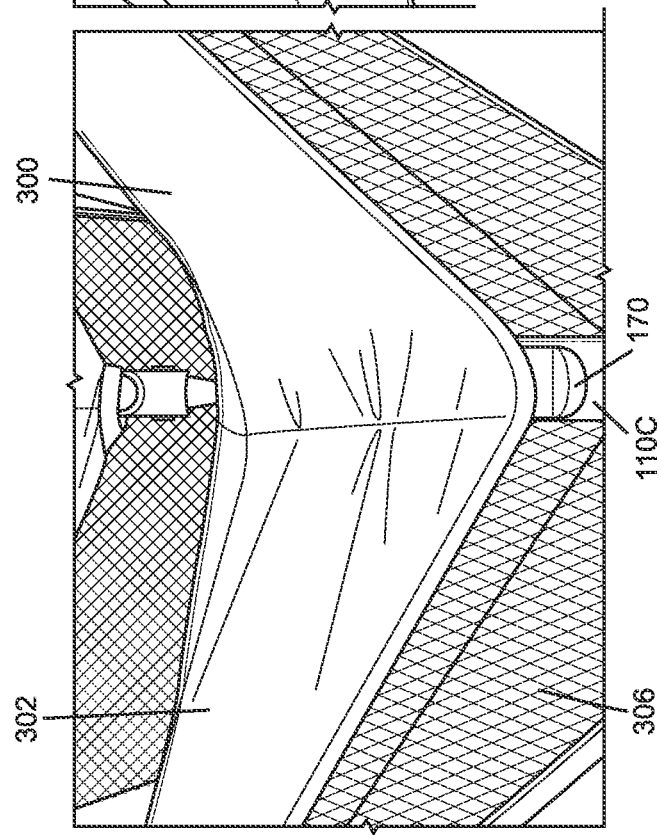

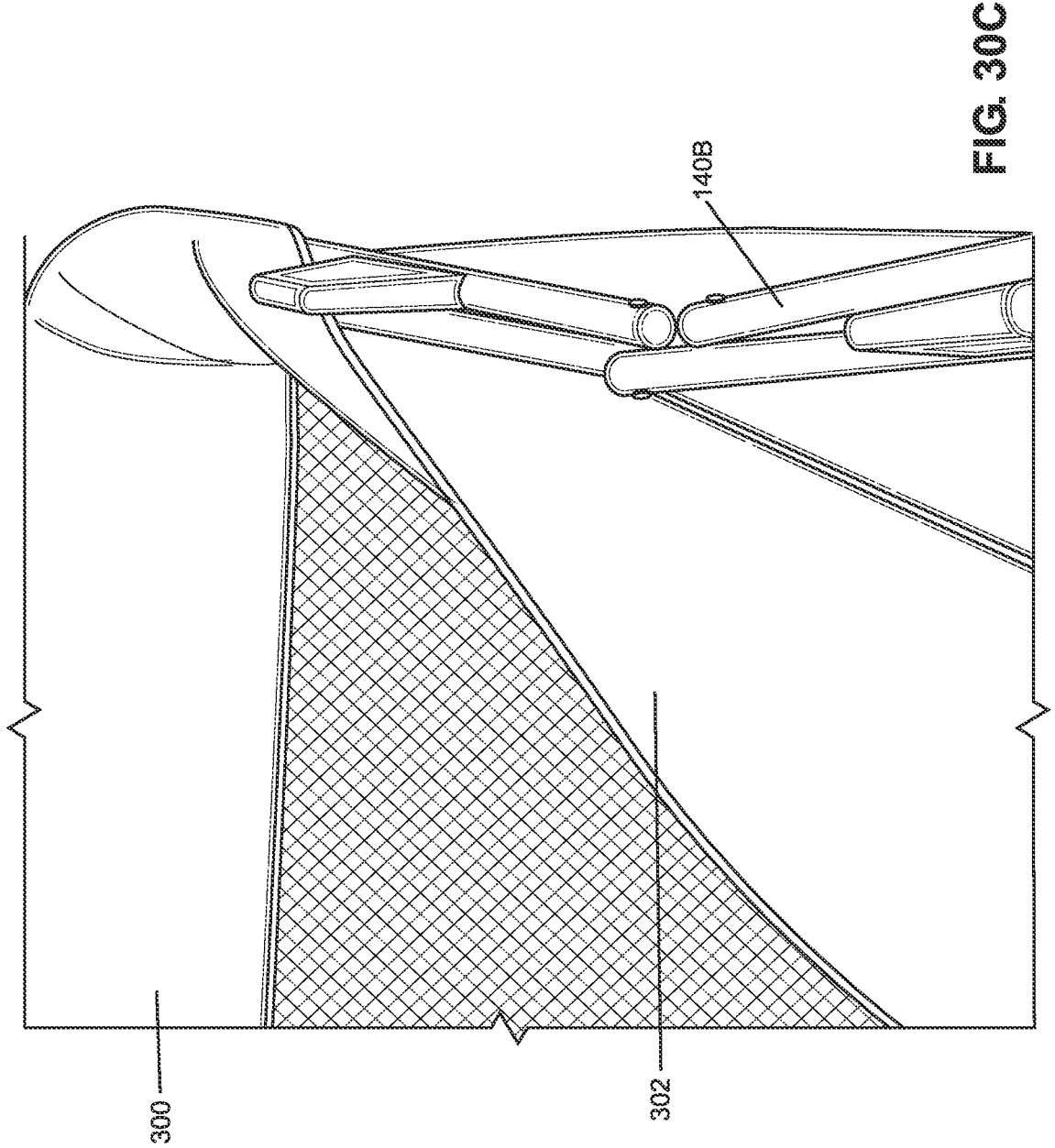

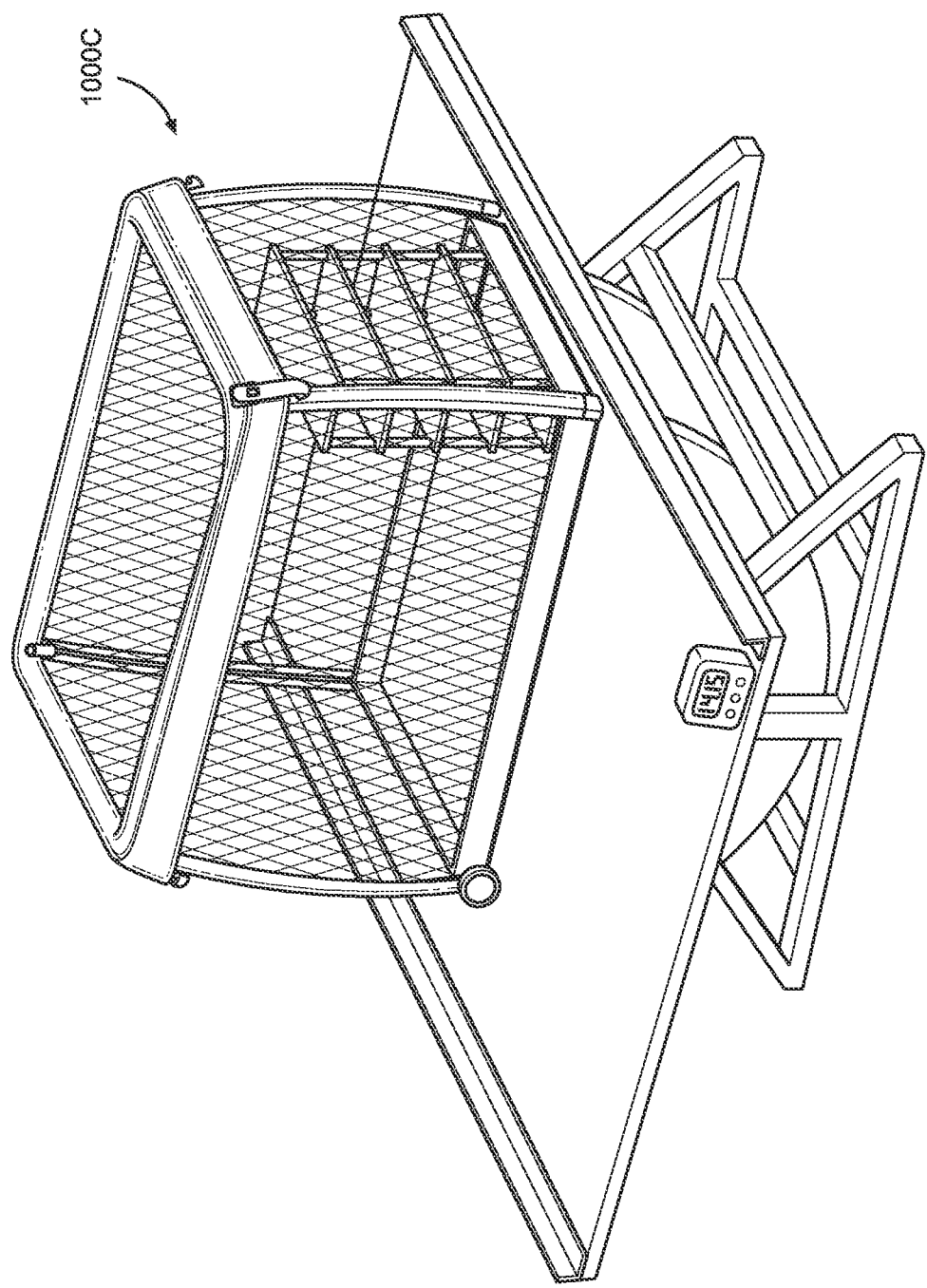

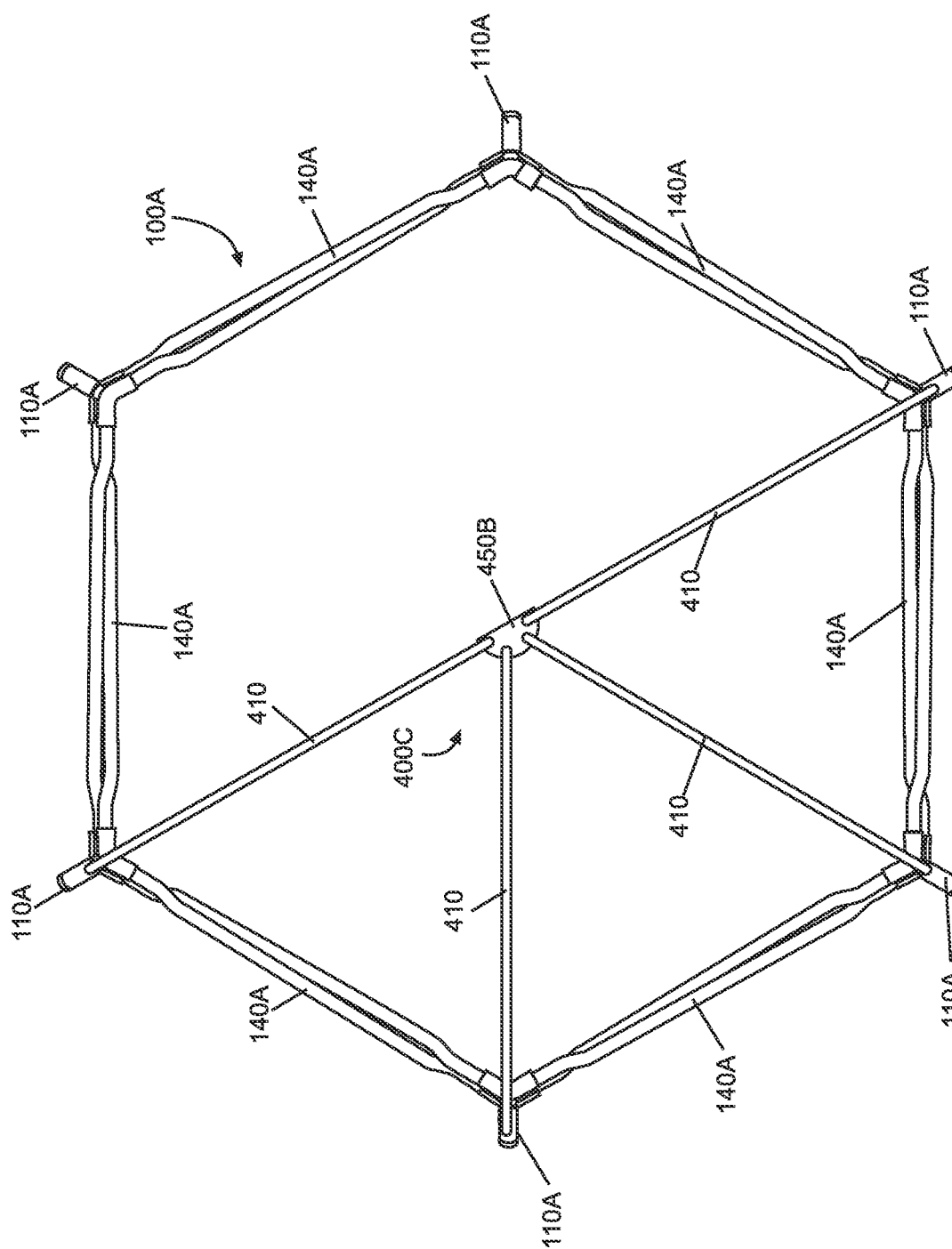

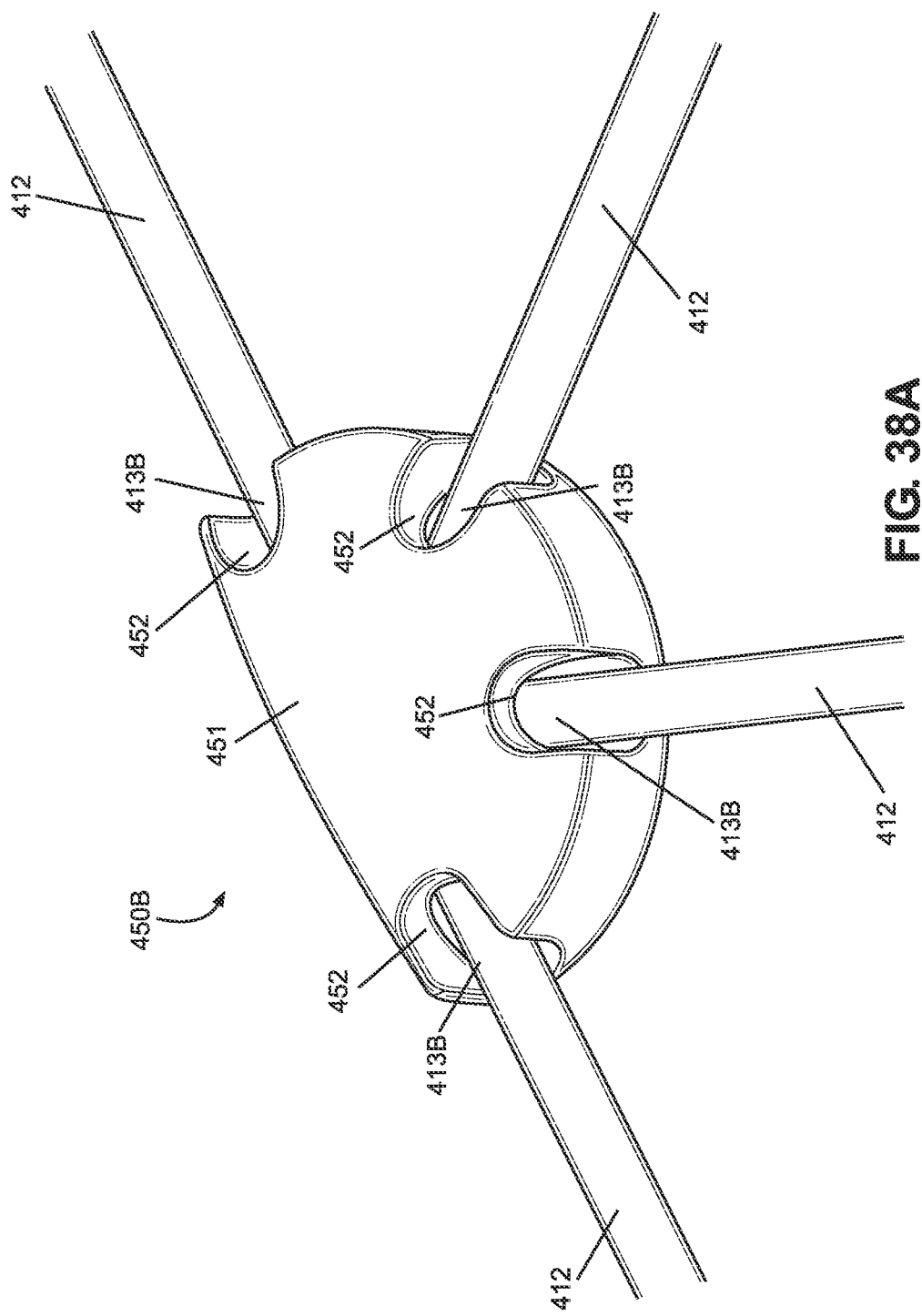

FOLDABLE PLAYARD HAVING X-FRAME ASSEMBLIES, OVAL-SHAPED LEG ASSEMBLIES, AND CANOPY COVER

CROSS-REFERENCE TO RELATED APPLICATION

This application is a 371 National Stage Entry of PCT Application No. PCT/US2020/063427, filed on Dec. 4, 2020, entitled "Foldable playard having x-frame assemblies, oval-shaped leg assemblies, and canopy cover," which claims a priority benefit to U.S. Provisional Application No. 62/943,409, filed on Dec. 4, 2019, entitled, "Canopy Attachment for Playard." Each of the aforementioned applications are incorporated by reference herein in their entirety.

BACKGROUND

A playard (also referred to herein as a "playpen" or a "game bed") is a framed enclosure that provides a safe and comfortable space for a young child (e.g., an infant, a toddler) to sleep and play without significant supervision from a caregiver. The playard typically includes a support structure (e.g., a frame) that outlines an interior space of the playard; the playard also includes soft padding (also referred to herein as "soft goods") placed within the interior space to provide a partially enclosed cushioned space to contain the child. Playards are generally foldable and/or collapsible to improve portability. For example, the caregiver may fold the playard for storage and/or transport and unfold the playard for use. Various types of playards have been manufactured and commercialized over the years with designs that have evolved, in part, depending on whether the playard is used primarily in outdoor settings or indoor settings.

FIG. 1A shows one example of a conventional outdoor playard 10a in an unfolded configuration. As shown, the playard 10a includes a frame 46 with multiple X-frame assemblies 20a that outline an interior space 11. Each X-frame assembly 20a includes X-tubes 22a and 22b that form a crossing pattern. In this example, the X-frame assemblies 20a are pivot-only X-frame assemblies where the X-tubes 22a and 22b are only rotatably coupled to each other and to other X-tubes to such that the frame 46 is foldable. As shown in the exploded-view inset in FIG. 1A, the playard 10a is provided with a latch mechanism 16 that attaches to the X-tubes 22a and 22b to lock the X-frame assemblies 20a in place when unfolded. Soft goods 12 are attached to the X-frame assemblies 20a and disposed along the sides and the floor of the interior space 11 for providing a partially enclosed space 13 for the child that is shaped and/or dimensioned to be similar to or smaller than the interior space 11 of the frame 46. As shown, the soft goods 12 includes webbing 14 along a top edge of the partially enclosed space 13 that functions as a top rail to increase the mechanical rigidity and stability of the playard 10a when the playard 10a is deployed. FIG. 1A also shows the playard 10a includes a canopy cover 40 disposed above the partially enclosed space 13 and mounted to the X-frame assemblies 20a to provide shade for a child.

FIG. 1B shows another example of a conventional outdoor playard 10b. As shown, the playard 10b includes a frame 46 with multiple pivot and slidable X-frame assemblies 20b coupled to adjoining leg support assemblies 24. Each leg support assembly 24 includes a leg tube 25, a corner (hidden beneath the soft goods 12) at the top of the leg tube 25, and a slider 26a or 26b that slides along the leg tube 25. The X-tubes 22a and 22b of each X-frame assembly 20 are coupled to respective sliders 26a and/or 26b and corners of the leg support assemblies 24. Thus, when the playard 10b is being folded or unfolded, the X-tubes 22a and 22b undergo both rotation and displacement along the leg tubes 25 via the sliders 26a and/or 26b. Compared to the pivot-only X-frame assemblies 20a of the playard 10a, the pivot and slidable X-frame assemblies 20b of the playard 10b enable the playard 10b to be folded more compactly thus occupying less space in a folded configuration; additionally, the pivot and slidable X-frame assemblies 20b allow the frame 46 to provide a larger interior space 11 and, hence, a larger partially enclosed space 13 for a child when the playard 10b is in an unfolded configuration.

As before, the soft goods 12 may be attached to the leg support assemblies 24 and/or the X-frame assemblies 20b. The playard 10b also includes a pair of latch mechanisms 16a and 16b respectively mounted to sliders 26b on leg support assemblies 24 disposed on opposing sides of the playard 10b. As shown in the inset of FIG. 1B, the sliders 26b are different from the sliders 26a due to including features to lock the latch mechanisms 16a and 16b. The playard 10b also includes a canopy cover 40 disposed above the partially enclosed space 13 and mounted to the corners of the leg support assemblies 24.

FIG. 1C shows an example of a conventional indoor playard 10c. As shown, the playard 10c includes a frame 46 formed from multiple legs 30 and rigid top rails 32 to provide a rigid frame supporting soft goods 12. The frame 46 also includes a bottom support structure 34 so that the floor of the partially enclosed space 13 defined by the soft goods 12 is suspended off the ground. Compared to the outdoor playards 10a and 10b, the indoor playard 10c does not include X-frame assemblies to facilitate folding and/or unfolding. Instead, the top rails 32 are coupled to a hinge 36, which allows the playard 10c to be collapsed into a smaller form as shown in FIG. 1D. Additionally, the bottom support structure 34 is also foldable. Thus, to fold the playard 10c, the caregiver needs to first remove some of the soft goods 12, pull up a bottom hub to fold the bottom support structure 34 (step 'A' in FIG. 1D), and then unlock and fold the top rails 32 (step 'B' in FIG. 1D). The caregiver needs to perform these steps in reverse to setup the playard 10c.

SUMMARY

The Inventors have recognized and appreciated that a foldable playard provides a caregiver a convenient and safe space for their child to play and/or sleep once the playard is setup, which alleviates the caregiver from having to continuously monitor their child. However, the Inventors have also recognized that conventional playards in some instances may be cumbersome to setup and/or stow away due, in part, to complicated mechanisms for folding, unfolding, latching and/or unlatching the playard (and correspondingly protracted procedures that the caregiver needs to perform while generally caring for their child). The complexity of conventional playards also results in a bulkier product, which is more difficult to handle and more expensive to manufacture and purchase as a consumer.

First, the Inventors have observed that conventional playards typically include various support structures, in addition to their frames, to provide more rigid boundaries outlining the interior space, so as to better contain the child and/or to increase the mechanical rigidity and stability of the frame. In many instances, one or more additional support structures are added to the frame of a conventional playard to ensure the playard meets various consumer safety standards related to the mechanical properties of the frame (e.g., American Society for Testing and Materials (ASTM) F406-19 entitled, "Standard Consumer Safety Specification for Non-Full-Size Baby Cribs/Play Yards").

With reference again to FIG. 1A and FIG. 1B, as noted above the respective frames 46 of the playards 10a and 10b include X-frame assemblies 20a and 20b to facilitate folding and/or unfolding of the frames 46. When unfolded, the X-frame assemblies 20a and 20b are disposed along the respective sides of the frames 46, thus providing a mechanically rigid and stable structure.

However, FIG. 1A shows the X-tubes 22a and 22b of the X-frame assembly 20a in the playard 10a, when unfolded, span the sides of the frame 46; this results in a top portion 47 of the interior space 11 above the X-frame assembly 20a that is not mechanically supported by the frame 46. If flexible, compliant soft goods 12 are placed over the frame 46 as shown in FIG. 1A, a child could potentially climb out of the playard 10a through the top portion 47 by folding and/or collapsing the soft goods. In view of the foregoing, as an additional support structure, the soft goods 12 includes an integrated webbing 14 that is pulled taut when the frame 46 is unfolded such that the webbing 14 mechanically functions as a top rail. In this manner, the webbing 14 provides a more rigid boundary spanning the top portions 47 of the interior space 11 to support the soft goods and to better keep the child within the playard 10a.

FIG. 1B similarly shows that the X-tubes 22a and 22b of the X-frame assembly 20b in the playard 10b, when unfolded, do not mechanically support the top portions 47 of the interior space 11 above the X-tubes 22a and 22b. Thus, similar to the playard 10a, the playard 10b includes webbing 14 that is directly coupled to the leg support assemblies 24 as an additional support structure. When the frame 46 of the playard 10b is unfolded, the webbing 14 is once again pulled taut to form a top rail and thereby provide a more rigid boundary spanning the top portions 47 of the interior space. It should be appreciated that without the webbing 14, the playards 10a and 10b are unlikely to comply with various consumer safety standards, such as ASTM F406-19.

As noted above in connection with FIG. 1C, the playard 10c includes rigid top rails 32 that connect adjacent legs 30. In this manner, the frame 46 of the playard 10c provides mechanical support structures that span the top and side boundaries of the interior space 11. However, a frame that only has vertical or nearly vertical legs and top rails is often prone to mechanical instability. For example, the frame may tilt to one side due to the bottom portion of the legs being mechanically unconstrained and/or due to backlash or slop between the joints connecting the rails and the legs together. This mechanical instability may be further exacerbated if the legs and the rails are configured to move relative to one another, e.g., to facilitate folding of the playard. Given this mechanical instability, to reinforce the frame 46 the playard 10c includes an additional bottom support structure 34 that connects the legs 30 located at opposing corners of the frame 46.

The various support structures added to conventional playards as discussed above, and the various modifications made to the playards to accommodate these support structures, increase the complexity, number of parts, and cost of these playards.

For instance, the webbing 14 for the playards 10a and 10b needs to be sewn directly into the soft goods 12 or the X-frame assemblies 20a and 20b, and/or the leg support assemblies 24 need to incorporate additional structural features to directly attach to the soft webbing 14—both of which increase design complexity resulting in higher manufacturing costs. For the playard 10c, the rigid top rails 36 and the bottom support structure 34 need to include additional mechanisms (e.g., the hinge 36, hinges connecting the various members of the bottom support structure 34) to facilitate tear down and folding of the playard 10c, which increase the number of parts for manufacture and assembly. As shown in FIG. 1D, these additional mechanisms also make it more difficult for the caregiver to setup and tear down the playard 10c by adding additional steps (e.g., steps 'A' and 'B'). In particular, the playard 10c is especially difficult to unfold since the playard 10c tends to tip over and/or partially collapse when partially unfolded.

The Inventors also have recognized that conventional playards often include frames that compromise between the ease of folding and/or unfolding the frame and other aspects related to the practical use of the playard. For example, the playards 10a and 10b include X-frame assemblies 20a and 20b, respectively, which makes folding and/or unfolding the respective frames 46 appreciably easier for the caregiver. However, the X-frame assemblies 20a and 20b both span an appreciable portion (if not all) of the sides of the respective frames 46 as described above, which may interfere with the visibility of a child in the partially enclosed space 13 and thereby impede or obstruct a caregiver's ability to easily see the child in the playard.

More specifically, with reference again to FIG. 1A, the soft goods 14 in the playard 10a includes see-through portions along the sides of the partially enclosed space 13, which are intended to allow the caregiver to see their child. However, the X-tubes 22a and 22b in the pivot-only X-frame assemblies 20a span the entire sides of the partially enclosed space 13, thus obstructing the see-through portions of the soft goods 14 and, hence, limiting a caregiver's ability to visually check on their child in the partially enclosed space 13. For the playard 10b, the pivot and slidable X-frame assemblies 20b do not span the entire sides of the partially enclosed space 13. However, FIG. 1B shows the combination of the X-frame assemblies 20b and the soft goods 14 instead covers nearly the top half of the partially enclosed space 13, thus limiting the areas in which the caregiver can see into the partially enclosed space 13.

In another example, the frame 46 of the playard 10c allows the caregiver to readily see into the partially enclosed space 13 at the expense of using a more complicated folding/unfolding mechanism as described above. Indoor playards are also typically designed to be aesthetically pleasing for indoor settings (e.g., the indoor playard should match other indoor furniture), which can often lead to compromises in other areas such as ease of use. For instance, X-frame assemblies are often only used for outdoor playards because the appearance of X-tubes clashes with most indoor furniture.

The Inventors further have observed that conventional playards often include complex latch mechanisms that are expensive to manufacture and difficult for consumers to use. For example, conventional playard frames that utilize pivot and slidable X-frame assemblies, such as the playard 10b shown in FIG. 1B, often include multiple latch mechanisms disposed on opposing sides of the playard to prevent any one side of the playard frame from sagging downwards when locked in the unfolded configuration. In particular, as noted above FIG. 1B shows the playard 10b includes a pair of latch mechanisms 16a and 16b disposed on opposing sides of the playard 10b. To lock or unlock the playard 10b, the caregiver needs to manually actuate each latch mechanism 16 one at a time, on different sides of the playard, which is inconvenient and cumbersome. In another example, the conventional indoor playard 10c shown in FIG. 1C includes separate latch mechanisms for each hinge 36. As described above, the caregiver needs to first lock each latch mechanism for each hinge 36 before unfolding the bottom support structure 34, during which the playard 10c may tip over and/or partially collapse if not held up properly by the caregiver.

The inclusion of multiple latch mechanisms increases the number of parts and, hence, the cost for manufacture. This drawback may be further exacerbated based on the placement and complexity of a given latch mechanism. For example, the latch mechanisms 16a and 16b in the playard 10b are mounted to the sliders of the leg support assemblies 24; as a result, the playard 10b needs to include different types of sliders, i.e., the sliders 26b forming part of the latch mechanisms 16a and 16b, and the different sliders 26a for the remainder of the leg support assemblies 24. Accordingly, this playard design increases the number of unique parts that need to be manufactured, which in turn increases manufacturing cost.

The Inventors have also observed that conventional playards also include various accessories to augment the functionality and/or environment for the child. For instance, the playards 10a and 10b both include a canopy cover 40 to provide shade for a child when the playard is deployed in outdoor settings. However, the Inventors have recognized and appreciated that in some instances various accessories, and in particular canopy covers, often are prone to misuse and premature detachment from the playard, and/or may compromise the safety of the child.

Generally, conventional canopy covers are supported by a separate canopy cover frame that directly mounts onto a top portion of the playard (e.g., the corners), which is already covered with soft goods. The presence of the soft goods can make it difficult for a caregiver to determine the proper location(s) on the playard where the canopy cover should be mounted, which can often result in incorrect canopy cover installations. Additionally, conventional canopy covers often are not attached securely to the playard due, in part, to the stack of multiple fabric layers in the soft goods. As a result, conventional canopy covers for outdoor playards are often prone to premature detachment due, for example, to a gust of wind.

Conventional canopy covers are also prone to being detached by a child placed within the partially enclosed space of the playard. For example, FIG. 1E shows the playard 10a of FIG. 1A with the canopy cover 40 pulled off a corner 28 by a child in the playard. As shown, a canopy bow 44 supports the canopy cover 40 over the playard 10a. The canopy bow 44 is attached to a canopy clip 42, which in turn should attach to the corner 28 covered by the soft goods 12. However, the combination of the canopy clip 42 not being securely attached to the corner 28 and the child's accessibility to the canopy clip 42 can lead to the removal of the canopy cover 40 by the child as shown in FIG. 1E. FIG. 1F shows another example where the child can further pull the canopy cover 40 into the partially enclosed space 13 of the playard 10a by pulling on the canopy bow 44 and/or the canopy clip 42.

In view of the foregoing observations by the Inventors, the present disclosure is thus directed to various inventive implementations of a foldable playard that is easier to operate (e.g., fold, unfold, latch and/or unlatch) as compared to conventional playards, structurally simpler with fewer parts for manufacture, and nonetheless sufficiently stable and rigid in structure so as to readily comply with various consumer safety standards (e.g., ASTM F406-19, referenced above).

In various inventive implementations, a foldable playard may generally include a frame that defines an interior space when unfolded, and soft goods that are mounted to the frame and partially disposed within the interior space to define a partially enclosed space for a child. In some implementations, a foldable playard includes an improved canopy cover assembly to cover the partially enclosed space (e.g., when the playard is deployed in an outdoor setting).

In one example of a frame for a foldable playard according to the present disclosure, the frame may be a closed frame that includes multiple leg support assemblies and X-frame assemblies arranged such that each leg support assembly is disposed along a side edge of the interior space, with the X-frame assemblies disposed between adjacent leg support assemblies along a side face of the interior space. The leg support assemblies enable the foldable playard to stand on the ground and the X-frame assemblies provide the structural support for the leg support assemblies as well as the mechanism to facilitate folding and/or unfolding of the playard. In some implementations, the leg support assemblies and the X-frame assemblies may define an interior space having a cross-section in the plane parallel to the ground that is polygonal in shape (e.g., a square, a rectangle, a hexagon).

Each leg support assembly of the frame of a foldable playard may include a leg tube, a corner mounted to a top end of the leg tube, a foot mounted to a bottom end of the leg tube, and a slider that slides between the corner and the foot. The top and bottom ends of the leg tube may align with top and bottom vertices of the interior space, respectively. Each X-frame assembly may include at least one pair of X-tubes where each X-tube is rotatably coupled to at least another X-tube, the corner, and/or the slider. By coupling at least one of the X-tubes to the slider, the X-frame assembly becomes a pivot and slidable X-frame assembly in which the X-tubes are rotationally and translationally displaced when folding and/or unfolding the playard. In this manner, the combination of the X-frame assemblies and the leg support assemblies allows for a playard that folds into a smaller form occupying less volume and/or unfolds to provide a larger interior space and, hence, a larger partially enclosed space for the child as compared to conventional playards.

In one aspect, the X-frame assemblies of the frame of the foldable playard may be positioned sufficiently near a top portion of the interior space when the playard is deployed in an unfolded configuration such that each X-frame assembly effectively functions as a rigid top rail that mechanically connects adjacent leg support assemblies in the frame. Said in another way, the respective X-tubes of each X-frame assembly form a top perimeter structure that spans the top of the playard frame, thus outlining a top opening of the interior space. For example, each pair of X-tubes in each X-frame assembly may form a sufficiently shallow X-frame structure such that the X-tubes are mechanically similar to the rigid top rails in previous playards (e.g., the top rail 32 in the playard 10c).

However, unlike previous playards, the frames of the foldable playards disclosed herein are sufficiently rigid and stable with only X-frame assemblies coupling the leg support assemblies together. In other words, in example implementations, the frames of the foldable playards disclosed herein do not include a separate top rail (e.g., the webbing 14 of the playards 10a and 10b shown in FIG. 1A and FIG. 1B, or the top rail 32 of the playard 10c shown in FIG. 1C)

or a bottom support structure (e.g., the bottom structure 34 of the playard 10c shown in FIG. 1C). Accordingly, the innovative frames described herein result in a more refined playard with sound mechanical stability using fewer parts.

In one aspect, the foldable playard frames disclosed in various examples herein achieve mechanical stability using fewer parts by reducing the length of the leg tubes as compared to conventional playards so as to make the frames less prone to being tilted and/or rotated (e.g., the resultant torque applied to a frame for a given force is reduced due to a shorter moment arm). As explained in greater detail below, in some implementations the length of a leg tube may be dimensioned based only on the portions of the foot and the corner that overlap with the leg tube and the distance the slider travels to sufficiently fold and/or unfold the frame.

Additionally, the dimensions and/or materials of the X-tubes employed in foldable playard frames disclosed in various examples herein may be chosen to provide sufficient mechanical rigidity to the frame. For example, the X-tubes may be formed from steel tubing with an exterior diameter of about 0.625 inches and a total length of about 24.5 inches. However, it should be appreciated the X-tubes may be formed from other materials (e.g., aluminum, carbon fiber) having different dimensions depending, in part, on the mechanical properties of the material and the desired dimensions of the interior space provided by the frame. In some implementations, as noted above, a frame comprising only leg support assemblies and X-frame assemblies as disclosed herein, without additional support structures, may satisfy the various mechanical rigidity, stability, and/or strength requirements set forth in various consumer safety standards (e.g., ASTM F406-19, 7.3.3, 7.11).

It should be appreciated that soft goods may be coupled at various points along the frame so that the partially enclosed space formed by the soft goods opens properly when the playard is unfolded. However, the soft goods may generally be a compliant, flexible component that remains loose instead of being pulled taut and, hence, does not appreciably improve the mechanical rigidity and/or stability of the frame.

Additionally, by placing the X-frame assemblies of the frame near the top portion of the interior space, the sides of the frame are more exposed to provide a larger window for the caregiver to see their child when the child is placed within the interior space. Furthermore, soft goods attached to the frame may more readily cover the X-frame assemblies using less material. In some implementations, the soft goods may partially cover the X-frame assemblies to provide access to a latch mechanism (described in more detail below), while in other implementations the soft goods may completely cover the X-frame assemblies such that no portion of the X-frame assemblies are observable when the playard is unfolded (which may improve, in part, the aesthetic appearance of the playard for both outdoor and indoor settings).

As discussed in greater detail below, the "top portion" of foldable playard frame in a given example implementation may generally refer to the portion of the frame proximate to the top ends of the leg tubes and/or the corners of each leg support assembly. The leg tubes of the respective leg support assemblies may generally have substantially identical lengths. In some implementations, the top portion of the frame may be defined as having: 1) a top horizontal plane that intersects the top ends of the leg tubes and/or the corners; and 2) a bottom horizontal plane that is offset vertically from the top horizontal plane such that the X-tubes are located entirely within the top and bottom horizontal planes when the X-frame assembly is unfolded. In some implementations, the bottom horizontal plane may be offset from the top horizontal plane by a distance less than or equal to 30% of the total length of the leg tubes and, more preferably, less than or equal to 20% of the total length of the leg tubes.

As noted above, in some implementations a foldable playard frame may include one or more X-frame assemblies forming a single X-frame structure with one pair of X-tubes. Each X-tube in the pair of X-tubes may be rotatably coupled to a corner of one leg support assembly, a slider of another leg support assembly, and the other X-tube in the pair of X-tubes. In other example implementations, a foldable playard frame may include one or more X-frame assemblies forming a double X-frame structure with two pairs of X-tubes. In examples employing this double X-frame structure, each X-tube is coupled to either a slider or a corner of one leg support, the X-tube within the same pair of X-tubes, and another X-tube from another pair of X-tubes. In this manner, the frame may provide an interior space having a horizontal cross section in which the sides have different dimensions (e.g., an interior space with a rectangular shape).

In another aspect, a foldable playard frame according to the present disclosure may include a latch mechanism to maintain the frame in an unfolded configuration. In some implementations, the frame may only include a single latch mechanism to maintain the frame in the unfolded configuration. In some implementations, the single latch mechanism is configured such that, as a caregiver unfolds the frame (e.g., by moving the slider in one leg support assembly towards the corner), the single latch mechanism is automatically actuated to lock the frame in the unfolded configuration. In this manner, the process of unfolding and locking the playard may be readily accomplished with the caregiver positioned at one side and/or one corner of the playard (i.e., the caregiver does not have to move around the playard to actuate multiple latch mechanisms). Furthermore, the caregiver may unfold and lock the playard using a single hand. For example, the single latch mechanism may automatically lock when the slider is displaced a sufficient distance along the leg tube.

In some implementations, the latch mechanism may be preferably disposed in the top portion of the frame as defined above. For example, the latch mechanism may include a latch member having a first end coupled to the corner of one leg support assembly and a second end that couples to a X-tube of one X-frame assembly or the slider. In this manner, the latch mechanism may be partially covered or, in some instances, fully covered by the soft goods.

The latch mechanism may also be coupled to various components of the frame including, but not limited to, an X-tube, a leg tube, a slider, and a corner. In some implementations, the latch mechanism may be coupled to the components of the X-frame assembly and/or the leg support assembly without having to modify the respective components of the X-frame assembly and the leg support assembly. For example, the latch mechanism may include a latch member that is rotatably coupled to the corner of one leg support assembly via a pin joint that also serves to rotatably couple an X-tube to the corner. In this manner, the playard may include a smaller number of unique parts for manufacture. In some implementations, the playard may include identical corners and/or identical sliders for the multiple leg support assemblies.

In some implementations, the latch mechanism may be a tool-less mechanism that is actuated in one or two steps by the caregiver. In one example, the latch member may couple respective components of the X-frame assembly and/or the leg support assembly to maintain an unfolded configuration via various attachment mechanisms including, but not limited to, a snap-fit connection, a spring-loaded pin, and a spring-loaded rotational lock off mechanism.

In some implementations, the latch mechanism may be a double-action latch that includes a latch member (e.g., mounted to the corner of one leg support assembly) and a latch boss (e.g., mounted to a X-tube of one X-frame assembly). The latch boss may include an undercut portion and the latch member may include a latch opening to receive the latch boss with a tab disposed within the latch opening to engage the undercut portion. In some implementations, the tab may include a slot and the undercut portion may include a rib to align the latch member and the latch boss when locking the latch mechanism. The undercut portion and the tab may be shaped such that the caregiver is unable to unlock the latch mechanism by pulling the latch member without applying an excessive amount of force (e.g., greater than 10 lbs of force). Instead, the caregiver may first squeeze the respective X-tubes of the X-frame assembly to displace the latch boss within the latch opening of the latch member to disengage the tab from the undercut portion. While squeezing the X-tubes together, the caregiver may then pull the latch member off the latch boss, thus unlocking the latch mechanism.

In yet another aspect, the foldable playard may include soft goods to define the partially enclosed space in which the child may play and/or sleep. Generally, the soft goods may cover a portion of the frame (e.g., the corners of the leg support assembly, a portion of the X-frame assemblies). In some implementations, the soft goods may be coupled directly to the frame (e.g., a corner) via one or more snap-fit connections. The soft goods may further include a semi-rigid tab disposed near the top edge of the soft goods to support a snap-fit connector to ensure the soft goods remain flush against the frame when attached (i.e., the top edge of the soft goods does not flip upwards to expose an interior portion of the soft goods). The soft goods may further include a floor portion that directly rests on the ground, as well as side portions, where the floor and side portions define the bottom and sides of the partially enclosed space. In some implementations, the side portions may be transparent and/or see-through (e.g., a mesh) to allow the caregiver to readily see their child in the playard.

In yet another aspect, a foldable playard according to the present disclosure may also include a canopy cover assembly, disposed on top of the playard frame and soft goods, to provide shade for the child within the playard. The canopy cover assembly may generally include multiple canopy support assemblies that provide a canopy cover frame or support structure. Each canopy support assembly may generally include a canopy bow that supports the canopy cover and a canopy clip to mount the canopy support assembly to the frame. In some implementations, different types of canopies (e.g., a half canopy, a full canopy) may be mounted onto the playard depending on the coverage desired by the caregiver.

In some implementations, the canopy clip may include snap-in features to directly couple the canopy clip the leg tube of one leg support assembly. In this manner, the canopy clip may be more securely attached to the frame (i.e., the canopy clip does not attach to a portion of the frame covered by soft goods), thereby reducing the likelihood the canopy cover assembly is accidentally detached from the frame. Each canopy clip may be further disposed outside the interior space along an exterior portion of one leg support assembly (e.g., proximate to the corner and/or the slider when the playard is unfolded). Additionally, the canopy bow may couple to the canopy clip such that a portion of the canopy bow is also disposed outside the interior space near the corner and/or the slider of the leg support assembly. The particular placement of the canopy clip and the portion of the canopy bow that overlaps the exterior portion of the frame may further limit the child's access to the various components of the canopy cover assembly, thus reducing the likelihood the child can detach and pull the canopy cover into the playard.

In one example, a frame for a foldable playard has a compact folded configuration for storage of the frame and a deployed unfolded configuration to support the foldable playard in an upright position on a ground surface to contain a child in an interior space of the foldable playard. The frame includes a plurality of leg support assemblies extending upward from the ground surface when the frame is in the deployed unfolded configuration where each leg support assembly of the plurality of leg support assemblies includes a bottom end supported by the ground surface and a top portion opposite to the bottom end. The frame further includes a plurality of X-frame assemblies coupled to the plurality of leg support assemblies where each X-frame assembly of the plurality of X-frame assemblies is coupled to respective top portions of adjacent leg support assemblies of the plurality of leg support assemblies when the frame is in the deployed unfolded configuration such that, in the deployed unfolded configuration of the frame, the plurality of X-frame assemblies forms a top perimeter structure of the frame outlining the interior space of the foldable playard and the plurality of X-frame assemblies does not significantly impede visibility of the child when the child is in the interior space of the foldable playard. The plurality of X-frame assemblies constitutes the only interconnection in the frame between respective pairs of leg support assemblies of the plurality of leg support assemblies. Each leg support assembly may include a leg tube with an oval-shaped cross-section.

In another example, a foldable playard defining an interior space when in an unfolded configuration includes a plurality of leg support assemblies where each leg support assembly includes a leg tube disposed along a side edge of the interior space having a top end disposed at a top vertex of the interior space, a corner coupled to the top end of the leg tube, and a slider slidably coupled to the leg tube such that the slider is disposed proximate to the corner when the foldable playard is in the unfolded configuration. The foldable playard further includes a plurality of X-frame assemblies positioned at respective side faces of the interior space between adjacent leg support assemblies where each X-frame assembly of the plurality of X-frame assemblies forms a top rail between adjacent leg support assemblies. Additionally, the sliders in the plurality of leg support assemblies are identical, the corners in the plurality of leg support assemblies are identical, and respective pairs of leg support assemblies are only coupled together via at least one X-frame assembly of the plurality of X-frame assemblies. The leg tube may also have an oval-shaped cross-section.

In another example, a foldable playard defining an interior space when in an unfolded configuration includes a plurality of leg support assemblies where each leg support assembly includes a leg tube disposed along a side edge of the interior space having a top end disposed at a top vertex of the interior space, a corner coupled to the top end of the leg tube, and a slider slidably coupled to the leg tube such that the slider is disposed proximate to the corner when the foldable playard is in the unfolded configuration. The foldable playard further includes a plurality of X-frame assemblies positioned at respective side faces of the interior space between adjacent leg support assemblies of the plurality of leg support assemblies where each X-frame assembly of the plurality of X-frame assemblies forms a top rail between the adjacent leg support assemblies. The foldable playard further includes a single latch mechanism coupled to one leg support assembly of the plurality of leg support assemblies to maintain the foldable playard in the unfolded configuration when the latch mechanism is in a locked configuration. Additionally, respective pairs of adjacent leg support assemblies are only coupled together via one X-frame assembly of the plurality of X-frame assemblies. The leg tube may also have an oval-shaped cross-section.

In another example, a foldable playard defining an interior space when in an unfolded configuration includes a plurality of leg support assemblies where each leg support assembly includes a leg tube disposed along a side edge of the interior space having a top end disposed at a top vertex of the interior space, a corner disposed on the top end of the leg tube, and a slider slidably coupled to the leg tube such that the slider is disposed proximate to the corner when the foldable playard is in the unfolded configuration. The foldable playard further includes a plurality of X-frame assemblies positioned at respective side faces of the interior space where each X-frame assembly of the plurality of X-frame assemblies is coupled to adjacent leg support assemblies of the plurality of leg support assemblies. The foldable playard further includes a latch mechanism that directly couples together the corner of one leg support assembly of the plurality of leg support assemblies and a X-tube of one X-frame assembly of the plurality of X-frame assemblies when the latch mechanism is in a locked configuration where the latch mechanism provides the only mechanism to maintain the foldable playard in the unfolded configuration. Additionally, respective pairs of leg support assemblies are only coupled together via at least one X-frame assembly of the plurality of X-frame assemblies. The leg tube may also have an oval-shaped cross-section.

In another example, a foldable playard defining an interior space when in an unfolded configuration includes a plurality of leg support assemblies where each leg support assembly includes a leg tube disposed along a side edge of the interior space having a top end disposed at a top vertex of the interior space, a corner coupled to the top end of the leg tube, and a slider slidably coupled to the leg tube such that the slider is disposed proximate to the corner when the foldable playard is in the unfolded configuration. The foldable playard further includes a plurality of X-frame assemblies positioned at respective side faces of the interior space where each X-frame assembly of the plurality of X-frame assemblies is coupled to adjacent leg support assemblies. The foldable playard further includes a plurality of canopy support assemblies disposed, in part, above the interior space where each canopy support assembly includes a canopy bow disposed, in part, above the interior space and a canopy clip disposed outside the interior space proximate to a first leg support assembly of the plurality of leg support assemblies. The canopy clip includes one or more snap features directly coupled to the leg tube of the first leg support assembly and a canopy bow opening to receive a portion of the canopy bow to couple the canopy bow to the canopy clip. The foldable playard also includes a canopy cover supported by respective canopy bows of the plurality of canopy support assemblies to cover at least a portion of the interior space.

In another example, a foldable playard includes a leg support assembly. The leg support includes a leg tube having a top end, a corner disposed on the top end of the leg tube, and a slider slidably coupled to the leg tube. The foldable playard further includes a X-frame assembly coupled to the leg support assembly where the X-frame assembly includes a first X-tube rotatably coupled to the corner of the leg support assembly and a second X-tube rotatably coupled to the slider of the leg support assembly and the first X-tube. The foldable playard further includes a latch mechanism coupled to the leg support assembly and the X-frame assembly to maintain the foldable playard in an unfolded configuration when in a locked configuration where the latch mechanism includes a latch boss coupled to the second X-tube and disposed proximate to the slider of the leg support assembly having an undercut portion and a latch member coupled to the corner of the leg support assembly having a latch opening and a tab disposed within the latch opening. The undercut portion of the latch boss retains the tab of the latch member when the latch mechanism is engaged thereby maintaining the foldable playard in the unfolded configuration.

In yet another example, a foldable playard defining an interior space with a cross-sectional shape, in a plane parallel to a ground, forming a regular hexagon when in an unfolded configuration, includes six leg support assemblies. Each leg support assembly includes a leg tube arranged such that a longitudinal axis associated with the leg tube intersects a respective corner of the regular hexagon and further has a top end and a bottom end, a foot coupled to the bottom end of the leg tube to contact a ground to support the foldable playard, a corner coupled to the top end of the leg tube, and a slider slidably coupled to the leg tube and positioned between the foot and the corner where the slider is disposed proximate to the corner when the foldable playard is in the unfolded configuration and disposed proximate to the foot when the foldable playard is in a folded configuration. The foldable playard further includes six X-frame assemblies arranged such that each X-frame assembly is positioned along a side of the regular hexagon. Each X-frame assembly of the six X-frame assemblies forms a top rail between adjacent leg support assemblies. The six X-frame assemblies includes a first X-frame assembly disposed between and coupled to a first leg support assembly and a second leg support assembly of the six leg support assemblies where the first X-frame assembly includes a first X-tube having a first end rotatably coupled to the corner of the first leg support assembly and a second end rotatably coupled to the slider of the second leg support assembly and a second X-tube having a first end rotatably coupled to the corner of the second leg support assembly and a second end rotatably coupled to the slider of the first leg support assembly. The second X-tube is rotatably coupled to the first X-tube. The foldable playard further includes a latch mechanism coupled to only the first leg support assembly and only the first X-frame assembly to maintain the foldable playard in the unfolded configuration when in a locked configuration where the latch mechanism includes a latch boss coupled to one of the second X-tube and disposed proximate to the slider of the first leg support assembly having an undercut portion and a latch member having a first end coupled to the corner of the first leg support assembly, a latch opening disposed proximate to a pulling tab, and a tab disposed within the latch opening. The latch mechanism is changed to the locked configuration by moving the slider of the first leg support assembly towards the corner of the first leg support assembly until the latch member snaps onto the latch boss such that the tab of the latch member contacts the undercut portion of the latch boss and the central rib is disposed within the central slot. The latch mechanism is changed to an unlocked configuration by squeezing the first and second X-tubes together to release the tab of the latch member from the undercut portion of the latch boss and, while squeezing the first and second X-tubes together, pulling the latch member away from the latch boss. Additionally, respective pairs of leg support assemblies are only coupled together via at least one X-frame assembly of the plurality of X-frame assemblies, the sliders in the six leg support assemblies are identical, and the corners in the six leg support assemblies are identical.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3B shows a top view of the X-frame assembly of FIG. 3A.

FIG. 3D shows a bottom perspective view of the corner and the slider of FIG. 3C.

FIG. 4A shows an exploded top perspective view of the X-frame assembly of FIG. 3A and the leg support assembly of FIG. 3C.

FIG. 5B shows a magnified view of top portion of the soft goods of FIG. 5A disposed over the corner of the leg support assembly in the playard of FIG. 2A.

FIG. 5C shows a magnified view of the top portion of FIG. 5B flipped upwards to show a tab and a snap-fit connector.

FIG. 6B shows a top perspective of the double-action latch mechanism of FIG. 6A with the latch member removed.

FIG. 8A shows a top perspective of the playard of FIG. 2A with soft goods and a flex lock latch mechanism with a latch opening. The playard is in an unfolded configuration.

FIG. 8B shows a magnified view of the flex lock latch mechanism of FIG. 8A.

FIG. 9A shows a top perspective view of the playard of FIG. 2A with soft goods and a flex lock latch mechanism with a latch member having a snap-fit connector. The playard is in an unfolded configuration.

FIG. 9B shows a magnified view of the flex lock latch mechanism of FIG. 9A.

FIG. 11C shows a perspective view of the flex lock latch mechanism of FIG. 11A with the soft goods removed and the flex lock latch mechanism in a locked configuration.

FIG. 11D shows a perspective view of the flex lock latch mechanism of FIG. 11C in an unlocked configuration.

FIG. 13C shows a perspective of the X-frame assembly with the latch mechanism of FIG. 13A.

FIG. 13G shows a top view of the latch mechanism of FIG. 13E.

FIG. 13H shows a top view of the latch mechanism of FIG. 13F.

FIG. 15D shows a side view of the latch mechanism of FIG. 15A in an unlocked configuration and the playard in a folded configuration.

FIG. 16A shows a top perspective view of the playard of FIG. 2A with the latch mechanisms of FIGS. 13A and 14A installed. The playard is in an unfolded configuration.

FIG. 19B shows a magnified view of the slider and a foot in the leg support assembly of FIG. 19A.

FIG. 20A shows a top perspective view of the playard of FIG. 17D with the soft goods removed.

FIG. 23B shows a top perspective view of the playard of FIG. 23A.

FIG. 25A shows an exploded perspective view of a leg assembly having a wheel in the playard of FIG. 23A.

FIG. 25B shows an exploded perspective view of a leg assembly having a foot in the playard of FIG. 23A.

FIG. 27B shows the soft goods attached to the corner of FIG. 27A.

FIG. 27C shows the soft goods removed from the corner of FIG. 27A.

FIG. 30C shows the playard of FIG. 30B with the soft goods partially removed from the X-frame assembly.

FIG. 31 shows a stability test being performed on the playard of FIG. 23A.

FIG. 36B shows a front view of the playard and the canopy cover assembly of FIG. 36A.

FIG. 36C shows a top view of the playard and the canopy cover assembly of FIG. 36A.

FIG. 36D shows a perspective view of the canopy clip of the canopy support assembly in the canopy cover assembly of FIG. 36A.

FIG. 36E shows another perspective view of the canopy clip of FIG. 36D.

FIG. 37A shows a top, front perspective view of the playard of FIG. 2A with an exemplary canopy cover assembly that covers half interior space of the playard and includes a hub.

FIG. 37B shows a front view of the playard and the canopy cover assembly of FIG. 37A.

FIG. 37C shows a top view of the playard and the canopy cover assembly of FIG. 37A.

FIG. 38A shows a top perspective view of the hub of FIG. 37A.

FIG. 38B shows a bottom perspective view of the hub of FIG. 38A.

FIG. 39A shows a top perspective view of another hub that allows each canopy bow to pivot about a horizontal axis relative to the hub.

FIG. 39B shows a bottom perspective view of the hub of FIG. 39A.

FIG. 40A shows a top perspective view of another hub that allows each canopy bow to pivot about a vertical axis relative to the hub.

Figure 40A:
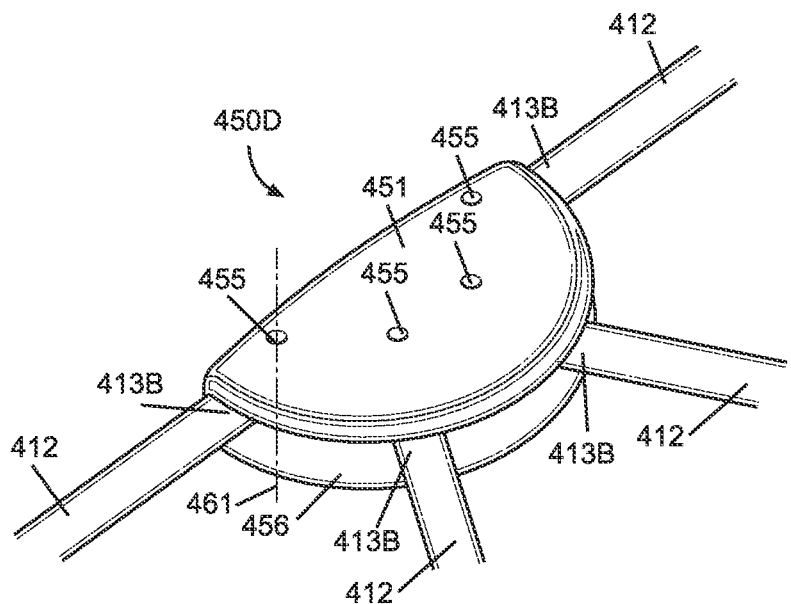
Figure 40B:
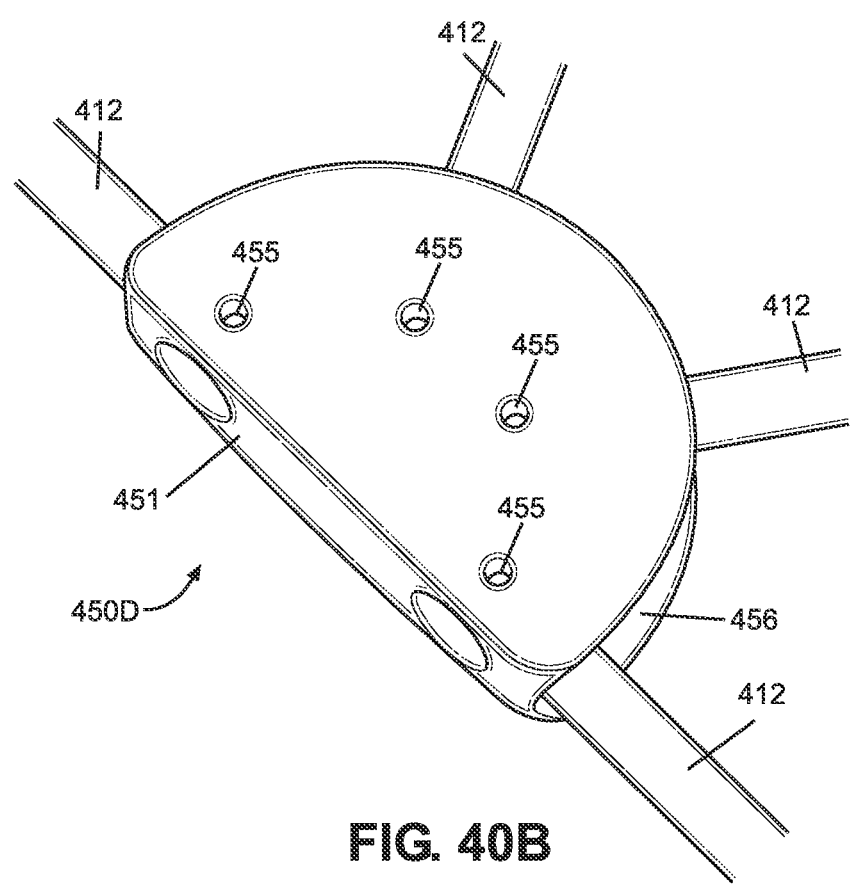

FIG. 40B shows a bottom perspective view of the hub of FIG. 40A.

DETAILED DESCRIPTION

Following below are more detailed descriptions of various concepts related to, and implementations of, foldable playards that include; 1) a mechanically-sound rigid frame with a simpler construction compared to conventional playards that is easier to operate; 2) soft goods attached to the frame to provide a partially enclosed space for the child; and optionally 3) a canopy cover assembly mounted to the frame to provide shade for the child. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive foldable playards are provided, wherein a given example or set of examples showcases one or more particular features of a frame, a X-frame assembly, a leg support assembly, a latch mechanism, soft goods, and a canopy cover assembly. It should be appreciated that one or more features discussed in connection with a given example of a foldable playard may be employed in other examples of foldable playards according to the present disclosure, such that the various features disclosed herein may be readily combined in a given foldable playard according to the present disclosure (provided that respective features are not mutually inconsistent).

Certain dimensions and features of the foldable playard are described herein using the terms "approximately," "about," "substantially," and/or "similar." As used herein, the terms "approximately," "about," "substantially," and/or "similar" indicates that each of the described dimensions or features is not a strict boundary or parameter and does not exclude functionally similar variations therefrom. Unless context or the description indicates otherwise, the use of the terms "approximately," "about," "substantially," and/or "similar" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

An Exemplary Foldable Playard with X-Frame Assemblies

Figure 2A:
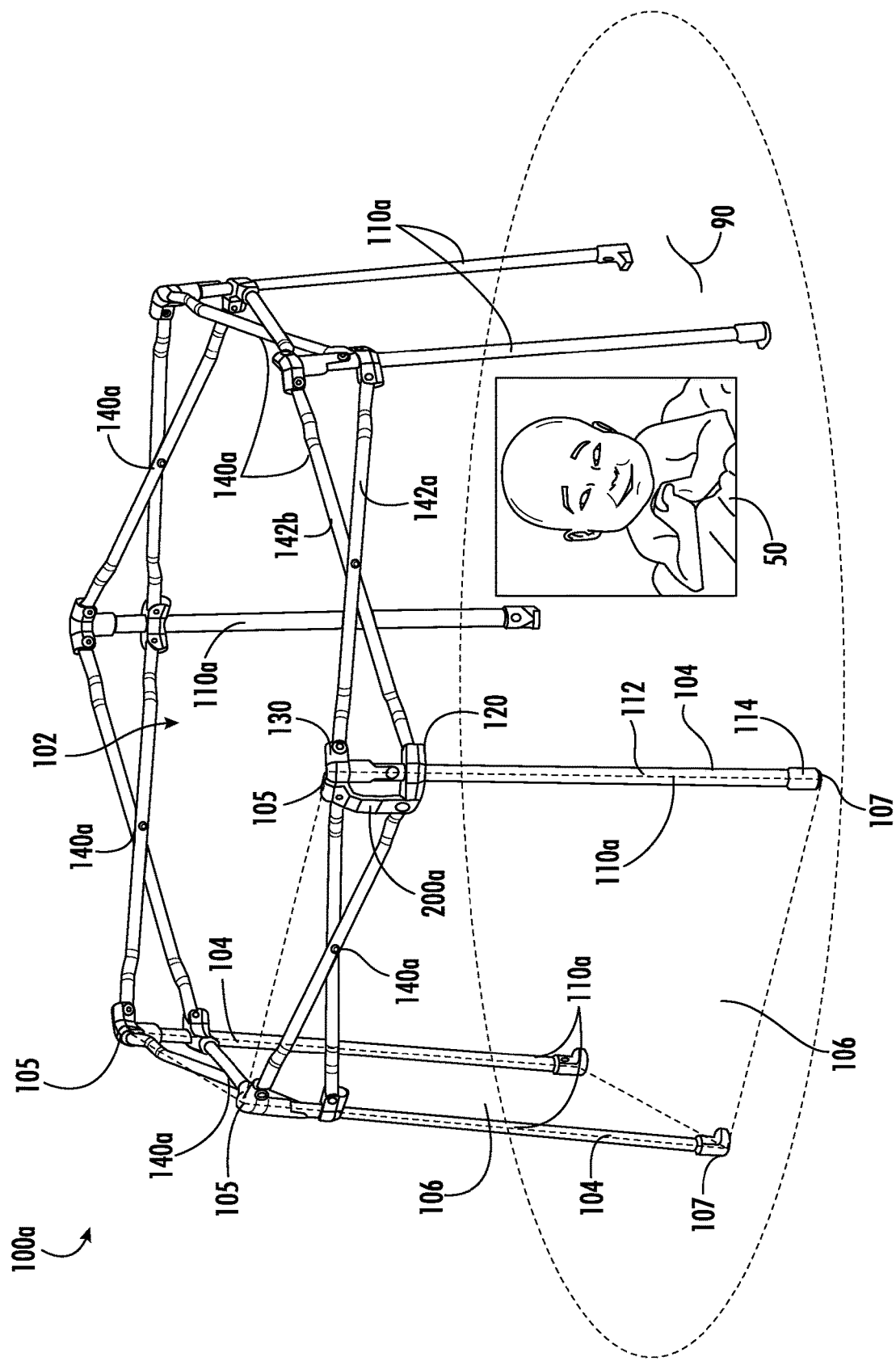
FIG. 2A shows a top perspective view of an exemplary playard forming a hexagonal-shaped interior space. The playard is in an unfolded configuration.
Figure 2B:
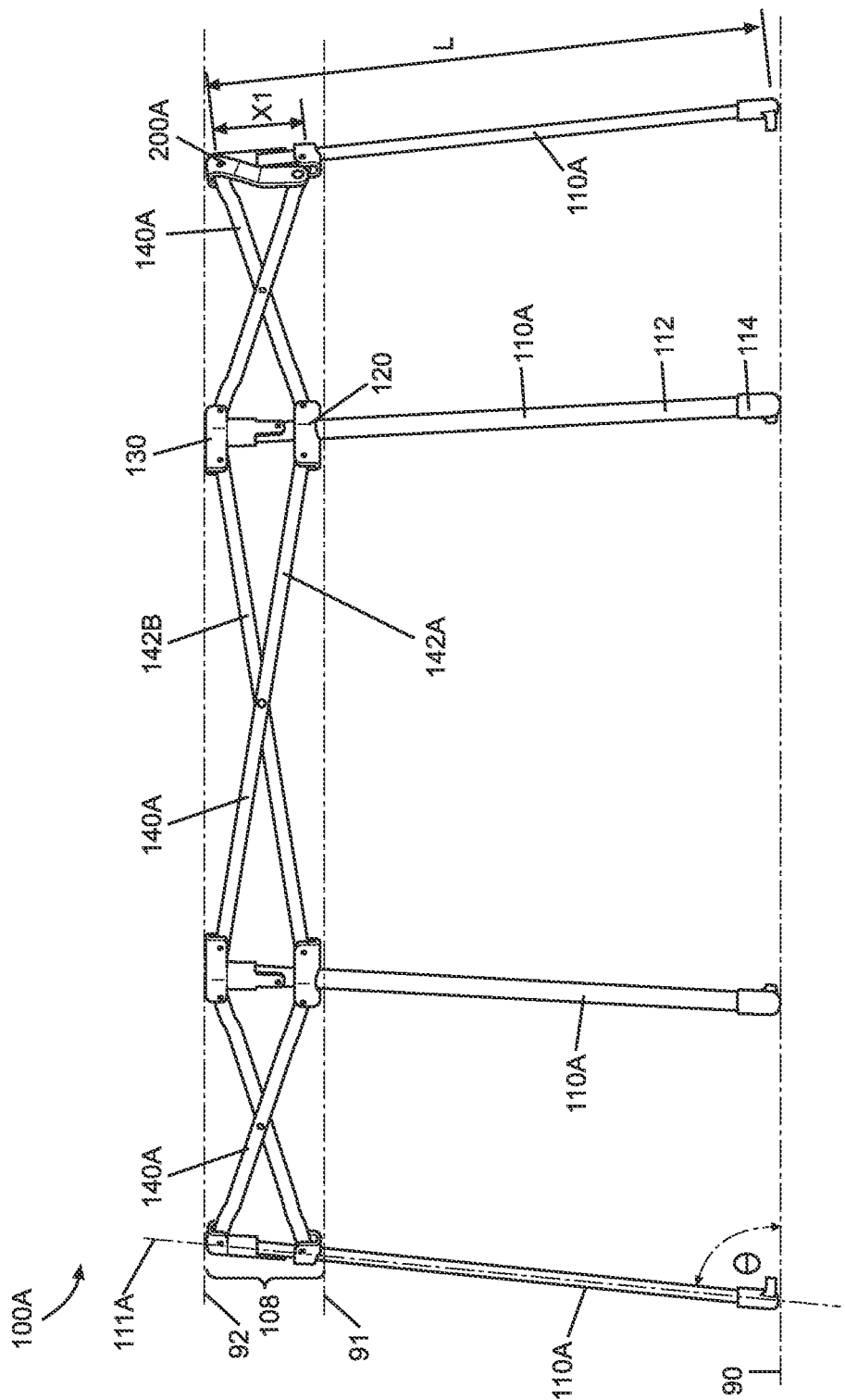
FIG. 2B shows a front view of the playard of FIG. 2A.
Figure 2C:
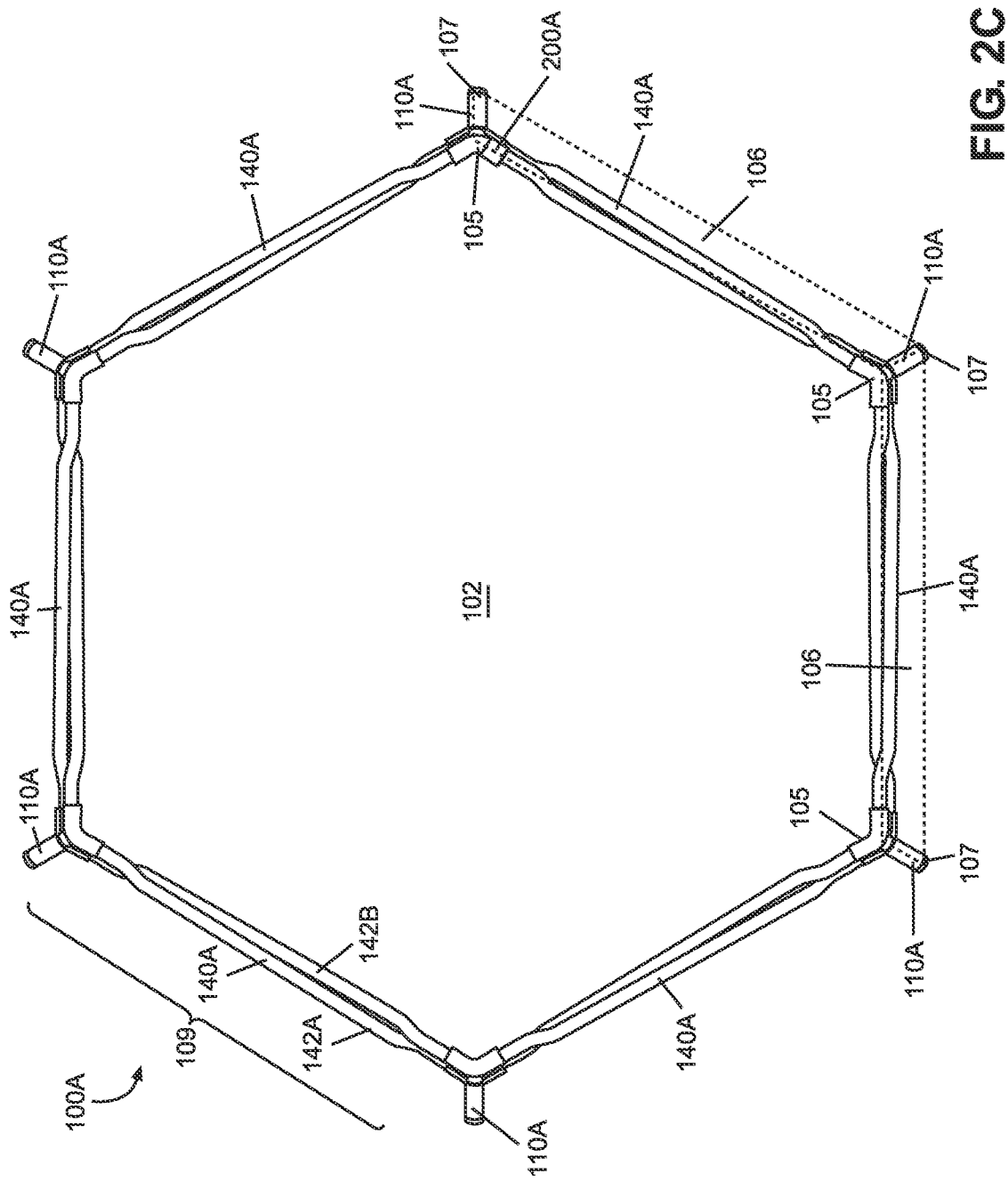
FIG. 2C shows a top view of the playard of FIG. 2A.
Figure 2D:
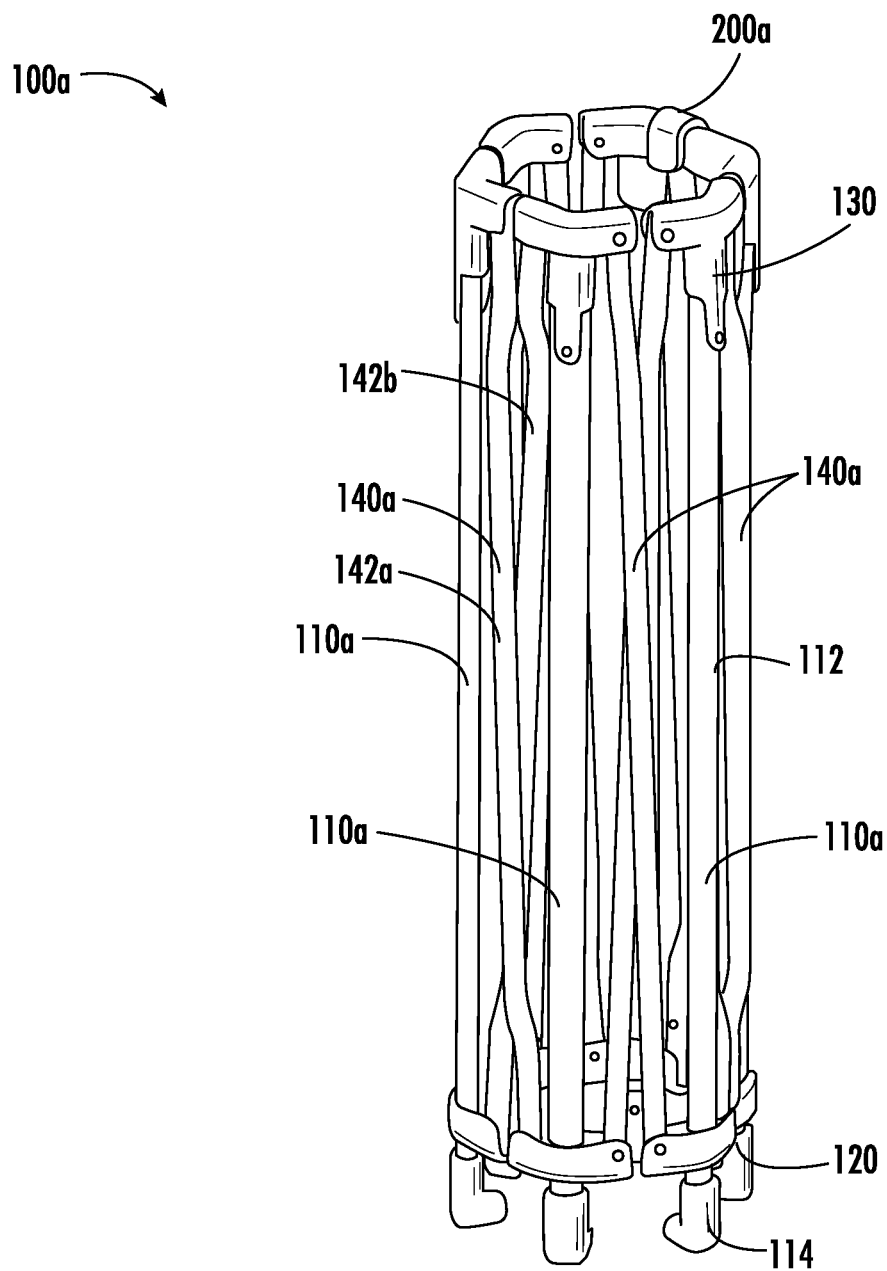
FIG. 2D shows a top perspective view of the playard of FIG. 2A in a folded configuration.
Figure 2E:
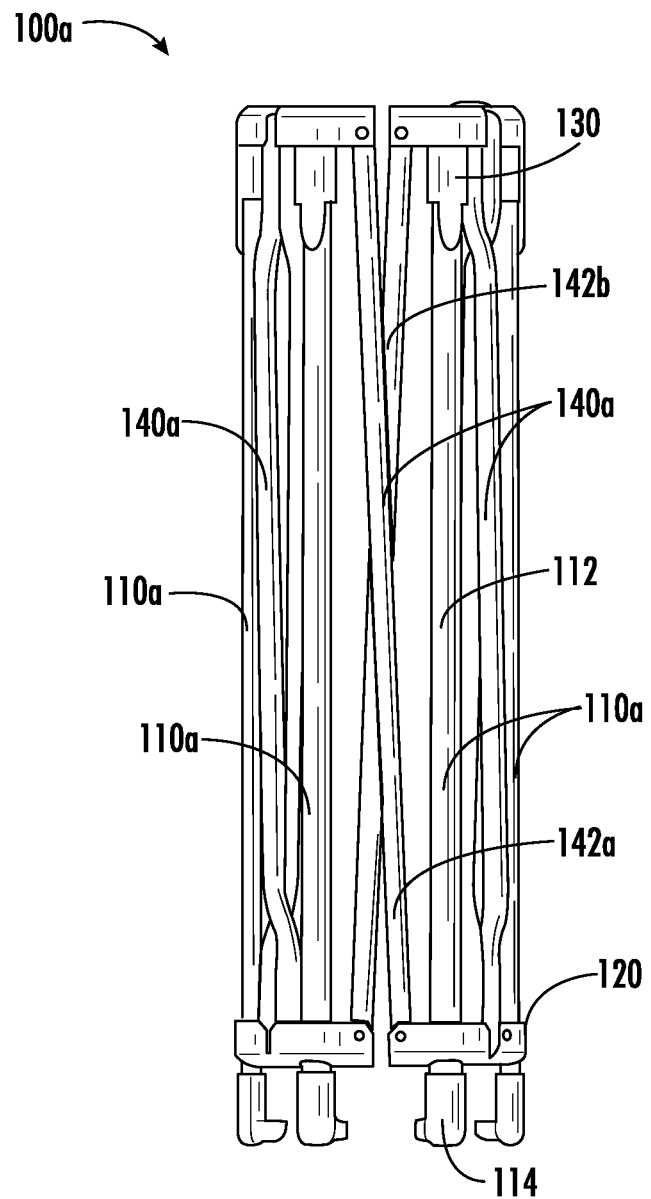
FIG. 2E shows a front view of the playard of FIG. 2D.
Figure 2F:
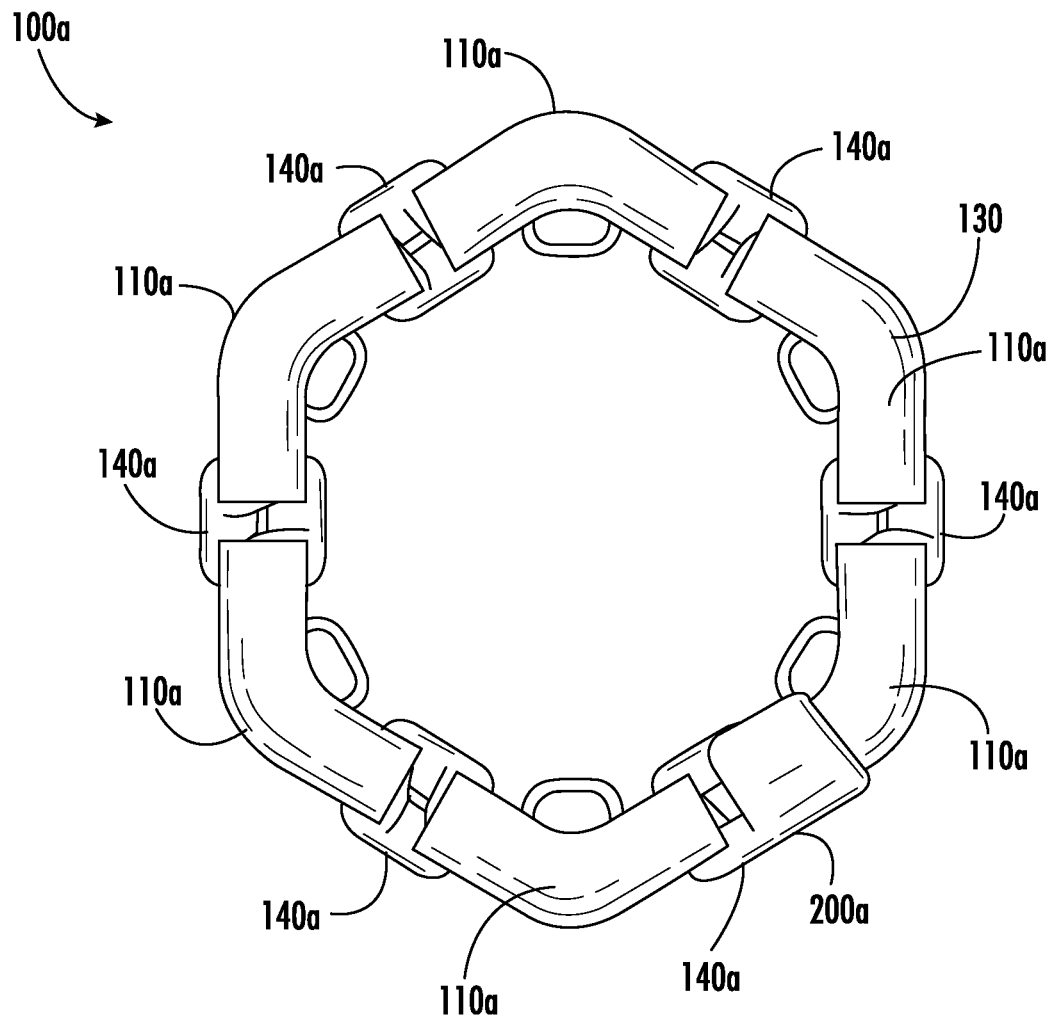
FIG. 2F shows a top view of the playard of FIG. 2D.

FIGS. 2A-2C show an exemplary frame 100a for a foldable playard in an unfolded configuration. As shown, the frame 100a may include multiple leg support assemblies 110a and multiple X-frame assemblies 140a that are arranged to outline and define an interior space 102. In particular, each leg support assembly 110a may be coupled to another adjacent leg support assembly 110a via a X-frame assembly 140a to form a closed frame structure (e.g., a frame that surrounds and separates the interior space 102 from the surrounding environment). As discussed further below in connection with FIG. 5A, in addition to the frame 100a, a foldable playard 1000a also includes soft goods 300 that are partially disposed within the interior space 102 to provide a padded, partially enclosed space 301 to contain a child 50. The soft goods 300 will be described in more detail below.

With reference again to FIG. 2A, the leg support assemblies 110a of the frame 100a may provide vertical or nearly vertical support stands that define the spatial extent of the interior space 102 in the unfolded configuration. In other words, the leg support assemblies 110a may define and/or otherwise be disposed along side edges 104 of the interior space 102. The X-frame assemblies 140a may provide the structural support to position and orient the leg support assemblies 110a as desired, as well as provide a mechanism to facilitate folding and/or unfolding of the frame 100a. As shown in FIG. 2A, each X-frame assembly 140a may define and/or otherwise be disposed on a side face 106 of the interior space 102 between adjacent side edges 104.

For the frame 100a shown in FIGS. 2A-2C, the interior space 102 has a horizontal cross-section (i.e., a cross-section in a plane parallel to a ground 90 supporting the frame 100a) shaped as a regular hexagon. However, it should be appreciated that in other implementations disclosed herein and discussed in further detail below, the number of leg support assemblies 110a and/or X-frame assemblies 140a may be adjusted to form interior spaces 102 with different horizontal cross-sectional shapes including, but not limited to a square, a rectangle, a pentagon, a hexagon, an octagon, a regular polygon, and an irregular polygon (i.e., the sides have different dimensions).

In some implementations, the interior space 102 may further form a three-dimensional volume shaped as a right prism. Said in another way, the leg support assemblies 110a may be vertically oriented such that the horizontal cross-section of the interior space 102 is identical or substantially identical in shape and dimensions at any vertical position along the length of the leg support assemblies 110a. In other implementations, the interior space 102 may form a three-dimensional volume shaped as a truncated pyramid where a bottom portion of the interior space 102 near the ground 90 is larger than a top portion of the interior space 102. Said in another way, the leg support assemblies 110a may be tilted when the frame 100a is deployed such that the top portions of the leg support assemblies 110a are positioned closer together than a bottom portion of the leg support assemblies 110a so that the area of the horizontal cross-section of the interior space 102 decreases from the bottom portion to the top portion of the leg support assemblies 110a if the leg support assemblies 110a are substantially straight in shape. In one aspect, a frame 100a forming a truncated pyramidal interior space 102 may be preferable for enhancing mechanical stability. The manner in which this geometry is achieved will be discussed in more detail below.

Figure 4B:
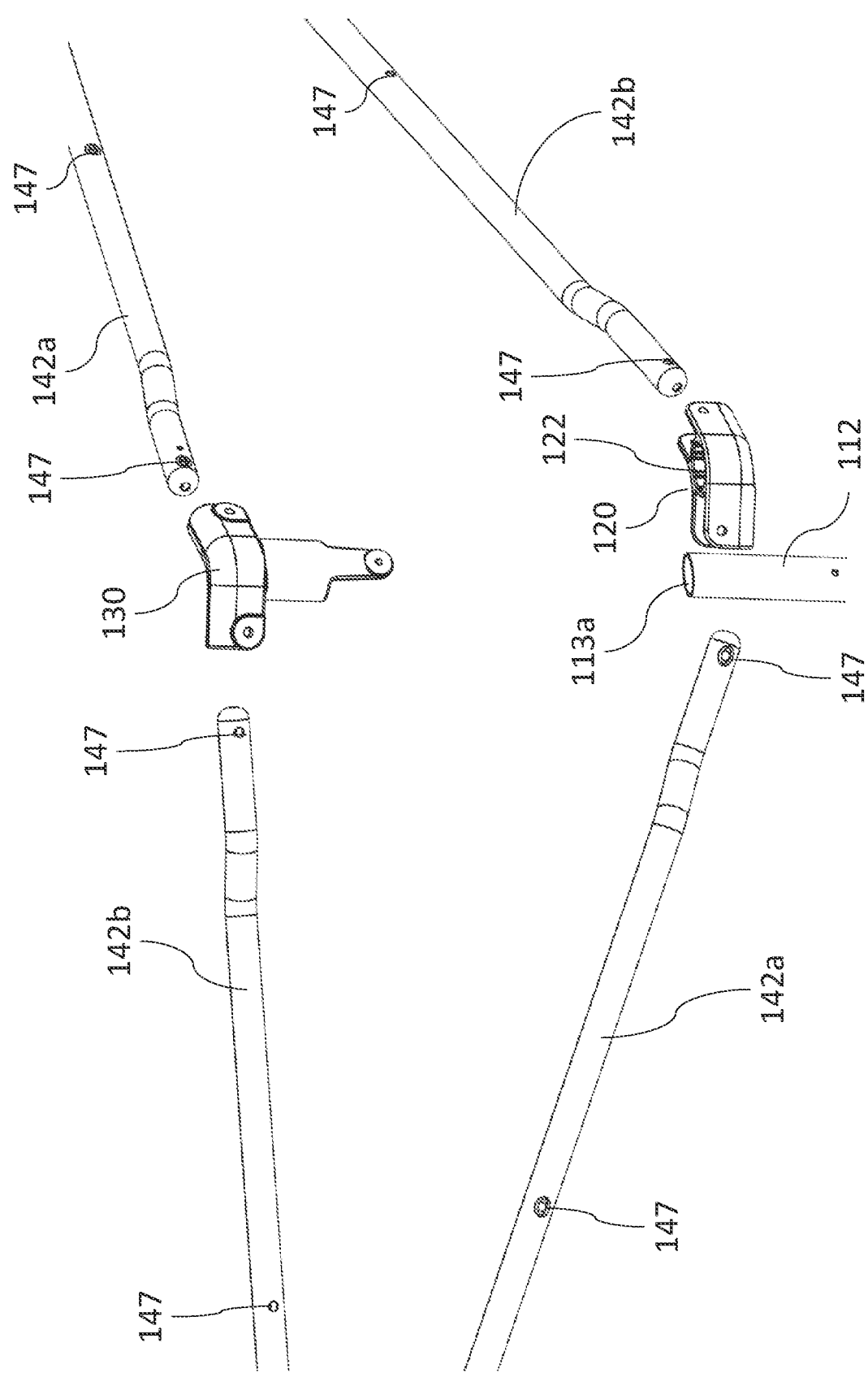
FIG. 4B shows a magnified top perspective view of the corner and the slider in the leg support assembly and the X-tubes in the X-frame assembly of FIG. 4A.

In the frame 100a shown in FIG. 2A, each leg support assembly 110a may include a leg tube 112 having a top end 113a and a bottom end 113b (see, for example, FIG. 4A), a foot 114 coupled to the bottom end 113b to support the frame 100a on the ground 90, a corner 130 coupled to the top end 113a of the leg tube 112, and a slider 120 that is slidably coupled to the leg tube 112 and positioned between the foot 114 and the corner 130. The top end 113a of the leg tube 112 and/or the corner 130 may coincide with a top vertex 105 of the interior space 102 and the bottom end 113b of the leg tube 112 and/or the foot 114 may coincide with a bottom vertex 107 of the interior space 102.

In this implementation, each X-frame assembly 140a may include a pair of X-tubes 142a and 142b that are arranged to cross one another to form a single X-shaped structure. The X-tubes 142a and 142b may be rotatably coupled to each other and to respective corners 130 and sliders 120 of adjacent leg support assemblies 110a. Thus, the X-frame assemblies 140a are pivot and slidable X-frame assemblies where the X-tubes 142a and 142b rotate relative to each other and the leg support assemblies 110a and translate relative to the leg tubes 112 via movement of the sliders 120. This enables the frame 100a to be folded into a more compact structure that occupies less volume and/or allows for a larger interior space 102 compared to, for example, conventional playards with pivot-only X-frame assemblies.

In some implementations, the manner in which the multiple X-frame assemblies 140a and the leg support assemblies 110a are coupled to each other may enable a caregiver to fold and/or unfold the frame 100a in a single step. For example, the caregiver may unfold the frame 100a by moving the slider 120 in one leg support assembly 110a towards the corner 130. The motion of the slider 120, in turn, causes the adjoining X-frame assemblies 140a to rotate and translate. The motion of the adjoining X-frame assemblies 140a, in turn, causes the sliders 120 in the adjacent leg support assemblies 110a to move in a similar manner. This process may occur simultaneously for all X-frame assemblies 140a and all sliders 120 resulting in the frame 100a being unfolded as the caregiver moves the slider 120 for the one leg support assembly 110a. Once the frame 100a is unfolded, a latch mechanism 200a, which will be described in more detail below, may be actuated to lock the frame 100a in the unfolded configuration (e.g., the latch mechanism 200a prevents the sliders 120 from sliding back down the respective leg tubes 112 towards the feet 114).

In some implementations, the frame 100a may be folded and/or unfolded with the feet 114 of the leg support assemblies 110a remaining in contact with the ground 90. The leg tubes 112 may also remain vertically upright or nearly vertically upright (e.g., leg tubes 112 may intentionally be tilted when the frame 100a is unfolded to improve stability) as the frame 100a is folded and/or unfolded. In this manner, the process of folding and/or unfolding the frame 100a may be made easier for the caregiver. For example, the caregiver would not have to balance the frame 100a from tipping over while setting up and/or tearing down the playard 1000a.

With reference to FIG. 2B, in some implementations, the X-tubes 142a and 142b of each X-frame assembly 140a may be positioned within a top portion 108 of the frame 100a and/or the interior space 102 when the frame 100a is unfolded. Said in another way, the X-frame assemblies 140a may form a perimeter structure around the top portion 108 of the frame 100a that outlines the horizontal cross section of the top opening of the interior space 102. For example, FIG. 2C shows the X-frame assemblies 140a form a top perimeter structure 109 that outlines a regular hexagon corresponding to the shape of the interior space 102.

Positioning the X-tubes 142a and 142b in the top portion 108 of the frame when the frame is in the unfolded configuraton provides several benefits to the frame 100a and, in turn, to a foldable playard comprising the frame 100a.

First, each X-frame assembly 140a in the frame 100a may function as a top rail that couples together two adjacent leg support assemblies 110a and provides mechanical rigidity and stability to the frame 100a. Said in another way, the X-frame assembly 140a may be unfolded to such an extent that the X-tubes 142a and 142b form a shallow X-frame structure in the top portion 108 of the frame that effectively functions as a rigid top rail. For example, in the limit where the respective sliders 120 are positioned proximate to the respective corners 130 in adjacent leg support assemblies 110a, the X-tubes 142a and 142b may be in near parallel alignment with one another when viewing the frame 100a from the side or the front. Thus, each X-tube 142a and 142b may separately function as a top rail.

Figure 1A:
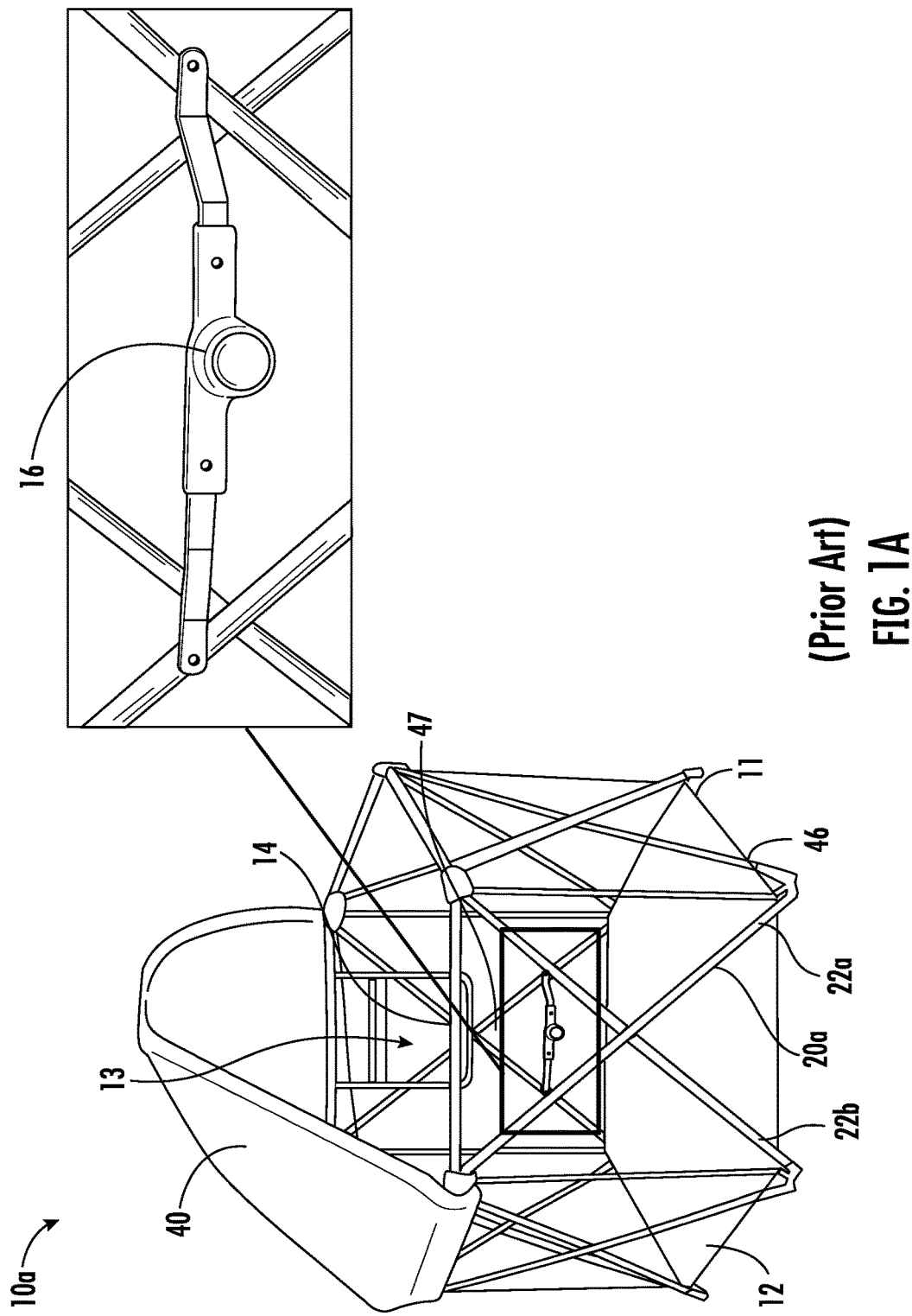
FIG. 1A shows a conventional outdoor playard with a pivot-only X-frame assembly and a canopy cover.
Figure 1B:
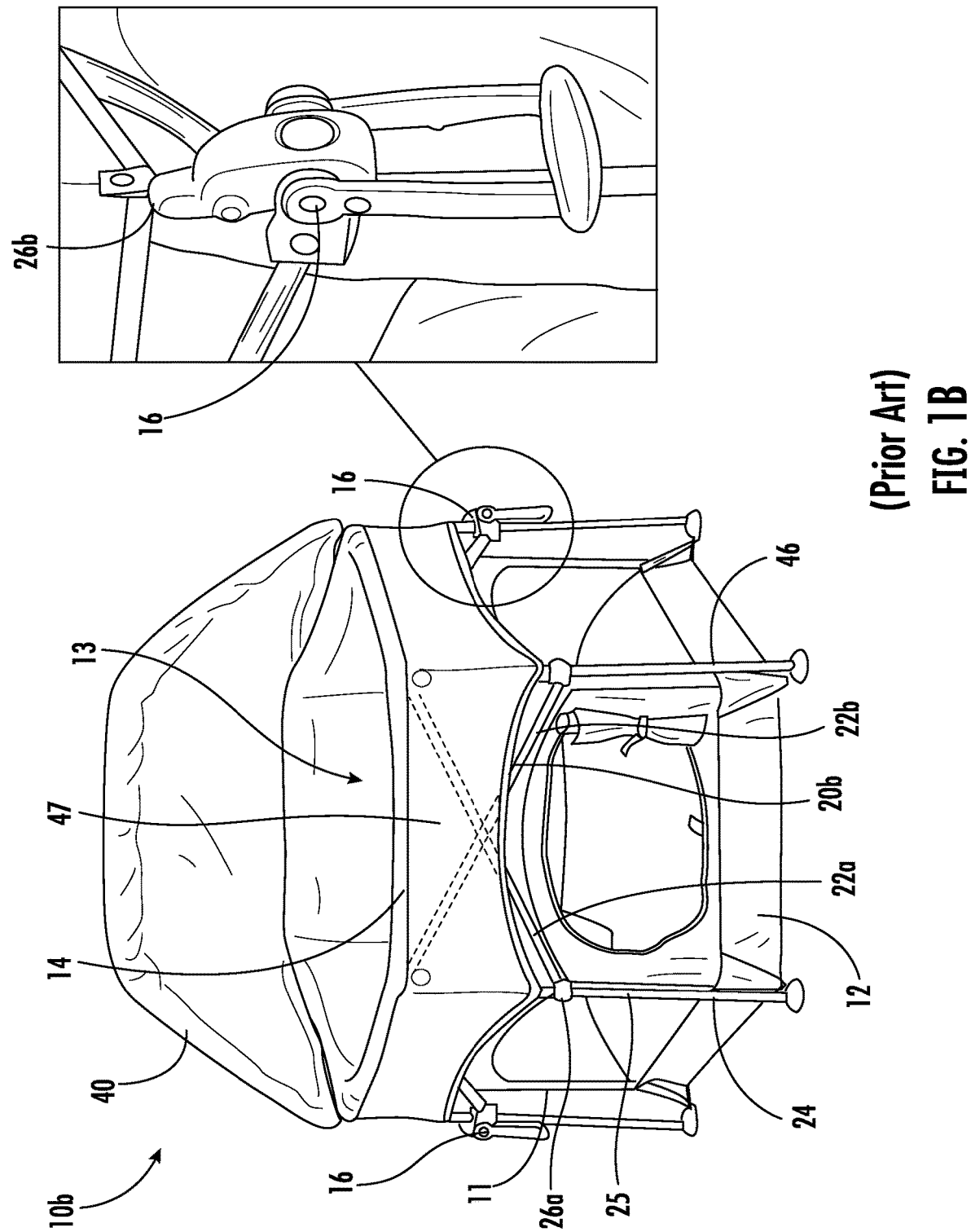
FIG. 1B shows another conventional outdoor playard with a pivot and slidable X-frame assembly.
Figure 1C:
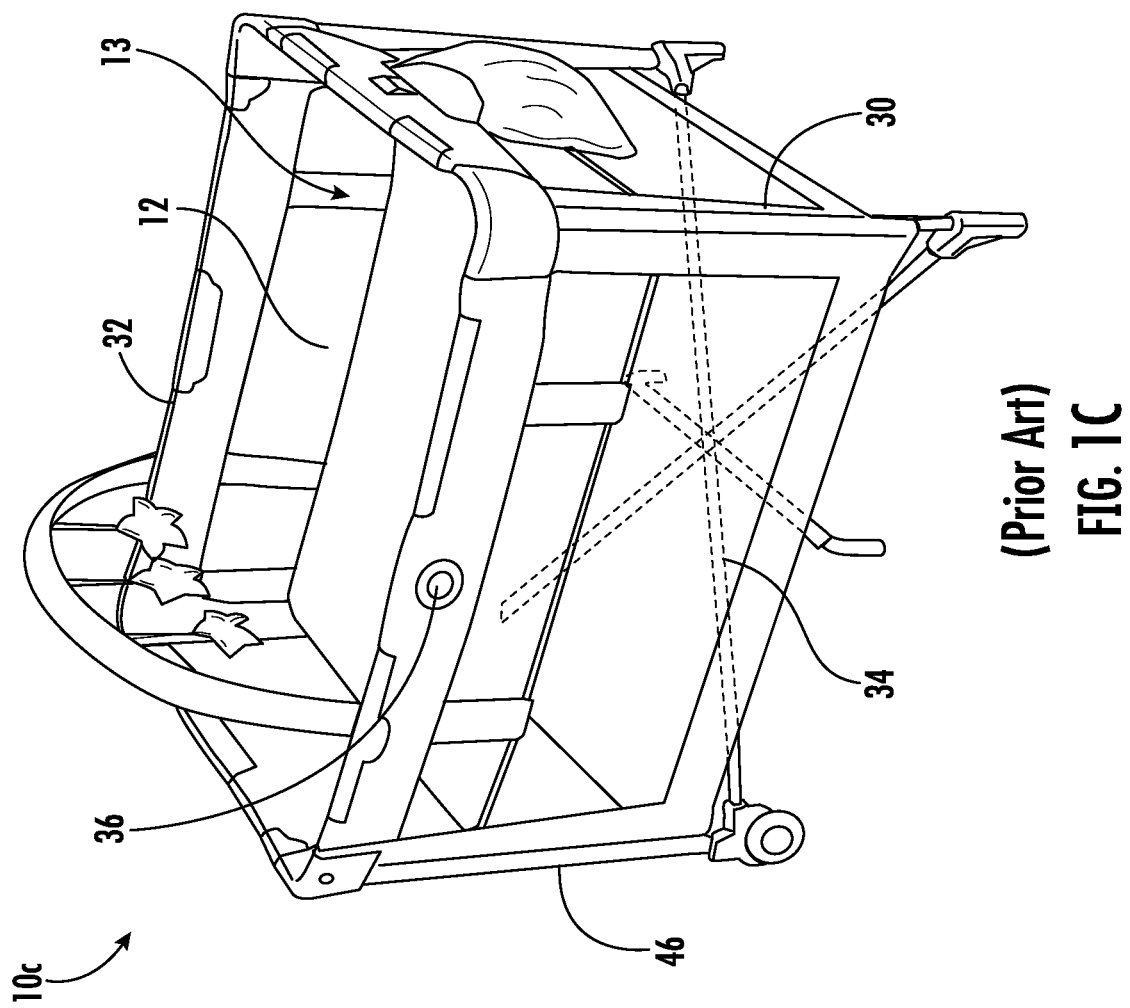
FIG. 1C shows a conventional indoor playard.
Figure 1D:
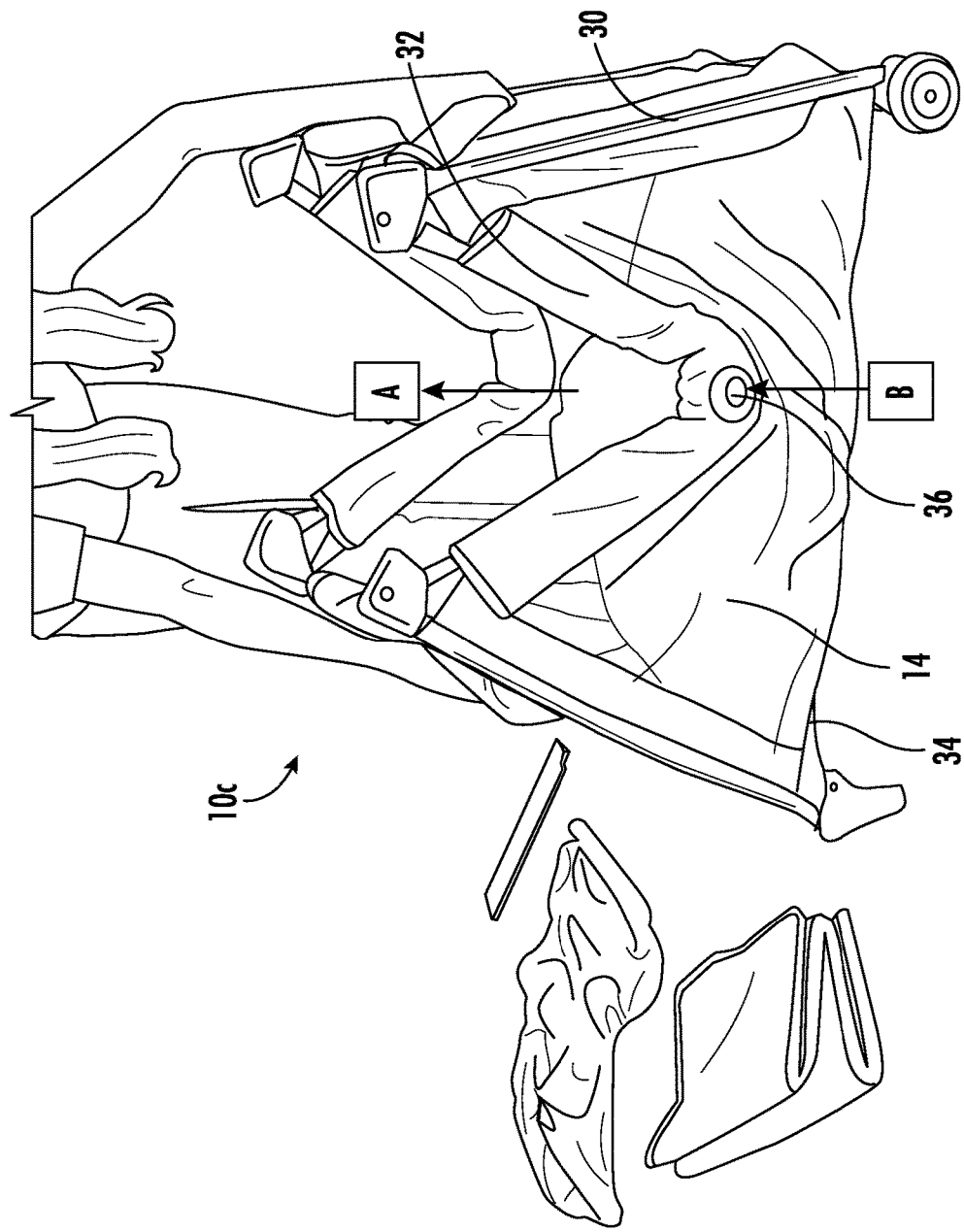
FIG. 1D shows the indoor playard of FIG. 1C being folded for storage or transport.
Figure 1E:
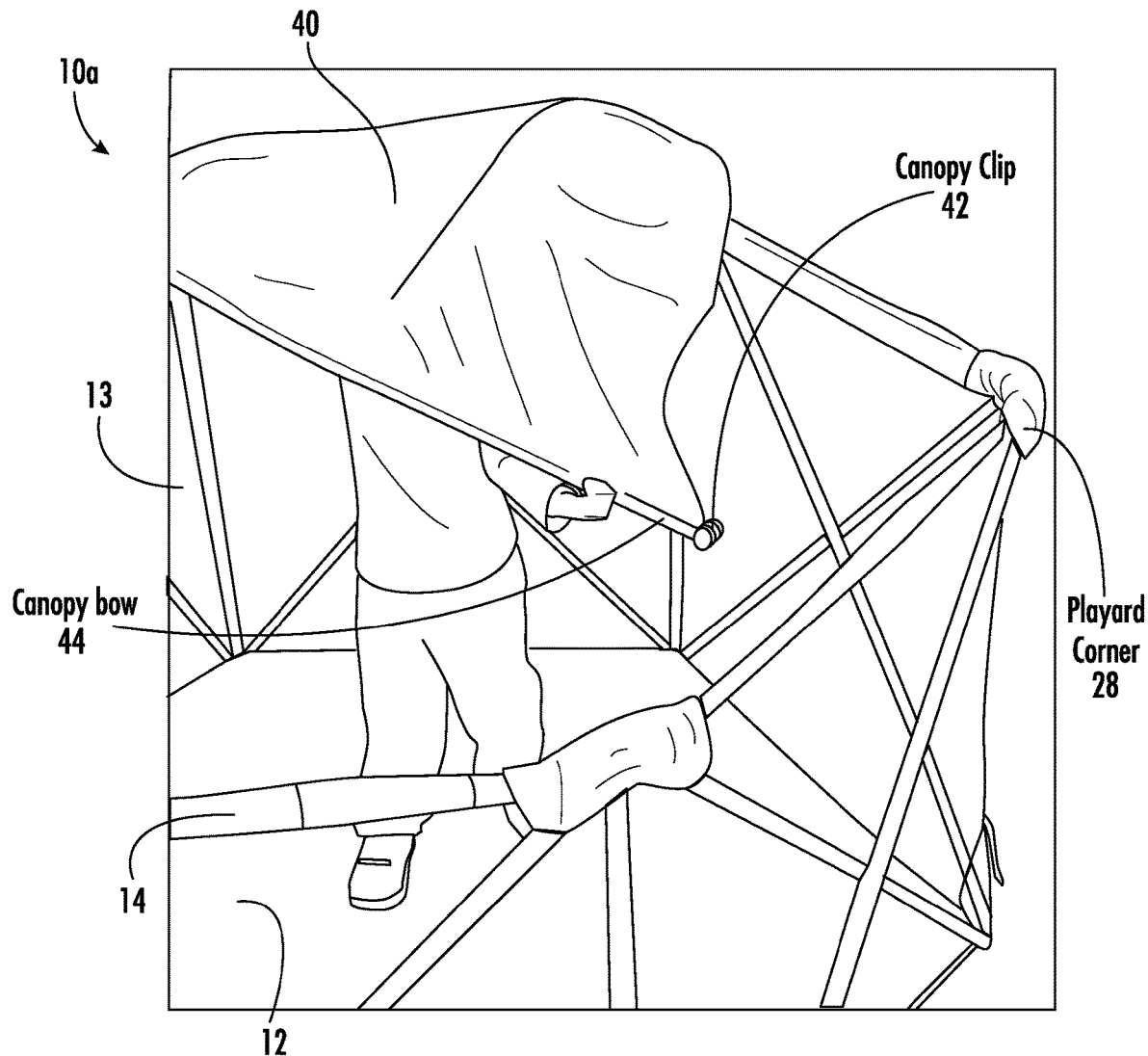
FIG. 1E shows a conventional outdoor playard with a canopy cover assembly where the canopy cover is pulled off the corner of the X-frame assembly by a child located within the playard.
Figure 1F:
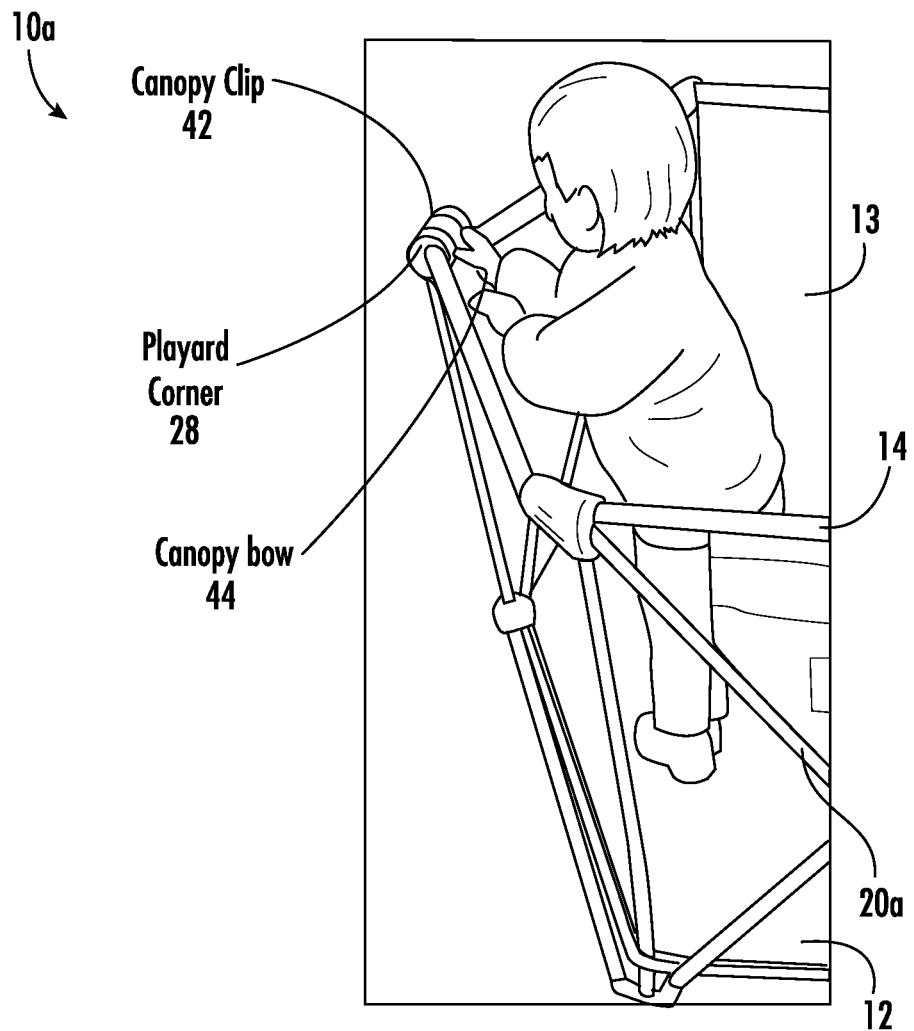
FIG. 1F shows another conventional outdoor playard with a canopy cover assembly where the canopy cover is pulled inside the interior space of the playard by a child located within the playard.

In some implementations, the leg support assemblies 110a may only be coupled to one another via the X-frame assemblies 140a. In other words, the frame 100a may exclude other support structures, such as a separate compliant and/or rigid top rail (e.g., the webbing 14 of the playards 10a and 10b shown in FIG. 1A and FIG. 1B, the rigid top rails 32 of the playard 10c shown in FIG. 1C) or a bottom support structure (e.g., the bottom support structure 34 of the playard 10c shown in FIG. 1C), which may appreciably reduce the number of parts for manufacture and assembly. For example, as shown in FIGS. 2A-2C, the portion of the leg tubes 112 located between the bottom end 113b and the slider 120 when the frame 100a is unfolded may not be coupled to another portion of the frame 100a (e.g., the bottom portions of the leg tubes 112 are mechanically unconstrained).

Figure 7A:
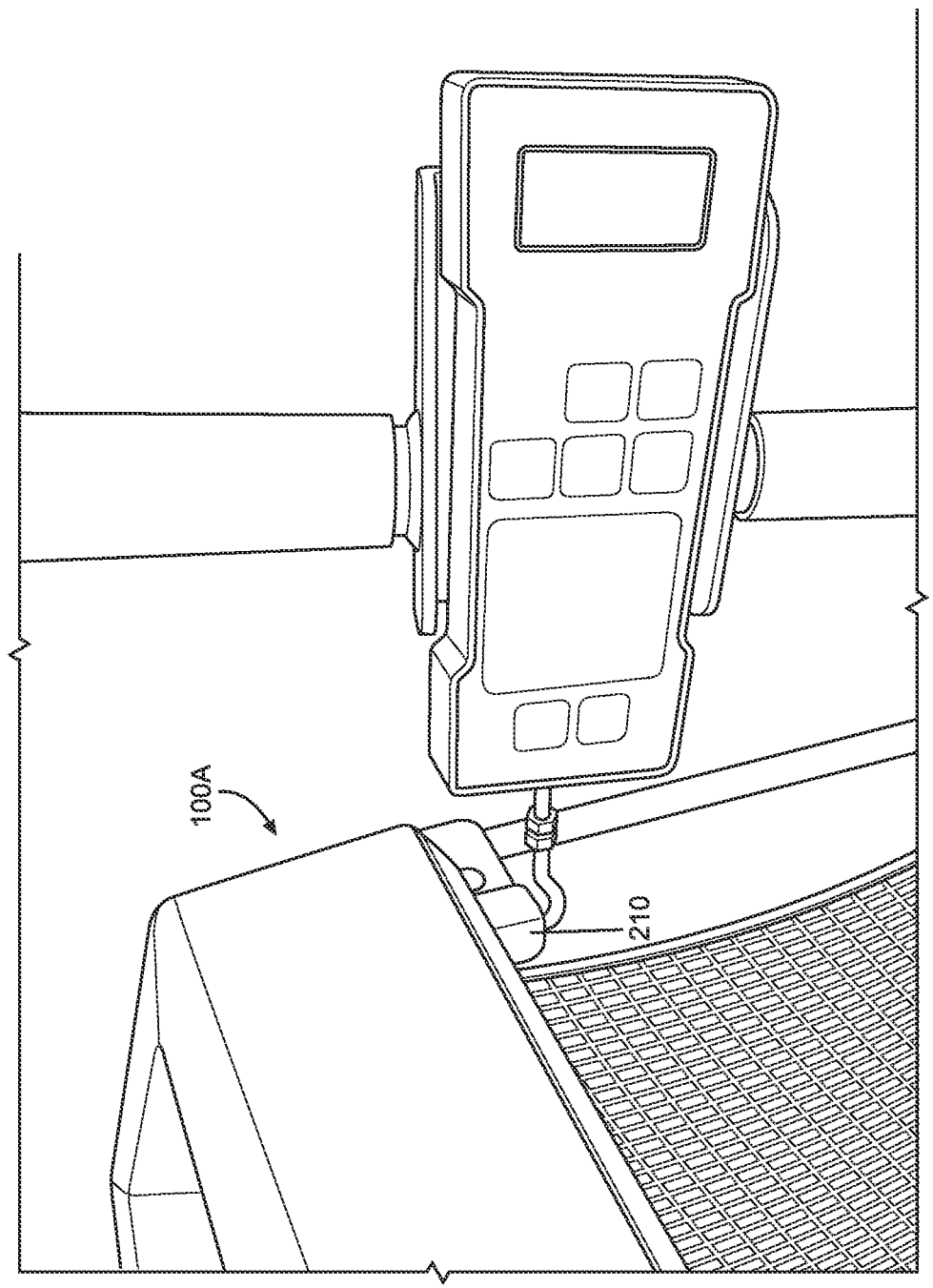
FIG. 7A shows a test being performed on the playard of FIG. 2A to evaluate the restraining force of the latch mechanism of FIG. 6A.
Figure 7B:
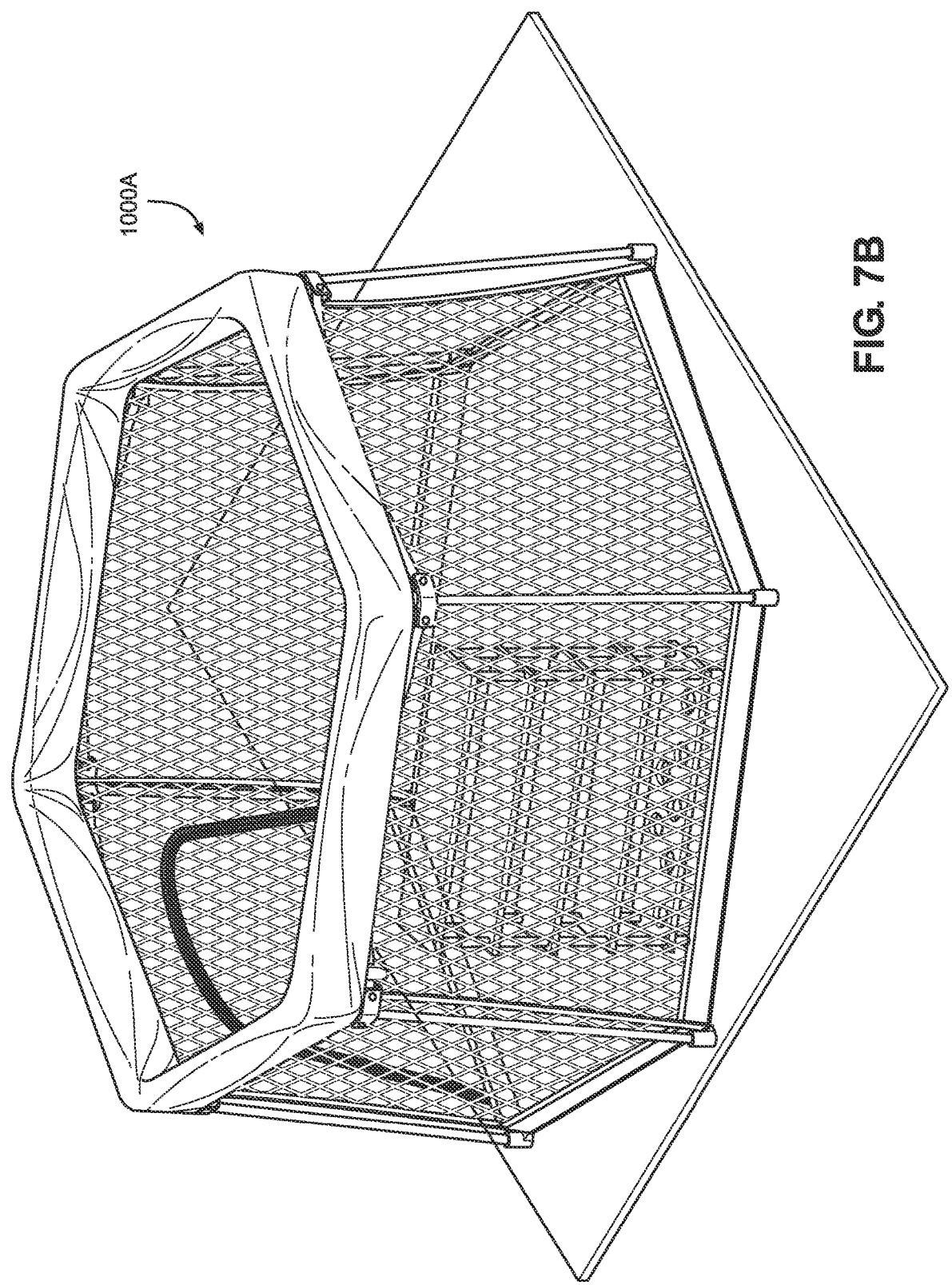
FIG. 7B shows a stability test being performed on the playard of FIG. 2A.

In some implementations, the frame 100a, comprising only leg support assemblies 110a and X-frame assemblies 140a to couple the leg support assemblies 110a together, may have sufficient mechanical rigidity, stability, and/or strength to meet the requirements set forth in various consumer safety standards (e.g., ASTM F406-19, 7.3.3, 7.11). For example, FIG. 7B shows the playard 1000a with the frame 100a unfolded and with soft goods 300 installed undergoing a stability test (e.g., ASTM F406-19, 5.12, 8.17). For this test, the playard 1000a was placed onto a flat piece of plywood and tilted at varying angles with a test weight disposed within the playard 1000a leaning against one side of the frame 100a. Based on this test, it was found the playard 1000a did not tip even when tilted at an angle of 20 degrees with at least three feet 114 remaining in contact with the plywood base. This result exceeds the requirements set forth in ASTM F406-19, 8.17, which require the playard to maintain three contact points with the plywood base when tilted to an angle of 10 degrees.

This may be accomplished, in part, by tailoring the materials and/or dimensions of the X-tubes 142a and 142b to provide the mechanical properties that ensure the frame 100a is mechanically rigid and stable when deployed. For example, the X-tubes 142a and 142b may be formed from steel tubing with an outer diameter of about 0.625 inches (⅝ inches) and a total length of about 24.5 inches. The term "about," when used to describe the dimensions of the X-tubes 142a and 142b, are intended to cover manufacturing tolerances. For example, "about 0.625 inches" may correspond to the following dimensional ranges: 0.61875 to 0.63125 inches (+/−1% tolerance), 0.62 to 0.63 inches (+/−0.8% tolerance), 0.62125 to 0.62875 inches (+/−0.6% tolerance), 0.6225 to 0.6275 inches (+/−0.4% tolerance), 0.62375 to 0.62625 inches (+/−0.2% tolerance). Similar tolerances may be applied to describe the total length of the X-tubes 142a and 142b.

It should also be appreciated the X-tubes 142a and 142b may be formed from other materials including, but not limited to, aluminum and carbon fiber. The X-tubes 142 and 142b may also have different dimensions depending, in part, on the desired size of the frame 100a and/or the interior space 102 and the mechanical properties of the materials used to form the X-tubes 142a and 142b. In some implementations, the X-frame assemblies 140a may all have substantially identical or identical dimensions and/or shapes resulting in an interior space 102 with a horizontal cross-section shaped as a regular polygon. In some implementations, the frame 100a may include X-frame assemblies 140a having different dimensions and/or shapes resulting in an interior space 102 that is skewed in shape.

Additionally, with reference to FIG. 2B, the length L of the leg tubes 112, defined as the distance between the top end 113a and the bottom end 113b, may generally be kept relatively small where possible in order to reduce the likelihood of the frame 100a being tilted especially when a force is applied along the top portion 108 of the frame 100a. For example, the length L may be chosen to ensure certain constraints on the frame 100a are satisfied. These constraints include: (1) providing a desired height for the interior space 102; (2) providing sufficient overlap with the foot 114 and the corner 130 to couple the foot 114 and corner 130 to leg tube 112; and/or (3) providing sufficient room for the slider 120 to move between the foot 114 and the corner 130 to fold and/or unfold the frame 100a. It should be appreciated that the lateral and vertical dimensions of the interior space 102 are coupled due, in part, to the rotational and translational motion of the X-frame assemblies 140a (e.g., an increase in the lateral dimensions of the interior space 102 results in a corresponding increase in the vertical dimensions to ensure the X-frame assemblies 140a have sufficient room to slide vertically along the leg tubes and hence fold).

In some implementations, the length L of the leg tubes 112 may be about 26 inches. Similar to the dimensions of the X-tubes 142a and 142b, the term "about," when used to describe the dimensions of the leg tube 112, are intended to cover manufacturing tolerances. The tolerance values may be the same as the X-tubes 142a and 142b. In some implementations, the leg tubes 112 in the leg support assemblies 110a may be substantially identical or identical. In some implementations, the leg tubes 112 may have different shapes and/or dimensions (e.g., some leg tubes 112 may be vertically oriented while other leg tubes 112 may be tilted when the frame 100a is unfolded).

Second, another benefit provided by positioning the X-tubes 142a and 142b in the top portion 108 of the frame when the frame is in the unfolded configuration is that the X-frame assemblies 140a occupy a smaller portion of the side faces 106 of the interior space 102 as compared to conventional playards with X-frame assemblies. When the soft goods 300 includes transparent and/or see-through side portions, the placement of the X-frame assemblies 140a in the top portion 108 of the frame allows for greater visibility of the partially enclosed space 301 when the soft goods 300 are coupled to the frame 100a. Said in another way, the X-frame assemblies 140a do not appreciable visually obstruct and/or impede the caregiver from seeing their child when the child 50 is in the playard 1000a.

Additionally, the soft goods 300 may use less material to cover the X-frame assemblies 140a. In some implementations, the soft goods 300 may cover the corners 130 of the leg support assemblies 110a and partially cover the X-frame assemblies 140a such that the latch mechanism 200a, when disposed in the top portion 108 of the frame 100a, remains accessible to the caregiver. In some implementations, the soft goods 300 may fully cover the X-frame assemblies 140a as well as the corners 130 and the sliders 120 of the leg support assemblies 110a such that an observer may only see the leg tubes 112 and/or the feet 114 of the leg support assemblies 110a. In this manner, the foldable playard 1000a may be presented with a cleaner, more aesthetically desirable appearance to a consumer, in both indoor and outdoor settings.

As discussed above in connection with FIG. 2B, the top portion 108 may generally correspond to the portion of the frame 100a proximate to the top ends 113a of the leg tubes 112 and/or the corners 130 of each leg support assembly 110a. More specificcally, the top portion 108 may be defined as the portion of the frame 100a located between a top horizontal plane 92 that intersects the top ends 113a of the leg tubes 112 and/or the corners 130 and a bottom horizontal plane 91 that is offset from the top horizontal plane 92 by an offset distance, $x_1$, along the length of the respective leg tubes 112. When the frame 100a is unfolded, the X-tubes 142a and 142b, the sliders 120, and the corners 130 are disposed within the top portion 108. The offset distance, $x_1$, may be defined as a fraction of the total length L of the leg tube 112 assuming the leg tubes 112 in the frame 100a have identical lengths. In some implementations, the offset distance, $x_1$, may be less than or equal to 30% of the total length, L, of the leg tubes 112 and, more preferably, less than or equal to 20% of the total length of the leg tubes 112.

Figure 3A:
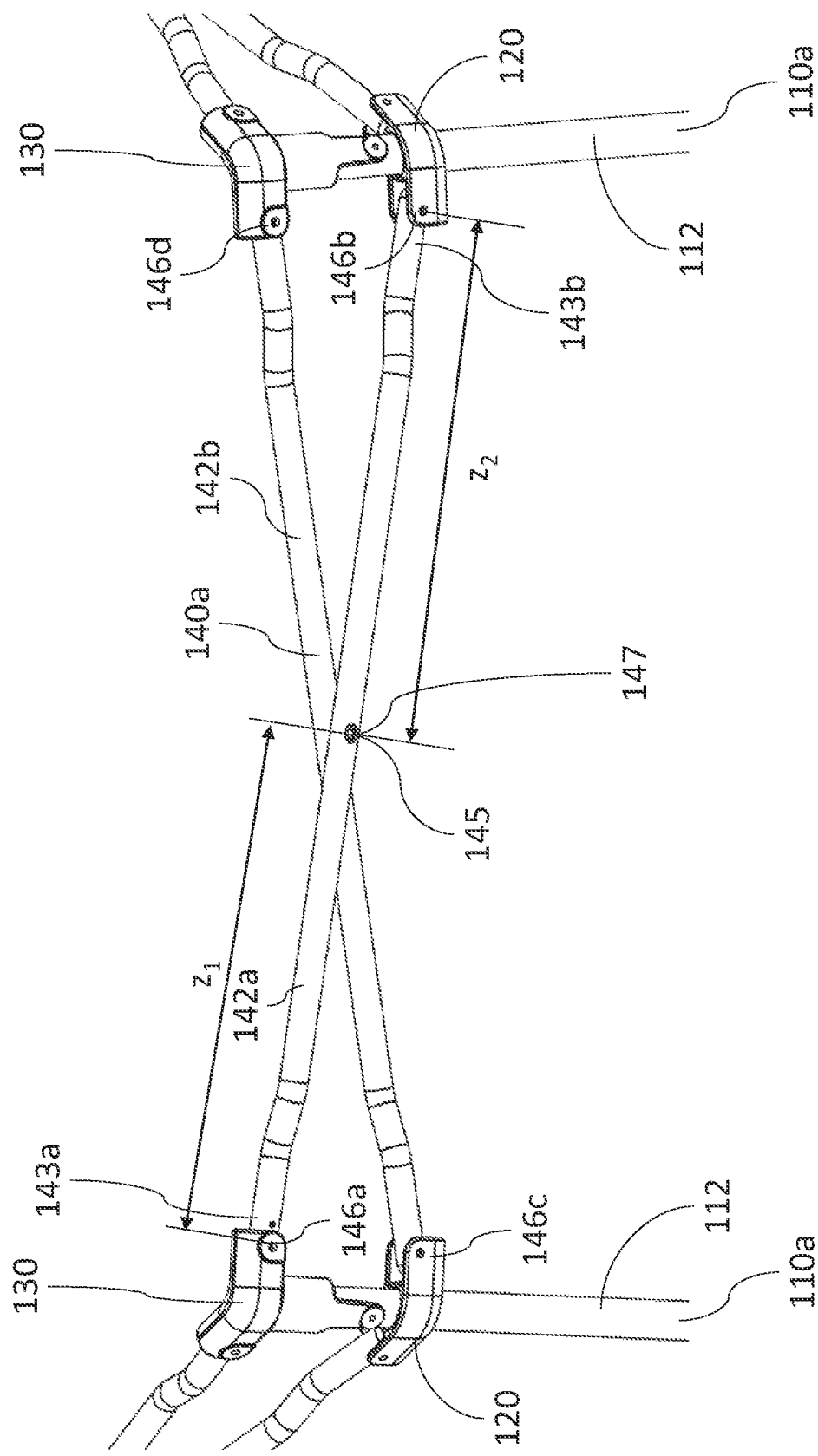
FIG. 3A shows a top perspective view of a X-frame assembly in the playard of FIG. 2A.

FIGS. 3A and 3B show additional views of the X-frame assembly 140a in the frame 100a. As shown, the X-tubes 142a and 142b may be rotatably coupled to each other via a pin joint 145. The X-tube 142a may have a first end 143a rotatably coupled to the corner 130 of one leg support assembly 110a via a pin joint 146a and a second end 143b rotatably coupled to the slider 120 of another leg support assembly 110a via a pin joint 146b. Similarly, the X-tube 142b may be rotatably coupled to the corner 130 of one leg support assembly 110a via a pin joint 146d and rotatably coupled to the slider 120 of another leg support assembly 110a via a pin joint 146c.

The pin joints 145 and 146a -146d may generally include a fastener (not shown) with a shaft inserted through openings 147 (see FIG. 4B) on the X-tubes 142a and 142b to allow rotational motion between the X-tubes 142a and 142b, the sliders 120, and the corners 130. The fastener may be various types of captive fasteners including, but not limited to, a rivet with a cap (e.g., a rolled rivet) and a bolt fastener with a nut.

Generally, the nominal dimensions and tolerances of the openings 147 and the shaft of the fastener affects the tightness or looseness of the pin joints 145 and 146a -146d. If the opening 147 is dimensioned to interfere with the fastener (e.g., the size of the opening 147 is smaller than the size of the shaft of the fastener), the caregiver may have to apply a greater force to rotate the X-tubes 142a and 142b. In some instances, the pin joints 145 and 146a -146d may be too tight such that the respective feet 114 of each leg support assembly 110a do not contact the ground 90 when the frame 100a is unfolded. For example, the caregiver may move the slider 120 of one leg support assembly 110a towards the corresponding corner 130, but the opposing sides of the frame 100a may only be partially unfolded. In contrast, if the size of the opening 147 is appreciably larger than the fastener shaft, the pin joints 145 and 146a -146d may allow the X-tubes 142a and 142b to rotate and/or translate along other unwanted axes of motion (e.g., the frame 100a may wobble), which may compromise the mechanical stability of the frame 100a. Thus, in some implementations, the nominal dimensions and tolerances of the opening 147 and the shaft of the fastener are particularly chosen to be sufficiently loose to ensure the feet 114 of the leg support assemblies 110a contact the ground 90 while still being sufficiently tight to limit unwanted rotational and/or translation motion between the X-tubes 142a and 142b and/or the sliders 120 or corners 130. For example, the tolerance (or clearance) between the shaft of the fastener and the edge of the opening 147 may greater than or equal to about 0.010 inches and, more preferably, greater than or equal to about 0.015 inches.

As shown in FIG. 3A, the pin joint 145 may generally be located along the length of the respective X-tubes 142a and 142b. For example, the pin joint 145 may be positioned at an offset distance, $z_1$, from the first end 143a and an offset distance, $z_2$, from the second end 143b. In some implementations, the offset distances $z_1$ and $z_2$ may be equal, which causes the respective first and second ends 143a and 143b of the X-tubes 142a and 142b to follow the same circular path when the X-tubes 142a and 142b are rotated. This, in turn, causes the orientation of the leg support assemblies 110a to remain unchanged when the frame 100a is being folded and/or unfolded. For example, the leg tubes 112 of each leg support assembly 110a may remain vertically oriented for both folded and unfolded configurations.

In other implementations, however, the offset distances $z_1$ and $z_2$ may not be equal. For example, the offset distance $z_2$ may be larger than the offset distance $z_1$ causing the first end 143a of the X-tube 142a to follow a smaller circular path and the second 143b to follow larger circular path when the X-tube 142a is rotated. The respective first and second ends 143a and 143b of the X-tube 142b may similarly follow smaller and larger circular paths, respectively. This, in turn, may cause the leg support assemblies 110a and, in particular, the leg tubes 112 to flare outwards when the frame 100a is unfolded. In other words, the leg tubes 112 of the leg support assemblies 110a may be tilted due to the rotational motion of the X-tubes 142a and 142b in the X-frame assemblies 140a such that the top ends 113a constitute the vertices of a smaller horizontal cross-section (parallel to the ground) than the bottom ends 113b (i.e., the top ends 113a are positioned closer to one another than the bottom ends 113b). In this manner, the frame 100a may define an interior space 102 with a truncated pyramidal interior shape as described above, which may be beneficial in improving the mechanical stability of the frame 100a (e.g., the frame 100a is less likely to be tilted over). With reference again to FIG. 2B, in some implementations the leg support assemblies 110a may be flared outwards such that respective longitudinal axes 111a associated with the leg tubes 110a are tilted at an angle, θ, relative to the ground 90, wherein the angle ranges between 2 degrees and 10 degrees and, more preferably, between 5 degrees and 7 degrees.

Turning now to FIG. 3B, in some implementations the X-tubes 142a and 142b may also be bent in shape. For example, the first and second ends 143a and 143b of the X-tube 142a may be aligned along a first axis 141a while a central portion 144 of the X-tube 142a is aligned along a second axis 141b that is parallel to and offset from the axis 141a. The X-tube 142b may have a similar bent shape as the X-tube 142a. In some implementations, the offset between the first and second axes 141a and 141b may be chosen to provide sufficient clearance between the X-tubes 142a and 142b such that the respective first and second ends 143a and 143b of the X-tubes 142a and 142b lie on the same plane (e.g., the side face 106 of the interior space 102) as shown in FIG. 3B. This, in turn, allows the portions of the corners 130 and the sliders 120 to also lie on the same plane with the first and second ends 143a and 143b of the X-tubes 142a and 142b. In some implementations, aligning the corners 130 and sliders 120 in this manner may allow the frame 100a to fold more compactly.

Figure 3C:
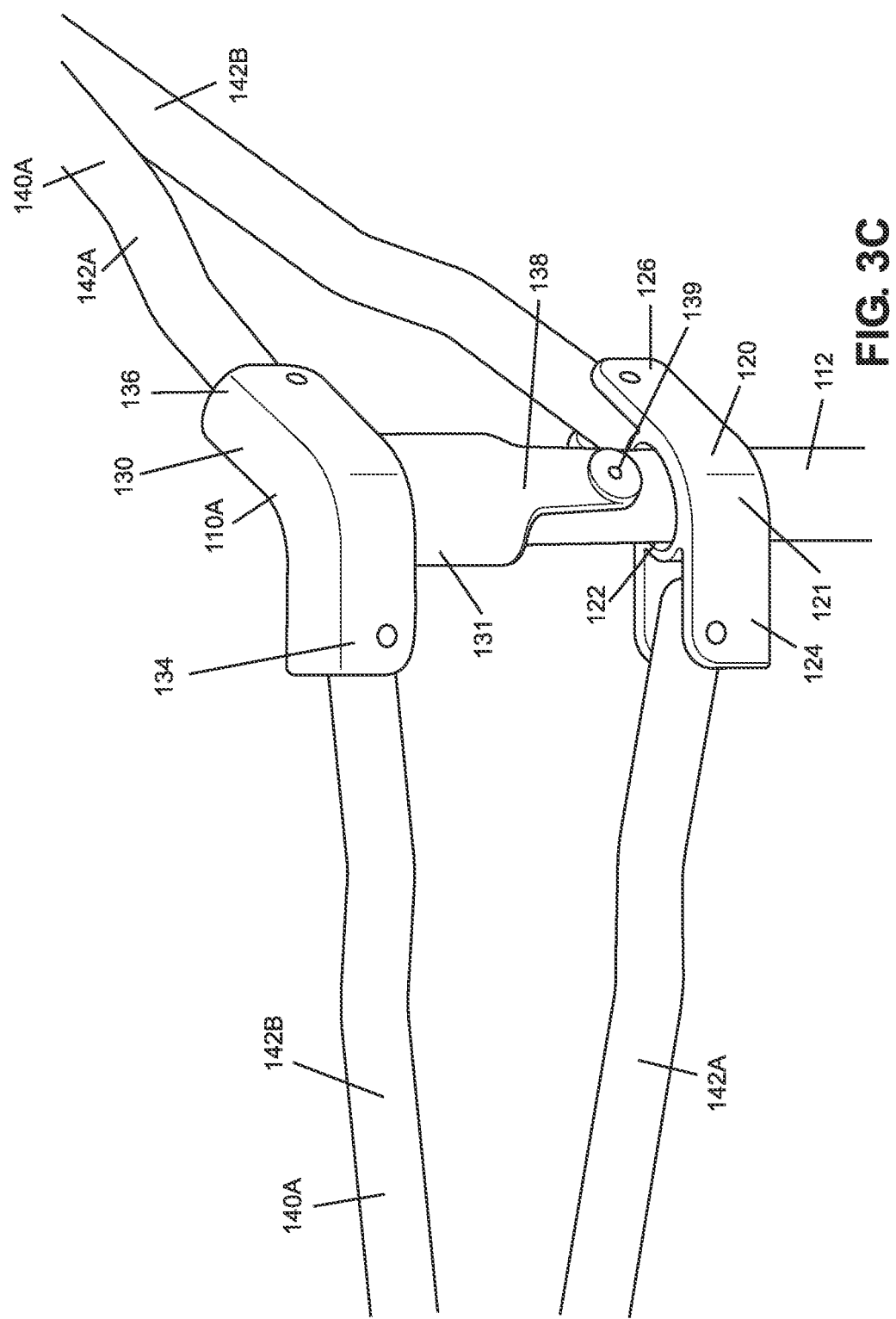
FIG. 3C shows a top perspective view of a corner and a slider of a leg support assembly in the playard of FIG. 2A.
Figure 3E:
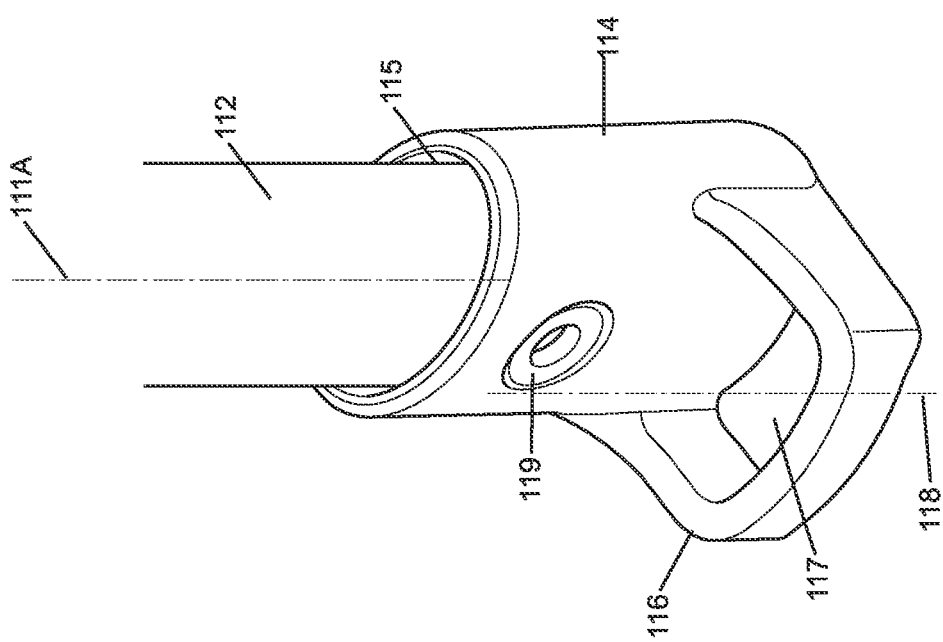
FIG. 3E shows a top perspective view of a leg tube and a foot in the leg support assembly of FIG. 3C.

FIGS. 3C-3E show additional views of the leg support assemblies 110a in the frame 100a. As shown, the leg tube 112 may be a substantially elongated, hollow tube that defines that path along which the slider 120 travels when the frame 100a is being folded and/or unfolded. In some implementations, the leg tube 112 may be substantially straight such that the slider 120 follows a straight path along the longitudinal axis 111a (see FIGS. 2A-2C). However, it should be appreciated the leg tube 112 may also be curved in other implementations to define a correspondingly curved path for the slider 120 to follow. Examples of curved leg tubes 112 will be discussed in further detail below. In some implementations, the leg tube 112 may have a cross-section that remains constant along the length, L, of the leg tube 112. In some implementations, the leg tube 112 may have various cross-sectional shapes including, but not limited to a circle, an oval, and an oblong shape. The leg tube 112 may also be formed from various materials including, but not limited to steel, aluminum, and carbon fiber.

The slider 120 may include a base 121 that defines a through hole opening 122 shaped and/or dimensioned to surround the leg tube 112, thus enabling the slider 120 to slidably move along the leg tube 112. In some implementations, the shape of the opening 122 may conform with the cross-sectional shape of the leg tube 112. The slider 120 may further include an extended portion 124 coupled to one side of the base 121 to couple the X-tube 142a of one X-frame assembly 140a to the slider 120 via a fastener inserted through an opening on the extended portion 124 aligned to the opening 147 of the X-tube 142a (see, for example, the exploded views of FIGS. 4A and 4B). The extended portion 124 may also include a recessed opening to receive the end of the X-tube 142a that is coupled to the slider 120. The slider 120 may also include an extended portion 126 similar to the extended portion 124 that is disposed opposite from the extended portion 124 to couple the X-tube 142b of another X-frame assembly 140a to the slider 120 via another fastener inserted through an opening on the extended portion 126 aligned to the opening 147 of the X-tube 142b.

The extended portions 124 and 126 may generally be oriented at an angle relative to each other to align the respective X-tubes 142a and 142b from adjoining X-frame assemblies 140a along the desired geometry of the interior space 102. For example, the extended portions 124 and 126 may be rotated relative to one another by an obtuse angle of approximately 120 degrees corresponding to the angles between adjoining sides of a hexagon. In some implementations, the extended portions 124 and 126 may lie on the same horizontal plane. In some implementations, the extended portions 124 and 126 may be offset vertically from one another if the respective X-tubes 142a and 142b coupled to the slider 120 are not identical. In some implementations, the sliders 120 of the leg support assemblies 110a may be identical with one another, thus reducing the number of unique parts for manufacture.

The corner 130 may include a base 131 that defines an opening 132 to receive the top end 113a of the leg tube 112. In some implementations, the shape of the opening 132 may conform with the cross-sectional shape of the leg tube 112. Similar to the slider 120, the corner 130 may include extended portions 134 and 136 disposed on opposing sides of the base 131 to couple the X-tube 142b of one X-frame assembly 140a and the X-tube 142a of another X-frame assembly 140a to the corner 130 using a similar attachment mechanism as the slider 120, e.g., a fastener inserted through an opening aligned to the openings 147 of the X-tubes 142a and 142b (see, for example, the exploded views of FIGS. 4A and 4B). The extended portions 134 and 136 may each have recessed openings to receive respective ends of the X-tubes 142a and 142b.

The extended portions 134 and 136 may also be oriented at an angle relative to each other to align the respective X-tubes 142a and 142b from adjoining X-frame assemblies 140a along the desired geometry of the interior space 102. The extended portions 134 and 136 may also lie on the same horizontal plane and/or offset vertically from one another if the respective X-tubes 142a and 142b coupled to the corner 130 are not identical. In some implementations, the corners 130 of the leg support assemblies 110a may be identical with one another, thus reducing the number of unique parts for manufacture.

FIG. 3C further shows the corner 130 may include a tab portion 138 that extends downwards along the leg tube 112 to support a snap-fit connector 139 to attach the soft goods 300 to the frame 100a. In some implementations, the tab portion 138 may be shaped and/or dimensioned to position the snap-fit connector 139 at a desired location along the leg tube 112. For example, the snap-fit connector 139 may be offset from the top end 113a to ensure the soft goods 300 overlaps and wraps around the top portion 108 of the frame 100a. In some implementations, an opening formed in the tab portion 138 to attach the snap-fit connector 139 to the corner 130 may also be used to securely couple the corner 130 to the leg tube 112 using the same fastener.

Figure 4C:
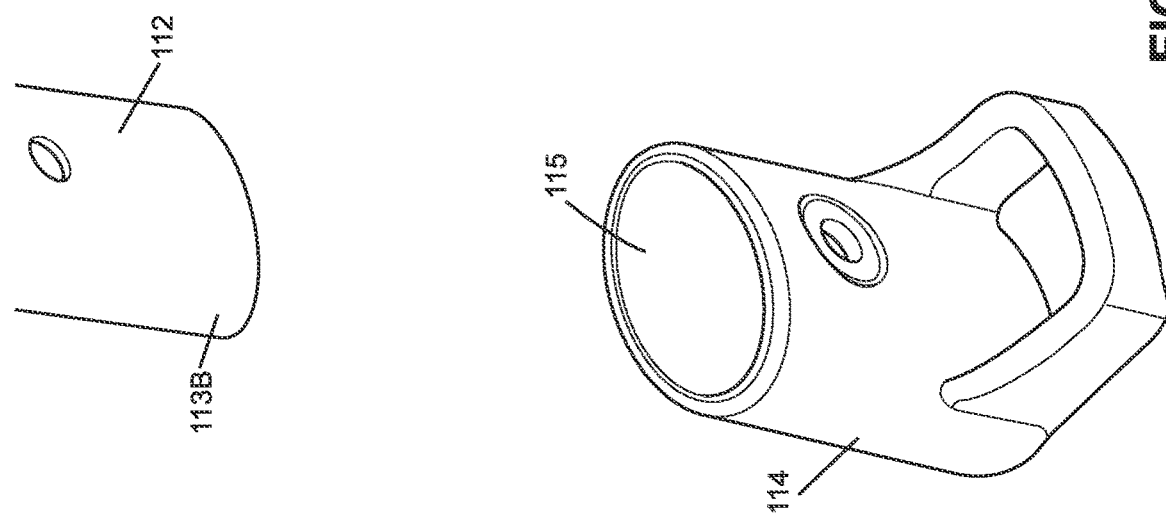
FIG. 4C shows a magnified top perspective view of the leg tube and the foot in the leg support assembly of FIG. 4A.

FIG. 3E shows a magnified view of the foot 114 of the leg support assembly 110a. As described above, the foot 114 supports the frame 100a and the foldable playard 1000a on the ground 90. As shown, the foot 114 may define an opening 115 to receive the bottom end 113b of the leg tube 112. In some implementations, the shape of the opening 115 may conform with the cross-sectional shape of the leg tube 112. The foot 114 may further include an opening 119 to securely couple the foot 114 to the leg tube 112 using, for example, a fastener (see, for example, FIG. 4C).

In some implementations, the foot 114 may also include a looped or ringed structure that extends from the base of the foot 114 to provide another attachment point to couple the soft goods 300 to the frame 100a. For example, FIG. 3C shows the foot 114 may include a D-ring 116 defining a D-shaped opening 117. The soft goods 300 may include a strap or a tether that is inserted through the D-shaped opening 117 and tied to the foot 114 to mechanically attach a bottom portion of the soft goods 300 to the frame 100a. As shown, the D-shaped opening 117 may be aligned such that a centerline axis 118 of the opening 117 is aligned substantially parallel with the longitudinal axis 111a of the leg tube 112. This orientation also allows the D-ring 116 to increase the area that the foot 114 contacts the ground 90, which may further improve the mechanical stability of the frame 100a. However, it should be appreciated the orientation and placement of the D-ring 116 may be varied in other implementations. For example, the D-ring 116 may be rotated 90 degrees relative to the ground such that the axis 118 of the opening 117 is perpendicular to the longitudinal axis 111*a*.

Figure 5A:
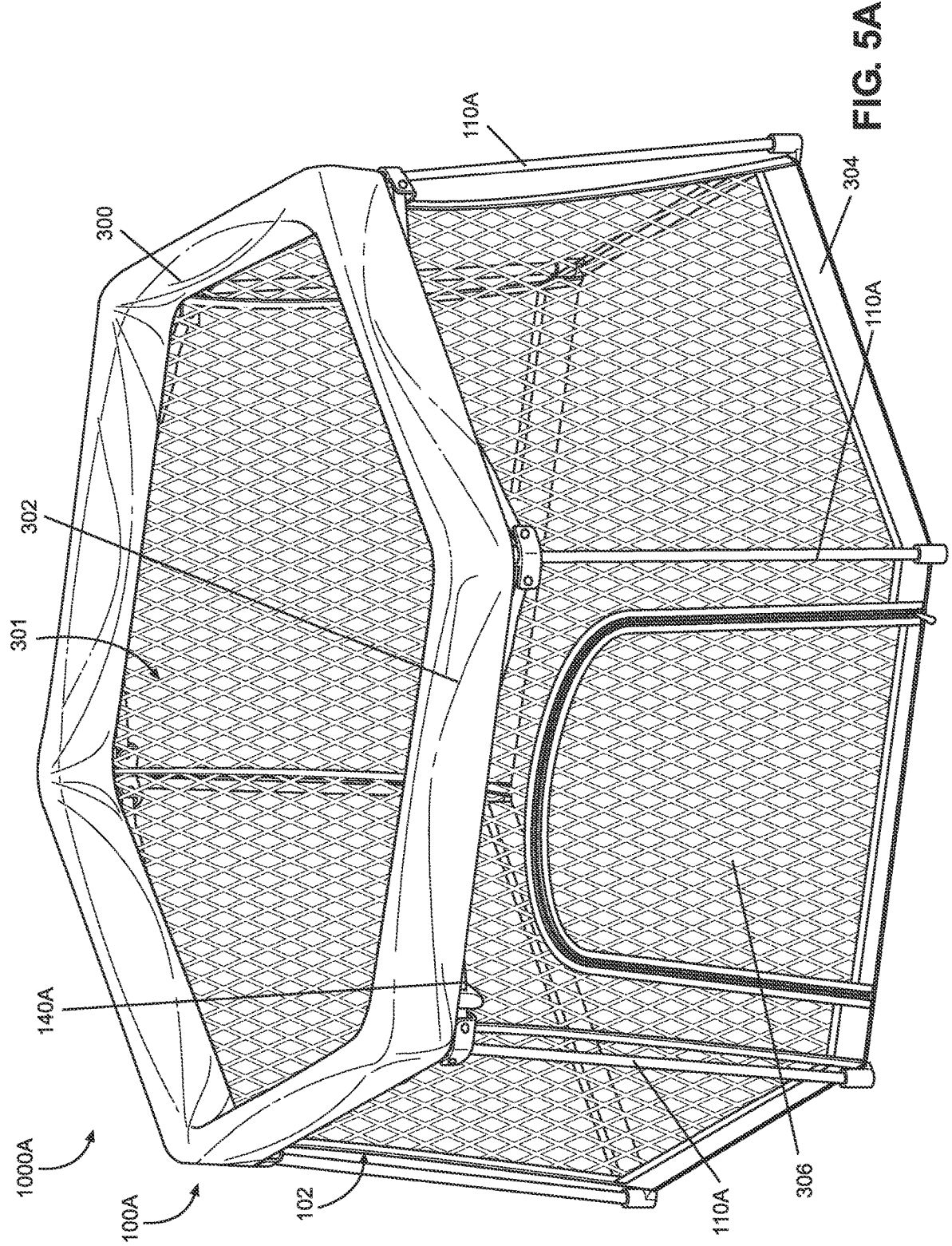
FIG. 5A shows a top perspective view of the playard of FIG. 2A with soft goods.

FIG. 5A shows the foldable playard 1000*a* with the soft goods 300 coupled to the frame 100*a*. As described above, the soft goods 300 defines a partially enclosed space 301 placed within the interior space 102 of the frame 100*a* to contain the child. In some implementations, the soft goods 300 may remain attached to the frame 100*a* as the frame 100*a* is folded and/or unfolded. As shown in FIG. 5A, the soft goods 300 may include a floor portion 304 that rests on the ground 90 when the playard 1000*a* is unfolded. The soft goods 300 may also include side portions 306 that define and surround the partially enclosed space 301. In some implementations, the side portions 306 may be transparent (e.g., a transparent plastic) or see-through (e.g., a mesh) so that a child in the playard is observable from outside the partially enclosed space 301. The soft goods 300 may also include one or more straps (e.g., a Velcro strap) and/or tethers to couple the soft goods 300 to each D-ring 116 of each foot 114 in the leg support assemblies 110*a*.

The soft goods 300 may also include a soft goods top portion 302 to wrap the soft goods 300 around the top portion 108 of the frame 100*a*. As shown in FIG. 5A, the soft goods top portion 302 may be formed from an opaque textile material with multiple layers of fabric to provide padding on the portions of the frame 100*a* that are covered. The soft goods 300 also may include integrated snap-fit connectors 312 that couple to the snap-fit receivers 139 of the corners 130. In some implementations, the soft goods 300 may include the same number of snap-fit connectors 312 such that the soft goods 300 attaches to each corner 130 of the frame 100*a*. In some implementations, the snap-fit connector 312 may be disposed on a tab 310 that is attached to an interior piece of the soft goods 300 along the soft goods top portion 302 as shown in FIG. 5C. The tab 310 may stiffen the interior piece of the soft goods top portion 302 to ensure the soft goods top portion 302 remains flush against the frame 100*a* (e.g., the soft goods top portion 302 does not curl upwards) when the snap-fit connector 312 is coupled to the snap-fit connector 139 on the corner 130 as shown in FIG. 5B. The tab 310 may be formed from a compliant material, such as polyethylene, and shaped to be stiffer than the surrounding textile material of the soft goods 300.

FIGS. 6A-6D show multiple views of the latch mechanism 200*a* disposed on the frame 100*a*. As described above, the latch mechanism 200*a* may lock the frame 100*a* in the unfolded configuration. In particular, the latch mechanism 200*a* may maintain the sliders 120 of the leg support assemblies 110*a* proximate to the corresponding corners 130 such that the X-frame assemblies 140*a* remain unfolded forming a shallow X-frame structure in the top portion 108 of the frame. Thus, the latch mechanism 200*a* may provide sufficient mechanical restraints to support the various forces and/or torques applied to one or more of the sliders 120 (e.g., the weight of the X-tubes 142*a* and 142*b* acting on the slider 120).

The latch mechanism 200*a* may generally be coupled to and/or couple together various components of the frame 100*a* including, but not limited to the slider 120, the corner 130, and the X-tubes 142*a* or 142*b*. Furthermore, the latch mechanism 200*a* may be disposed, at least in part, within the top portion 108 of the frame 100*a*. This may enable the latch mechanism 200*a* to be at least partially covered by the soft goods 300. For example, the latch mechanism 200*a* may directly couple the corner 130 of one leg support assembly 110*a* to a X-tube 142*a* or 142*b* of an adjoining X-frame assembly 140*a* as shown in FIG. 6A.

The frame 100*a* may generally include one or more latch mechanisms disposed on one or more leg support assemblies 110*a* and/or the X-frame assemblies 140*a*. For example, the frame 100*a* may include latch mechanisms disposed on opposing sides of the frame 100*a* to ensure the frame 100*a*, when unfolded, maintains an even, unfolded shape (e.g., one side of the frame 100*a* does not sag downwards relative to another side). However, in other implementations, a single latch mechanism is sufficient to lock the frame 100*a* in the unfolded configuration while keeping the various leg support assemblies 110*a* and X-frame assemblies 140*a* unfolded evenly. For example, with reference again to FIGS. 2A-2C, these figures show that the frame 100*a* includes a single latch mechanism 200*a* disposed, in part, on one leg support assembly 110*a* and one X-frame assembly 140*a*. In some implementations, the latch mechanism 200*a* may be configured to withstand a load greater than or equal to 10 lbs. before being disengaged or unlocked.

Figure 6A:
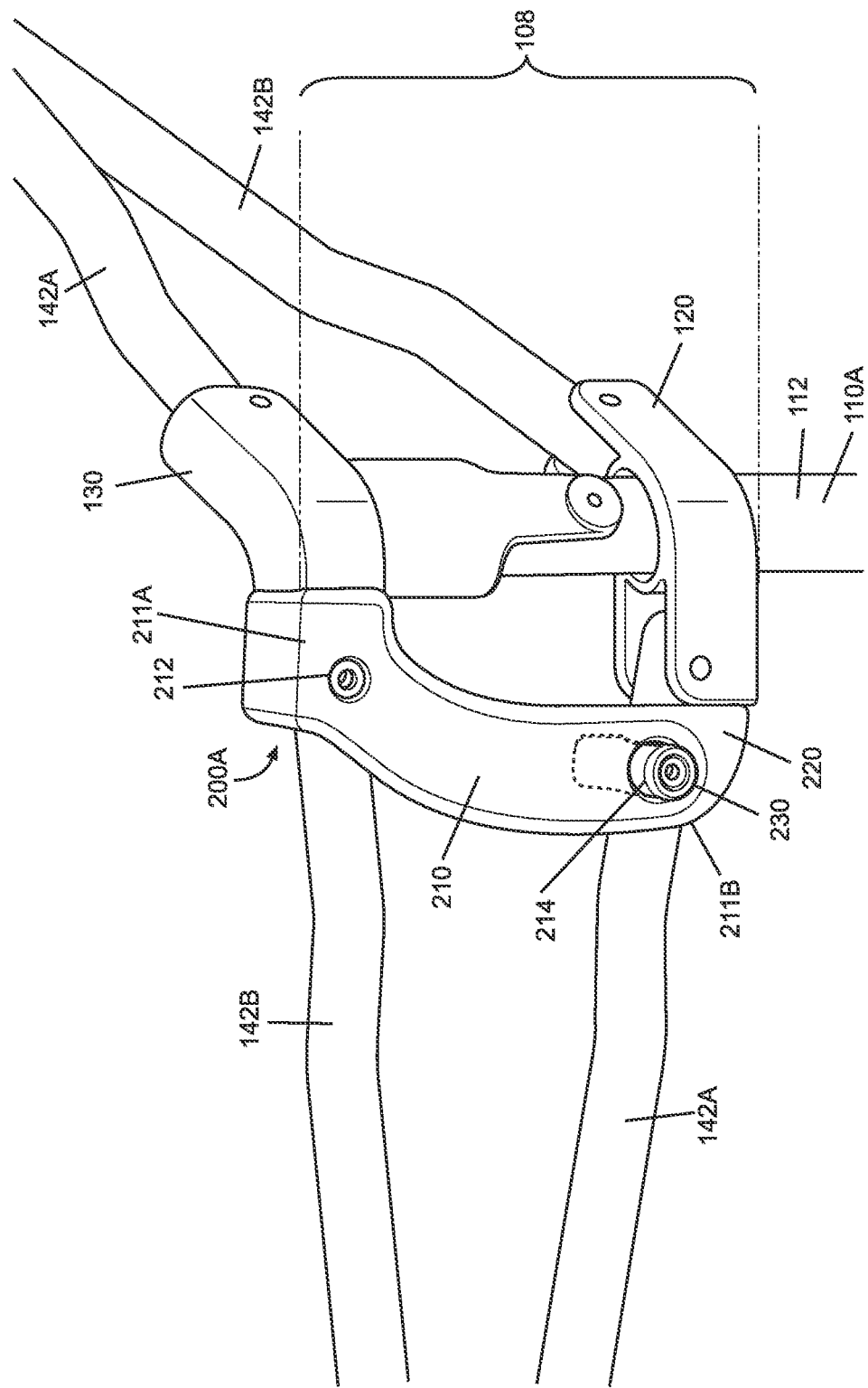
FIG. 6A shows a top perspective of a double-action latch mechanism in the playard of FIG. 2A.

FIG. 6A shows the latch mechanism 200*a* may include a latch member 210 (also referred to herein as a "flex lock") with a top end 211*a* coupled to the corner 130 of one leg support assembly 110*a* and a latch boss 230 coupled to the X-tube 142*a* of one X-frame assembly 140*a*. The latch member 210 may include an opening 212 disposed at the first end 211*a* that aligns with the opening on the corner 130 used to couple to the X-tube 142*b*. In this manner, a single fastener may couple the latch member 210, the corner 130, and the X-tube 142*b* together and the corner 130 may remain unmodified. In other words, the latch member 210 may be coupled to any one of the corners 130 in the leg support assemblies 110*a* of the frame 100*a* provided the latch boss 230 is coupled to one of the X-tubes 142*a* and 142*b* adjoining the leg support assembly 110*a*. In some implementations, the latch member 210 may be coupled to the corner 130 via a pin joint connection or a rigid connection (e.g., in which the latch member 210 cannot be rotated relative to the corner 130). The latch boss 230 may include an opening that is shaped and/or dimensioned to conform with the X-tube 142*a*, thus enabling the latch boss 230 is slid onto the X-tube 142*a* for assembly. FIG. 6B shows the latch boss 230 may then be coupled to the X-tube 142*a* using, for example, a fastener inserted through respective openings (not shown) on the latch boss 230 and the X-tube 142*a*.

With reference again to FIG. 6A, the latch member 210 may include a latch opening 214 disposed at a second end 211*b* of the latch member 210 located opposite from the first end 211*a*. The latch opening 214 may be shaped and/or dimensioned to receive the latch boss 230. In other words, the latch opening 214 may function as a latch catch. In this manner, the latch member 210 may directly couple the corner 130 to the X-tube 142*b* by engaging with the latch boss 230, thus holding the slider 120 in the top portion 108 of the frame 100*a* near the corner 130.

The latch member 210 may also include a tab 220 disposed at the second end 211*b*. Generally, the latch member 210 may be a mechanically compliant component that bends when the caregiver pulls on the tab 220 to disengage the latch member 210 from the latch boss 230. The latch member 210 may also have sufficient mechanical rigidity such that a restoring force is generated when bent by the caregiver. When the caregiver releases the tab 220, the restoring force may return the latch member 210 back to its original shape. In some implementations, the latch member 210 may be formed from a plastic material. The latch member 210 may further have a sufficient thickness and/or be reinforced with integral rib structures to provide the desired mechanical rigidity.

Figure 6D:
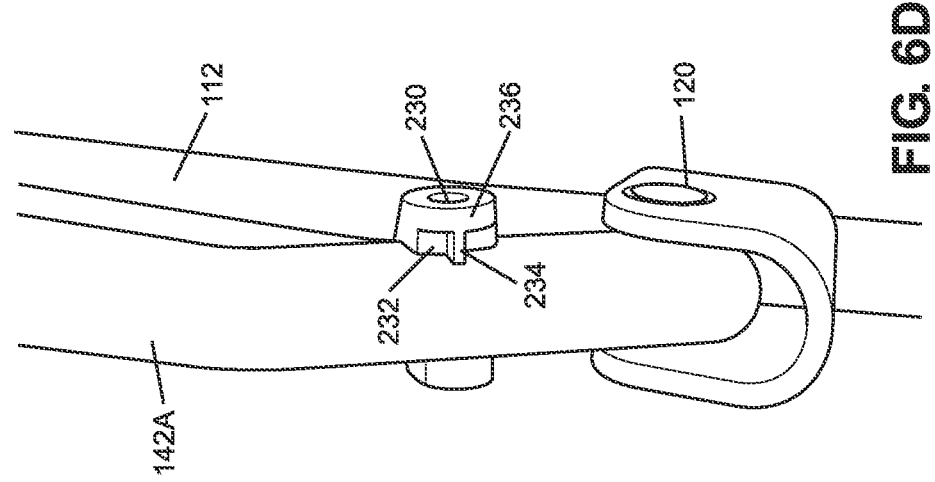
FIG. 6D shows a magnified view of the latch boss in the double-action latch mechanism of FIG. 6A.
Figure 6C:
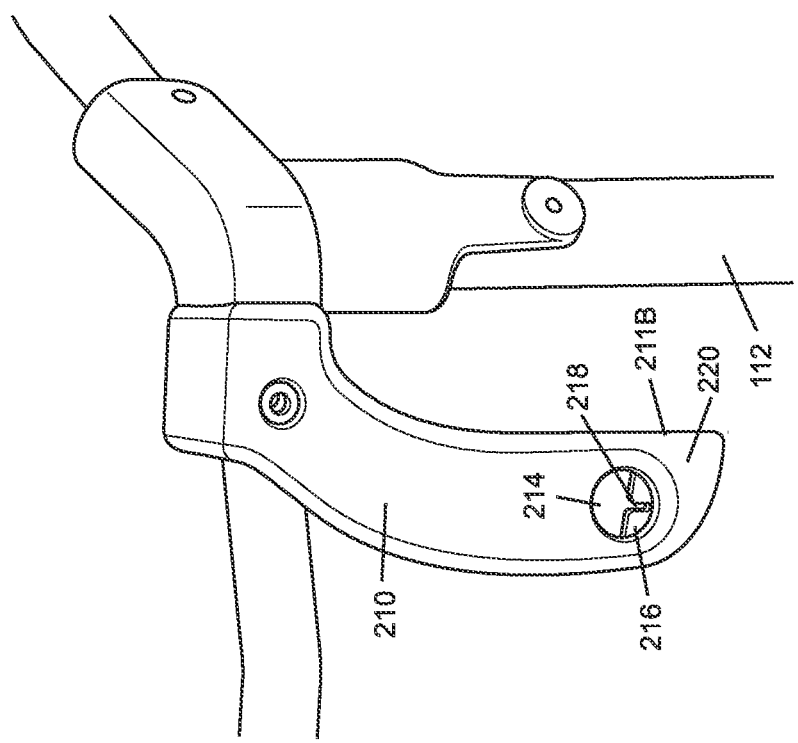
FIG. 6C shows a magnified view of the latch member in the double-action latch mechanism of FIG. 6A.

In some implementations, the latch mechanism 200a may be a double-action latch mechanism (e.g., the caregiver needs to perform two operations to unlock the latch mechanism). For example, FIG. 6C shows the latch opening 214 of the latch member 210 may include a tab 216 disposed within the latch opening 214. FIG. 6D shows the latch boss 230 may include an undercut portion 232 that forms a notch or a slot between the X-tube 142a and an end portion 236. Thus, when the latch member 210 is coupled to the latch boss 230, the tab 216 of the latch member 210 is disposed within the undercut portion 232 and retained by the end portion 236 of the latch boss 230. In some implementations, the tab 216 may further define a slot 218 as shown in FIG. 6C, and the latch boss 230 may further include a rib 234 partially disposed within the undercut portion 232 as shown in FIG. 6D, that together facilitate alignment of the tab 216 to the undercut portion 232 to ensure the latch member 210 is properly engaged with the latch boss 230.

To setup the frame 100a and, by extension the playard 1000a, the caregiver may initially move the slider 120 of one leg support assembly 110a towards the corresponding corner 130 to partially unfold the frame 100a. As the frame 100a is being unfolded, the latch boss 230 disposed on the X-tube 142a is displaced towards the latch member 210 coupled to the corner 130. Once the latch boss 230 reaches the latch member 210 and, in particular, the tab 216, further movement of the slider 120 along the leg tube 112 results in contact between the latch boss 230 and the tab 216, which causes the latch member 210 to be deflected outwards. In some implementations, the latch member 210 may include a lead-in feature on the tab 216 (not shown), such as a sloped or a ramped wall. The lead-in feature may allow the latch member 210 to be deflected more effectively as the latch boss 230 slides against the latch member 210 by orienting the contact force between the latch member 210 and the latch boss 230 along a direction that increases the magnitude of the torque applied to bend the latch member 210 (note that the pivot point of the latch member 210 is located at the mounting opening 212 as shown in FIG. 6A).

As the latch member 210 is deflected with further movement of the slider 120 along the leg tube 112, an internal restoring force is generated within the latch member 210, which is applied against the latch boss 230. As the caregiver continues to move the slider 120 towards the corner 130, the latch member 210 is deflected further outwards resulting in a higher magnitude restoring force being applied against the latch boss 230. When the slider 120 is moved sufficiently close to the corner 130, the latch boss 230 passes through the latch opening 214 and the restoring force causes the latch member 210 to snap back to its original position such that the latch boss 230 protrudes through the latch opening 214. Once the caregiver releases the slider 120, the slider 120 may move slightly downwards along the leg tube 112 due to gravity, causing the undercut portion 232 of the latch boss 230 to rest onto the tab 216 of the latch member 210.

Figure 6E:
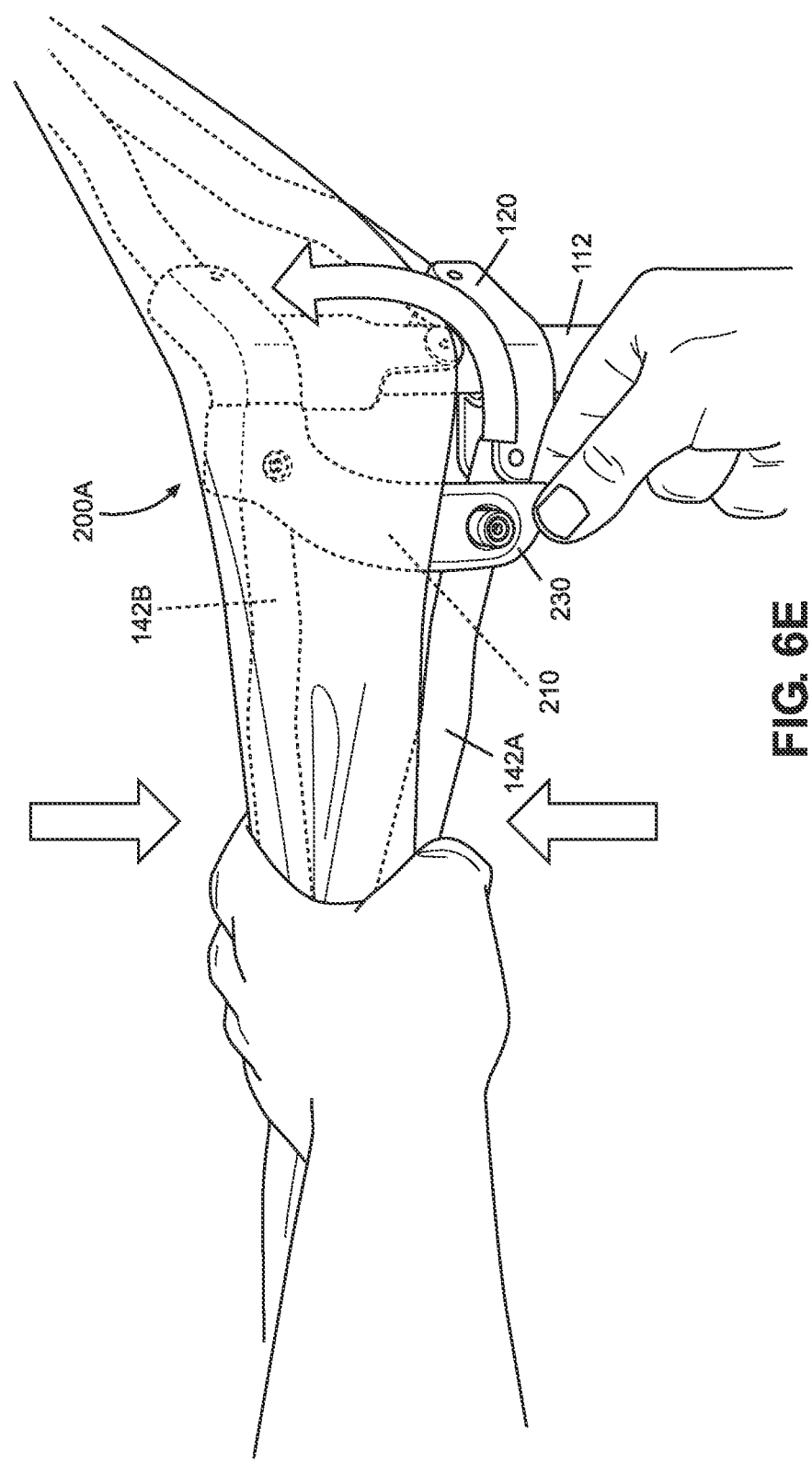
FIG. 6E shows an illustration for unlocking the double-action latch mechanism of FIG. 6A.

FIG. 6E illustrates how a caregiver may transition the frame 100a and the playard 1000a to a folded configuration from the unfolded configuration by disengaging the double-action latch mechanism 200a. As shown in FIG. 6E, the caregiver may first squeeze the X-tubes 142a and 142b (as shown by the upward and downward arrows in FIG. 6E), which causes the slider 120 to move upwards along the leg tube 112, thus disengaging the tab 216 of the latch member 210 from the undercut portion 232 of the latch boss 230. While the caregiver is squeezing the X-tubes 142a and 142b together with one hand, the caregiver may then pull on the tab 220 of the latch member 210 with another hand to release the latch boss 230 from the latch opening 214 (as shown by the curved arrow in FIG. 6E). The "double-action" of the latch mechanism 200a is thus "squeeze-and-pull." While holding the latch member 210, the caregiver may then release the X-tubes 142a and 142b and the slider 120 may then fall downwards along the leg tube 112 due, in part, to the weight of the X-frame assemblies 140a. The caregiver may then move the slider 120 downwards towards the foot 114 of the leg support assembly 110a, thus folding the playard 1000a.

With reference again to FIG. 6D, in some implementations of the double-action latch mechanism 200a, the undercut portion 232 and the end portion 236 of the latch boss 230 and the tab 216 of the latch member 210 may be shaped and/or dimensioned such that latch member 210 cannot be pulled off the latch boss 230 without applying an appreciably large force (e.g., a force greater than 20 lbs). For example, FIG. 7A shows a force test being applied to the double-action latch mechanism 200a, which shows the latch member 210 remains engaged to the latch boss 230 when a force greater than 24 lbs is applied to the tab 220.

It should be appreciated that, in other implementations, the playard 1000a and, in particular, the frame 100a may include other types of latching mechanisms. For example, FIGS. 8A-8D show a playard 1000a where the frame 100a includes a single-action latch mechanism 200b (e.g., the caregiver needs to perform only one operation to release the latch mechanism) instead of (or in addition to) the double-action latch mechanism 200a discussed immediately above.

Figure 8D:
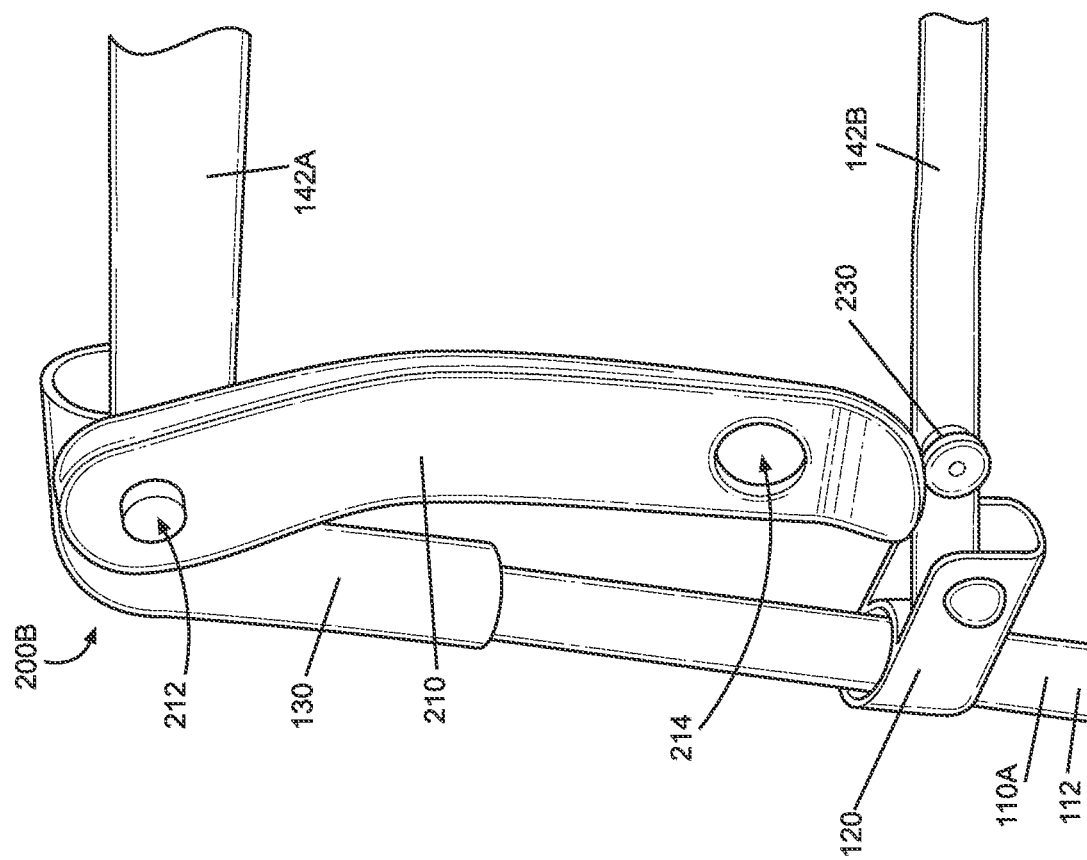
FIG. 8D shows a perspective view of the flex lock latch mechanism of FIG. 8C in an unlocked configuration.
Figure 8C:
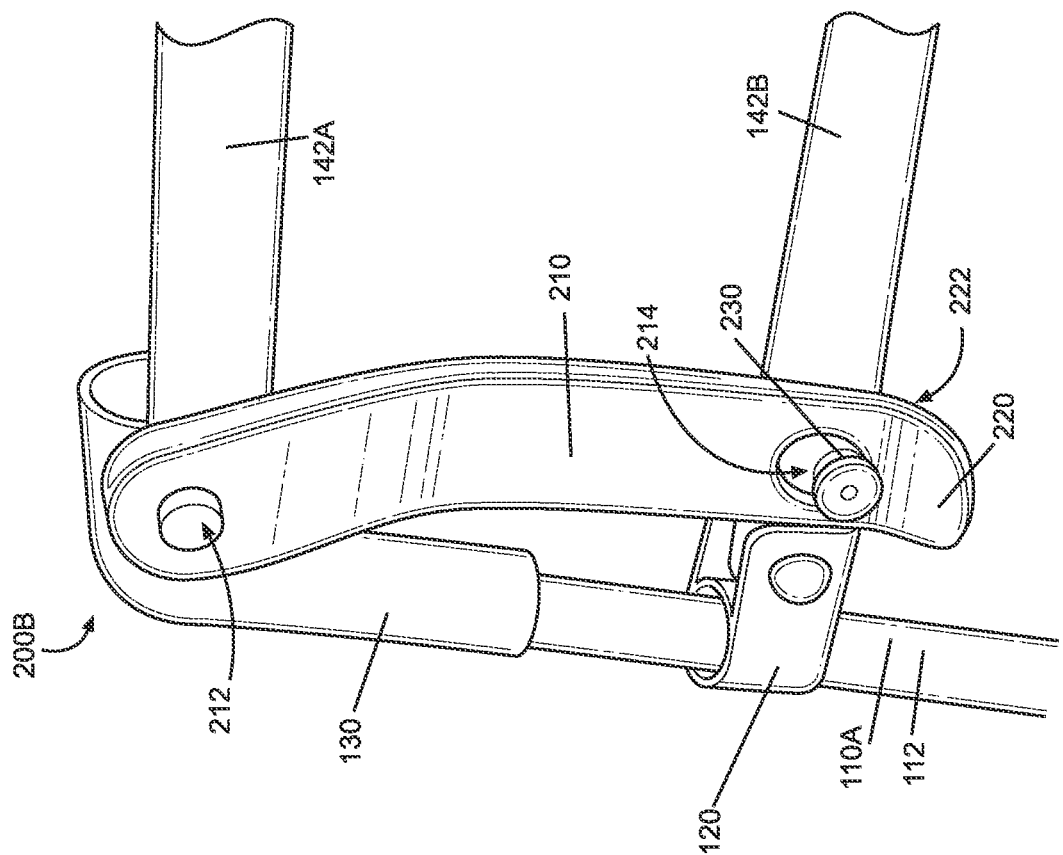
FIG. 8C shows a perspective view of the flex lock latch mechanism of FIG. 8A with the soft goods removed and the flex lock latch mechanism in a locked configuration.

Specifically, FIG. 8A shows the playard 1000a with the soft goods 300 installed onto the frame 100a, where the soft goods 300 covers the corners 130 of the leg support assemblies 110a and partially covers the X-frame assemblies 140a. In this manner, a portion of the single-action latch mechanism 200b is left exposed to provide access to the caregiver (see, for example, FIG. 8B). As shown in FIGS. 8C and 8D, the single-action latch mechanism 200b may also include a latch member 210 that is coupled at one end to the corner 130 via a fastener inserted through an opening 212 on the latch member 210. The latch member 210 may once again include a latch opening 214 to receive a latch boss 230. In this implementation, the latch boss 230 is shown coupled to the X-tube 142b of the X-frame assembly 140a.

The single-action latch mechanism 200b may be locked in a similar manner as the double-action latch mechanism 200a. Specifically, the slider 120 is moved towards the corner 130, which causes the latch boss 230 to initially deflect the latch member 210 until the latch boss 230 reaches the latch opening 214. At this point, the restoring force generated within the latch member 210 causes the latch member 210 to return to its original position with the latch boss 230 protruding through the latch opening 214. In this manner, the single-action latch mechanism 200b may hold the frame 100a in the unfolded configuration.

To unlock the single-action latch mechanism 200b and fold the frame 100a, the caregiver may pull on the tab 220 to deflect and/or bend the latching member 210 outwards, thus releasing the latch member 210 from the latch boss 230. As before, while the caregiver holds the latch member 210, the slider 120 may then move downwards along the leg tube 112 via a combination of gravity and the caregiver moving the slider 120 towards the foot 114 of the leg support assembly 110a as shown in FIG. 8D. In this manner, the playard 1000a may be folded.

FIGS. 9A-9F show another exemplary latch mechanism 200c installed on the frame 100a of the playard 1000a. FIG.

Figure 9C:
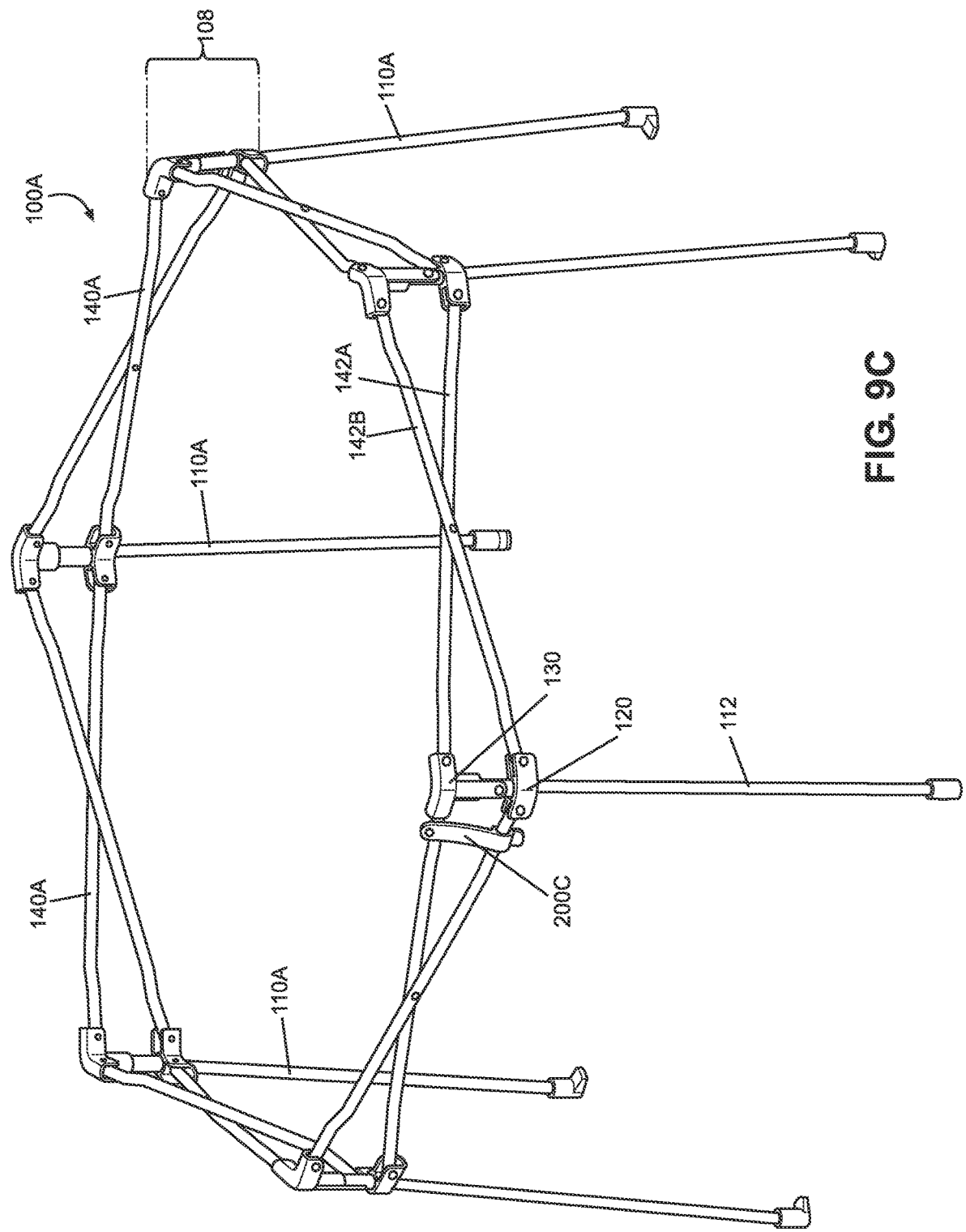
FIG. 9C shows a top perspective view of the playard of FIG. 9A with the soft goods removed.

9A shows the frame 100*a* once again covered with soft goods 300. FIG. 9B shows the soft goods 300 only partially covers the X-frame assemblies 140*a* such that a bottom portion of the latch mechanism 200*c* is exposed. FIG. 9C shows the frame 100*a* without soft goods 300 attached. As shown, the latch mechanism 200*c* may be positioned on the frame 100*a* similar to the double-action latch mechanism 200*a* and the single-action latch mechanism 200*b*, i.e., the latch mechanism 200*c* is disposed in the top portion 108 of the frame 100*a*.

Figure 9E:
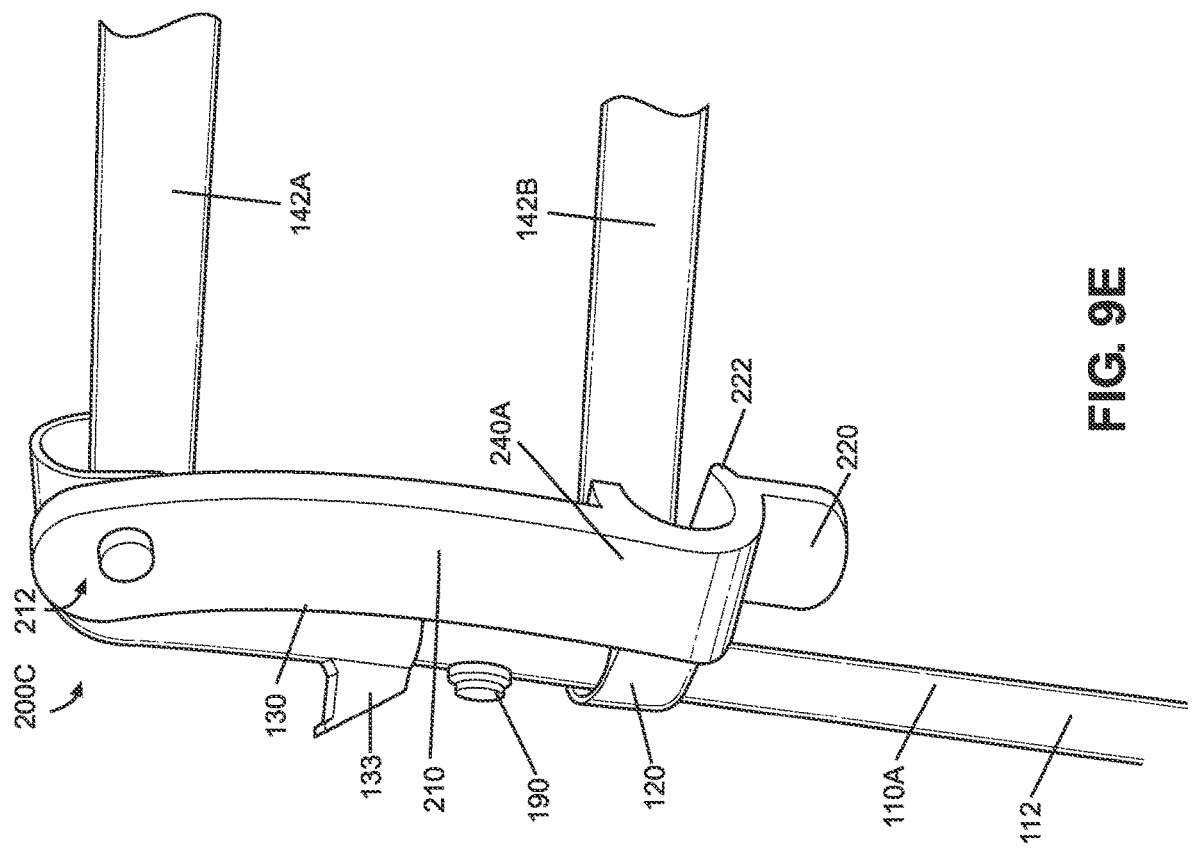
FIG. 9E shows a perspective view of the flex lock latch mechanism of FIG. 9D in an unlocked configuration.
Figure 9D:
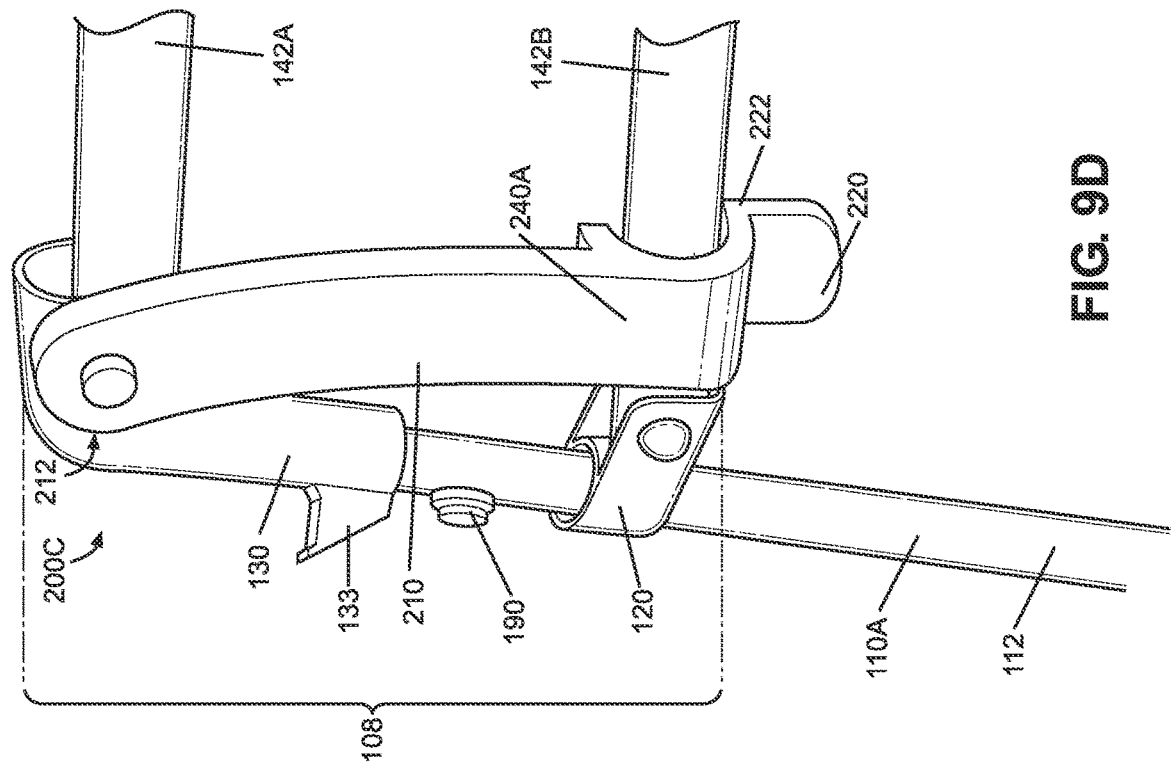
FIG. 9D shows a perspective view of the flex lock latch mechanism of FIG. 9C in a locked configuration.

FIG. 9D shows the latch mechanism 200*c* may once again include a latch member 210 that is coupled to the corner 130 via a fastener inserted through an opening 212 at one end of the latch member 212. However, in this example, the latch member 210 may form a notch 240*a* that is shaped and/or dimensioned to form a snap-fit connection with the X-tube 142*b*. In this manner, the latch mechanism 200*c* may utilize fewer parts compared to the latch mechanisms 200*a* and 200*b* (e.g., the latch mechanism 200*c* only includes the latch member 210 and a fastener to couple the latch member 210 to the corner 130). As shown, the notch 240*a* may be shaped to conform with the cross-sectional shape of the X-tube 142*b*. As before, the latch member 210 may be a mechanically compliant component that may be bent and/or deflected due to contact with the X-tube 142*b* (e.g., when unfolding the frame 100*a*) and/or by the caregiver pulling on the tab 220 disposed at the bottom end of the latch member 210 to release the latch member 210 from the X-tube 142*b* (e.g., when folding the frame 100*a*).

In the implementation shown in FIGS. 9A-9D, the frame 100*a* and, by extension, the playard 1000*a* may be setup once again by having the caregiver move the slider 120 of one leg support assembly 110*a* towards the corresponding corner 130. When the X-tube 142*b* contacts the latch member 210 and, specifically, the tab 220, the latch member 210 may be deflected outwards. The latch member 210 may further include a lead-in feature 222 (e.g., a sloped wall) to deflect the latch member 210 as the latch member 210 contacts the X-tube 142*b*. The caregiver may then continue to move the slider 120 towards the corner 130 until the notch 240*a* aligns with the X-tube 142*b*.

In some implementations, the latch member 210 may be sufficiently compliant such that deflection of the latch member 210 does not produce an appreciable restoring force. Thus, the caregiver needs to press the latch member 210 to snap-fit the latch member 210 onto the X-tube 142*b*. In other implementations, however, the latch member 210 may instead generate an internal restoring force when bent and/or deflected (e.g., the latch member 210 includes rib structures to increase the mechanical rigidity of the latch member 210). The restoring force may be of sufficient magnitude to cause the notch 240*a* to at least partially engage the X-tube 142*b*. In some instances, the caregiver may still press the latch member 210 onto the X-tube 142*b*, albeit with less force due to the restoring force generated in the latch member 210, to ensure the latch member 210 is properly engaged to the X-tube 142*b*. In yet other implementations, the restoring force may instead be sufficiently large to snap-fit connect the latch member 210 to the X-tube 142*b* without any additional action by the caregiver.

Figure 9F:
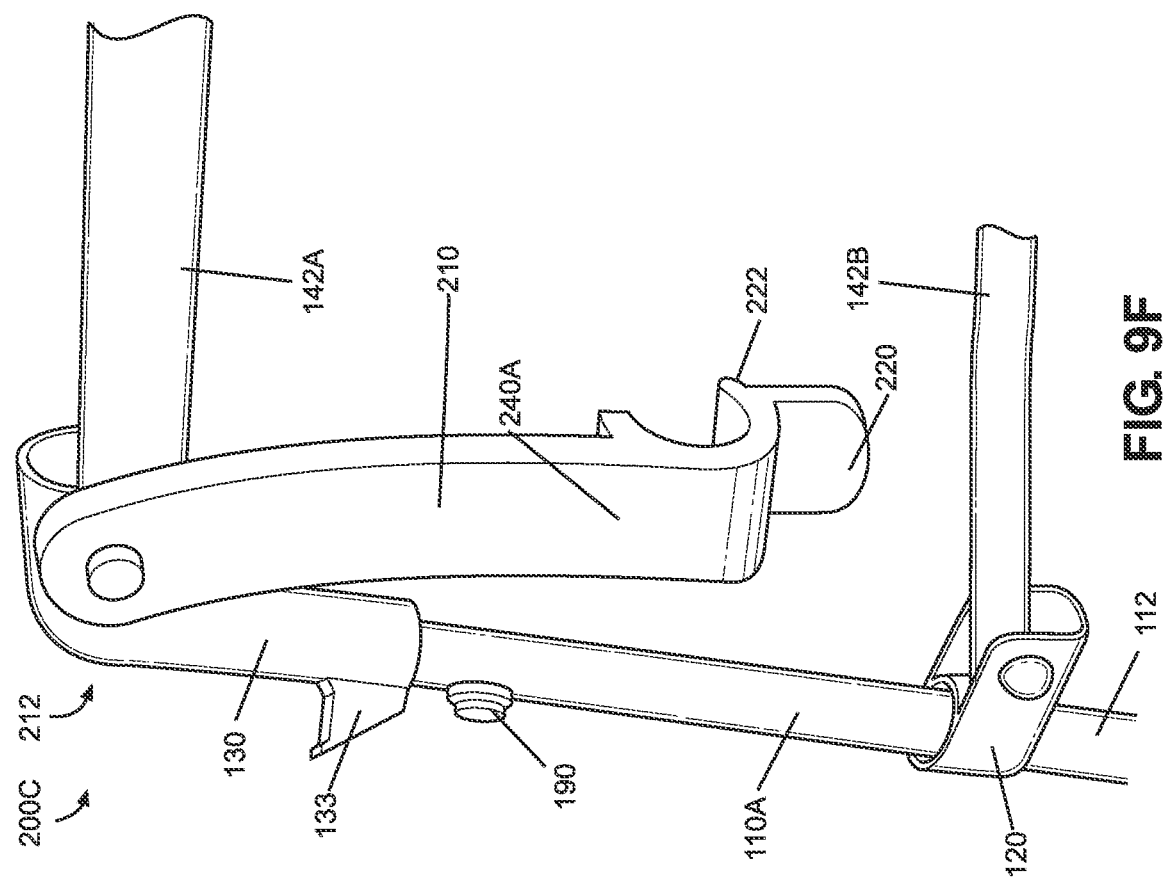
FIG. 9F shows a perspective view of the flex lock latch mechanism of FIG. 9E where the playard is partially folded after unlocking the flex lock latch mechanism.

Turning now to FIG. 9E, to unlock the latch mechanism 200*c* the caregiver may pull on the tab 220 with sufficient force to disengage the notch 240*a* from the X-tube 142*b*. In implementations where the latch member 210 does not generate an appreciable restoring force, the caregiver may release the latch member 210, and the slider 120 may then move downwards along the leg tube 112 via gravity and/or the caregiver actively moving the slider 120 as shown in FIG. 9F. In implementations where the latch member 210 generates an appreciable restoring force, the caregiver may hold the latch member 210 with one hand until the slider 120 moves a sufficient distance along the leg tube 112 such that the X-tube 142*b* is no longer aligned with the notch 240*a*.

Additionally, FIGS. 9D-9F show the corner 130, in some implementations, may further include a hook 133 that protrudes outwards from the frame 100*a*. The hook 133 may be used, in part, to pull the soft goods 300 taut around the frame 100*a* and/or to function as a secondary restraining feature to prevent the soft goods 300 from prematurely detaching from the frame 100*a*. In some implementations, the hook 133 may also be used as a locating feature to facilitate installation of the soft goods 300 onto the frame 100*a*. FIGS. 9D-9F further show that, in some implementations, the corner 130 may not include the snap-fit connector 139 as before. Instead, a snap-fit connector 190 maybe mounted directly onto the leg tube 112.

Figure 10:
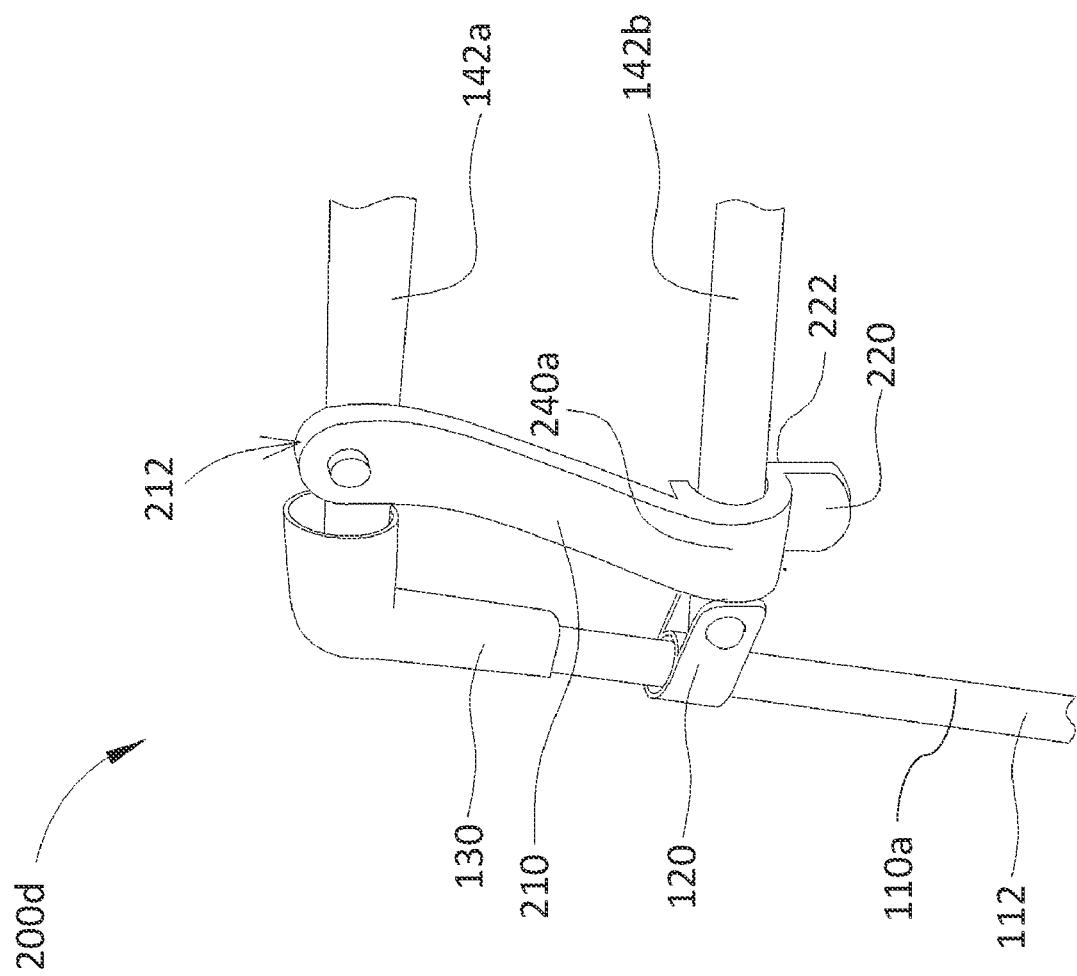
FIG. 10 shows another flex lock latch mechanism with a latch member having a snap-fit connector where the latch member of the latch mechanism is coupled to a X-tube of an X-frame assembly.

FIG. 10 shows another exemplary latch mechanism 200*d* coupled to the frame 100*a*. The latch mechanism 200*d* is a variant of the latch mechanism 200*c* with the primary difference being the latch member 210 is coupled to the X-tube 142*a* instead of the corner 130 via a fastener inserted through the opening 212 and an opening on the X-tube 142*a*. The latch mechanism 200*d* may be locked and/or unlocked in the same manner as the latch mechanism 200*c*. In some implementations, the latch member 210 of the latch mechanism 200*d* may be dimensioned to be shorter in length due to the smaller separation distance between the X-tubes 142*a* and 142*b* compared to the latch member 210 of the latch mechanism 200*c*.

Figure 11A:
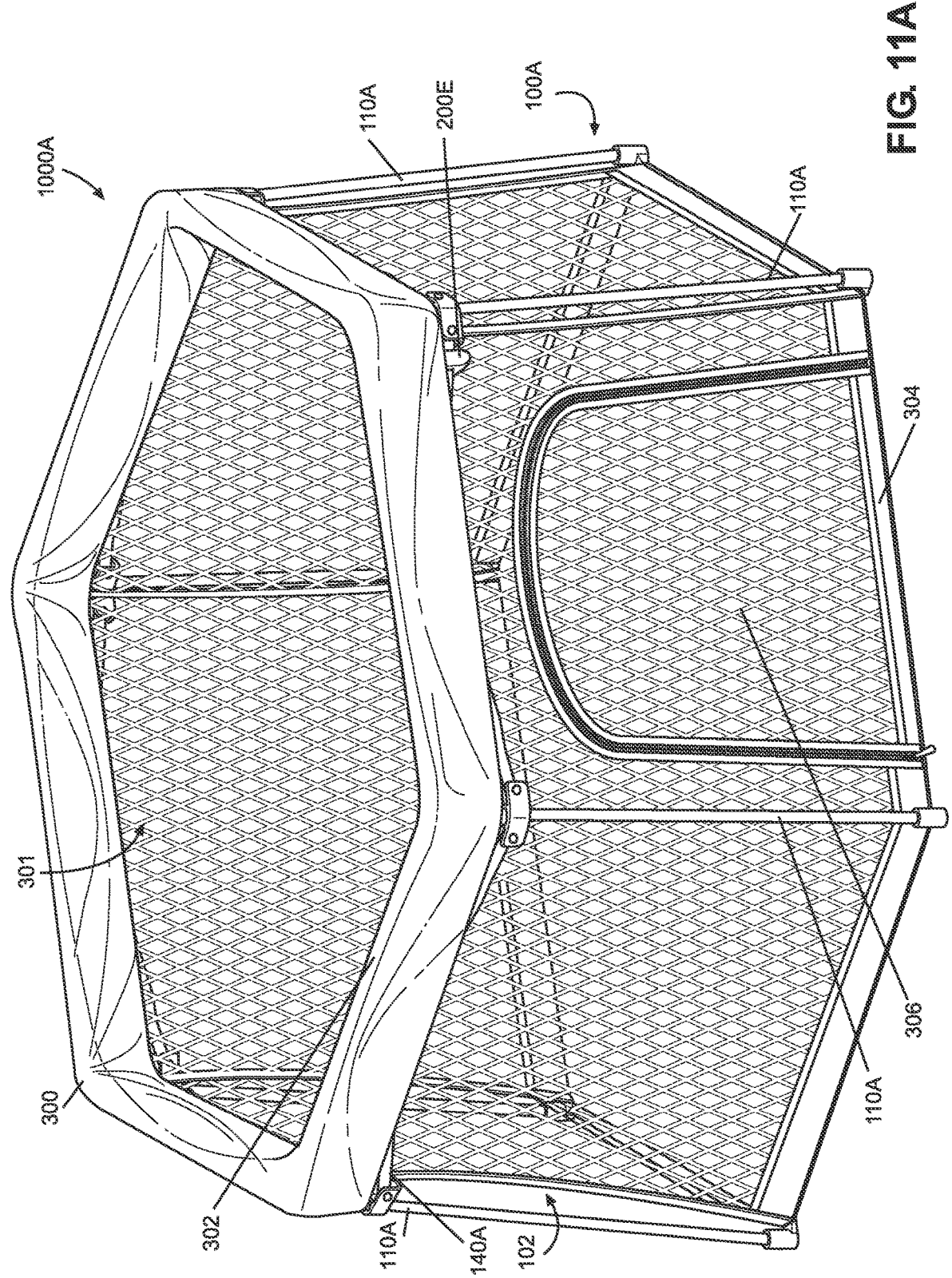
FIG. 11A shows a top perspective view of the playard of FIG. 2A with soft goods and a flex lock latch mechanism with a hook structure. The playard is in an unfolded configuration.
Figure 11B:
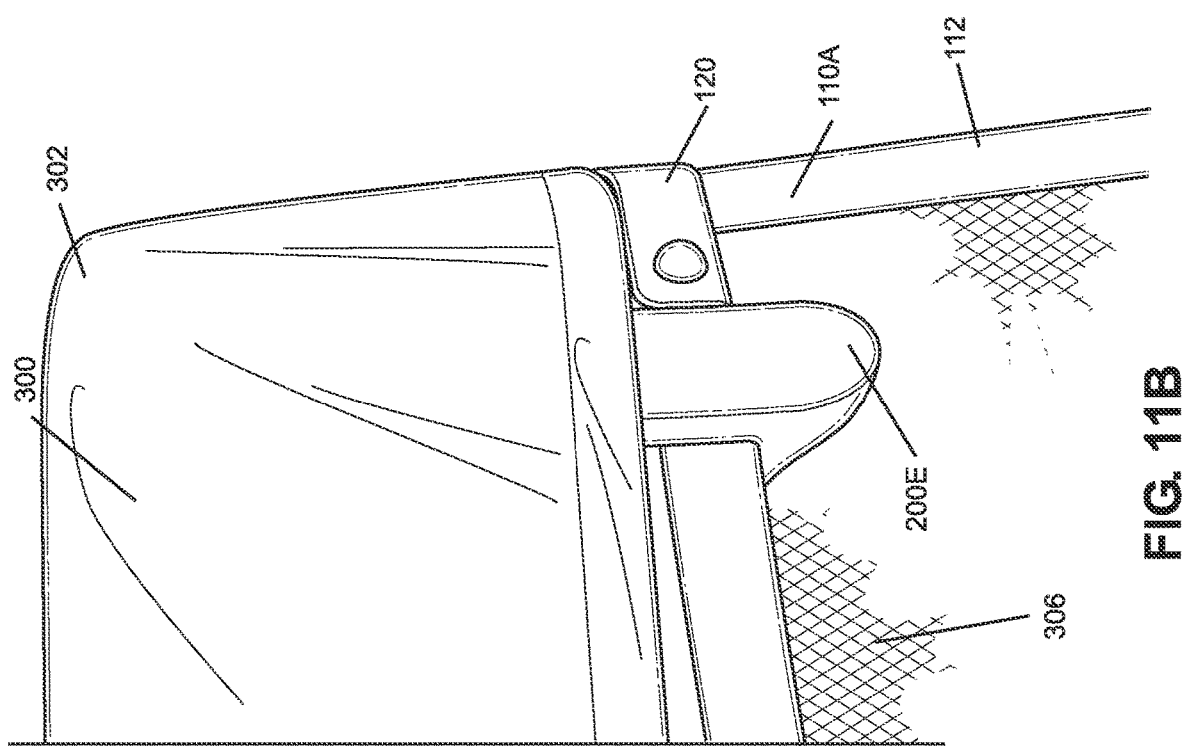
FIG. 11B shows a magnified view of the flex lock latch mechanism of FIG. 11A.

FIGS. 11A-11D show another exemplary latch mechanism 200*e* installed on the frame 100*a* of the playard 1000*a*. FIG. 11A shows the frame 100*a* once again covered with soft goods 300. FIG. 11B shows the soft goods 300 again partially covering the X-frame assemblies 140*a* such that a bottom portion of the latch mechanism 200*e* is exposed similar to the latch mechanisms 200*a* -200*d*.

FIG. 11C shows the latch mechanism 200*e* may again include a latch member 210 coupled to the corner 130 of one leg support assembly 110*a* via a fastener inserted through the opening 212 at one end of the latch member 210. In this example, the latch member 210 may include a hook structure 240*b* near the tab 220. As shown, the hook structure 240*b* may provide a contoured surface upon which the X-tube 142*b* may rest when the frame 100*a* is unfolded. As before, the latch member 210 may be a mechanically compliant component that may be deflected and/or bent due to contact with the X-tube 142*b* and/or the caregiver pulling on the tab 220 disposed at the bottom end of the latch member 210.

The latch mechanism 200*e* may lock the frame 100*a* in the unfolded configuration in a similar manner to the latch mechanisms 200*a* -200*d*. When the caregiver moves the slider 120 towards the corner 130, the X-tube 142*b* may contact the latch member 210 and deflect outwards. The latch member 210 may include a lead-in feature 222 formed between the hook structure 240*b* and the bottom end of the latch member 210 to guide the X-tube 142*b* moving against the latch member 210 and to deflect the latch member 210 outwards. Once the X-tube 142*b* is disposed above the hook structure 240*b*, the caregiver may release the slider 120 and the slider 120 may then move downwards along the leg tube 112 until the X-tube 142*b* comes to rest on the hook structure 240*b*.

In some implementations, the hook structure 240*b* may be shaped such that the caregiver may release the latch mechanism 240b by pulling on the tab 220 with sufficient force. In some implementations, the hook structure 240b may be shaped to cradle the X-tube 142b and/or the latch member 210 may be sufficiently rigid such that the latch member 210 acts as a double-action latch mechanism where the caregiver would have to apply an appreciably large force to disengage the latch member 210 from the X-tube 142b. Instead, the caregiver may raise the slider 120 and/or squeeze the X-tubes 142a and 142b such that the X-tube 142b is released from the hook structure 240b. While the caregiver holds the X-tube 142b above the hook structure 240b with one hand, the caregiver may then pull the latch member 210 outwards to allow the X-tube 142b to fall below the hook structure 240b as shown in FIG. 11D.

Figure 12A:
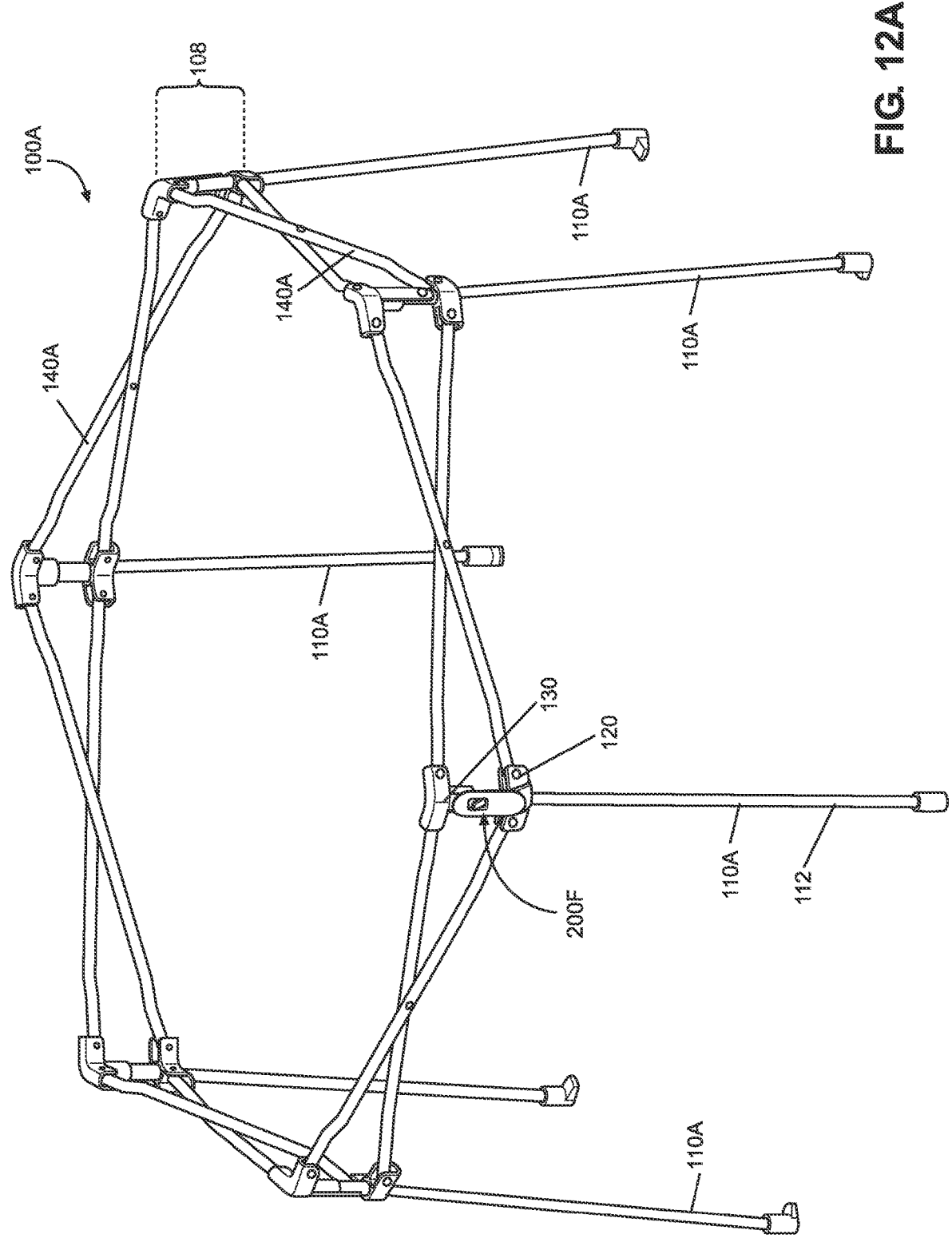
FIG. 12A shows a top perspective view of the playard of FIG. 2A with a latch mechanism mounted to a slider and a corner of a leg support assembly. The playard is in an unfolded configuration.
Figure 12B:
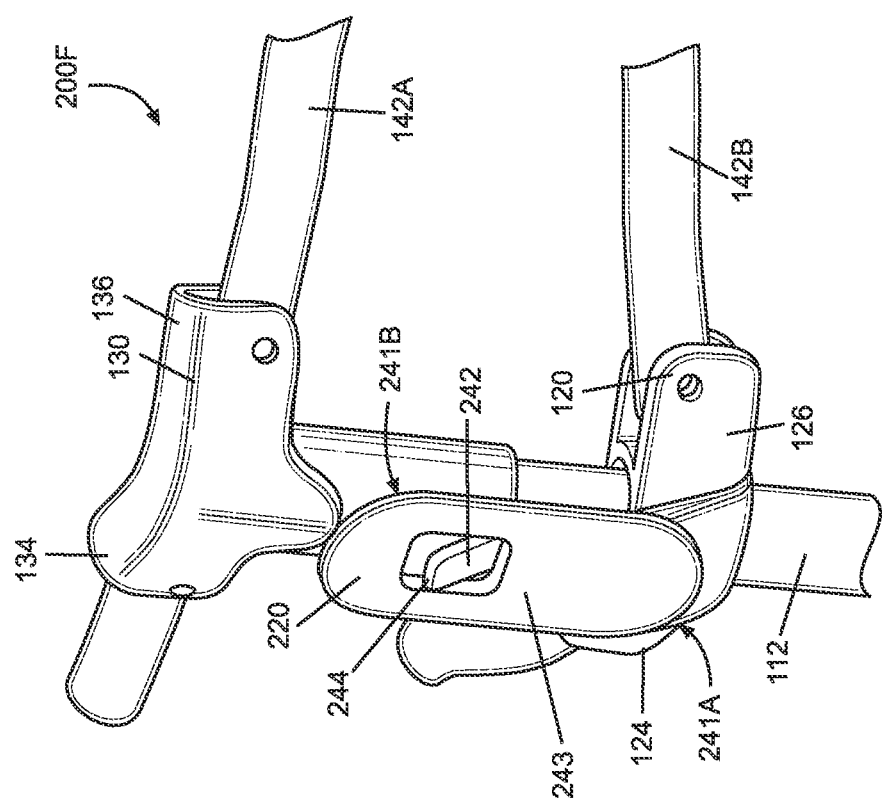
FIG. 12B shows a magnified view of the latch mechanism of FIG. 12A.

FIGS. 12A and 12B show another exemplary latch mechanism 200f that directly couples the slider 120 to the corner 130 in the frame 100a of the foldable playard 1000a. As shown in FIG. 12A, the frame 100a may only include one latch mechanism 200f coupled to one leg support assembly 110a to support the multiple sliders 120 and/or X-frame assemblies 140a when the frame 100a is unfolded.

FIG. 12B shows the latch mechanism 200f may include a latch member 243 disposed on the slider 120 of one leg support assembly 110a and a latch hook 242 disposed on the corresponding corner 130. The latch member 243 may be integrally formed onto the slider 120 to form one single component or fabricated as a separate component that is then coupled to the slider 120 using, for example, a fastener or a snap-fit connection. In some implementations, the latch member 243, when formed as a separate component, may be coupled to the openings of the slider 120 formed on the extended portions 124 and 126 to couple to the X-tubes 142a and/or 142b such that a single fastener couples the latch member 243, the slider 120, and one or more X-tubes 142a and/or 142b together. In this manner, the slider 120 may remain identical with the other sliders 120 in the frame 100a.

The latch hook 242 may similarly be integrally formed onto the corner 130 to form one single component or fabricated as a separate component that is then coupled to the slider 120. Similarly, the latch hook 242, when formed as a separate component, may be coupled to the openings of the corner 130 formed on the extended portions 134 and 136 in a manner similar to the latch member 210 of the latch mechanism 200a where the corner 130 remains unchanged and/or identical with the other corners 130 in the frame 100a.

The latch member 243 may include a first end 241a coupled to the slider 120 and a latch opening 244 disposed near a second end 241b opposite from the first end 241a. The latch opening 244 may be shaped to receive the latch hook 242 on the corner 130. In some implementations, the latch hook 242 may have a contoured surface such that the portion of the latch member 243 forming the top side of the opening 244 rests upon the latch hook 242 when the latch mechanism 200f is locked. In this manner, the latch mechanism 200f may directly couple the slider 120 and the corner 130 together to hold the frame 100a in the unfolded configuration. In some implementations, the latch opening 244 and the latch hook 242 may also be shaped to reduce or, in some instances, eliminate relative translational and/or rotational motion between the slider 120 and the corner 130 along axes of motion other than the longitudinal axis 111a.

The latch member 243 may be a mechanically compliant component with a tab 220 disposed at the second end 241b similar to the latch member 210 of the latch mechanism 200a. Although the latch member 243 is disposed on the slider 120, the latch member 243 may engage the latch hook 242 in a manner similar to the latch mechanisms 200a -200e. As before, the caregiver may move the slider 120 towards the corner 130. Once the tab 220 of the latch member 243 contacts the bottom surface of the latch hook 242, the latch member 243 may be deflected outwards. As shown in FIG. 12B, the bottom surface of the latch hook 242 may form a lead-in feature (e.g., a sloped surface) to guide the latch member 243 as it is deflected outwards. The latch member 243 may be sufficiently rigid to generate an internal restoring force when the latch member 243 is bent. Thus, once the slider 120 is moved sufficiently close to the corner 130 that the latch hook 242 is aligned with the latch opening 242, the restoring force may cause the latch member 243 to snap back to its original form and the latch hook 242 may then protrude through the latch opening 242.

Similar to the latch mechanism 200e, the latch mechanism 200f may be a single-action latch mechanism where the caregiver may release the latch member 243 from the latch hook 242 by pulling the tab 220 with sufficient force. In some implementations, the latch mechanism 200f may be a double-action latch mechanism where the latch hook 242 may be sufficiently rigid and/or includes a sufficiently deep undercut portion such that the latch member 243 cannot be released by pulling the tab 220 without applying excessive force (e.g., a force greater than 20 lbf). The caregiver should instead raise the slider 120 such that the portion of the latch member 243 forming the top side of the opening 244 is released from the latch hook 242. While holding the slider 120 in the raised position, the caregiver may then pull the latch member 243 outwards so that the slider 120 may move downwards along the leg tube 112.

Figure 13A:
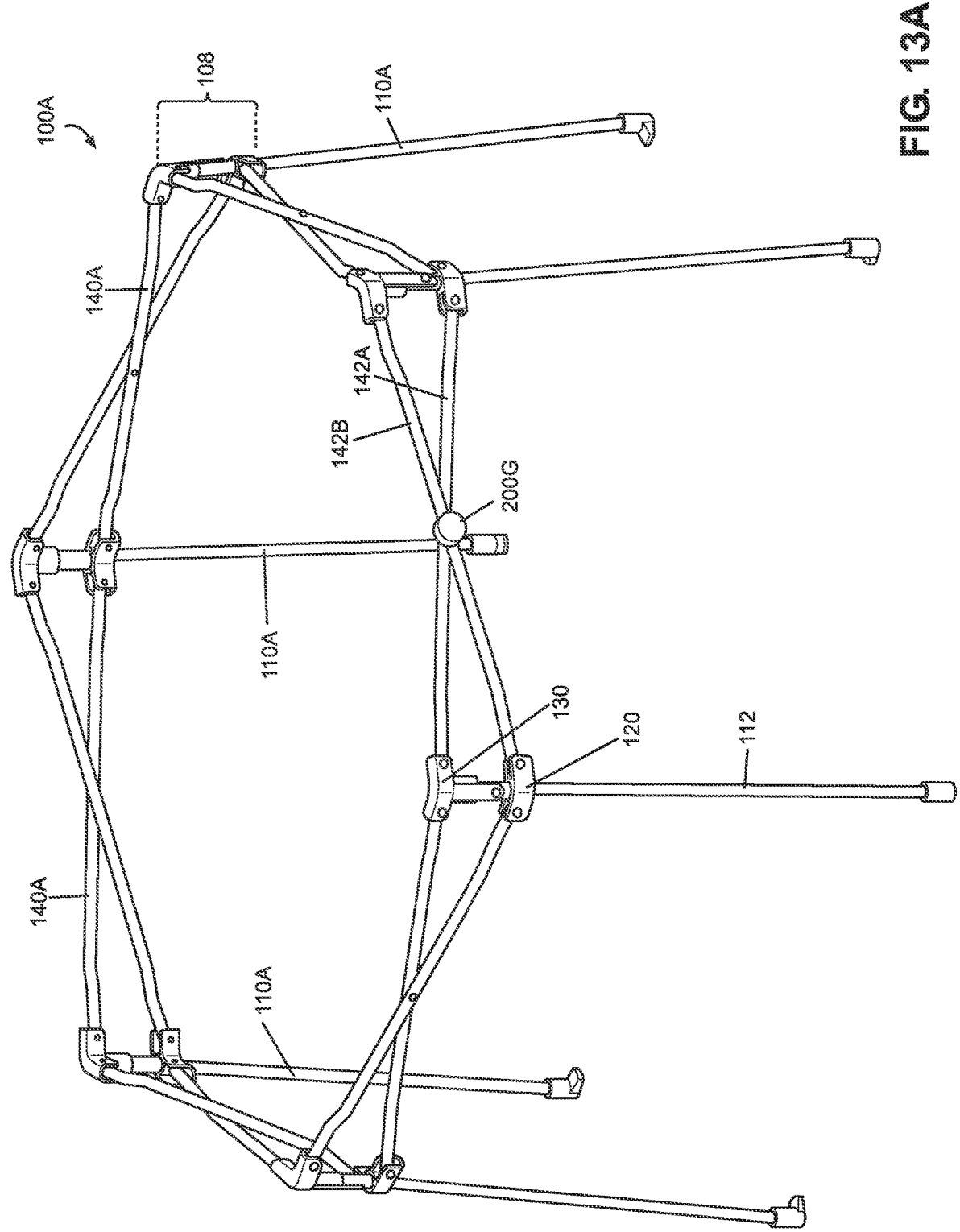
FIG. 13A shows a top perspective view of the playard of FIG. 2A with a latch mechanism mounted to a pair of X-tubes in the X-frame assembly. The playard is in an unfolded configuration.
Figure 13B:
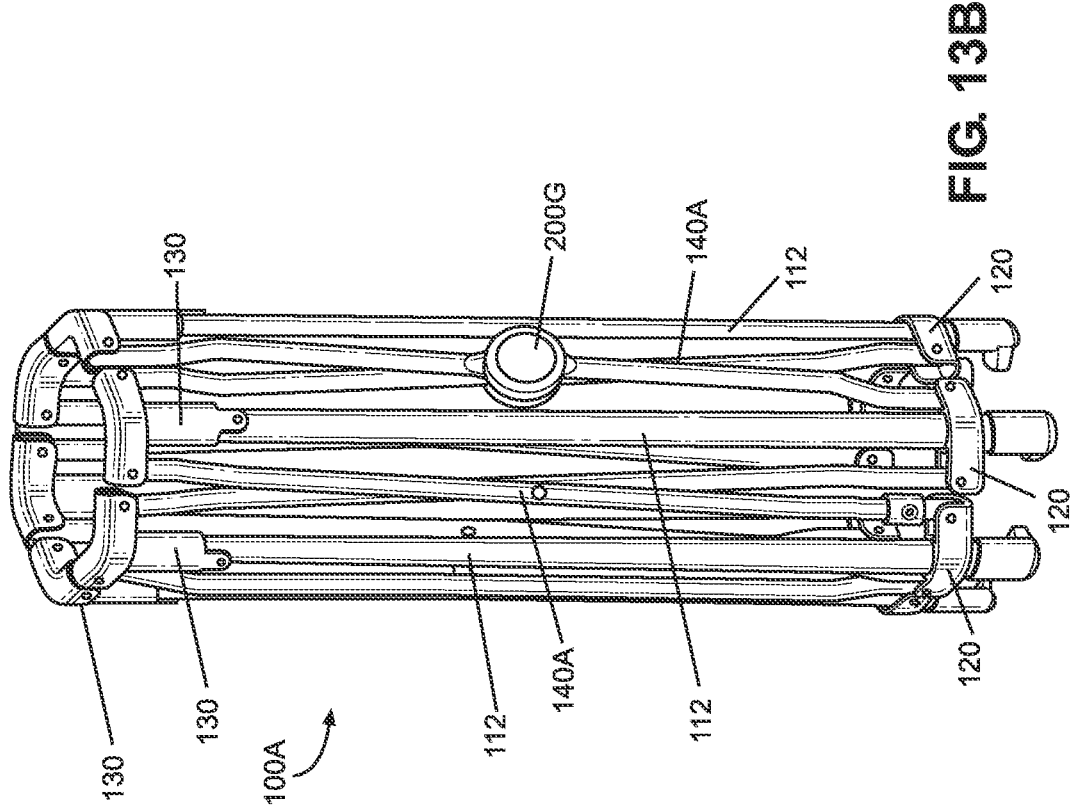
FIG. 13B shows a perspective view of the playard of FIG. 13A in a folded configuration.

FIGS. 13A-13H show another exemplary latch mechanism 200g that is mounted to the X-tubes 142a and 142b of one X-frame assembly 140a. As shown in FIG. 13A, the frame 100a may include a single latch mechanism 200g mounted to one X-frame assembly 140a to support the frame 100a in the unfolded configuration. In some implementations, the latch mechanism 200g may be shaped and/or dimensioned to have the same or similar thickness as the X-frame assembly 140a so that the latch mechanism 200g does not protrude appreciably outwards from the frame 100a particularly when the frame 100a is in the folded configuration as shown in FIG. 13B. In other words, the thickness of the latch mechanism 200g may be the same or similar as the distance separating the outer exterior edge of the central portion 144 of the X-tube 142a and the interior exterior edge of the central portion 144 of the X-tube 142b in FIG. 3B.

Figure 13D:
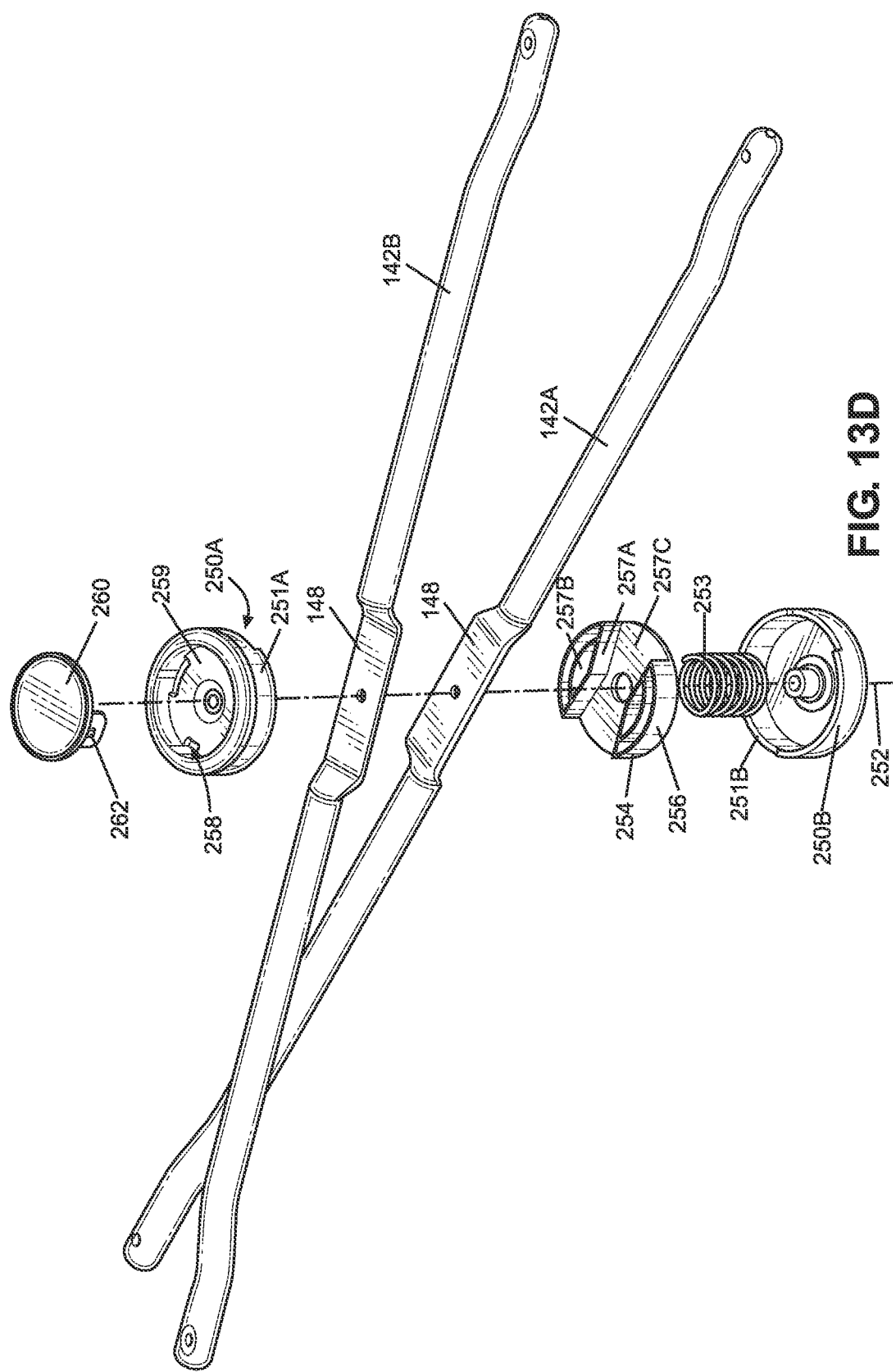
FIG. 13D shows an exploded view of the X-frame assembly with the latch mechanism of FIG. 13C.
Figure 13F:
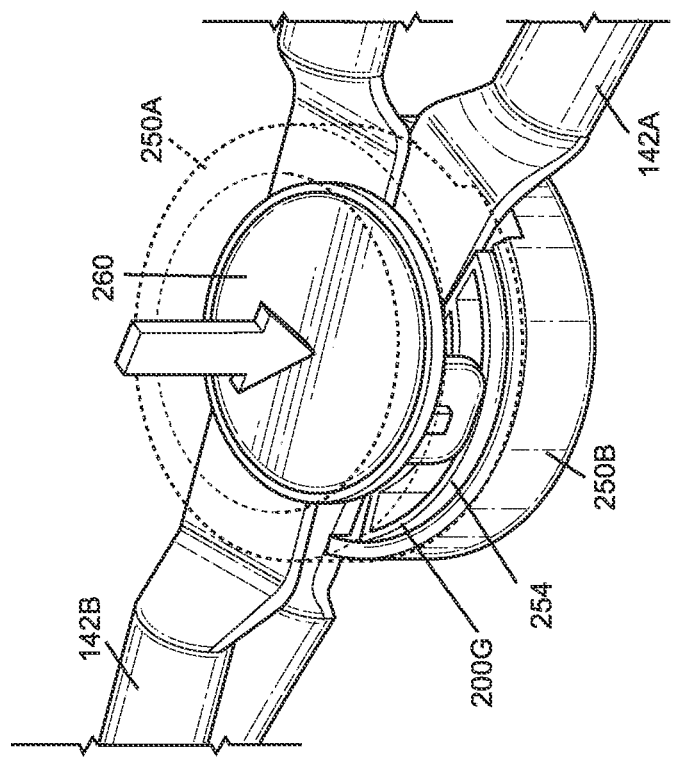
FIG. 13F shows a perspective view of the latch mechanism of FIG. 13E in an unlocked configuration.
Figure 13E:
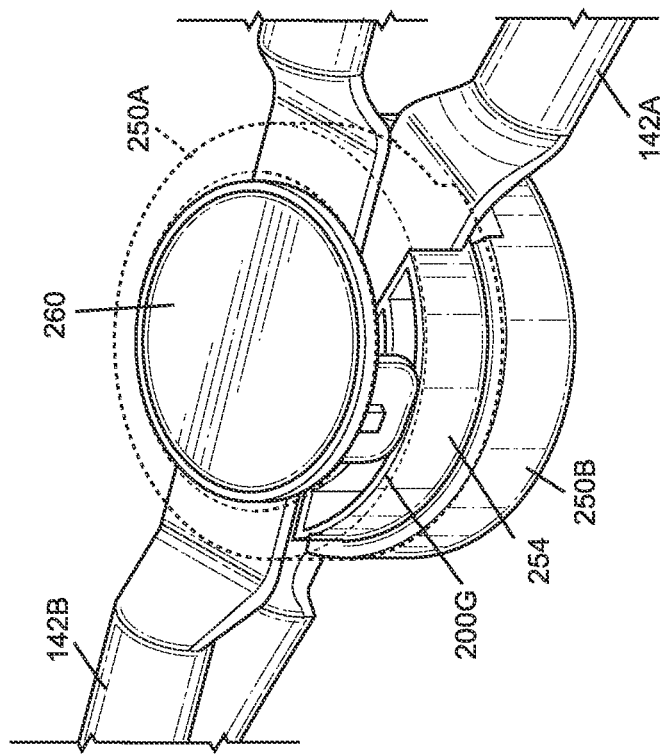
FIG. 13E shows a perspective view of the latch mechanism of FIG. 13A in a locked configuration.

FIG. 13C shows the latch mechanism 200g may replace the pin joint 145 and, hence, may rotatably couple the X-tube 142a to the X-tube 142b such that the X-tubes 142a and 142b rotate about a rotation axis 252. FIG. 13D shows the latch mechanism 200g may include a first housing 250a disposed on an exterior portion of the frame 100a and rigidly coupled to the X-tube 142b. In particular, the first housing 250a may include a notch 251a and the X-tube 142b may be formed with a flat section 148 within the central portion 144 that fits into the notch 251a. Thus, the first housing 250a may rotate together with the X-tube 142b.

The latch mechanism 200g may further include a second housing 250b disposed within the interior space 102 of the frame 100a and rigidly coupled to the X-tube 142a. The second housing 250b may also include a notch 251b and the X-tube 142a may also have a flat section 148 that fits into the notch 25 1b so that the second housing 250b rotates together with the X-tube 142a. The first housing 250a may be rotatably coupled to the second housing 250b via a shaft or pin (not shown) inserted through respective openings in the first housing 250a, the second housing 250b, and the X-tubes 142a and 142b along the rotation axis 252 as shown in FIG. 13D.

The first and second housings 250a and 250b may form a cavity to contain a locking gear 254, which may translate along the rotation axis 252 relative to the first and second housings 250a and 250b to lock and/or unlock the latch mechanism 200g. The cavity may further contain a return spring 253 disposed between the locking gear 254 and the second housing 250b to impart a spring-bias force onto the locking gear 254 to maintain the latch mechanism 200g in a locked configuration by default. The locking gear 254 may include a pair of latch key sections 256 that have interior sidewalls 257a that define a channel 257c shaped to restrict and lock the X-tubes 142a and 142b when the frame 100a is unfolded (e.g., the X-tubes 142a and 142b are arranged to form a shallow X-frame structure). Said in another way, when the latch mechanism 200g is locked, the flat sections 148 of the X-tubes 142a and 142b may be disposed within the channel 257c where the sidewalls 257a abut opposing sides of each of flat sections 148 to prevent rotation of the X-tubes 142a and 142b.

When the playard 1000a is in the folded configuration, the locking gear 254 may be primarily disposed within the second housing 250b and the return spring 253 may be compressed due to the respective flat sections 148 of the X-tubes 142a and/or 142b contacting and/or pressing against the front portions 257b of the locking gear 254. To deploy the playard 1000a, the caregiver may once again move the slider 120 of at least one leg support assembly 110a and/or squeeze the X-tubes 142a and 142b of one X-frame assembly 140a together to unfold the frame 100a. As the X-tubes 142a and 142b are rotated, the respective flat sections 148 of the X-tubes 142a and 142b may slide along the front portions 257b of the locking gear 254, thus maintaining compression of the return spring 253. Once the X-tubes 142a and 142b are sufficiently rotated such that the respective flat sections 148 of the X-tubes 142a and 142b are aligned to match the geometry of the channel 257c, the spring 253 may then push the locking gear 254 outwards towards the first housing 250a such that the flat sections 144 are disposed within the channel 257c and constrained by the latch key sections 256 (see FIGS. 13E and 13G).

FIG. 13D further shows the latch mechanism 200g may include a release button 260 disposed, in part, within a recessed opening 259 formed along the front of the first housing 250a. The recessed opening 259 of the first housing 250a may be separated from the cavity formed between the first and second housings 250a and 250b by a recessed front surface of the first housing 250a. The release button 260 may be slidably coupled to the first housing 250a via the slot guides 258 and may include one or more tabs 262 that protrude through the recessed surface of the first housing 250a to contact front portions 257b of the latch key sections 256 on the locking gear 254.

To unlock the latch mechanism 200g, the caregiver may push the release button 260 into the recessed opening 259 causing the tabs 262 to press against the latch key sections 256 of the locking gear 254. The locking gear 254, in turn, is then displaced towards the second housing 250b along the rotation axis 252 resulting in compression of the return spring 253. Once the locking gear 254 is sufficiently displaced where the respective flat sections 148 of the X-tubes 142a and 142b are no longer disposed within the channel 257c, the caregiver may then rotate the X-tubes 142a and 142b and/or move the slider 120 of at least one leg support assembly 110a to fold the frame 100a (see FIGS. 13F and 13H). In some implementations, the depth of the recessed opening 259 and/or the length of the tabs 262 of the release button 260 may be tailored to ensure sufficient travel distance for the release button 260 to disengage the locking gear 254 from the X-tubes 142a and 142b. In some implementations, the release button 260 may remain disposed within the recessed opening 259 until the playard 1000a is unfolded.

FIGS. 14A-14D show another exemplary latch mechanism 200h integrated into the X-tube 142b of one X-frame assembly 140a to engage the slider 120 of one leg support assembly 110a in the frame 100a of the playard 1000a. FIG. 14A once again shows the frame 100a may only include a single latch mechanism 200h to support the frame 100a in the unfolded configuration.

Figure 14A:
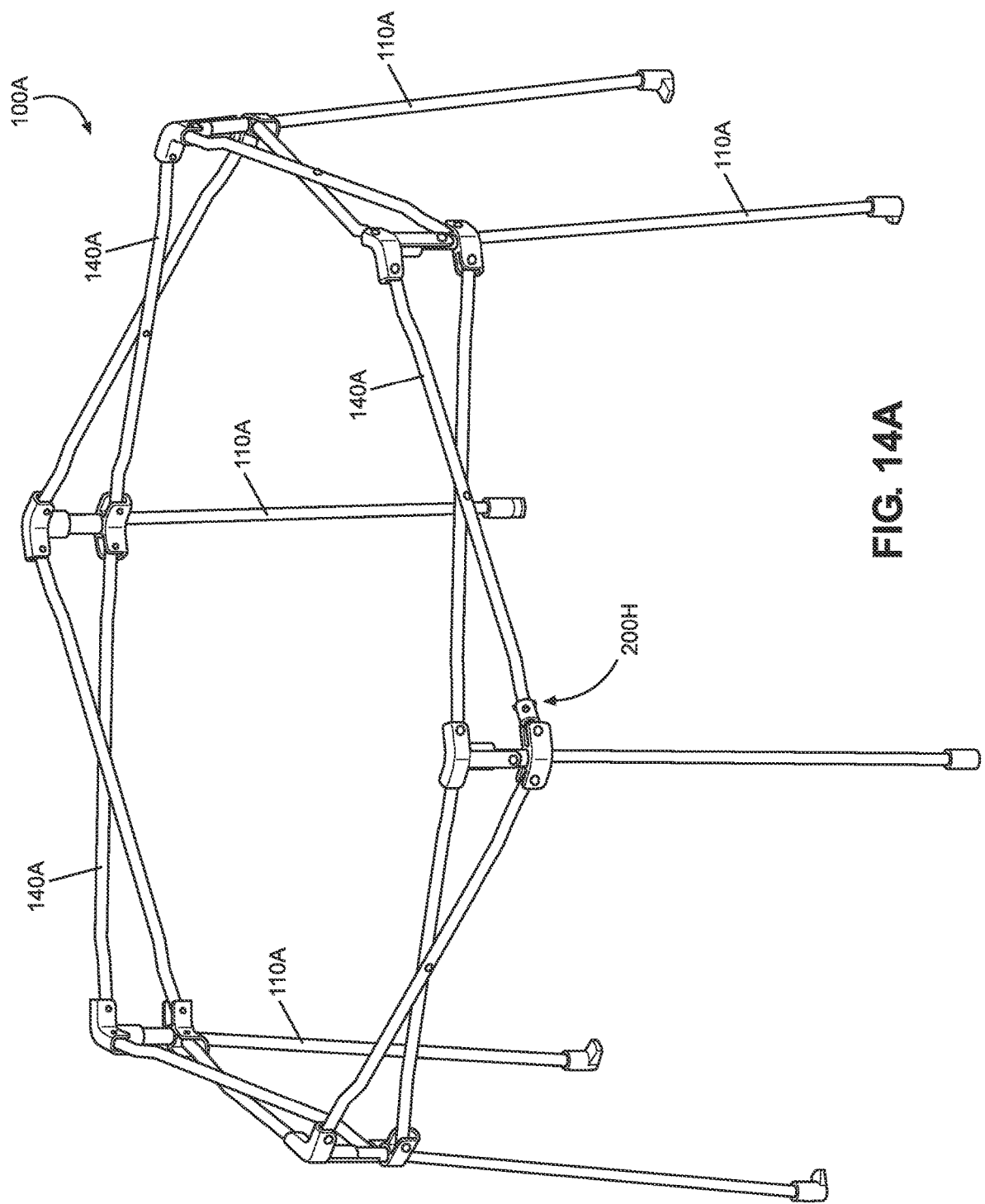
FIG. 14A shows a top perspective view of the playard of FIG. 2A with a latch mechanism that includes a spring-loaded pin disposed at one end of a X-tube to engage with a leg tube. The playard is in an unfolded configuration.
Figure 14B:
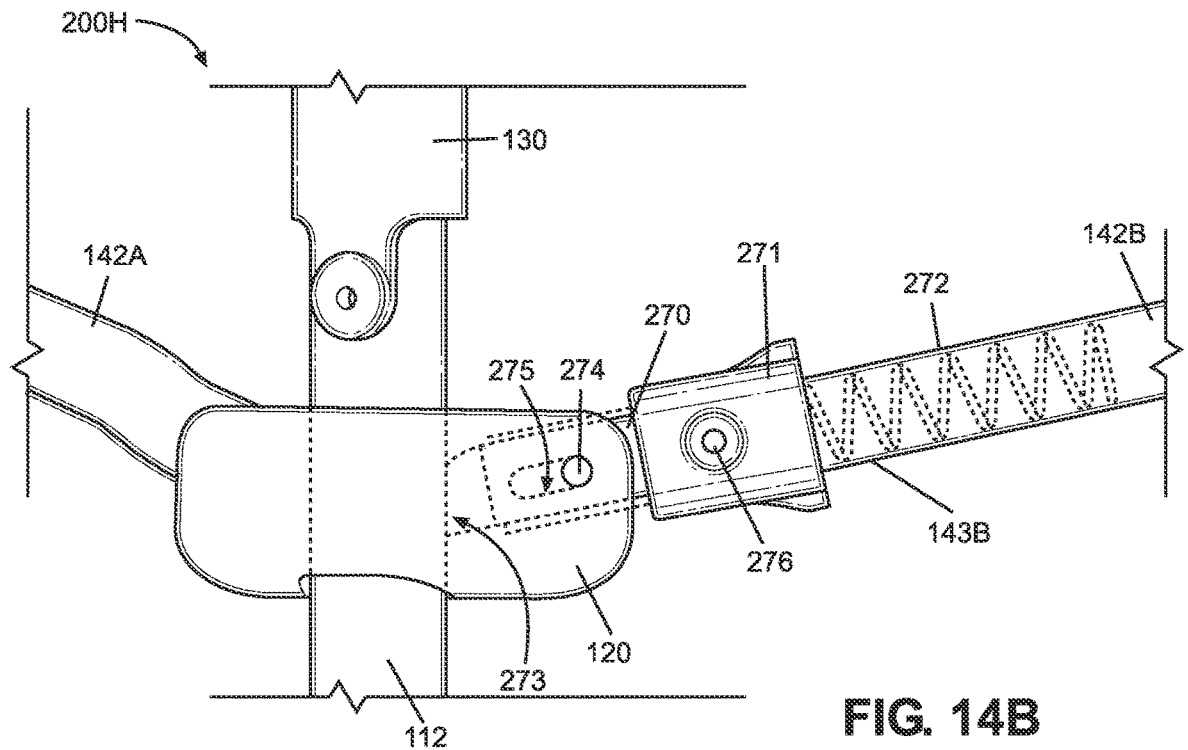
FIG. 14B shows a side view of the latch mechanism of FIG. 14A in a locked configuration.

FIG. 14B shows the latch mechanism 200h may include a latch 270 that is slidably coupled to the X-tube 142b and rotatably coupled to the slider 120 of one leg support assembly 110a. A return spring 272 may be disposed, at least in part, within an interior cavity of the X-tube 142b to impart a spring-bias force that pushes the latch 270 towards the leg tube 112. The leg tube 112 may include a latch opening 273 shaped and/or dimensioned to receive at least a portion of the latch 270 (e.g., the tip of the latch 270).

When the frame 100a is sufficiently unfolded such that the slider 120 is positioned along the leg tube 112 to overlap the latch opening 273, the return spring 272 may push the latch 270 into the latch opening 272, thus locking the slider 120 and, by extension, the X-tube 142b in place. Since the X-tube 142b is movably coupled to the X-tube 142a, the corners 130 and sliders 120 of other leg support assemblies 110a, and the other X-frame assemblies 140a (via the other leg support assemblies 110a) in the frame 100a, the constraints applied to the slider 120 and the X-tube 142b by the latch mechanism 200h may maintain the frame 100a in the unfolded configuration.

FIG. 14B further shows the latch mechanism 200h may include a collar 271 coupled to the latch 270 to provide an actuator for the caregiver to move when unlocking the latch mechanism 200h. In some implementations, the latch 270 may be directly coupled to the collar 271 using, for example, a fastener inserted through an opening 276 on the collar and an opening (not shown) on the latch 270. The collar 271, in turn, may be slidably coupled to the second end 143b of the X-tube 142b. For example, the collar 271 may include a recessed opening (not shown) shaped to receive the second end 143b with sufficient depth to enable the collar 271 and, by extension, the latch 270 to slide along the X-tube 142b. To compensate for the respective lengths of the latch 270 and the collar 271, the X-tube 142b supporting the latch 270 and the collar 271 may be shorter in length compared to other X-tubes 142b in other X-frame assemblies 140a.

The latch 270 may be rotatably coupled directly to the slider 120 via a pin 274 inserted through the opening on the slider 120 (previously used to couple to the X-tube 142b in other X-frame assemblies 140a) and an opening 275 formed along the latch 270. In some implementations, the opening 275 may be a slot that is shaped and/or dimensioned to allow the latch 270 to slidably move relative to the slider 120 to facilitate insertion of the latch 270 into the latch opening 273.

In some implementations, the latch 270 may instead be disposed within the interior cavity of the X-tube 142b such that the overall length of the X-tube 142b remains the same as other X-tubes 142b in other X-frame assemblies 140a. The second end 143b of the X-tube 142b, however, may have an opening through which the latch 270 may pass through when engaging and/or disengaging the latch opening 273 on the leg tube 112. The collar 271 may be disposed outside the X-tube 142b and configured to slide together with the latch 270 along the length of the X-tube 142b. As before, the latch 270 may be coupled to the collar 271 via a fastener inserted through the opening 276 on the collar 271 and another opening (not shown) on the latch 270. The fastener may pass through the X-tube 142b via a slotted opening (not shown) that is shaped and/or dimensioned to be similar to the opening 275 on the latch 270.

The latch 270 and the X-tube 142b may be rotatably coupled to the slider 120. For example, the pin 274 may pass through the openings on the slider 120, the opening 275 on the latch 270, and the opening 147 on the X-tube 142b. The latch 270 may still have a slotted opening 275 to allow the latch 270 to slidably move relative to the slider 120 to engage and/or disengage the latch opening 273.

Figure 14C:
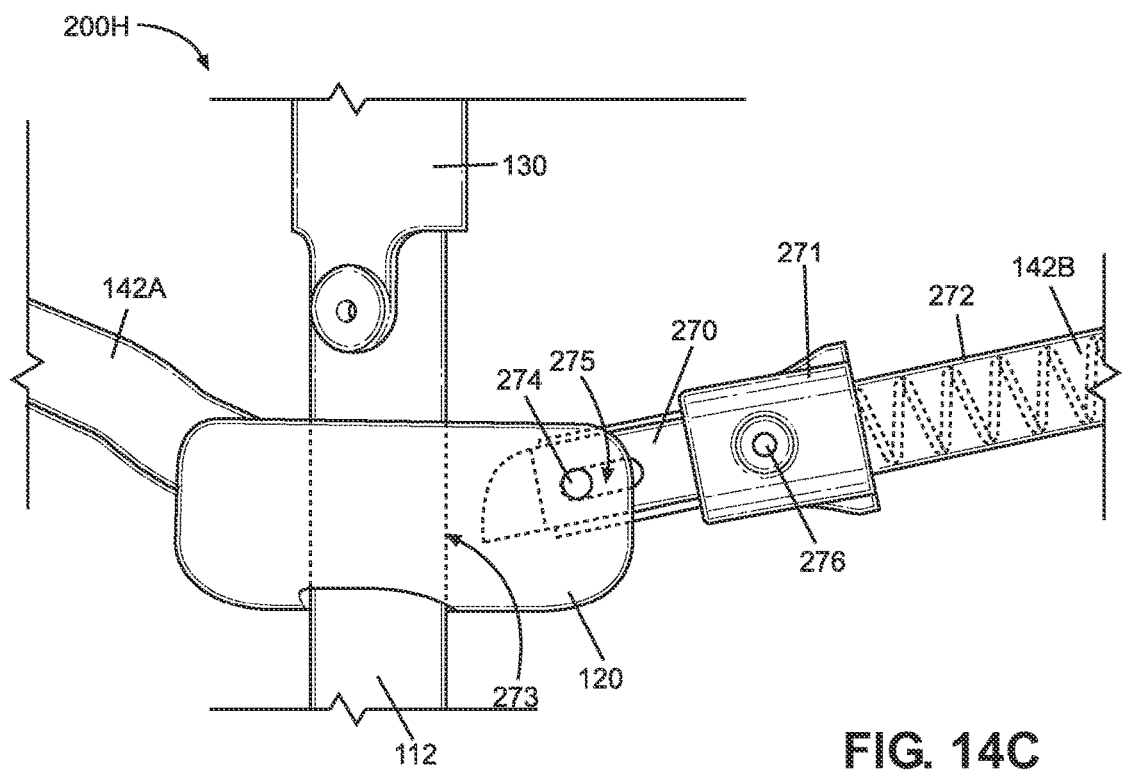
FIG. 14C shows a side view of the latch mechanism of FIG. 14B in an unlocked configuration.
Figure 14D:
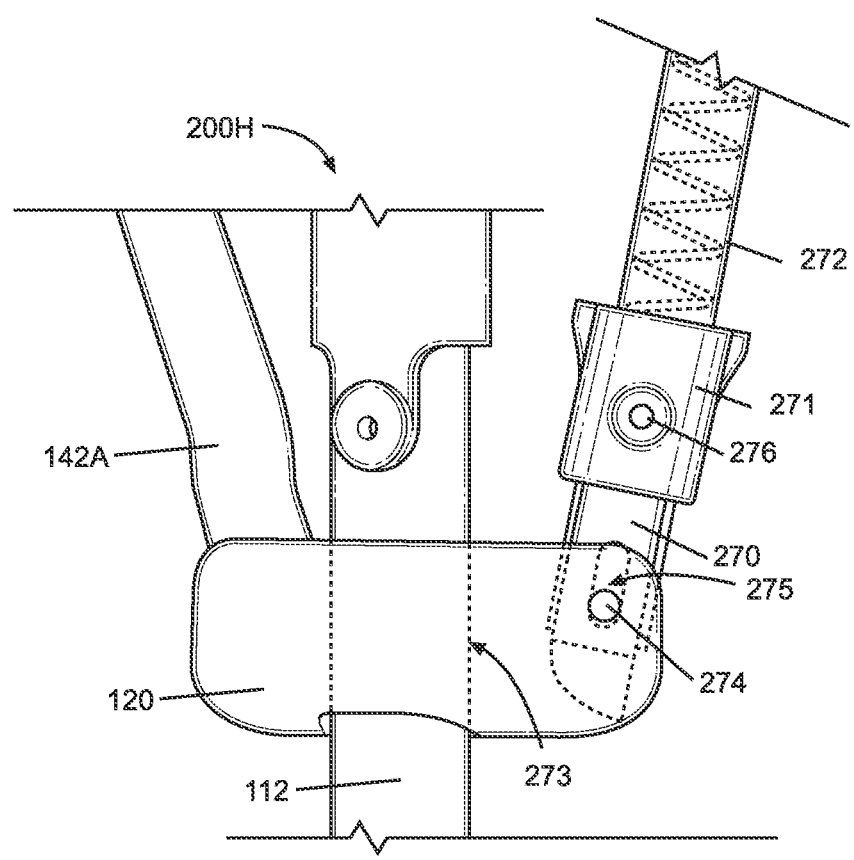
FIG. 14D shows a side view of the latch mechanism of FIG. 14C after the playard is folded.

To unlock the latch mechanism 200h, the caregiver may move the collar 271 along the X-tube 142b to release the latch 270 from the latch opening 273 as shown in FIG. 14C. This causes the return spring 272 to be compressed, thus generating and/or increasing a spring-bias force applied to the latch 270. While holding the collar 271, the slider 120 may then move downwards along the leg tube 112, thus folding the X-frame assembly 140a. Once the latch 270 is no longer aligned to the latch opening 273, the caregiver may release the collar 271 and continue folding the frame 100a. The spring-bias force applied to the latch 270 may cause the latch 270 to press against the exterior surfaces of the leg tube 112 as the slider 120 is moved towards the foot 114 and/or the surfaces of the slider 120 once the X-tube 142b is sufficiently rotated as shown in FIG. 14D. In some implementations, the end of the latch 270 may be shaped (e.g., curved or contoured) to allow the X-tube 142b to rotate smoothly when pressing against the leg tube 112 and/or the slider 120 as the frame 100a is being folded and/or unfolded.

FIGS. 15A-15D show yet another exemplary latch mechanism 200i mounted onto the frame 100a of the playard 1000a. Specifically, the latch mechanism 200i may be mounted to one end of the X-tube 142b (or 142a) of one X-frame assembly 140a to engage the slider 120 of one leg support assembly 110a. FIG. 15A once again shows the frame 100a may only include a single latch mechanism 200i to support the frame 100a in the unfolded configuration. The latch mechanism 200i may be shaped and/or dimensioned such that the latch mechanism 200i fits within the recessed opening of the extended section 126 (or 124) of the slider 120 together with the second end 143b of the X-tube 142b. In this manner, the latch mechanism 200i may not protrude outwards from the frame 100a even when the frame 100a is folded (see FIG. 15B), thus preserving the compact shape of the folded frame 100a.

Figure 15A:
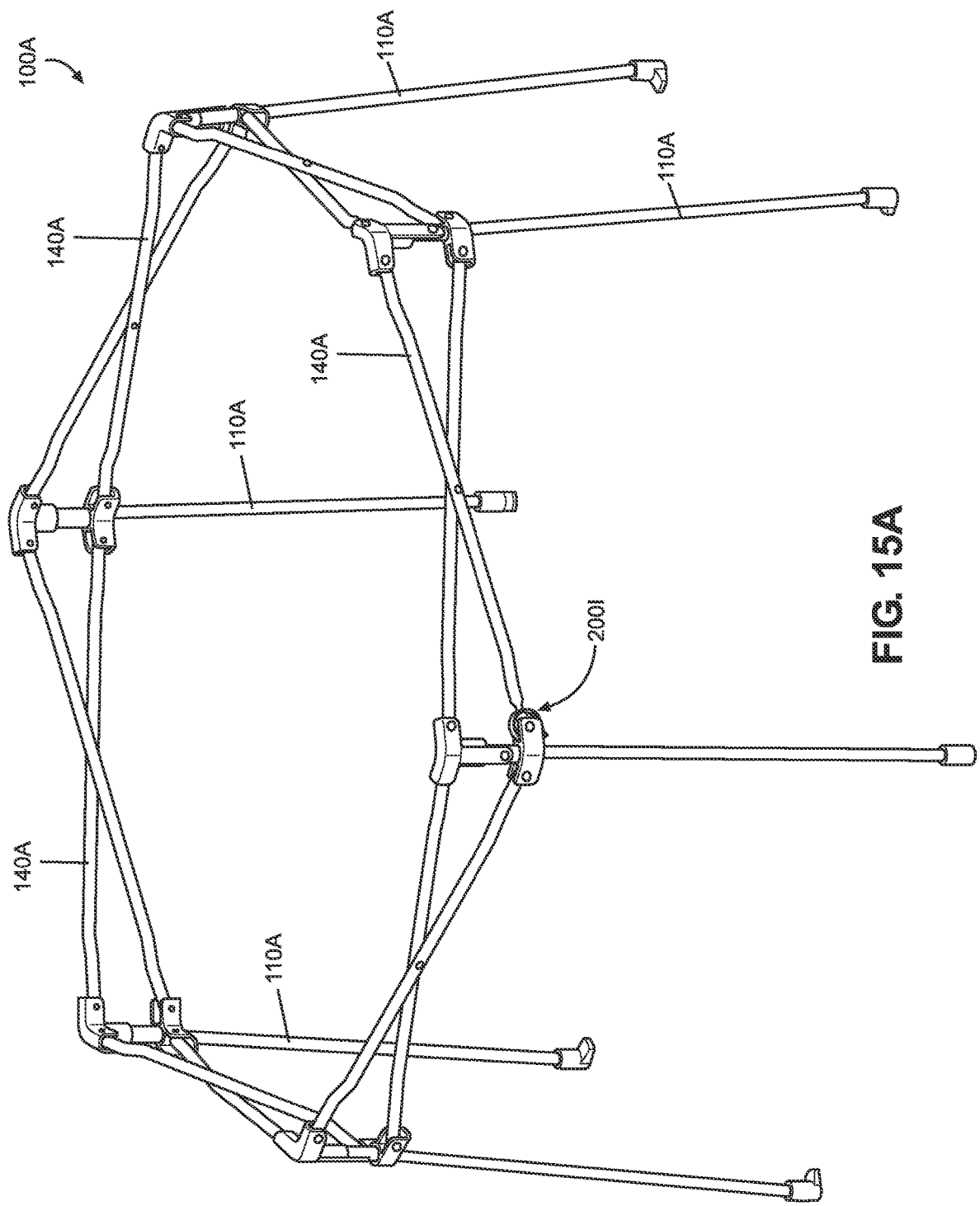
FIG. 15A shows a top perspective view of the playard of FIG. 2A with a latch mechanism that includes a snap-fit connector disposed at one end of a X-tube. The playard is in an unfolded configuration.
Figure 15C:
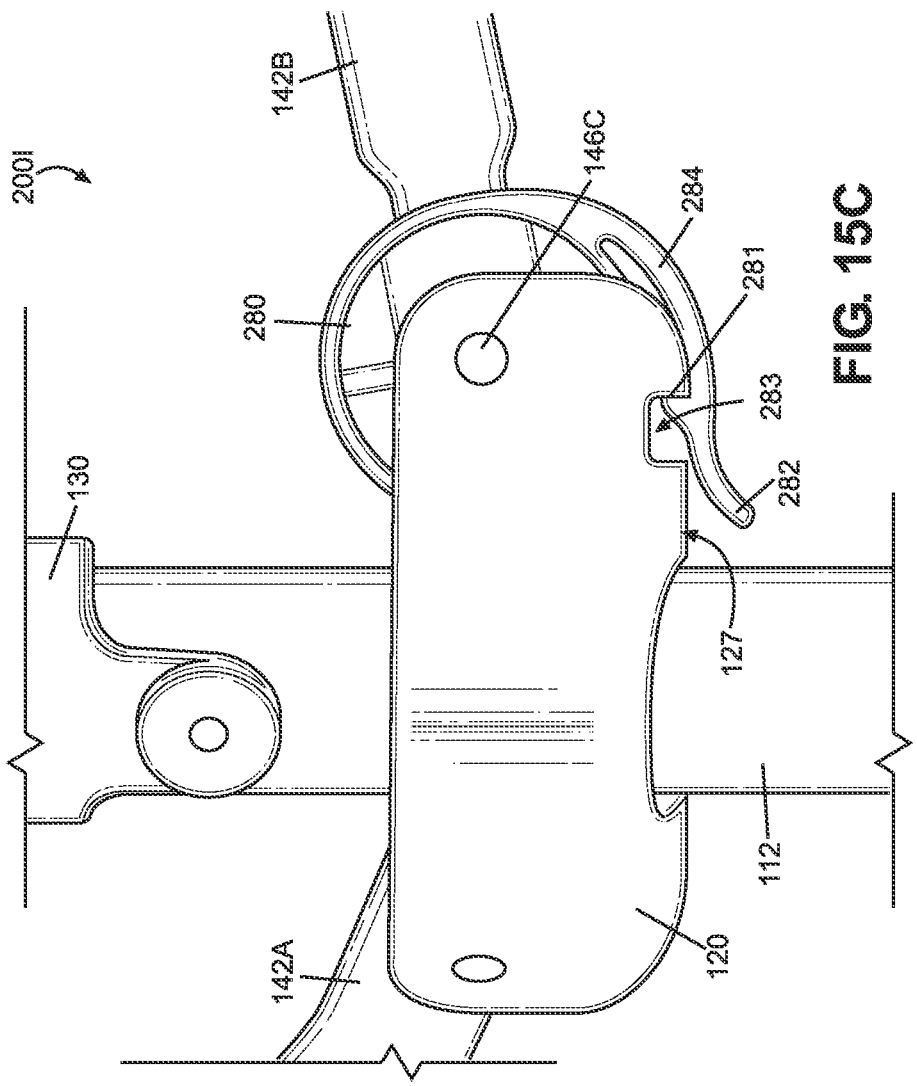
FIG. 15C shows a side view of the latch mechanism of FIG. 15A in a locked configuration.
Figure 15B:
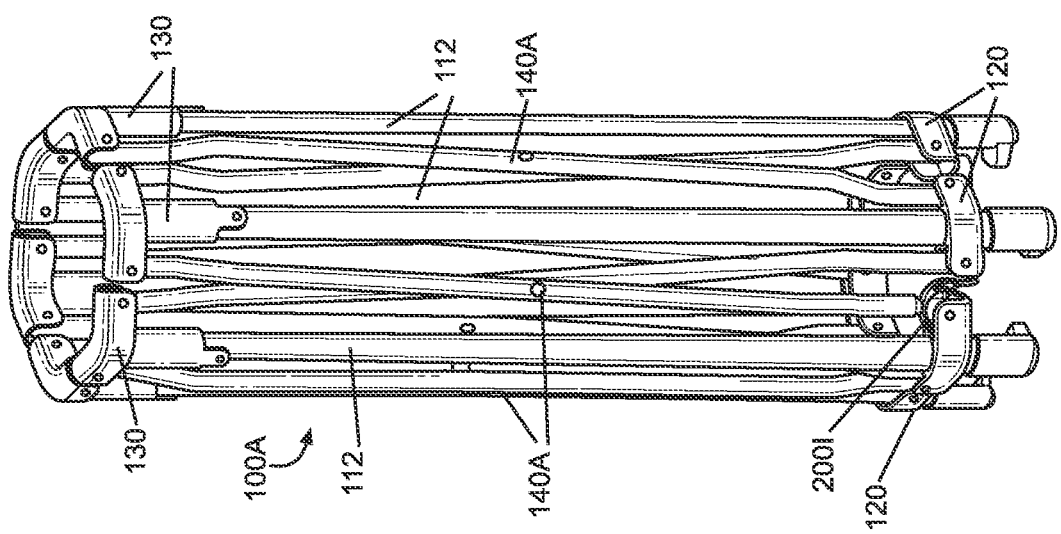
FIG. 15B shows a perspective view of the playard of FIG. 15A in a folded configuration.

FIG. 15C shows the latch mechanism 200i may include a latch base 280 coupled to the second end 143b of the X-tube 142b and rotatably coupled to the slider 120. In some implementations, a single fastener may couple the slider 120, the latch base 280, and the X-tube 142b together. As shown, the latch base 280 may include a latch member 284 that extends from the latch base 280. The latch member 284 may be a mechanically compliant component that is deformable and may have sufficient mechanical rigidity to generate a restoring force when deformed.

In some implementations, the latch base 280 may have a cylindrical shape and the latch member 284 may extend from the periphery of the latch base 280. The latch member 284 may have a curved and/or contoured shape as shown in FIGS. 15C and 15D. The latch member 284 may include an integrally formed latch catch 281 that is shaped to engage a latch opening 283 formed on a bottom surface 127 of the slider 120. The latch member 284 may further include a tab 282 disposed at the end of the latch member 284, which may be pulled to bend the latch member 282, thus releasing the latch catch 281 from the latch opening 283.

FIG. 15D shows the latch member 284 may be disposed between the sliders 120 from adjacent leg support assemblies 110a when the frame 100a is unfolded. When unfolding the frame 100a, the latch body 280 together with the latch member 284 may rotate with the X-tube 142b about the pin joint 146c relative to the slider 120 as the slider 120 moves up along the leg tube 112 towards the corner 130. As the latch body 280 rotates, the latch member 284 and, in particular, the latch catch 281, may initially contact the exterior portions of the slider 120, thus bending and/or deflecting the latch member 284. In some implementations, the latch catch 281 may include a lead-in feature to facilitate the deflection of the latch member 284 as the frame 100a is unfolded.

Once the slider 120 is positioned sufficiently close to the corner 130 and/or the X-tube 142b is sufficiently rotated such that the latch catch 281 aligns with the latch opening 283, the restoring force generated by the deflection of the latch member 284 may insert the latch catch 281 into the latch opening 283. The latch catch 281 and the latch opening 283 may thus prevent further rotation of the X-tube 142b relative to the slider 120 and, hence, further movement of the slider 120 along the leg tube 112 to hold the frame 100a in the unfolded configuration.

To unlock the latch mechanism 200i, the caregiver may pull on the tab 282 with sufficient force to release the latch catch 281 from the latch opening 283. While holding the tab 282, the slider 120 may then move downwards along the leg tube 112 towards the foot 114, which causes the X-tube 142b and the latch body 280 to rotate relative to the slider 120. Once the latch catch 281 is no longer aligned with the latch opening 283, the caregiver may release the tab 282 and proceed with folding the frame 100a.

As described above, the frame 100a may generally include at least one latch mechanism to maintain the frame 100a and, by extension, the playard 1000a in the unfolded configuration. In some implementations, the frame 100a may include a single latch mechanism (e.g., one of the latch mechanisms 200a -200i) to lock the unfolded frame 100a, which may simplify the frame 100a by reducing the number of parts for manufacture. However, in other implementations, the frame 100a may include multiple latching mechanisms to ensure the various components of the frame 100a are kept evenly unfolded. Thus, it should be appreciated that in other implementations, the frame 100a may include combinations of one or more of the latch mechanisms 200a -200i described above.

Figure 16B:
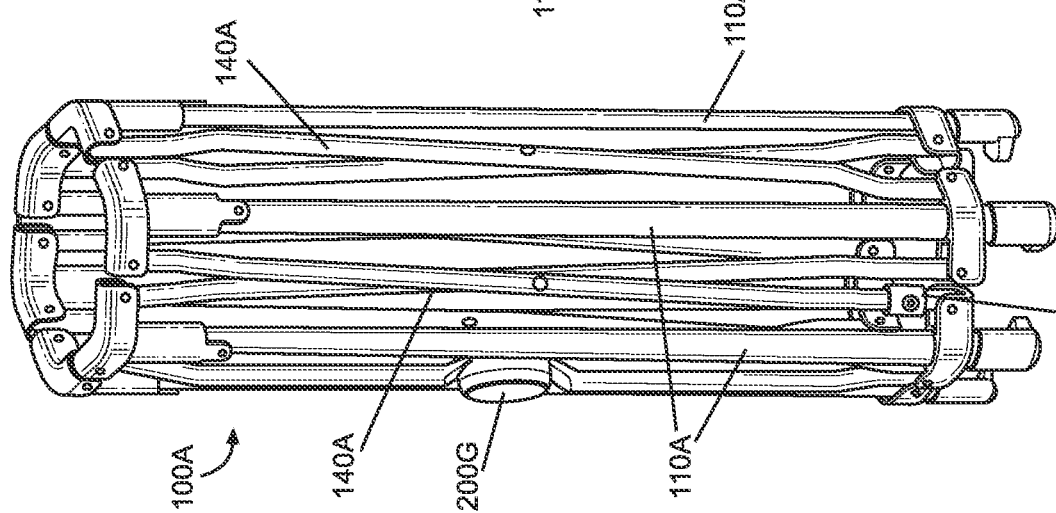
FIG. 16B shows a perspective view of the playard of FIG. 16A in a folded configuration.

FIGS. 16A and 16B show one example of a frame 100a that includes the latch mechanism 200g coupled to one X-frame assembly 140a and the latch mechanism 200h coupled to the X-tube of another X-frame assembly 140a and the slider 120 of one leg support assembly 110a. FIG. 16A shows the latch mechanisms 200g and 200i being used to maintain the frame 100a in the unfolded configuration. FIG. 16B shows the latch mechanisms 200g and 200i do not appreciably extend outwards from the frame 100a when the frame 100a is in the folded configuration.

As described above, the foldable playard may generally include a frame that outlines an interior space. The frame may include multiple leg support assemblies and X-frame assemblies that together define and/or align with the outer boundaries of the interior space. For example, the playard 1000a includes a frame 100a defining an interior space 102 with a horizontal cross-section shaped as a hexagon. It should be appreciated that the various implementations of the foldable playard described herein may define interior spaces having other geometries based, in part, on the number of leg support assemblies and/or the X-frame assemblies used for construction.

For example, the playard may outline an interior space with a square horizontal cross-section. The frame of the playard may include four identical leg support assemblies, which may be connected together using four identical X-frame assemblies where each X-frame assembly forms a single (or double) X-frame structure. As before, each X-frame assembly may couple adjacent leg support assemblies together.

In another example, FIGS. 17A-17D show an exemplary playard 1000b with a frame 100b that outlines an interior space 102 with a horizontal cross-section shaped as a rectangle. The frame 100a may include multiple leg support assemblies 110b defining and/or aligning with the respective side edges 104 of the interior space 102 when the frame 100b is unfolded to support the playard 1000b on the ground 90 (see, for example, FIG. 18A). The frame 100a may include a pair of X-frame assemblies 140a disposed on the smaller side faces 106 of the interior space 102 to couple together adjacent leg support assemblies 110b located on the shorter sides of the rectangular horizontal cross-section of the interior space 102. The frame 100 may further include a pair of X-frame assemblies 140b disposed on the larger side faces 106 of the interior space 102 to couple together adjacent leg support assemblies 110b located on the longer sides of the rectangular horizontal cross-section of the interior space 102. Thus, each leg support assembly 110b may couple to one X-frame assembly 140a and one X-frame assembly 140b.

To form the rectangular-shaped interior space 102, each X-frame assembly 140a may form a single X-frame structure, as described above, and each X-frame assembly 140b may form a double X-frame structure (i.e., two pairs of crossing X-tubes where each pair of X-tubes couples to one leg support assembly). The combination of the single and double X-frame structures allows the frame 100b to define an interior space 102 where the sides of the horizontal cross-section have different dimensions while enabling the X-frame assemblies 140a and 140b to couple to the same components of the leg support assembly 110b (e.g., the same slider 120 and corner 130) so that the leg support assemblies 110b, the X-frame assemblies 140a, and the X-frame assemblies 140b may fold and/or unfold together (see FIG. 17C). Furthermore, the double X-frame structure of the X-frame assembly 140b may also enable the leg support assemblies 110b and, in particular, the length of the leg tube 112 to be shorter compared to a single X-frame structure that spans the same length as the X-frame assembly 140b when deployed. Thus, the frame 100b may be more compact, particularly, when folded.

Similar to the frame 100a, the frame 100b may be unfolded with the feet 114 of the leg support assemblies 110b remaining in contact with the ground 90. Additionally, the leg tubes 112 may remain vertically upright or nearly vertically upright (e.g., leg tubes 112 may intentionally be tilted when the frame 100b is unfolded to improve stability) while the frame 100b is being folded and/or unfolded to make the process of setting up and/or tearing down the playard 1000b easier for the caregiver (see FIG. 17D).

Figure 18A:
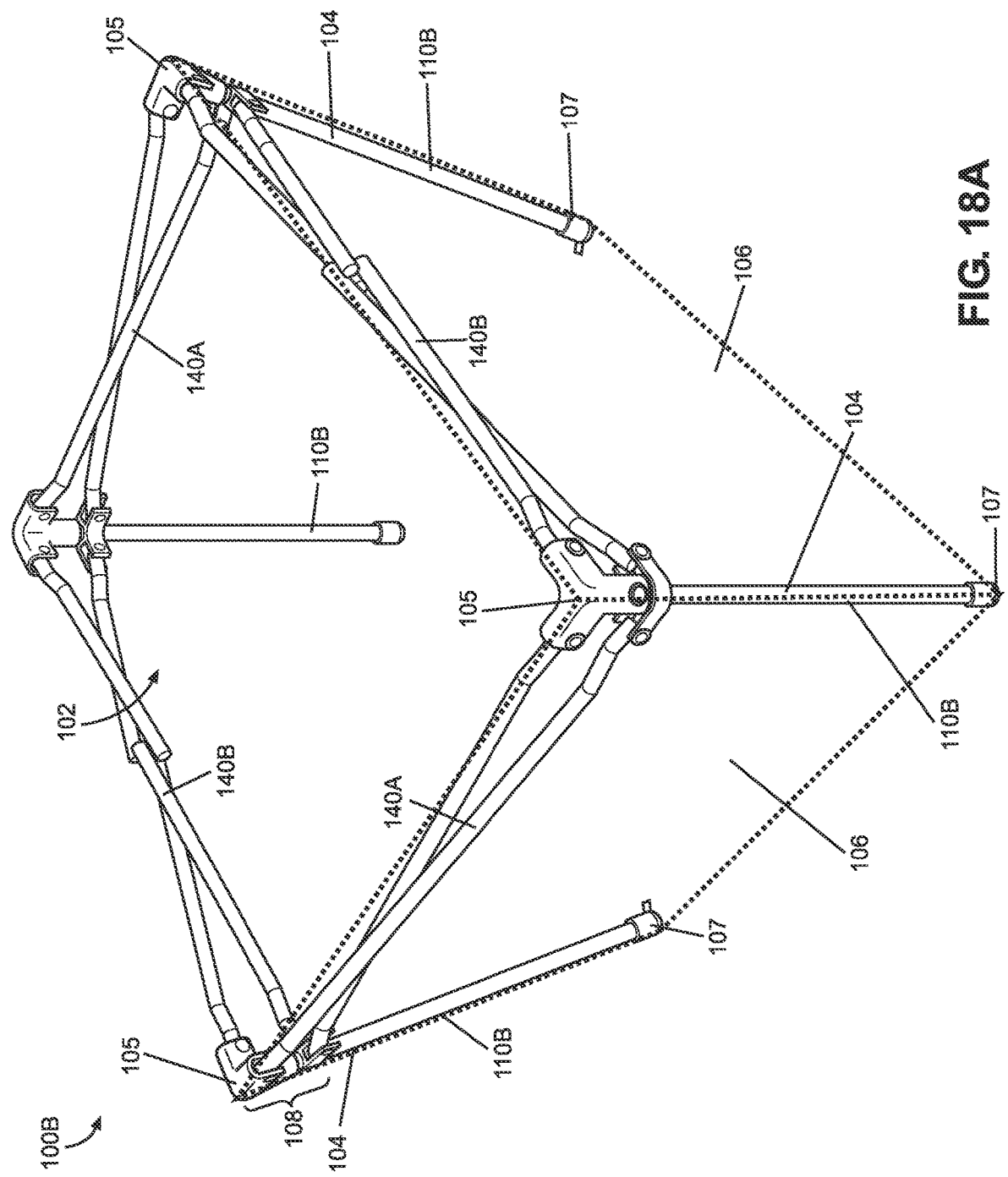
FIG. 18A shows a top perspective view of the playard of FIG. 17A with the soft goods removed.

Additionally, the X-frame assemblies 140a and 140b in the frame 100b may be disposed in the top portion 108 of the frame 100a to form a top perimeter structure along the interior space 102 (see FIG. 18A). As before, this may enable the respective X-tubes of the X-frame assemblies 140a and 140b to function as top rails to provide mechanical stability and rigidity to the frame 100b. In some implementations, the frame 100b may not include a separate compliant or rigid top rail and/or a bottom support structure.

Figure 22:
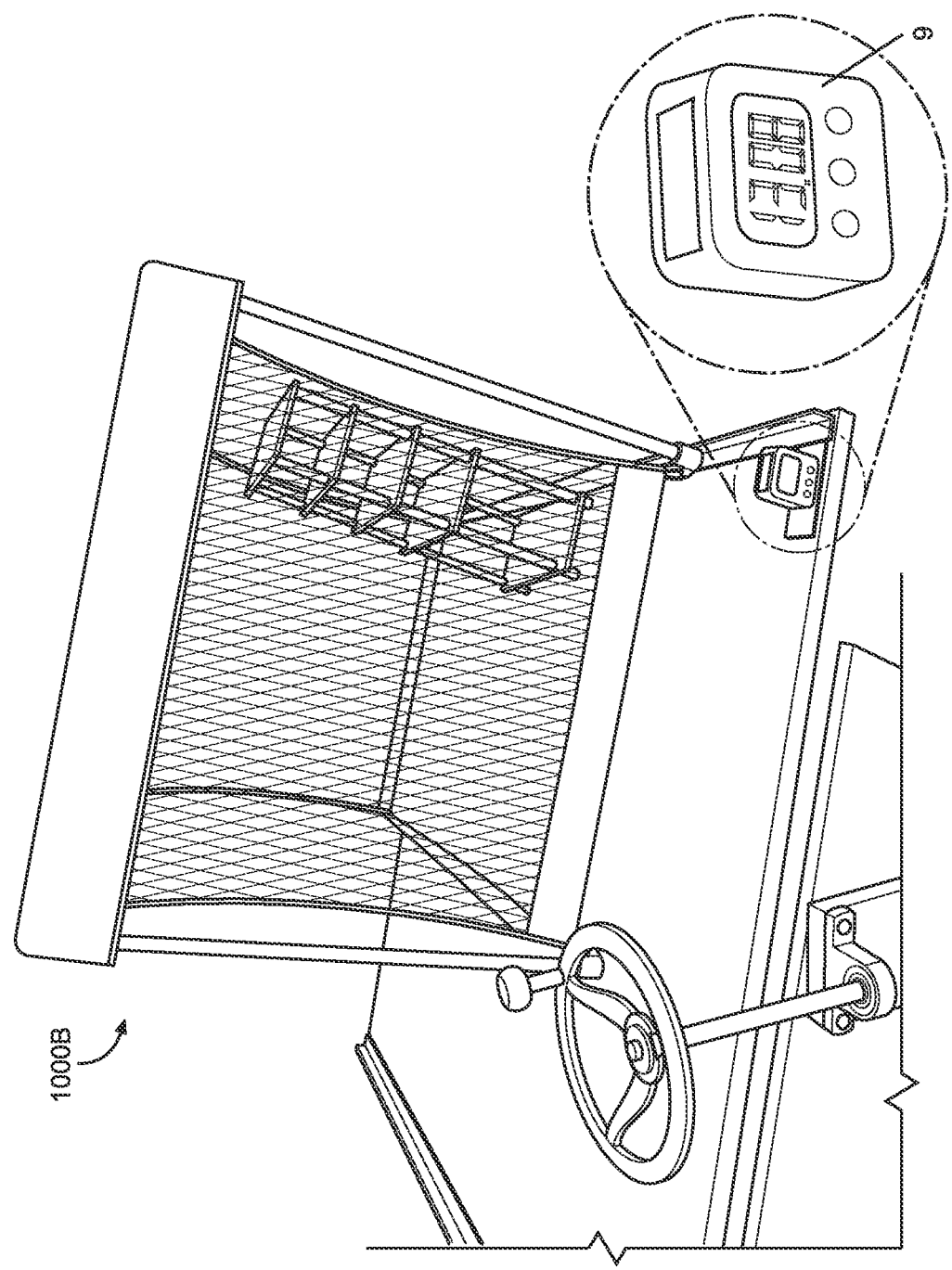
FIG. 22 shows a stability test being performed on the playard of FIG. 17A.

In some implementations, the frame 100b with only X-frame assemblies 140a and 140b coupling the leg support assemblies 110b together may provide sufficient mechanical rigidity, stability, and/or strength to satisfy various consumer safety standards (e.g., ASTM F406-19). For example, FIG. 22 shows the playard 1000b subjected to a stability test. Similar to the playard 1000a, the playard 1000b was demonstrated to remain sufficiently stable (i.e., at least three feet 114 remained in contact with the underlying platform) when the playard 1000b was tilted more than 10 degrees.

Figure 17A:
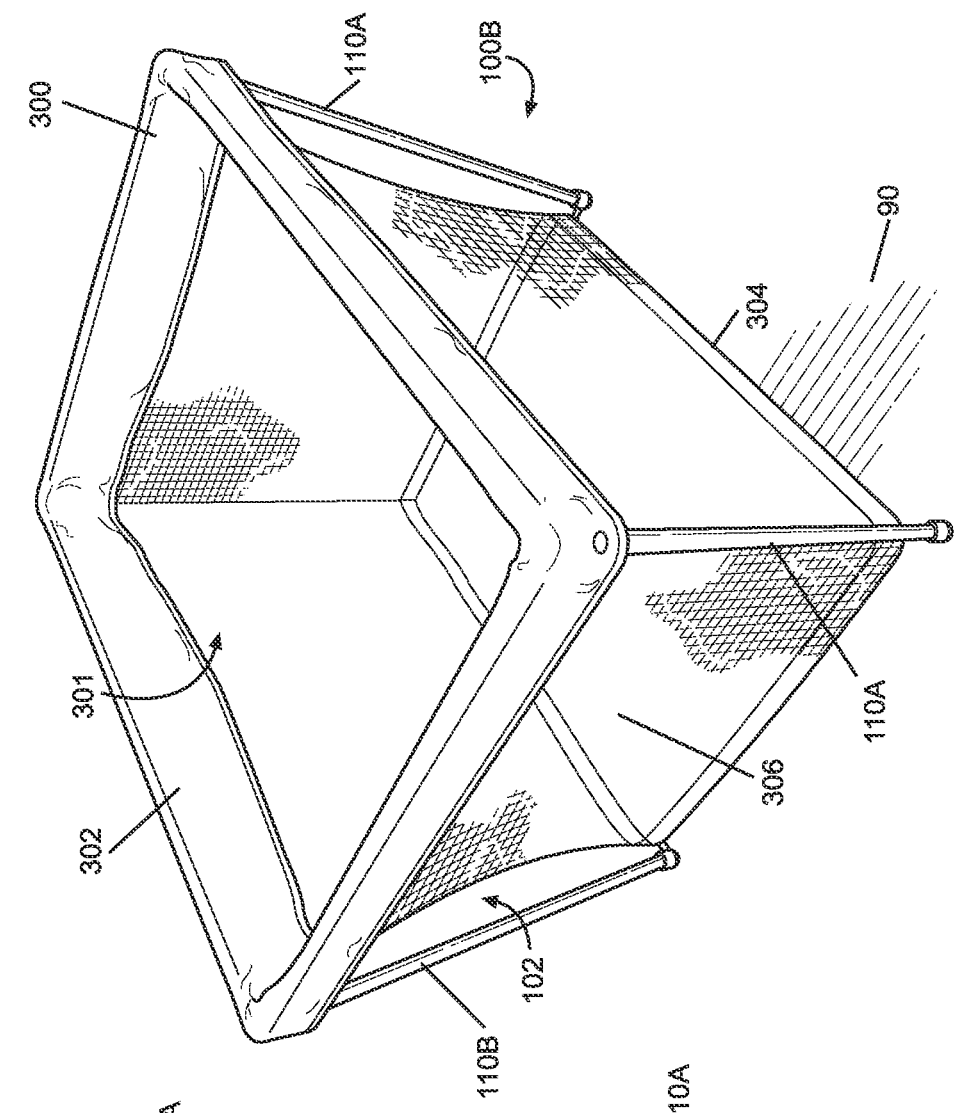
FIG. 17A shows a top perspective view of an exemplary playard forming a rectangular-shaped interior space with soft goods. The playard is in an unfolded configuration.
Figure 17B:
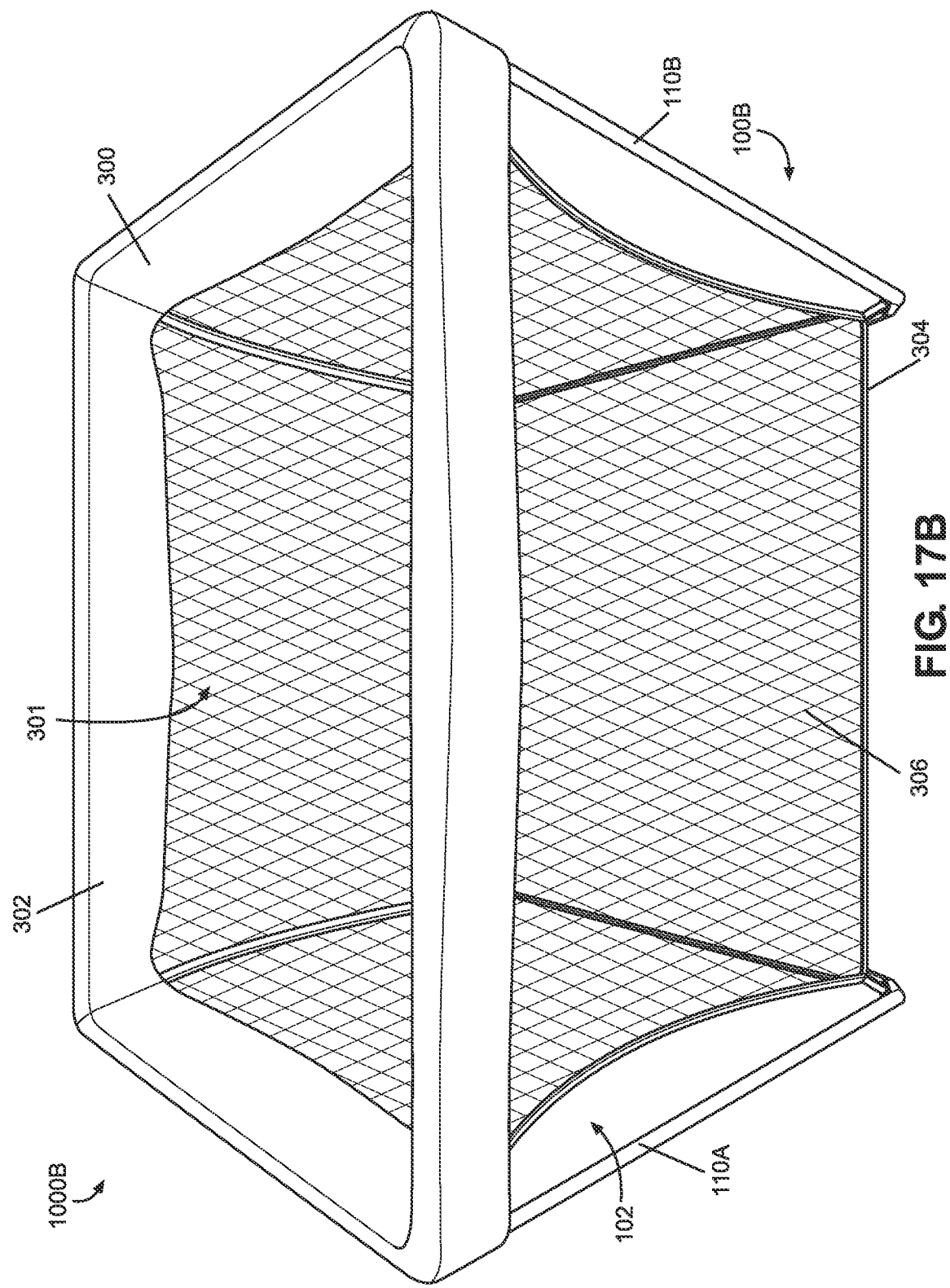
FIG. 17B shows another perspective view of the playard of FIG. 17A.
Figure 17D:
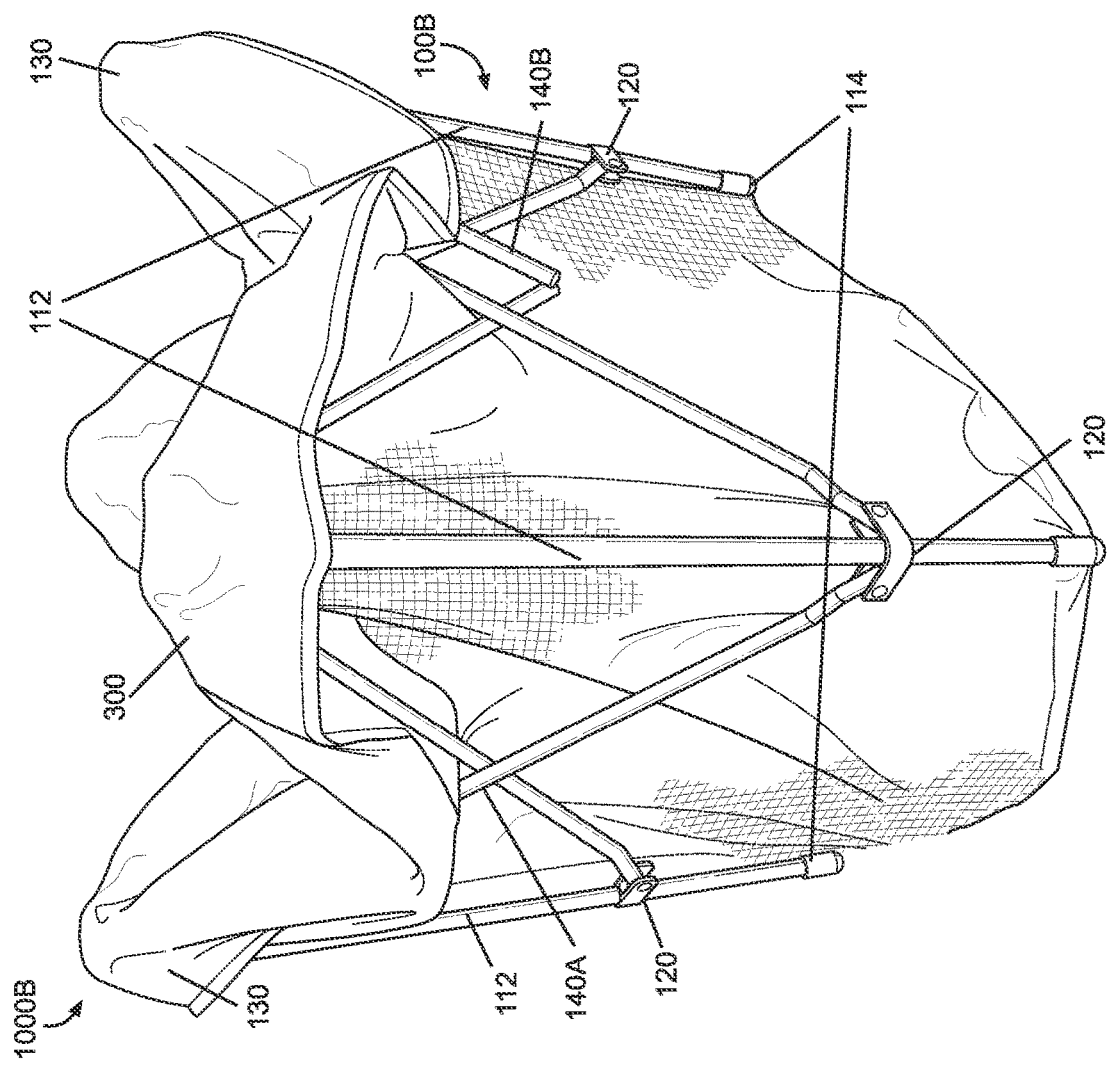
FIG. 17D shows a top perspective view of the playard of FIG. 17A in a partially unfolded configuration.
Figure 17C:
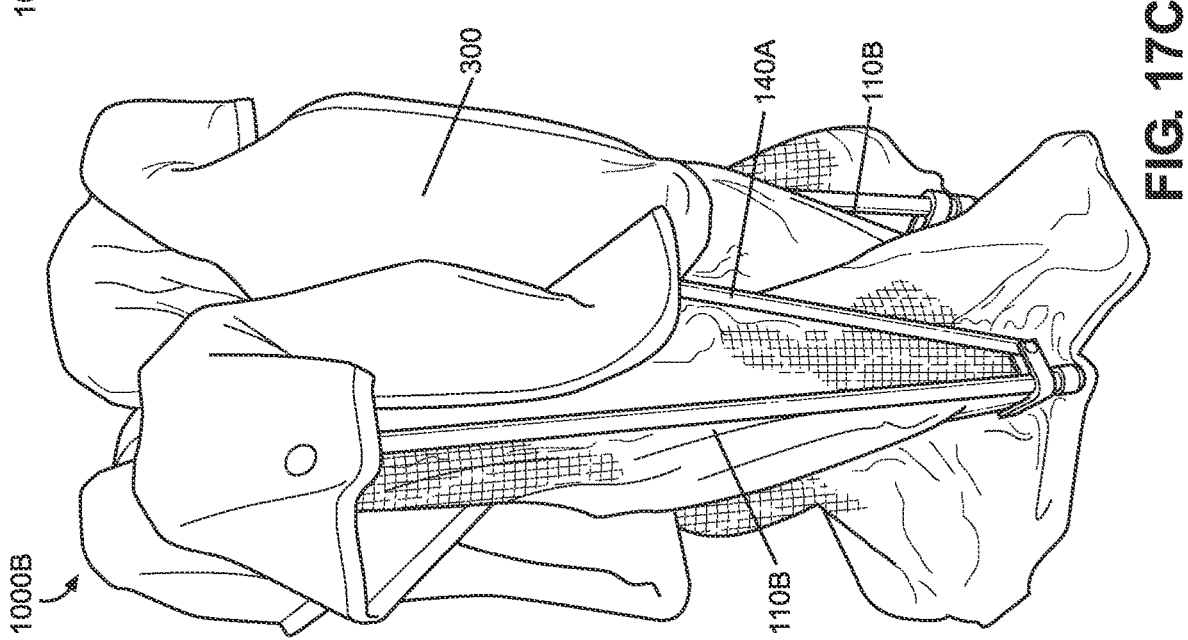
FIG. 17C shows a top perspective view of the playard of FIG. 17A in a folded configuration.

FIGS. 17A and 17B further show the playard 1000b may include soft goods 300 coupled to the frame 100b and forming a partially enclosed space 301 disposed within the interior space 102 to contain the child 50. As before, the soft goods 300 may be readily folded together with the frame 100b as shown in FIG. 17C. The soft goods 300 may include a floor portion 306 that rests on the ground 90 supporting the playard 1000b and side portions 304 that together define and surround the partially enclosed space 301. The floor portion 306 may include a removable mat to provide padding on the ground 90. The side portions 304 may be formed from transparent and/or see-through materials to allow the caregiver to monitor their child 50 when the child 50 is placed into the partially enclosed space 301. The soft goods 300 may include tethers and/or straps to attach the floor portion 306 to the bottom portions of the leg support assemblies 110b.

The soft goods 300 may further include a top portion 302, formed from an opaque textile material, to attach the soft goods 300 to the top portions of the leg support assemblies 110b as well as cover the top portion of the frame 100b. In particular, the soft goods 300 in the playard 1000b may fully cover one or more of the X-frame assemblies 140a and 140b, the corners 130 of the leg support assemblies 110b, and/or the sliders 120 of the leg support assemblies 110b. In some implementations, the soft goods 300 may fully cover the X-frame assemblies 140a and 140b as well as the sliders 120 and the corners 130 of the leg support assemblies 110b such that only the leg tubes 112 and/or the feet 114 are observable as shown in FIGS. 17A and 17B. As before, positioning the X-frame assemblies 140a and 140b in the top portion 108 of the frame 100b when the frame 100b is unfolded may also increase the visibility of the child 50 due to the larger visually unobstructed portions of the side faces 106.

As described above, conventional playards and especially, indoor playards, typically have to compromise between ease of use, visibility of the child, and/or the appearance of the playard (see, for example, playard 10c). In comparison, the playard 1000b may simultaneously improve ease of use, visibility of the child, and the overall appearance. First, the playard 1000b includes X-frame assemblies 140a and 140b that allow the frame 100b to be folded and/or unfolded in one step. For instance, the caregiver may move one slider 120 of one leg support assembly 110b to fold and/or unfold the frame 100b. Second, the X-frame assemblies 140a and 140b are positioned in the top portion 108 of the frame 100b when the playard 1000b is deployed, which allows for greater visibility of the child in the partially enclosed space 301 through the sides of the frame 100b. Third, aesthetically undesirable components, such as the X-tubes, the sliders 120, the corners 130, may be readily hidden by the top portion 302 of the soft goods 300 to provide a cleaner, more aesthetically desirable appearance.

FIG. 18A shows the frame 100b without the soft goods 300 attached in the unfolded configuration. As shown, each leg support assembly 110b may be similar to leg support assemblies 110a used in the frame 100a. For instance, the leg support assembly 110b includes a leg tube 112 with a top end 113a and a bottom end 113b, a corner 130 coupled to the top end 113a, a foot 114 coupled to the bottom end 113b, and a slider 120 that is slidably coupled to be leg tube 112 and disposed between the foot 114 and the corner 130. The top end 113a of the leg tube 112 and/or the corner 130 may align with a top vertex 105 of the interior space 102. The bottom end 113b of the leg tube 112 and/or the foot 114 may align with a bottom vertex 107 of the interior space 102.

Figure 18B:
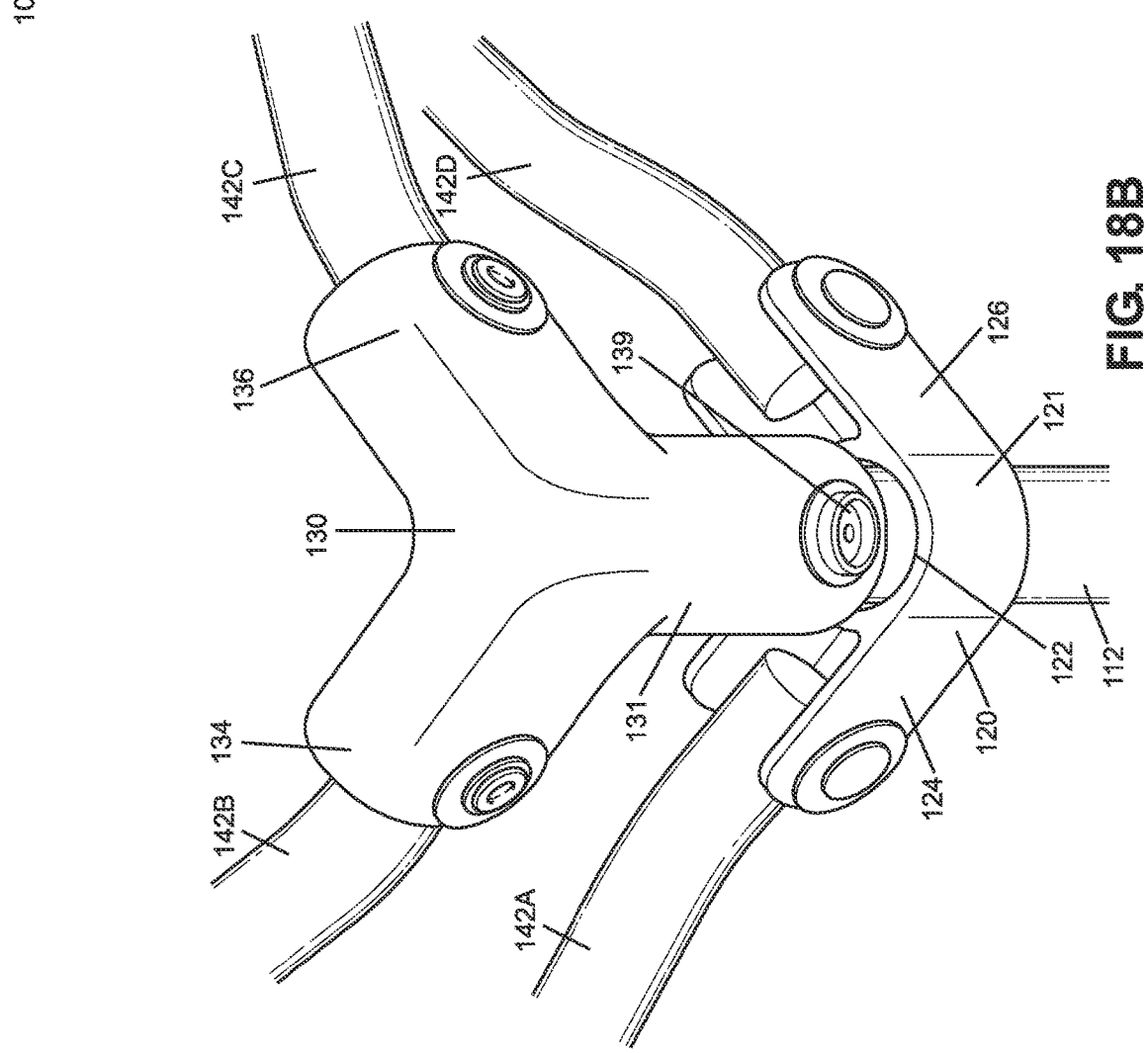
FIG. 18B shows a magnified view of a corner and a slider of a leg support assembly in the playard of FIG. 18A.

FIG. 18B further shows the leg tubes 112 may have a circular cross-sectional shape. The leg tubes 112 may also remain vertical or nearly vertical for both the folded and unfolded configurations. Thus, the interior space 102 may be shaped as right prism with rectangular base. The slider 120 may once again include a base 121 that defines a through hole opening 122 that surrounds the leg tube 112. The slider 120 may include extended portions 124 and 126 disposed on opposing sides of the base 121 to couple respective X-tubes (e.g., X-tubes 142a and 142d in FIG. 18B) of the X-frame assemblies 140a and 140b to the slider 120. The corner 130 may include a base 131 with a recessed opening (not shown) to receive the top end 113a of the leg tube 112. The corner 130 may further include a snap-fit connector 139 coupled to the base 131 instead of a tab 138 extending from the base 131 as in the leg support assembly 110a. Once again, the corner 130 may include extended portions 134 and 136 disposed on opposing sides of the base 131 to couple respective X-tubes (e.g., X-tubes 142b and 142c in FIG. 18D) of the X-frame assemblies 140a and 140b to the corner 130.

Figure 19A:
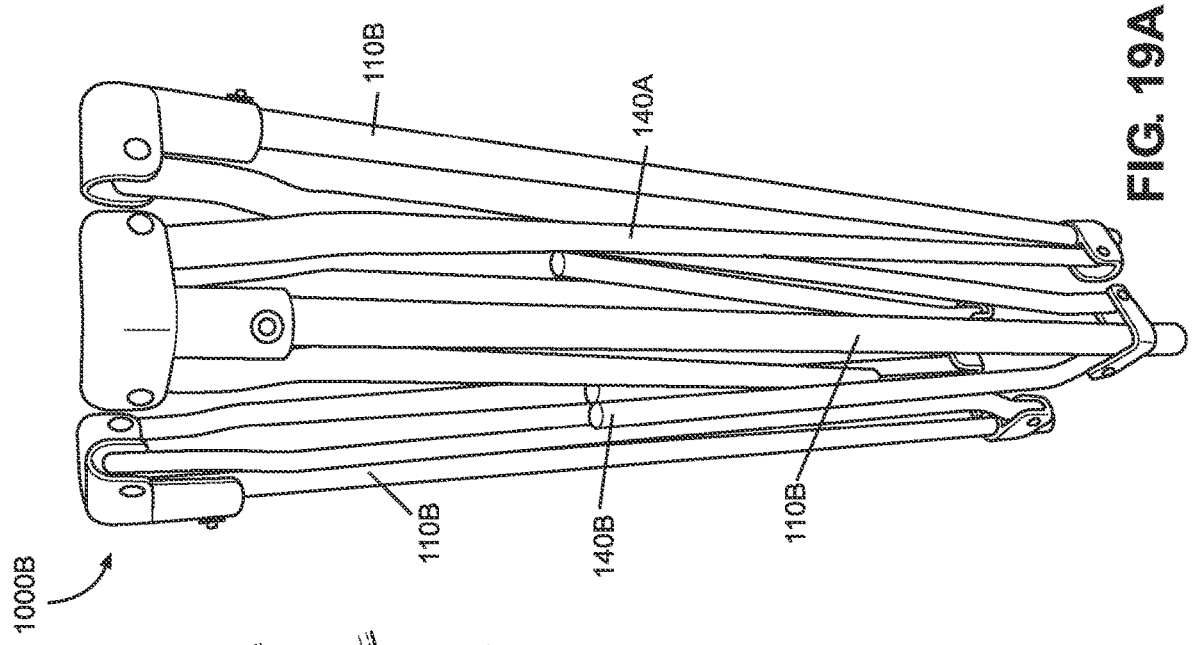
FIG. 19A shows a top perspective view of the playard of FIG. 17C with the soft goods removed.

FIG. 19A shows the frame 100b in the folded configuration. FIG. 19B shows the slider 120 may be disposed proximate to the foot 114 when the frame 100b is folded. As described above and shown in FIGS. 18B and 19B, the X-frame assemblies 140a and 140b may couple to the same corner 130 and slider 120 of one leg support assembly 110b. Furthermore, the pin joints that connect the respective X-tubes of the X-frame assemblies 140a and 140b to the slider 120 or the corner 130 may be located along the same horizontal plane. Thus, the respective ends of the X-tubes of the X-frame assemblies 140a and 140b that couple to the leg support assembly 110b may travel the same distance along the leg tube 112 to fold and/or unfold both the X-frame assemblies 140a and 140b. This enables the slider 120 and the corner 130 to be thinner in size and, in turn, reduces the overall length, L, of the leg tube 112 such that the leg tube 112 only provides sufficient overlap to couple the foot 114 and the corner 130 to the leg tube 112 and sufficient clearance for the slider 120 to move a sufficient distance to fold and/or unfold the X-frame assemblies 140a and 140b. As shown in FIGS. 18B and 19B, the slider 120 may be disposed proximate to the corner 130 when the frame 100b is in the unfolded configuration and proximate to the foot 114 when the frame 100b is in the folded configuration.

Figure 20B:
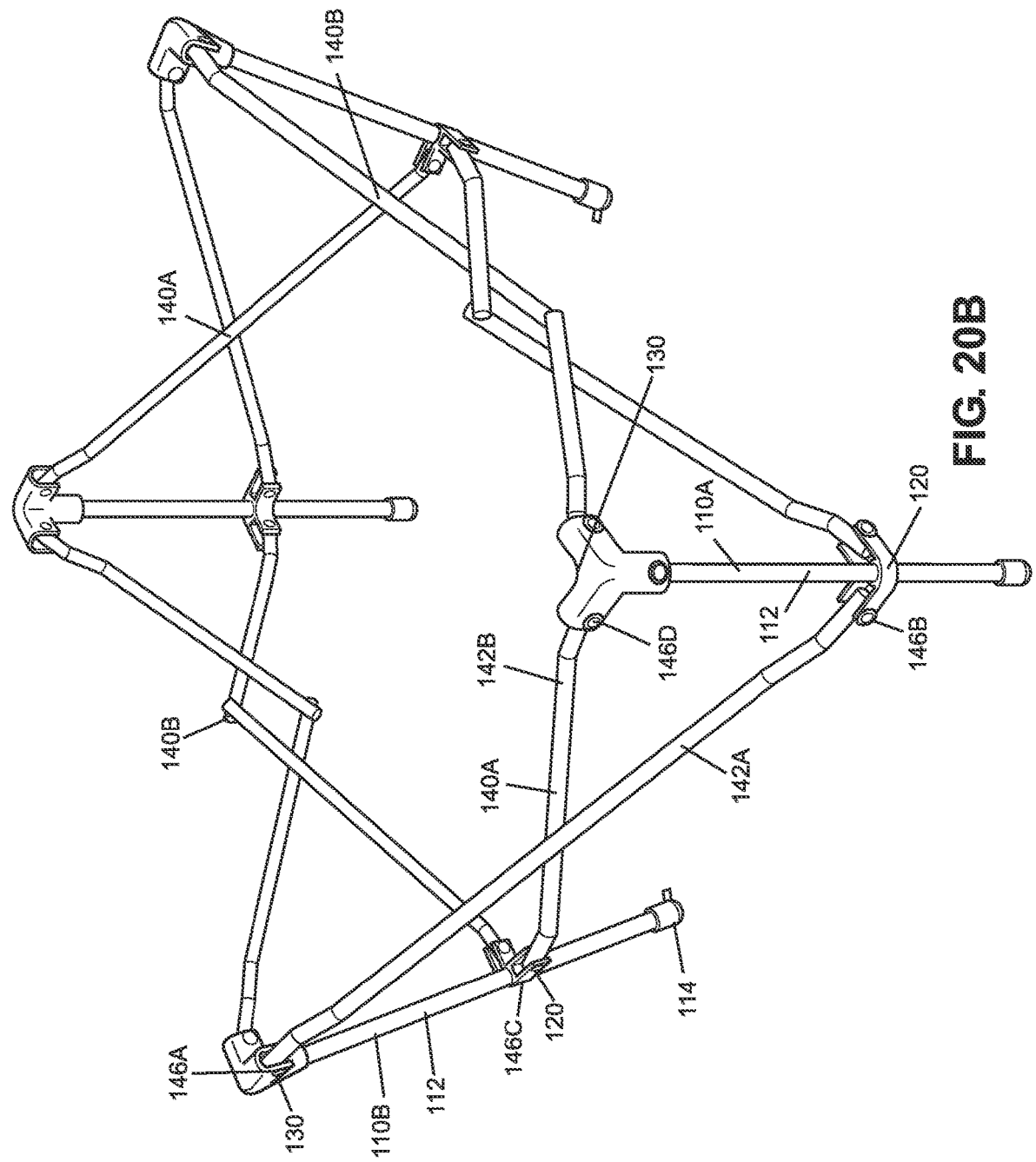
FIG. 20B shows a top, side perspective view of the playard of FIG. 20A.

FIGS. 20A-20E show several views of the frame 100b in a partially unfolded/folded state. In particular, FIG. 20B shows the X-frame assembly 140a may once again include X-tubes 142a and 142b that are rotatably coupled to one another via a pin joint (e.g., a rolled rivet joint). As shown, the X-tube 142a may be rotatably coupled to the corner 130 of one leg support assembly 112b via a pin joint 146a and the slider 120 of another leg support assembly 112b via a pin joint 146b. Similarly, the X-tube 142b may be rotatably coupled to the slider 130 of the one leg support assembly 112b via a pin joint 146c and the corner 130 of the other leg support assembly 112b via a pin joint 146d. Thus, the X-frame assembly 140a may operate in a similar or same manner as the X-frame assemblies 140a in the frame 100a.

Figure 20C:
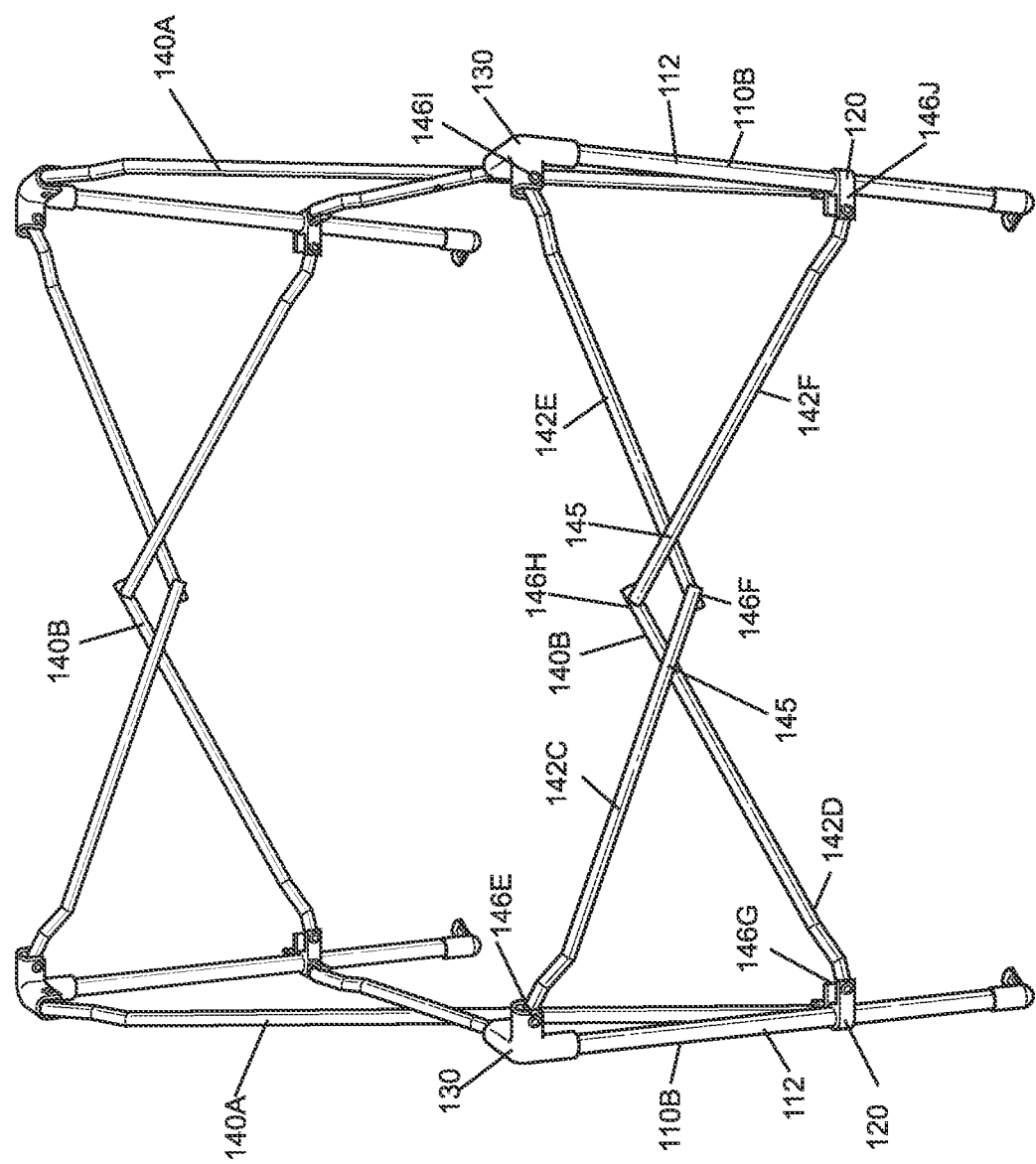
FIG. 20C shows a top, front perspective view of the playard of FIG. 20A.

FIG. 20C shows the X-frame assembly 140b may include two pairs of X-tubes, i.e., the X-tubes 142c and 142d as well as the X-tubes 142e and 142f. The X-tubes 142c and 142d may be rotatably coupled to each other via a pin joint 145 similar to the X-tubes 142a and 142b in the X-frame assembly 140a. Similarly, the X-tubes 142e and 142f may be rotatably coupled to each via another pin joint 145. Each pair of X-tubes 142c and 142d (or 142e and 142f) may be coupled to one leg support assembly 110b and to the other remaining pair of X-tubes. As shown, the X-tube 142c may be rotatably coupled to the corner 130 of one leg support assembly 110a via a pin joint 146e and the X-tube 142e via a pin joint 146f. The X-tube 142d may be rotatably coupled to the slider 120 of the one leg support assembly 110a via a pin joint 146g and to the X-tube 142e via a pin joint 146h. The X-tube 142e may be further rotatably coupled to the corner 130 of another leg support assembly 110b via a pin joint 146i. The X-tube 142f may be further rotatably coupled to the slider 120 of the other leg support assembly 110b via a pin joint 146j.

In some implementations, the shape and/or dimensions of the X-tubes 142c -142f may be substantially identical or identical with each other. The shape and/or dimensions of the X-tubes 142a and 142b of the X-frame assembly 140a may be different from the X-tubes 142c -142f of the X-frame assembly 140b depending, in part, on the desired dimensions of the rectangular-shaped interior space 102. However, in some implementations, the shape and/or dimensions of the X-tubes 142c -142f may also be substantially identical or identical with the X-tubes 142a and 142b of the X-frame assembly 140a.

FIG. 20C further shows the pair of pin joints 145 may be offset from the respective center points of the X-tubes 142c -142f. In particular, the pin joint 145 coupling the X-tubes 142c and 142d together may be positioned closer to the pin joints 146h and 146f than the pin joints 146e and 146g. Similarly, the pin joint 145 coupling the X-tubes 142e and 142f together may also be positioned closer to the pin joints 146h and 146f than the pin joints 146i and 146j. The position of the pin joints 145 along the X-tubes 142c -142f may be tailored to ensure the respective ends of the X-tubes 142c -142f align with the ends of the X-tubes 142a and 142b when coupled to the same corner 130 or slider 120.

Figure 20E:
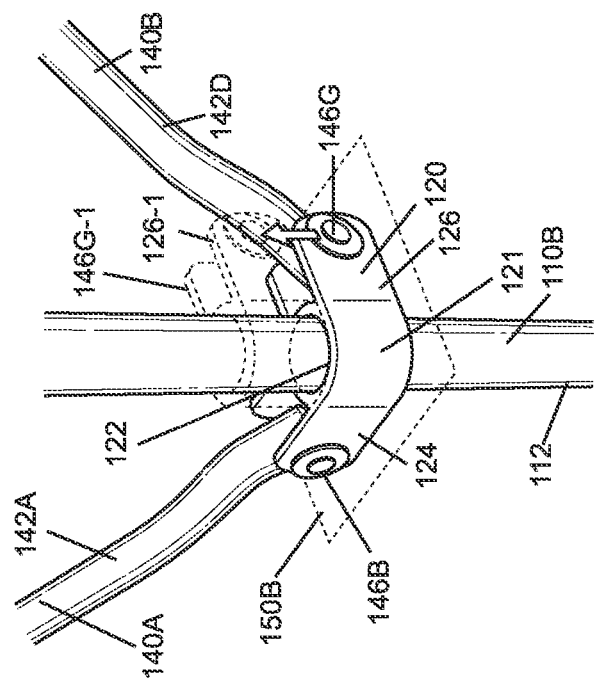
FIG. 20E shows a magnified view of the slider in the leg support assembly of FIG. 20A.
Figure 20D:
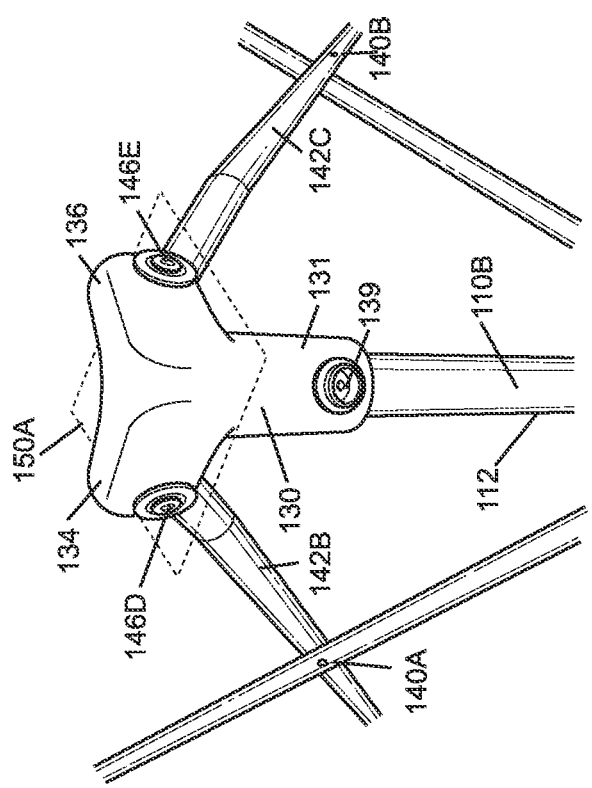
FIG. 20D shows a magnified view of the corner in the leg support assembly of FIG. 20A.

For example, FIG. 20D shows the pin joint 146d coupling the X-tube 142b to the corner 130 and the pin joint 146e coupling the X-tube 142c to the same corner 130 lie on the same horizontal plane 150a. FIG. 20E similarly shows the pin joint 146b coupling the X-tube 142a to the slider 120 and the pin joint 146g coupling the X-tube 142d to the same slider 120 may also lie on the same horizontal plane 150b. As described above, aligning the pin joints in this manner may allow for a thinner slider 120 and corner 130, which, in turn, may reduce the overall length of the leg tube 112. However, it should be appreciated that in some implementations, the pin joints may not be aligned to the same horizontal plane. For example, FIG. 20E shows the extended portion 126 of the slider 120 and the pin joint 146g may be vertically raised (i.e., see extended portion 126-1 and pin joint 146g) above the extended portion 124 and the pin joint 146b.

Figure 21B:
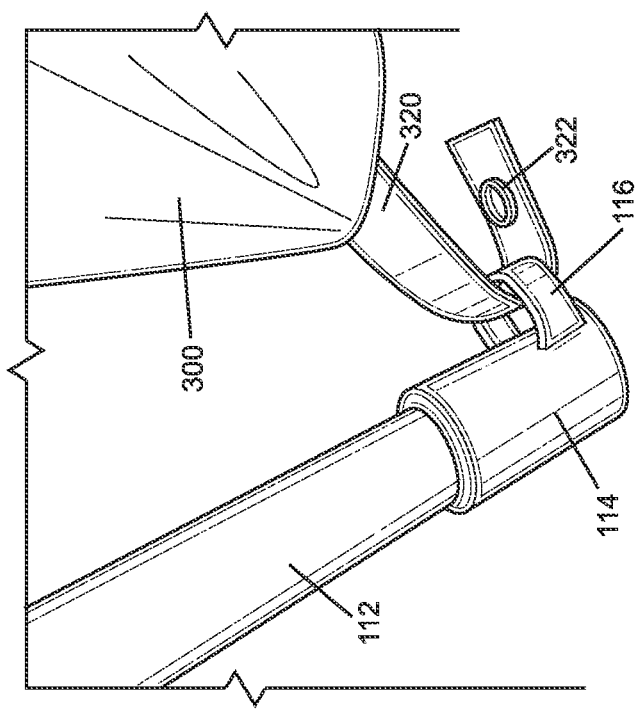
FIG. 21B shows a perspective view of the foot of the leg support assembly attached to the soft goods of FIG. 21A.
Figure 21A:
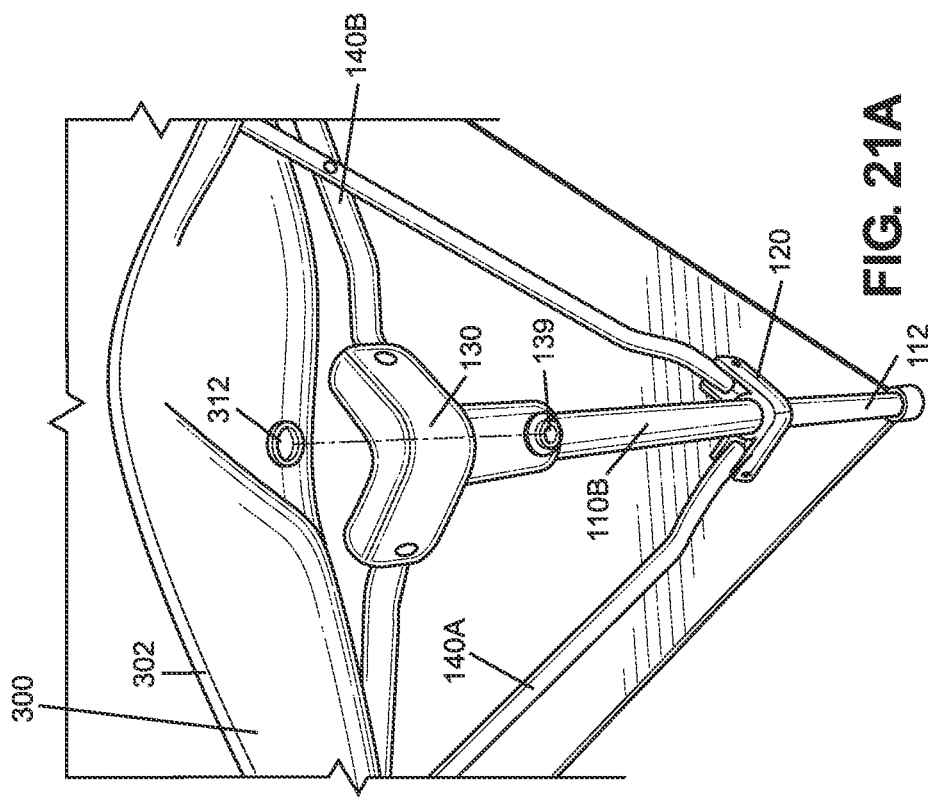
FIG. 21A shows a perspective view of the playard of FIG. 17D with the soft goods partially removed from the leg support assembly.

FIGS. 21A and 21B show the soft goods 300 may attach to the frame 100b in a similar manner as in the frame 100a. Specifically, FIG. 21A shows the soft goods 300 may include a snap-fit connector 312 disposed on an interior portion of the top portion 302 to couple with the snap-fit connector 139 on the corner 130. FIG. 21B shows the foot 114 of each leg support assembly 110b may include a D-ring 116 that provides an opening to tie a tether 320 of the soft goods 300 to the bottom portion of the leg support assemblies 110b. As shown, the tether 320 may form a closed via the snap-fit connector 322 coupled to another snap-fit connector (not shown) disposed at the base of the strap 320.

In yet another example, FIGS. 23A-23E show a playard 1000c with a frame 100c that also outlines an interior space 102 with a horizontal cross-section shaped as a rectangle. However, the frame 100c may include curved leg support assemblies 110c resulting in the interior space 102 having a convex shape. In other words, the leg support assemblies 110c curve outwards from the interior space 102 such that the size of the horizontal cross-section is larger at the mid-point of the leg support assemblies 110c than the top or bottom portions of the leg support assemblies 110c. In some implementations, a convex-shaped interior space 102 may provide the child 50 a larger volume to play and/or sleep compared to an interior space with straight leg support assemblies and the same footprint. Additionally, a convex-shaped interior space 102 may also provide a more aesthetically pleasing design.

Figure 23A:
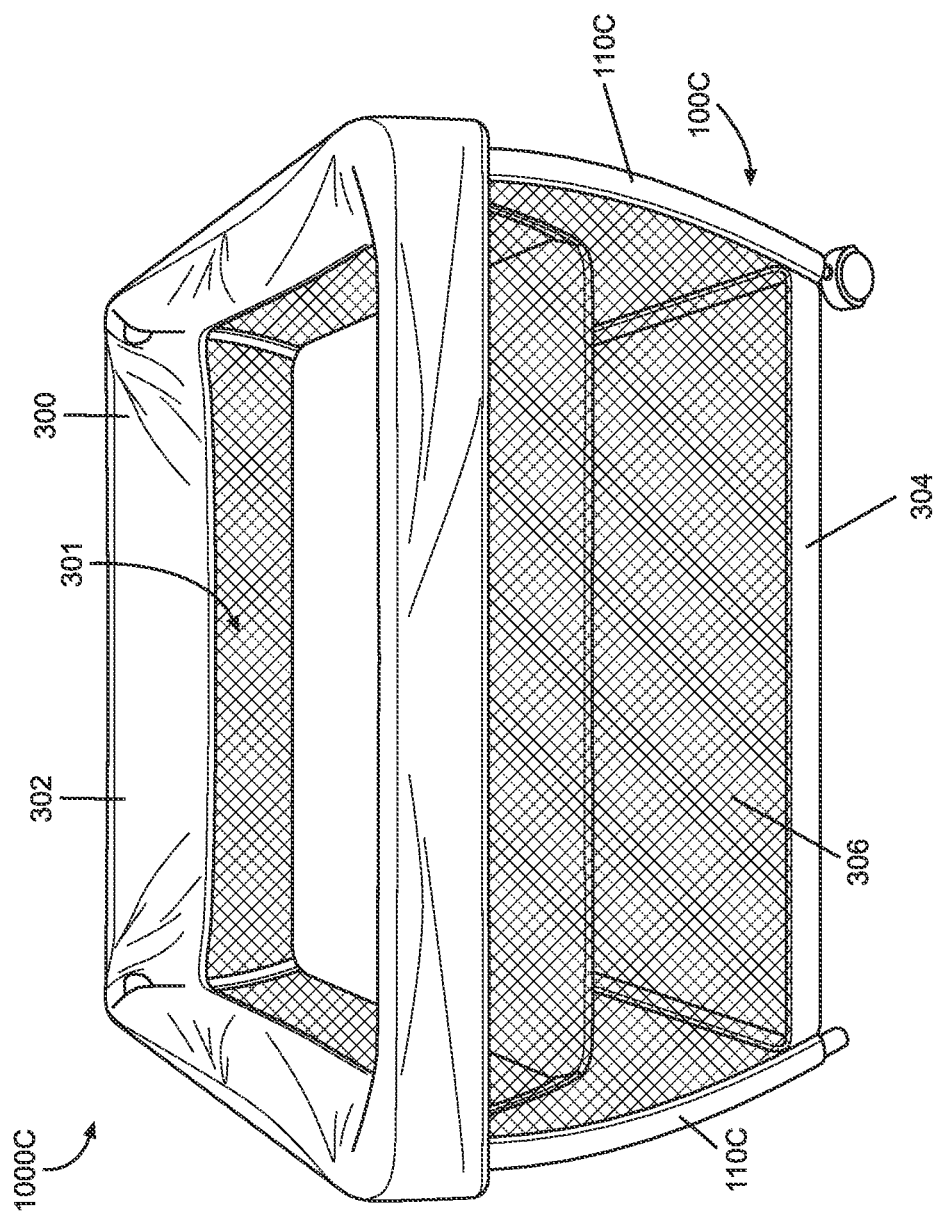
FIG. 23A shows a top, front perspective view of another exemplary playard forming a rectangular, convex-shaped interior space with soft goods. The playard is in an unfolded configuration.

As shown in FIG. 23A, the playard 1000c may also include soft goods 300 that define a partially enclosed space 301 disposed within the interior space 102 of the frame 100c for the child 50 to play and/or sleep. Similar to the playard 1000b, the soft goods 300 in the playard 1000c may include a floor portion 304 and side portions 306 that define and surround the partially enclosed space 301 as well as a top portion 302 that covers the top portion 108 of the frame 100c. The soft goods 300 may include a removable mat placed onto the floor portion 304 to provide padding on the ground 90 supporting the playard 1000c. The side portions 306 may also be formed from a transparent or see-through material. As before, the soft goods 300 may further include a removable mat that is placed onto the floor portion 304 to provide padding.

Figure 23C:
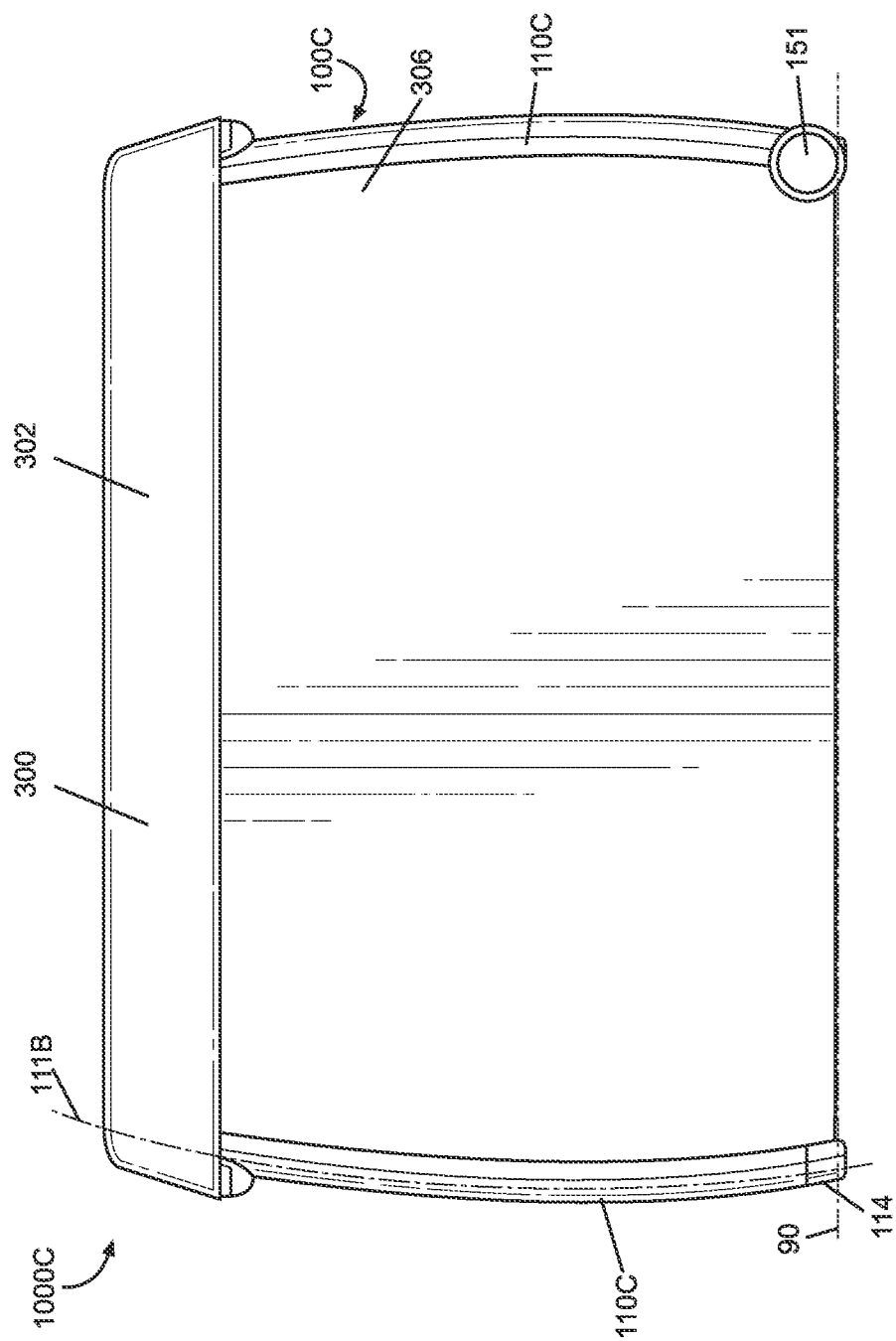
FIG. 23C shows a front view of the playard of FIG. 23B.
Figure 23D:
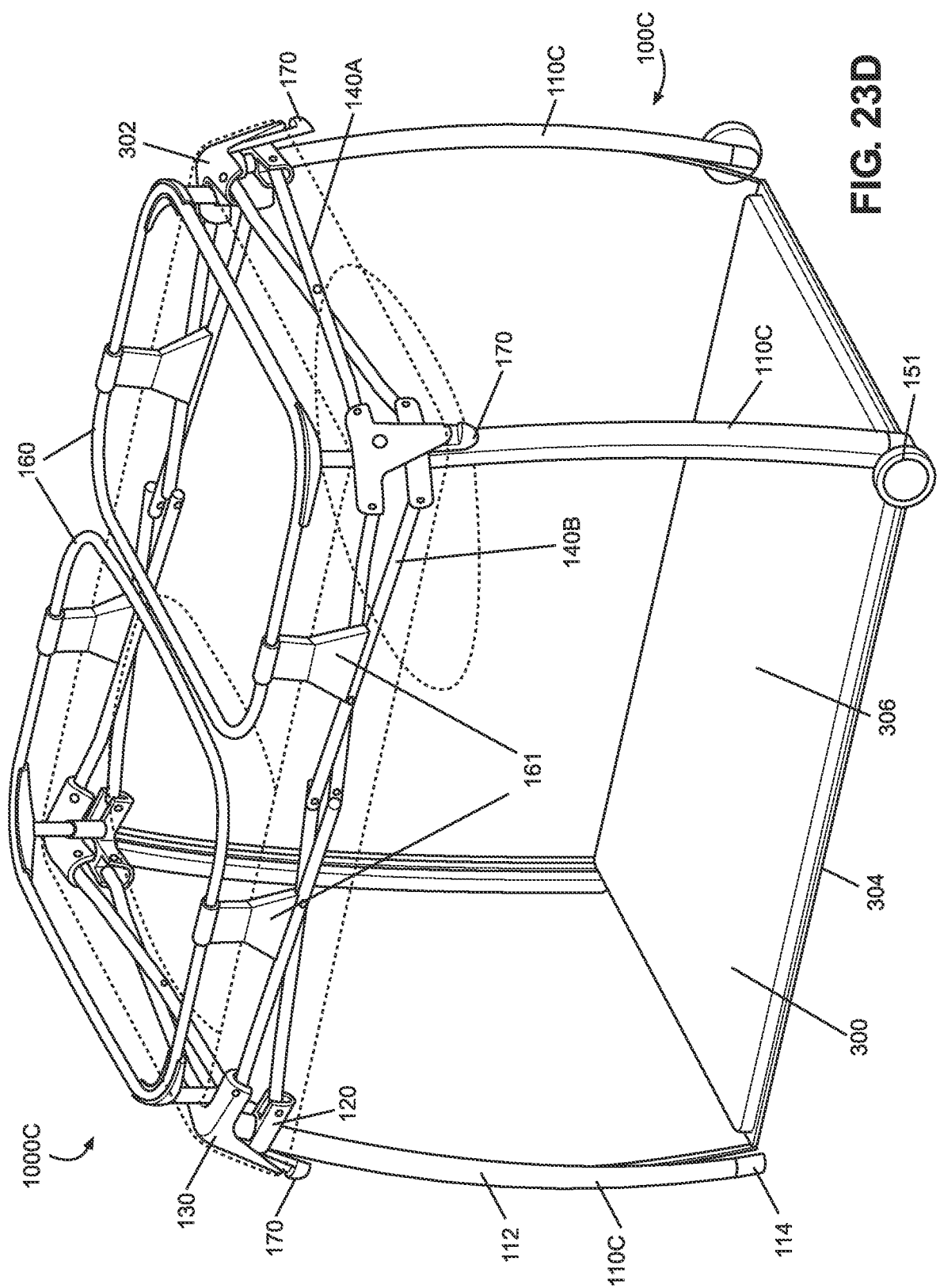
FIG. 23D shows a top perspective view of the playard of FIG. 23B where the soft goods are shown as being transparent.
Figure 23E:
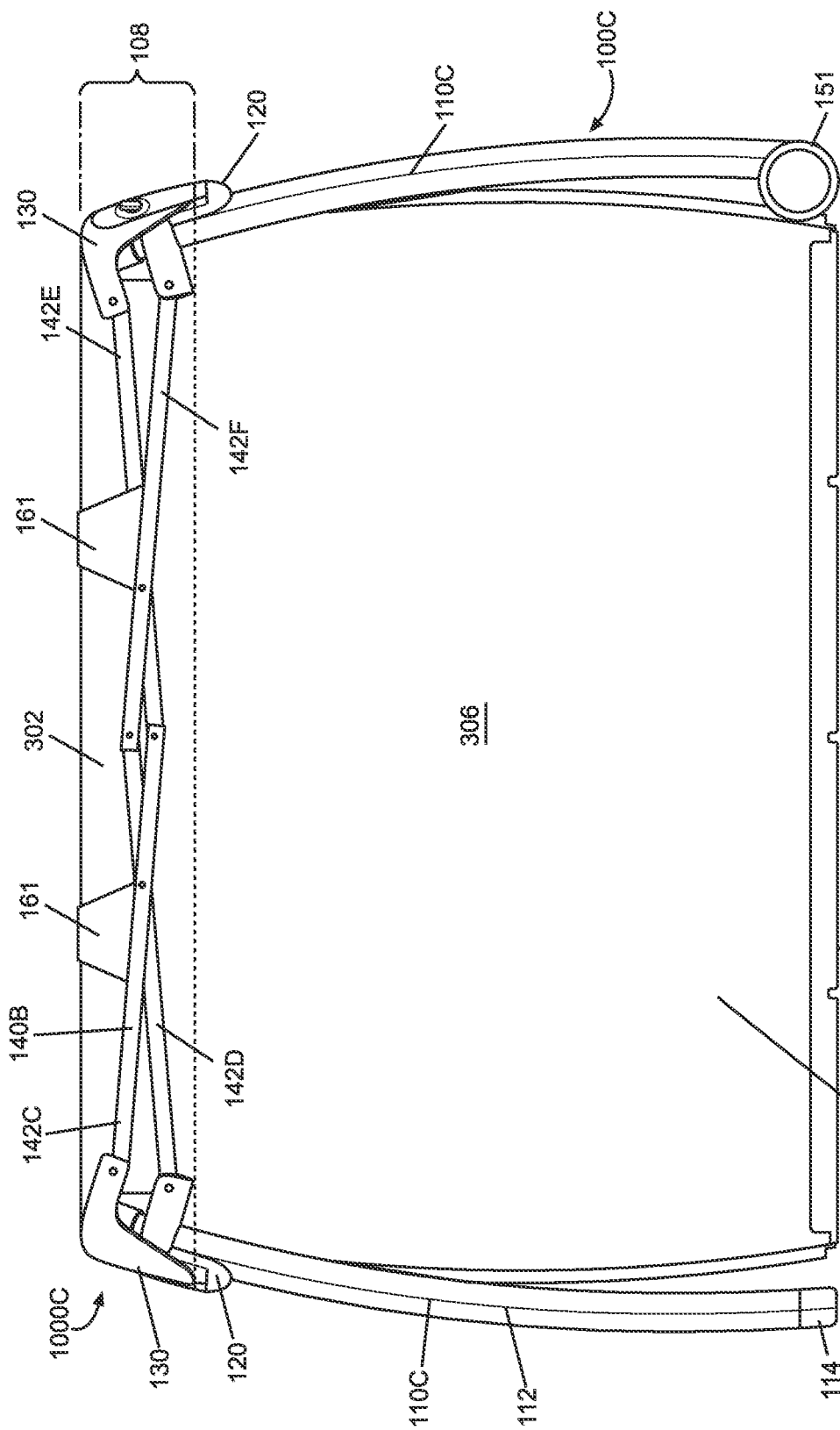
FIG. 23E shows a front view of the playard of FIG. 23D.

As shown in FIGS. 23D and 23E, the frame 100c may include multiple leg support assemblies 110c that each include at least a leg tube 112, a slider 120, and a corner 130. Compared to the leg support assemblies 110a and 110b, the leg tube 112 may be curved along an axis 111b such that the slider 120 moves along a curved path when the frame 100c is folded and/or unfolded. The leg support assemblies 110c may define and/or align with respective side edges 104 of the interior space 102 (see FIG. 24).

The leg support assemblies 110c may further include either a foot 114 to support the playard 1000c on the ground 90 or a wheel assembly 151 to more easily move and/or reorient the playard 1000c after being unfolded. For example, FIG. 23D shows the leg support assemblies 110c at one end of the interior space 102 may both include wheel assemblies 151. Thus, the caregiver may pick up the playard 1000c from the opposing end and pull the playard 1000c with the wheel assemblies 151 rolling along the ground 90 to reposition the playard 1000c as desired.

FIG. 25A shows an exploded view of the leg support assembly 110c with the wheel assembly 151. As shown, the leg tube 112 may once again have a first end 113a and a second end 113b. The corner 130 may be coupled to the top end 113a of the leg tube 112. The wheel assembly 151 may include a base 152 that couples to the bottom end 113b of the leg tube 112. The wheel assembly 151 may further include a wheel 153 that is rotatably coupled to the base 152 via a wheel cover 154. The slider 120 may thus be slidably coupled to the leg tube 112 such that the slider 120 is located between the base 152 of the wheel assembly 151 and the corner 130. FIG. 25A also shows the frame 100c may include a latch mechanism 200j that directly couples the slider 120 to the corner 130, which will be described in more detail below.

FIG. 25B shows an exploded view of the leg support assembly 110c with the foot 114. As shown, the leg tube 112, the slider 120, the corner 130, and the foot 114 may be assembled in a similar manner to the leg support assemblies 110a and 110b as described above.

Figure 24:
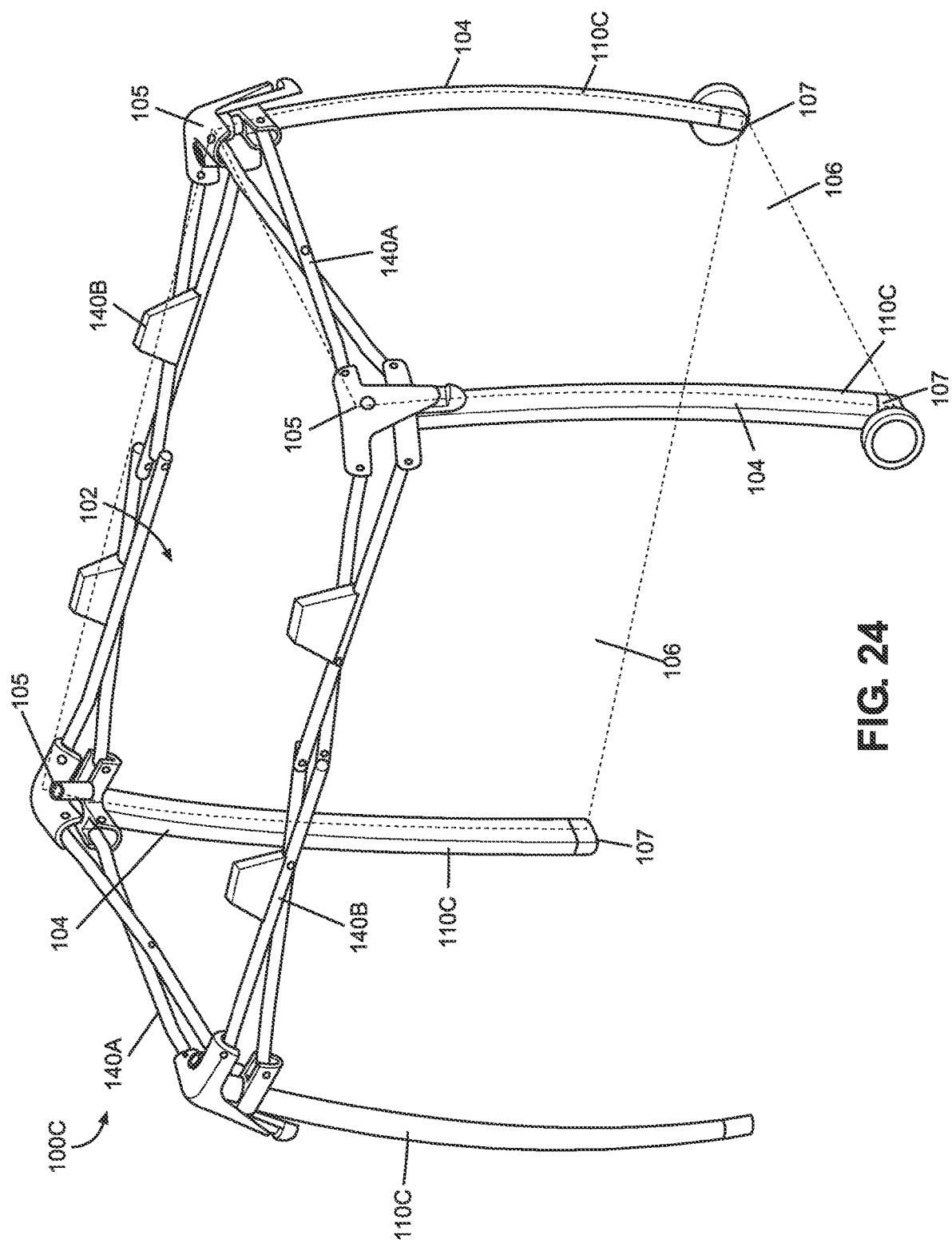
FIG. 24 shows a top perspective view of the playard of FIG. 23B with the soft goods removed.

The frame 100c may further include X-frame assemblies 140a, disposed on the smaller curved side faces 106 of the interior space 102, to couple adjacent leg support assemblies 110c along the shorter sides of the rectangular cross-section of the interior space 102 (see FIG. 24). The frame 100c may also include X-frame assemblies 140b, disposed on the larger curved side faces 106 of the interior space 102, to couple adjacent leg support assemblies 110c along the longer sides of the rectangular cross-section of the interior space 102 (see FIG. 24). As before, the X-frame assemblies 140a may form a single X-frame structure with one pair of X-tubes and the X-frame assemblies 140b may form a double X-frame structure with two pairs of X-tubes.

The shape and/or dimensions of the respective X-tubes in the X-frame assemblies 140a and 140b and/or the location of the pin joints that rotatably couple each X-tube to another X-tube, the slider 120, and/or the corner 130 may be tailored based, in part, on the desired dimensions of the interior space 102 similar to the frame 100b. Additionally, in some implementations, the X-tubes of the X-frame assemblies 140a and 140b may be arranged such that the pin joints that couple the X-tubes to the same slider 120 or corner 130 of the leg support assembly 110c are aligned along the same horizontal plane.

The X-frame assemblies 140a and 140b may once again be disposed within a top portion 108 of the frame 100c and/or the interior space 102. This enables the X-frame assemblies 140a and 140b to function as top rails to mechanically reinforce the frame 100c while also eliminating other support structures, such as a separate top rail and/or a bottom support structure. The placement of the X-frame assemblies 140a and 140b may also provide a larger window for the caregiver to view their child 50 through the sides of the frame 100c.

In some implementations, the soft goods 300 in the playard 1000c may be divided into separate components, in part, to better conform with the geometry of the interior space 102. For example, the side portions 306 and the floor portion 304 may be installed separately from the top portion 302. To better conform with the shape of the interior space 102, the side portions 306 may be mounted along an interior side of the leg tube 112 to reduce or, in some instances, prevent gaps from forming between the side portions 306 and the leg support assemblies 110c (see, for example, FIG. 26A) when the playard 1000c is unfolded. Said in another way, the side portions 306 of the soft goods 300 may be attached to the leg support assemblies 110c to provide a seamless appearance with the leg tubes 112, the feet 114, and/or the wheel assemblies 151 being exposed along the exterior portion of the playard 1000c as shown in FIGS. 23A-23C. Once the side portions 306 and the floor portion 304 of the soft goods 300 are installed, the top portion 302 may then be attached to the side portions 306 using, for example, a $z_1$ pper connection (not shown), and subsequently coupled to the frame 100c to complete assembly.

Figure 26B:
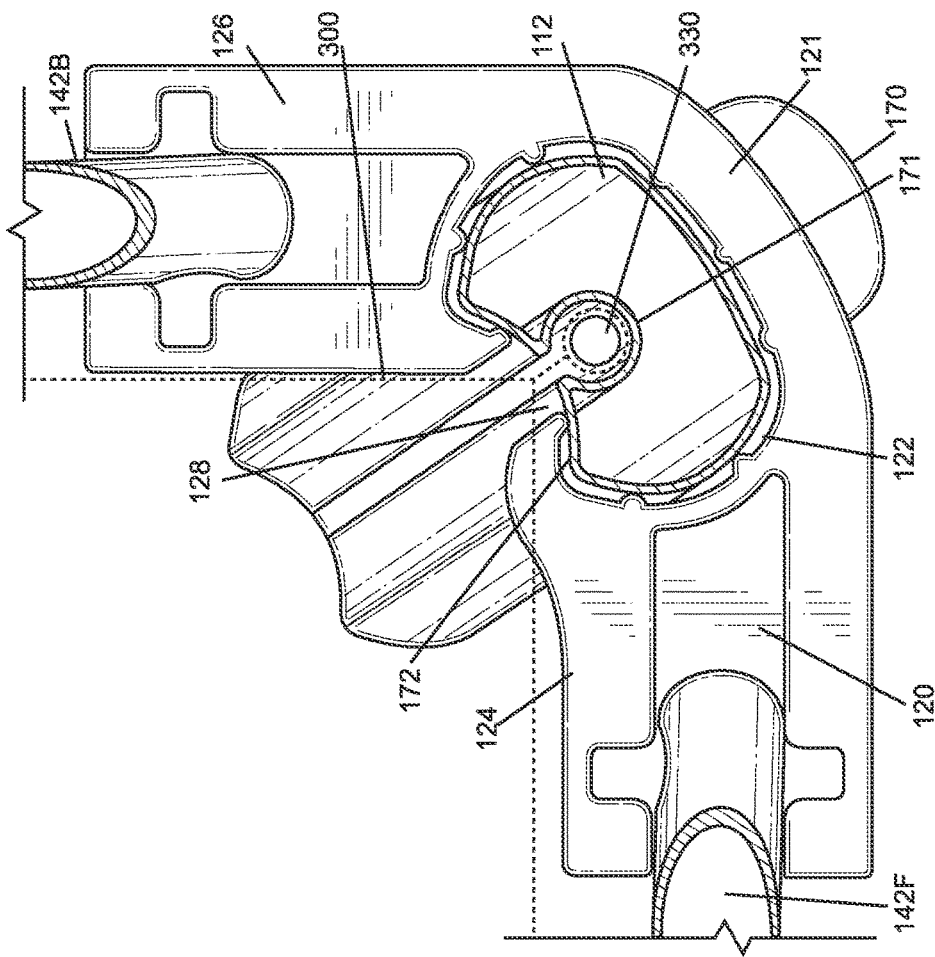
FIG. 26B shows a cross-sectional view of a slider of a leg support assembly in the playard corresponding to the plane A-A of FIG. 26A.
Figure 26A:
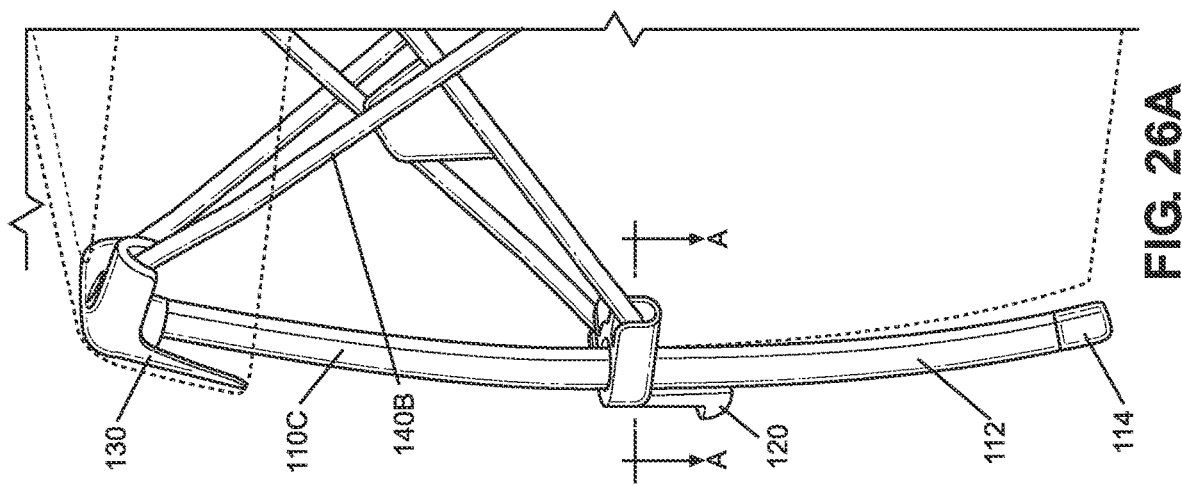
FIG. 26A shows a perspective view of the playard of FIG. 23A in a partially unfolded configuration.

This may be accomplished, in part, by incorporating a stiffener 330 into the side portions 306 of the soft goods 300, which may then the routed through a channel 171 formed along the leg tube 112. The stiffener 330 may be a compliant component, such as an extruded plastic rod that is inserted through a pocket formed along the respective corners of the side portions 306 located near the side edges 104 of the interior space 102. FIG. 26B shows the leg tube 112 may have an oblong cross-sectional shape with a curved side 172 that forms a recess along the interior side of the leg tube 112 facing the interior space 102. The channel 171 may be formed on the curved side 172 and may span a portion of or, in some instances, the entire length of the leg tube 112. As shown in FIG. 26B, the stiffener 330 may be inserted through the channel 171, thus holding the side portions 306 of the soft goods 300 against the leg tube 112.

The slider 120 in the leg support assembly 110c may still be allowed to move along the leg tube 112 even with the side portions 306 of the soft goods 300 installed onto the leg tube 112. For example, FIG. 26B shows the slider 120 may include a base 121 that defines a through hole opening 122 that only partially surrounds the leg tube 112 to guide the movement of the slider 120 along the leg tube 112. As shown, a slotted opening 128 may be formed along an interior side of the base 121 to allow the side portions 306 attached to the leg tube 112 to pass through the base 121 of the slider 120. In this manner, the slider 120 may move along the leg tube 112 unimpeded by the side portions 306 when the playard 1000c is folded and/or unfolded.

FIG. 26B further shows the slider 120 may once again include extended portions 124 and 126 disposed on opposing sides of the base 121 to couple to respective X-tubes of the X-frame assemblies 140a and 140b (e.g., X-tubes 142f and 142b).

Figure 27A:
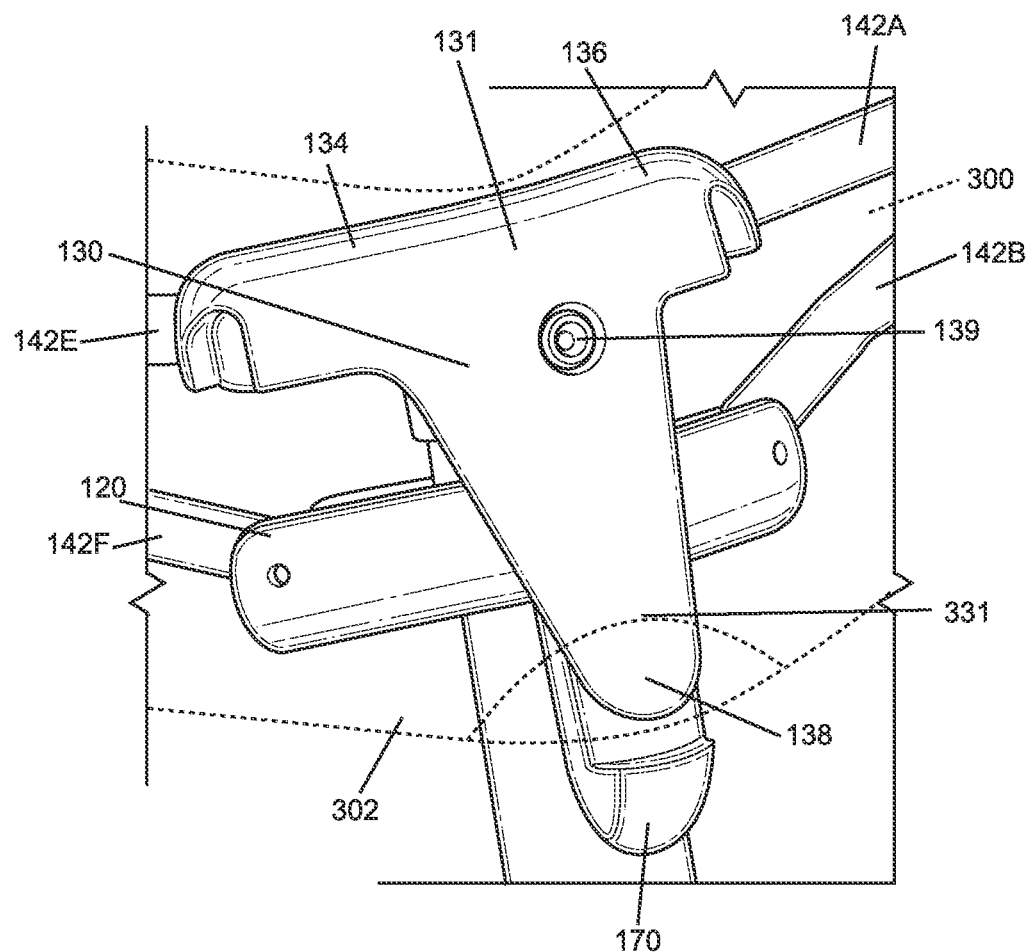
FIG. 27A shows a magnified view of the slider and a corner of the leg support assembly in the playard of FIG. 23A.

FIG. 27A shows the corner 130 may once again include a base 131 with extended portions 134 and 136 disposed on opposing sides of the base 131 to couple to respective X-tubes of the X-frame assemblies 140a and 140b (e.g., X-tubes 142e and 142a). The corner 130 may further include a tab 138 that extends downwards along the leg tube 112 and outwards from the frame 100c to form an overhang portion. As shown in FIG. 27A, the slider 120 may be positioned underneath the overhang portion formed by the tab 138 and, hence, disposed between the leg tube 112 and the tab 138 of the corner 130 when the frame 100c is unfolded.

The corner 130 may be shaped in this manner to provide a hook structure for the top portion 302 of the soft goods 300 to wrap around, thus ensuring the corners 130 and the X-frame assemblies 140a and 140b are covered. In some implementations, the top portion 302 of the soft goods 300 may further include a pocket 331 to aid the caregiver in wrapping the soft goods 300 around the corners 130. Additionally, the soft goods 130 may primarily contact only the exterior surfaces of the corner 130, which may allow the corners of the playard 1000c to have a softer, gentler appearance. For example, the base 131 and the tab 138 of the corner 130 may have a smooth rounded shape for the top portion 302 of the soft goods 300 to wrap around. The top portion 302 of the soft goods 300 may include a snap-fit connector 312 disposed along an interior portion of the top portion 302 that couples to a corresponding snap-fit connector 139 on the corner 139 as shown in FIGS. 27B and 27C.

In some implementations, the slider 120 may also include a rounded bottom section 170 positioned underneath the overhang portion of the tab 138 when the frame 100c is unfolded. As shown in FIGS. 26B and 27A, the rounded bottom section 170 may extend further outwards from the frame 100c than the tab 138 of the corner 130 to provide a lead-off feature to reduce or, in some instances, prevent a string or another tethered object from becoming entangled with the overhang portion of the corner 130.

As described above, the frame 100c may include the latch mechanism 200j to lock the frame 100c in the unfolded configuration by engaging the slider 120 of one leg support assembly 110c to the corresponding corner 130. Generally, the frame 100c may include one or more of the latch mechanisms 200j. For example, FIG. 28A shows the playard 1000c may include a single latch mechanism 200j coupled to one leg support assembly 110c. However, in other implementations, the playard 1000c may include another latch mechanism 200j coupled to another leg support assembly 110c on an opposite corner of the playard 1000c to ensure the frame 100c is evenly unfolded.

Figure 28B:
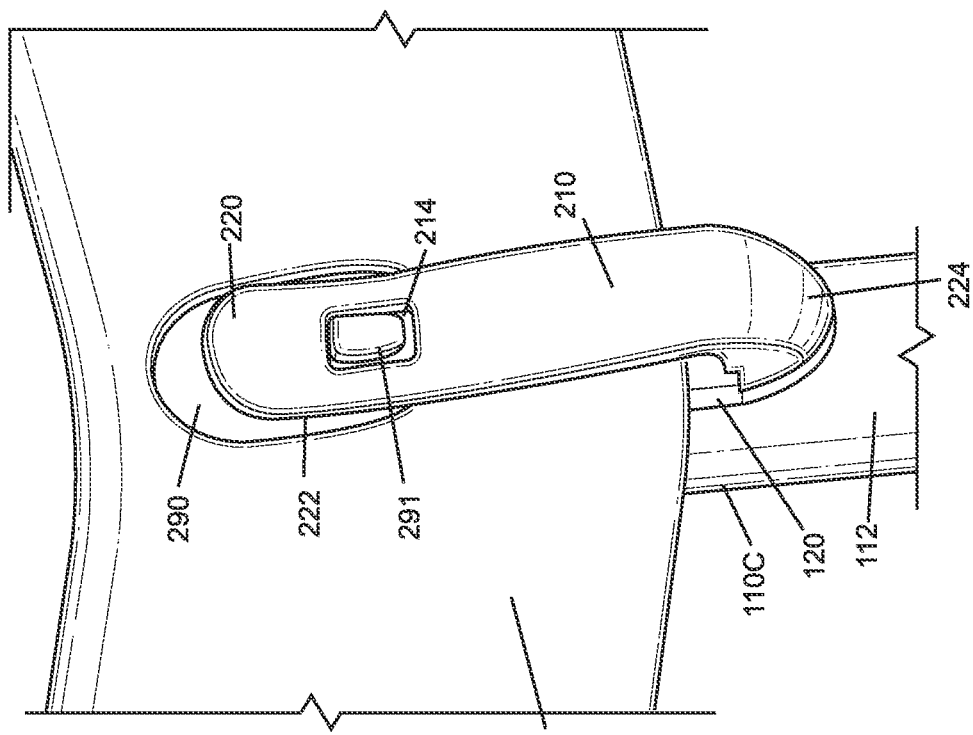
FIG. 28B shows a magnified view of the latch member of the latch mechanism of FIG. 28A.
Figure 28A:
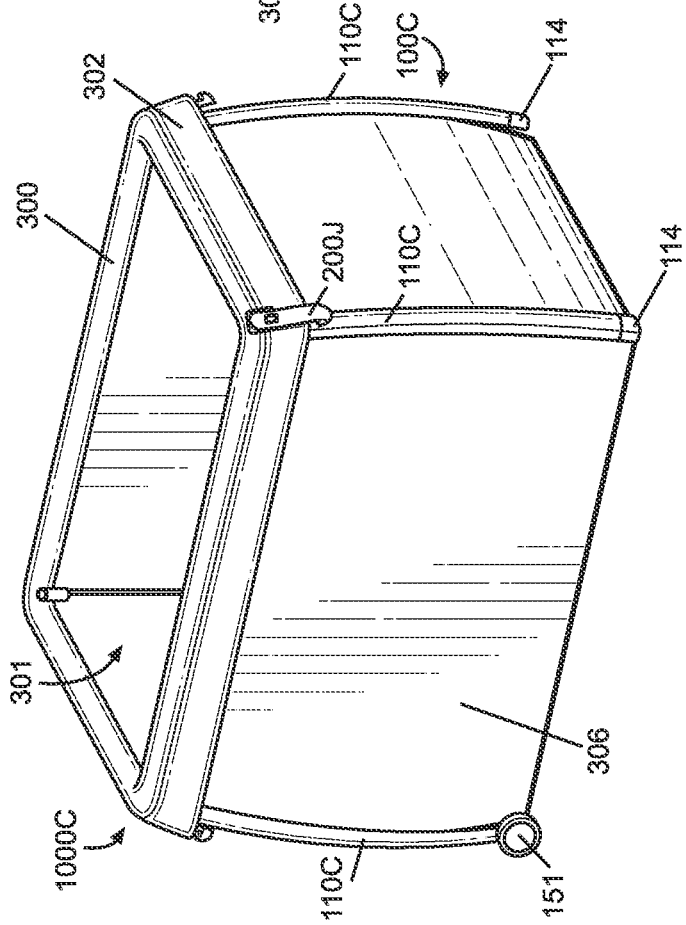
FIG. 28A shows a top perspective view of the playard of FIG. 23A with a snap-fit latch mechanism disposed over the soft goods.
Figure 28C:
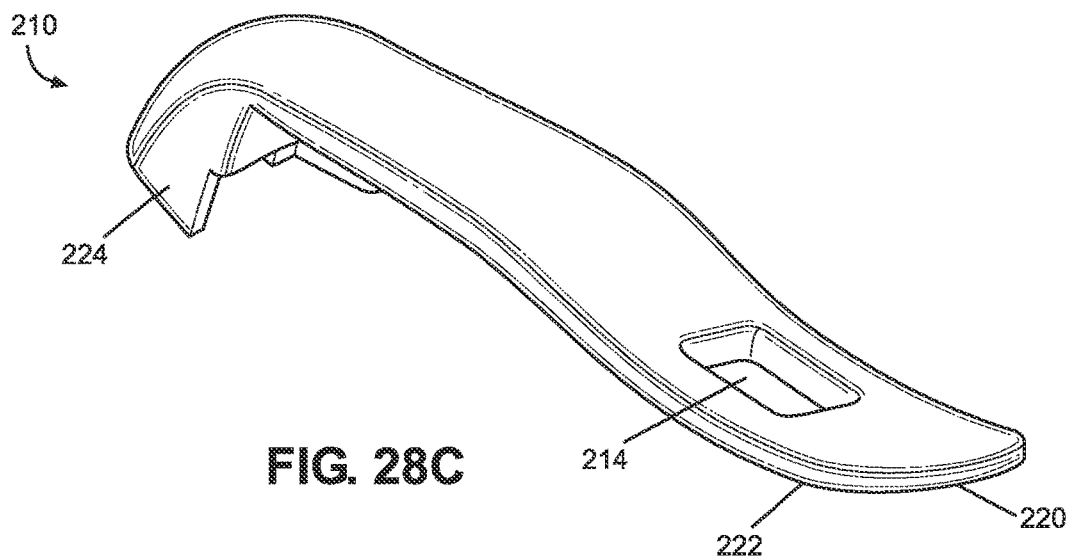
FIG. 28C shows a perspective of a latch member in the latch mechanism of FIG. 28A.

FIG. 28B shows the latch mechanism 200j may include a latch member 210 with a mounting base 224 at one end that is rigidly coupled to the slider 120 and a latch opening 214 disposed at an opposing end (see FIG. 28C) to receive a latch catch 291 disposed on the corner 130. The latch member 210 may be a mechanically compliant component with sufficient mechanical rigidity such that a restoring force is generated when the latch member 210 is bent and/or deflected. The latch member 210 may further include a tab 220, which may be pulled to bend the latch member 210 outwards from the frame 100c to release the latch member 210 from the latch catch 291. Additionally, the latch member 210 may include a lead-in portion 222 to facilitate engagement of the latch member 210 to the latch catch 291 when unfolding the playard 1000c.

FIG. 28B further show the latch mechanism 200j may be locked and/or unlocked with the soft goods 300 and, in particular, the top portion 302 covering the top portion 108 of the frame 100c. As shown, the latch catch 291 may protrude through an opening formed on the top portion 302 of the soft goods 300. The latch member 210 may be disposed over the top portion 302 when engaging with the latch catch 291. Thus, the latch member 210 may be left exposed. Furthermore, the internal restoring force generated by the latch member 210 may also cause at least a portion of the latch member 210 (e.g., the tab 220, the lead-in feature 222) to press onto the top portion 302 of the soft goods 300, thus further restraining the soft goods 300 against the corner 130. In other words, the latch member 210 may function as an integral escutcheon when engaged with the latch catch 291.

Figure 29A:
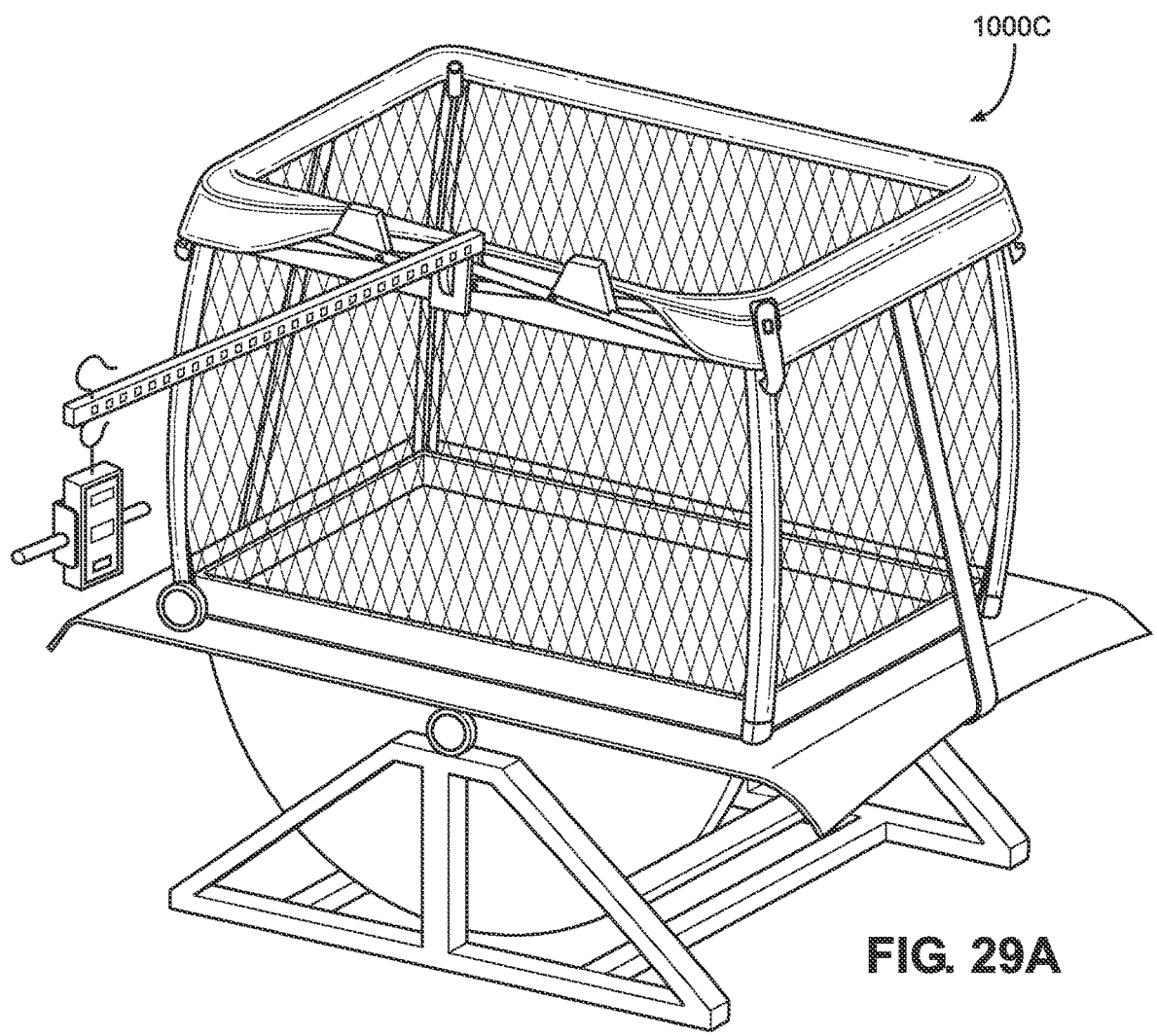
FIG. 29A shows a top rail to corner post attachment test being performed on the playard of FIG. 23A.
Figure 29B:
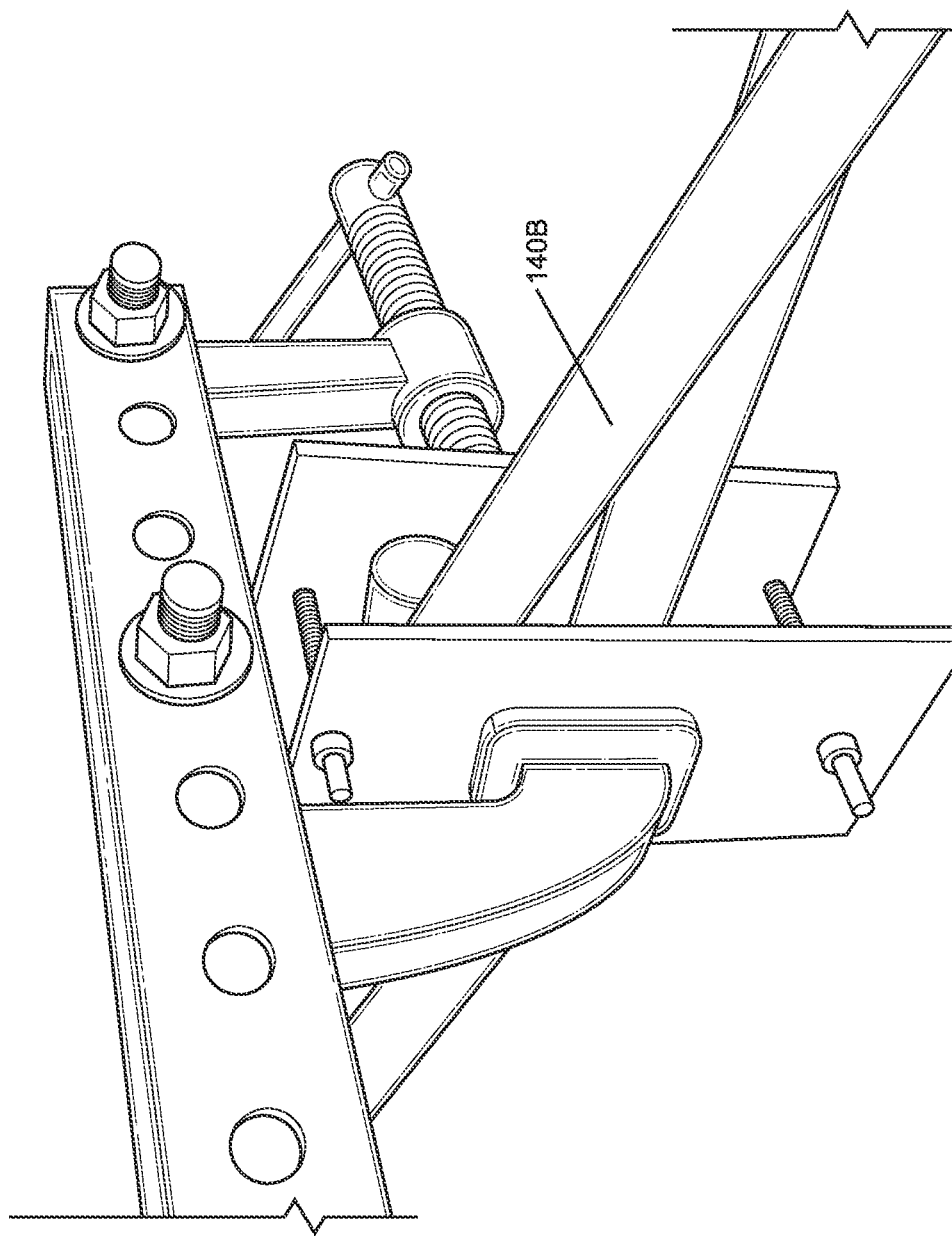
FIG. 29B shows a testing apparatus mounted to the double X-frame assembly in the playard of FIG. 23A.
Figure 29C:
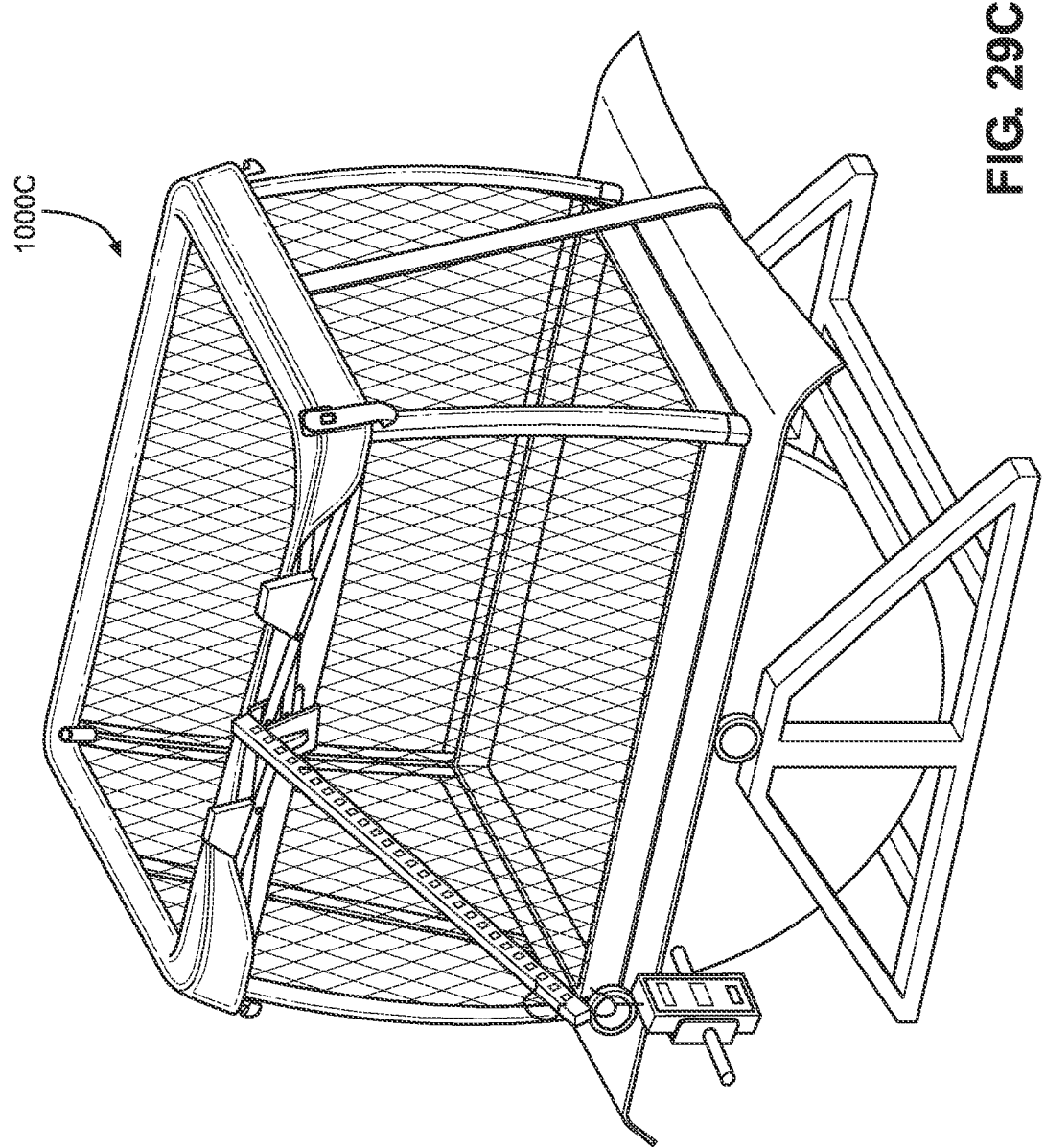
FIG. 29C shows the playard after conducting the test of FIG. 29A.
Figure 29D:
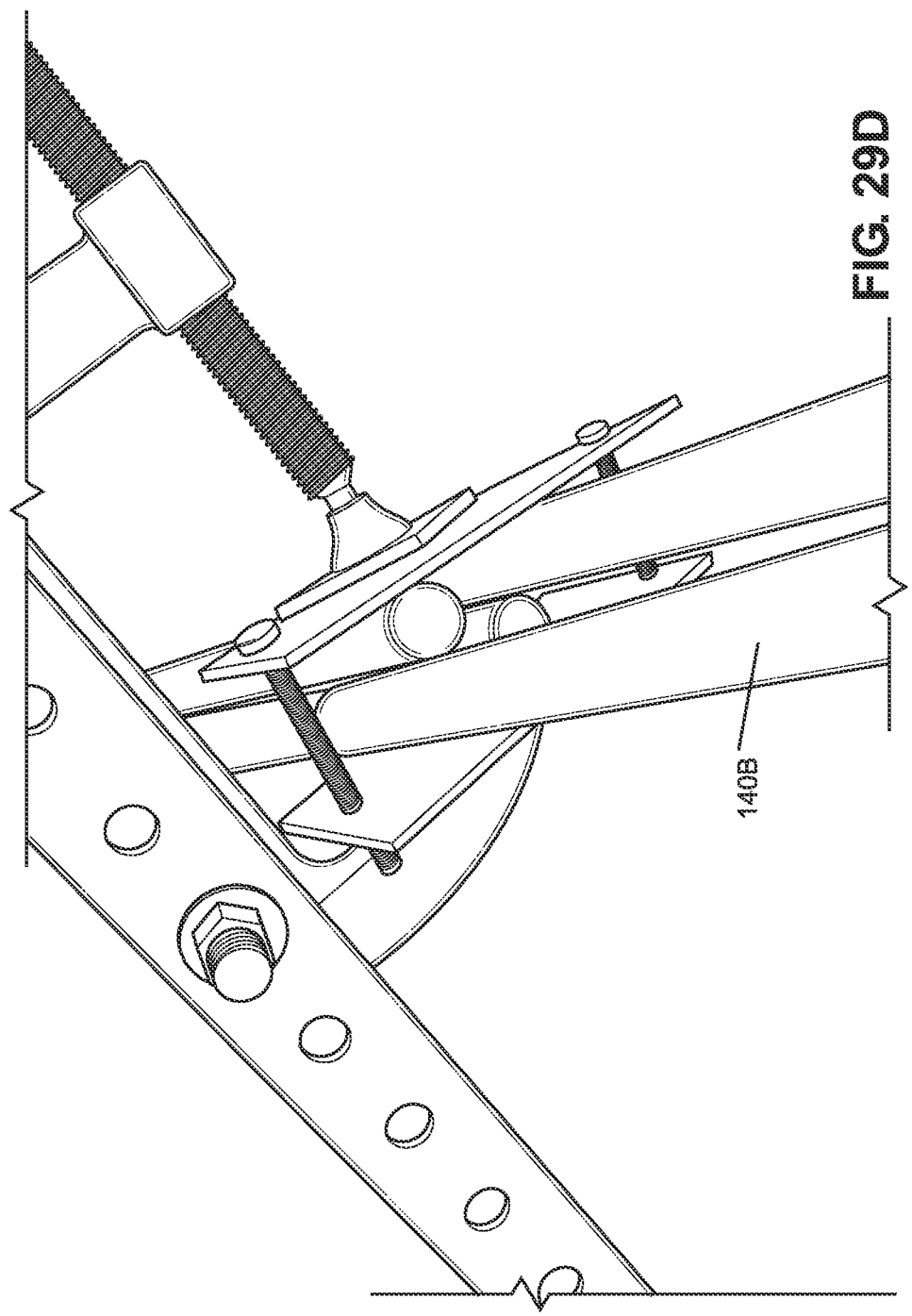
FIG. 29D shows the testing apparatus mounted to the double X-frame assembly in the playard of FIG. 23A.

Similar to the playards 1000a and 1000b, the frame 100c of the playard 1000c may only include the leg support assemblies 110c and the X-frame assemblies 140a and 140b. In some implementations, the frame 100c may exhibit sufficient mechanical rigidity, stability, and strength to satisfy various consumer safety standards (e.g., ASTM F406-19). For example, FIGS. 29A-29D show the playard 1000c being subjected to a Top Rail to Corner Post Attachment test as set defined under ASTM F406-19, 7.11 and 8.30. As shown in FIGS. 29A and 29B, a torque is applied to one of the X-frame assemblies 140b by clamping a 24 inch long rod to the X-tubes of the X-frame assembly 140b and hanging a 15-20 lb weight onto the end of the rod. FIGS. 29C and 29D show that after applying the torque load for at least 10 seconds, the X-tubes of the X-frame assembly 140b were deformed, but the sliders 120 and the corners 130 coupled to the X-tubes did not crack and/or otherwise break, thus satisfying the requirements under ASTM F406-19, 7.11.

Figure 30A:
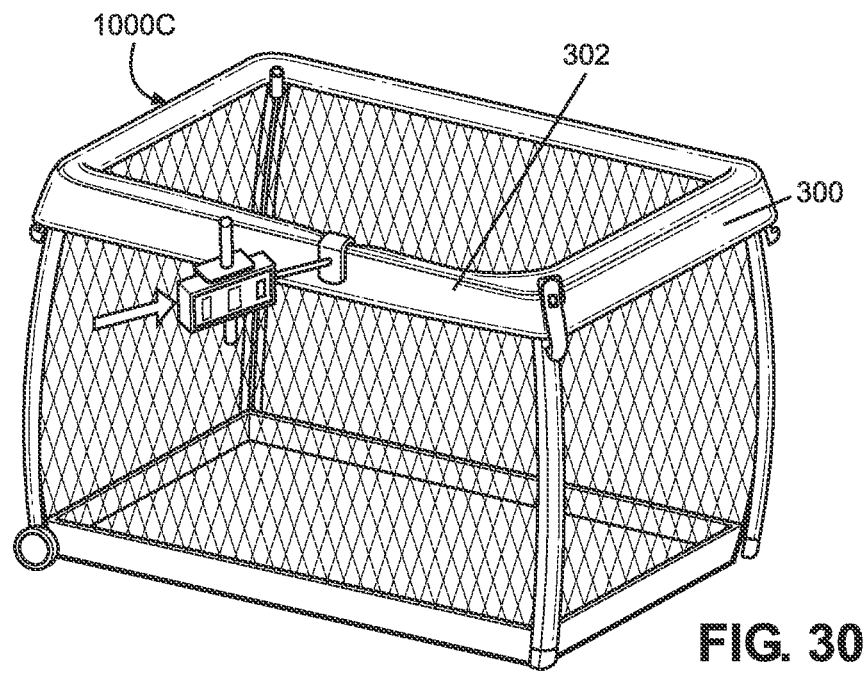
FIG. 30A shows a strength test being applied to the double X-frame assembly in the playard of FIG. 23A.
Figure 30B:
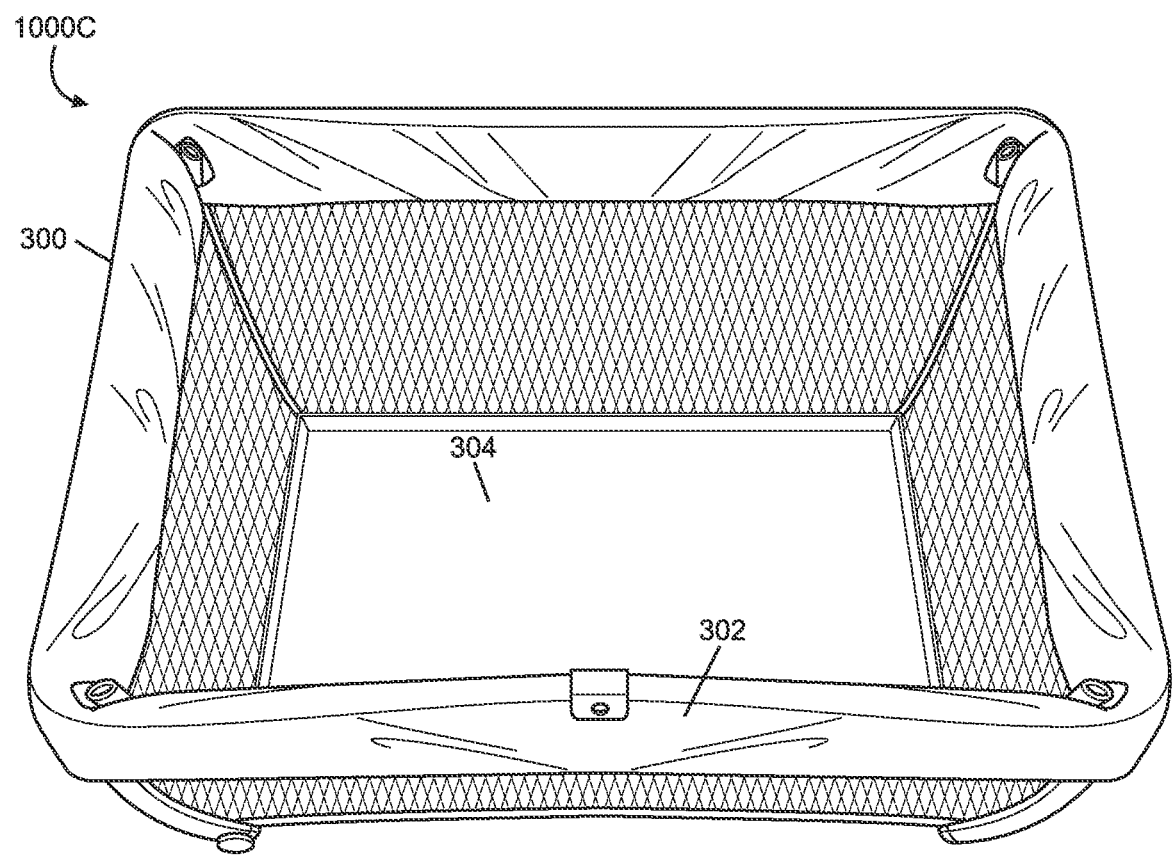
FIG. 30B shows the playard of FIG. 30A after the strength test.

FIGS. 30A-30C show the playard 1000c being subjected to another test to evaluate the mechanical strength and robustness of the X-frame assembly 140b under ASTM F406-19, 7.3.3 and 8.11.2.4. As shown in FIG. 30A, a 100 lbf force was applied to the center of the X-frame assembly 140b at a 45 degree angle relative to the floor for at least 15 seconds. FIGS. 30B and 30C show the X-tubes of the X-frame assembly 140b were deformed and the rolled rivet joints connecting the X-tubes together were bent. However, the X-tubes, the rolled rivet joints, and the corners and sliders of the leg support assemblies did not crack and/or otherwise break, thus satisfying the requirements under ASTM F406-19, 7.3.3.

FIG. 31 further shows the playard 1000c being subjected to a stability test where the playard 1000c was placed onto playform and a load was applied to one side of the playard 1000c from within the partially enclosed space 301. Similar to the playards 1000a and 1000b, it was found at least three of the feet 114 and/or the wheels 151 of the playard 1000c maintained contact with the underlying platform when the playard 1000c was rotated more than 10 degrees, thus satisfying the requirements under ASTM F406-19 for stability.

In some implementations, the foldable playard, when deployed, may also provide a platform to support various accessories (also referred to herein as a "topper") to augment the functionality of the playard. For example, FIG. 23D shows the frame 100c of the playard 1000c may include one or more topper supports 161 disposed on the respective X-tubes of the X-frame assemblies 140b. The combination of the topper supports 161 and the corners 130 of the leg support assemblies 110c may support one or more toppers 160 placed onto the top portion 108 of the frame 100c when the playard 1000c is in the unfolded configuration. The toppers 160 may be various accessories including, but not limited to a changing table, a bassinet, and a bouncer.

In another example, FIGS. 32A-32F show the frame 100a in the unfolded configuration with a canopy cover assembly 400a. The canopy cover assembly 400a may be coupled to the frame 100a and disposed, in part, above the interior space 102 of the frame 100a to support a canopy cover 440 (see, for example, FIG. 32E) that covers the interior space 102. The canopy cover 440 may be a compliant and/or flexible component formed from, for example, a textile material. For example, the playard 1000a may be deployed in an outdoor setting, thus the canopy cover 440 may provide shade for the child 50 when placed in the partially enclosed space 301 of the playard 1000a.

Figure 32A:
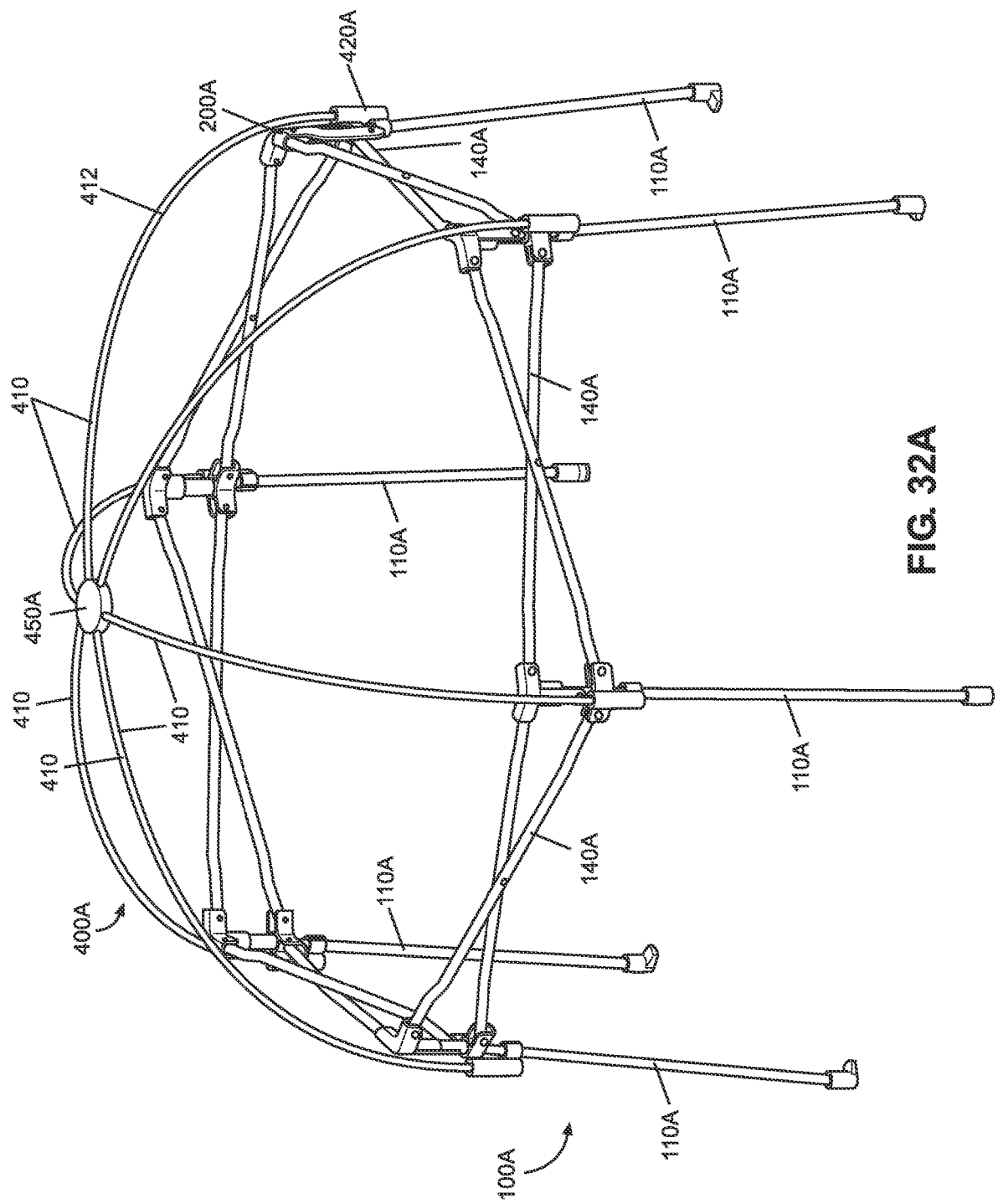
FIG. 32A shows a top perspective view of the playard of FIG. 2A with an exemplary canopy cover assembly that covers the entire interior space of the playard. The canopy cover is not shown.
Figure 32B:
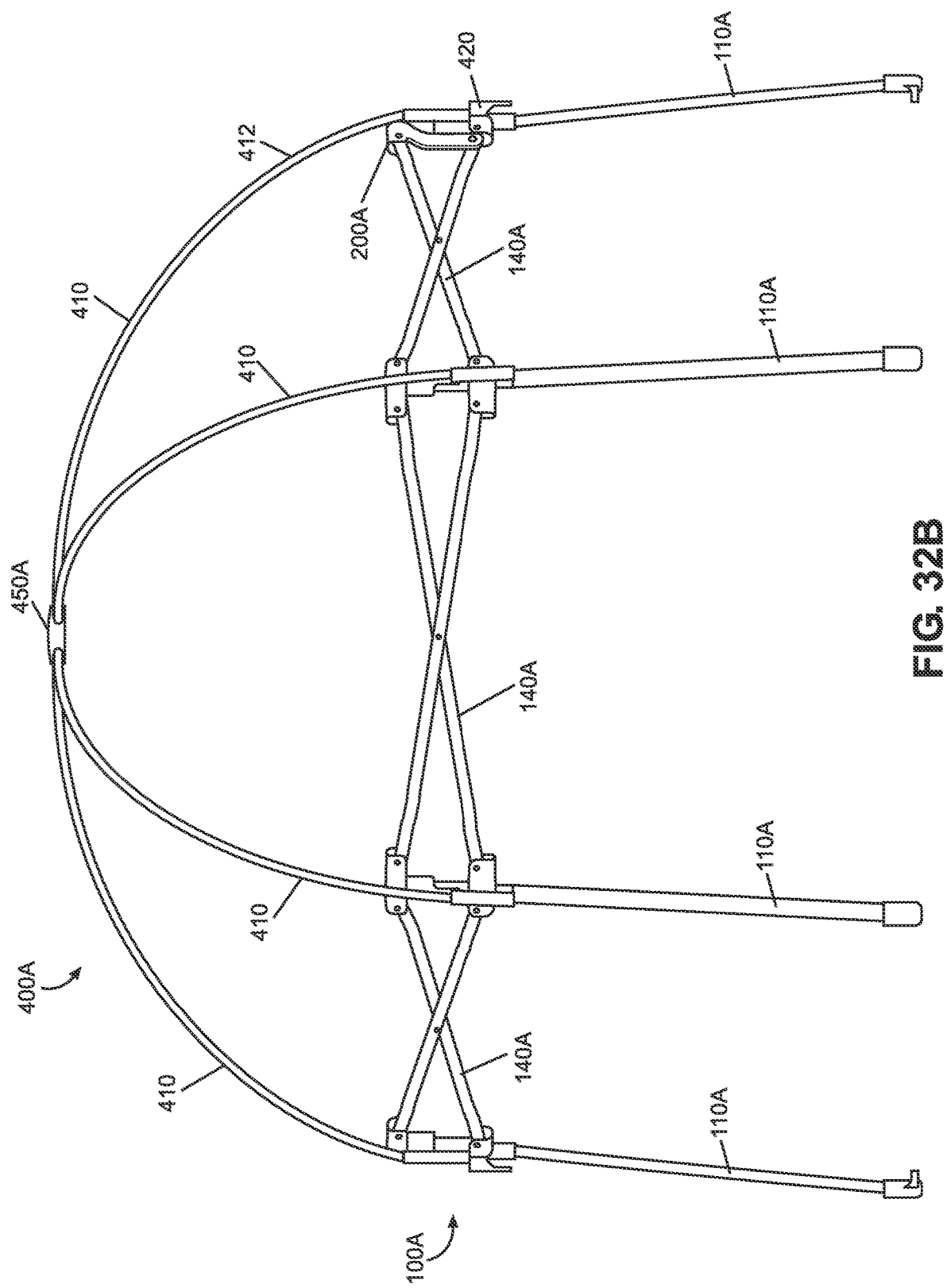
FIG. 32B shows a front view of the playard and the canopy cover assembly of FIG. 32A.
Figure 32C:
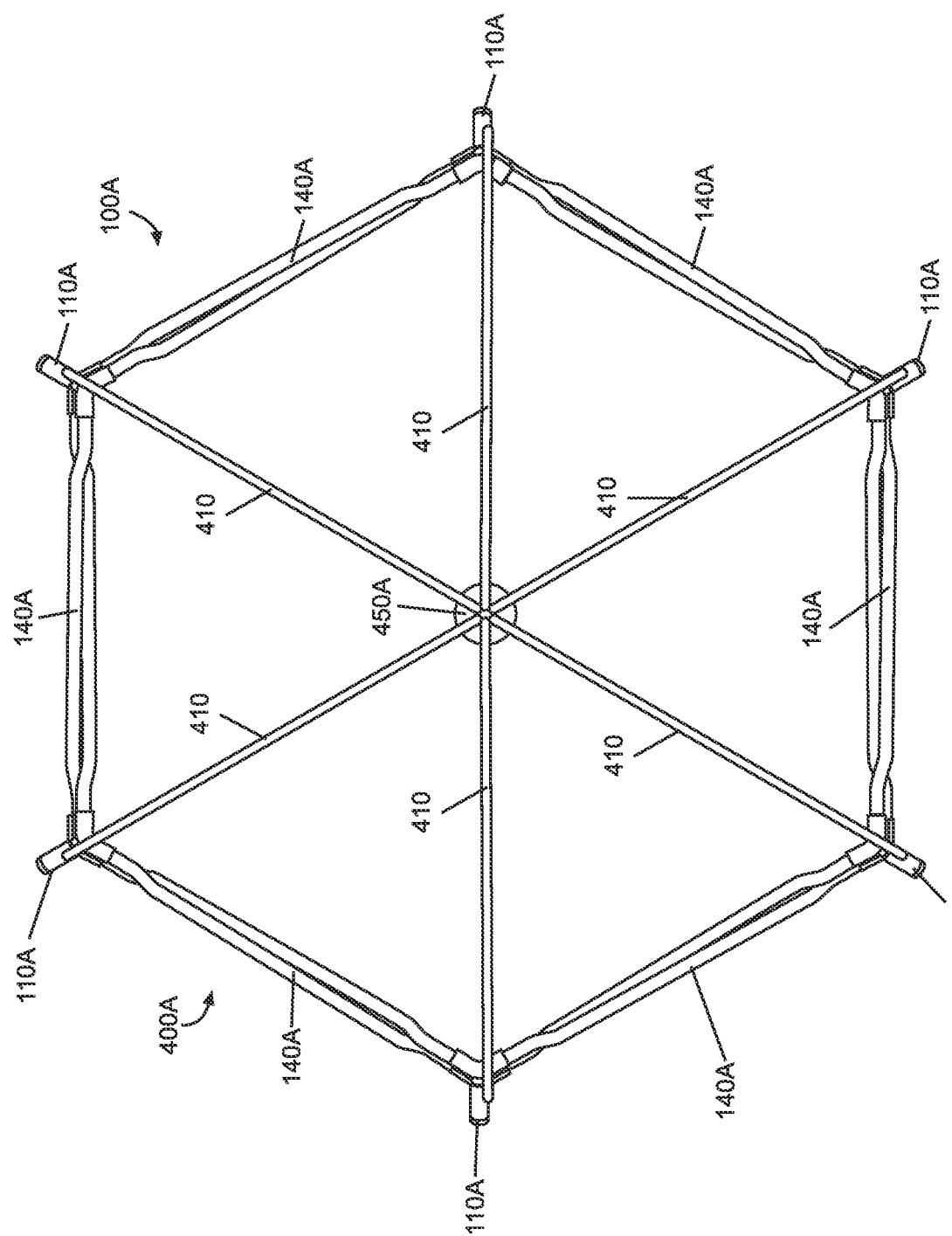
FIG. 32C shows a top view of the playard and the canopy cover assembly of FIG. 32A.

As shown in FIGS. 32A-32C, the canopy cover assembly 400a may include multiple canopy support assemblies 410 that couple to each leg support assembly 110a of the frame 100a. Thus, the canopy cover assembly 400a may fully cover the interior space 102 (i.e., the canopy cover assembly 400a is a full canopy cover). In some implementations, the canopy support assemblies 410 may be substantially identical or identical with the other canopy support assemblies 410.

Each canopy support assembly 410 may include a canopy bow 412 partially disposed above the interior space 102 to support the canopy cover 440 and a canopy clip 420a to couple the canopy bow 412 to the frame 100a. For the canopy cover assembly 400a, the canopy bows 412 from each canopy support assembly 410 may be coupled together via a hub 450a disposed above the interior space 102 as shown in FIG. 32A. In some implementations, the hub 450a may be approximately aligned or aligned to the center of the interior space 102 when the canopy cover assembly 400a is mounted to the frame 100a, as shown in FIG. 32C. FIG. 32B further shows the respective canopy bows 412 of the canopy support assemblies 410 may form a frame or support structure where each canopy bow 412 is bent, in part, to define the desired shape of the canopy cover 440 when the canopy cover 440 is installed onto the canopy support assemblies 410.

Figure 32D:
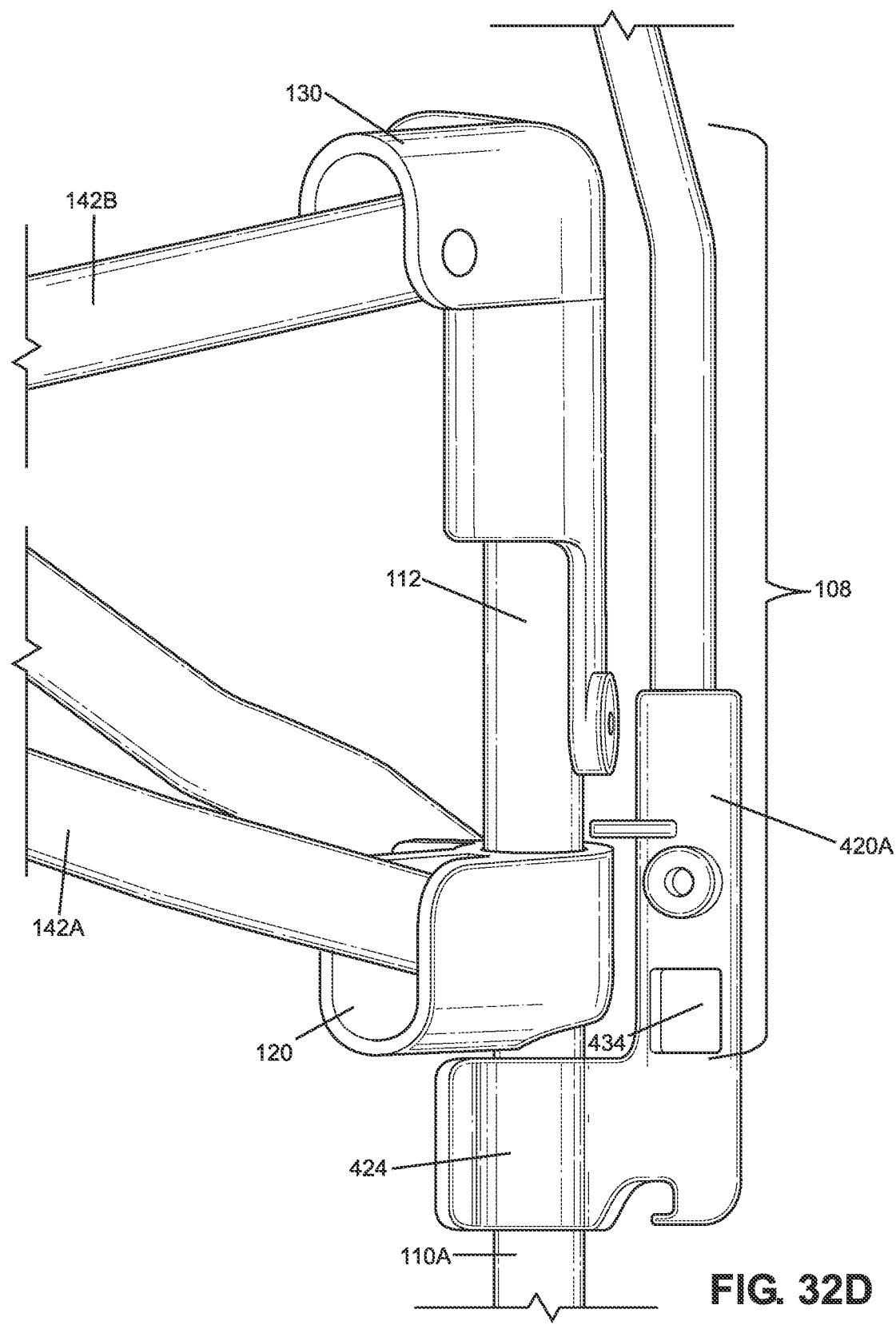
FIG. 32D shows a magnified view of a canopy clip of a canopy support assembly in the canopy cover assembly of FIG. 32A coupled to the leg support assembly of the playard.
Figure 32E:
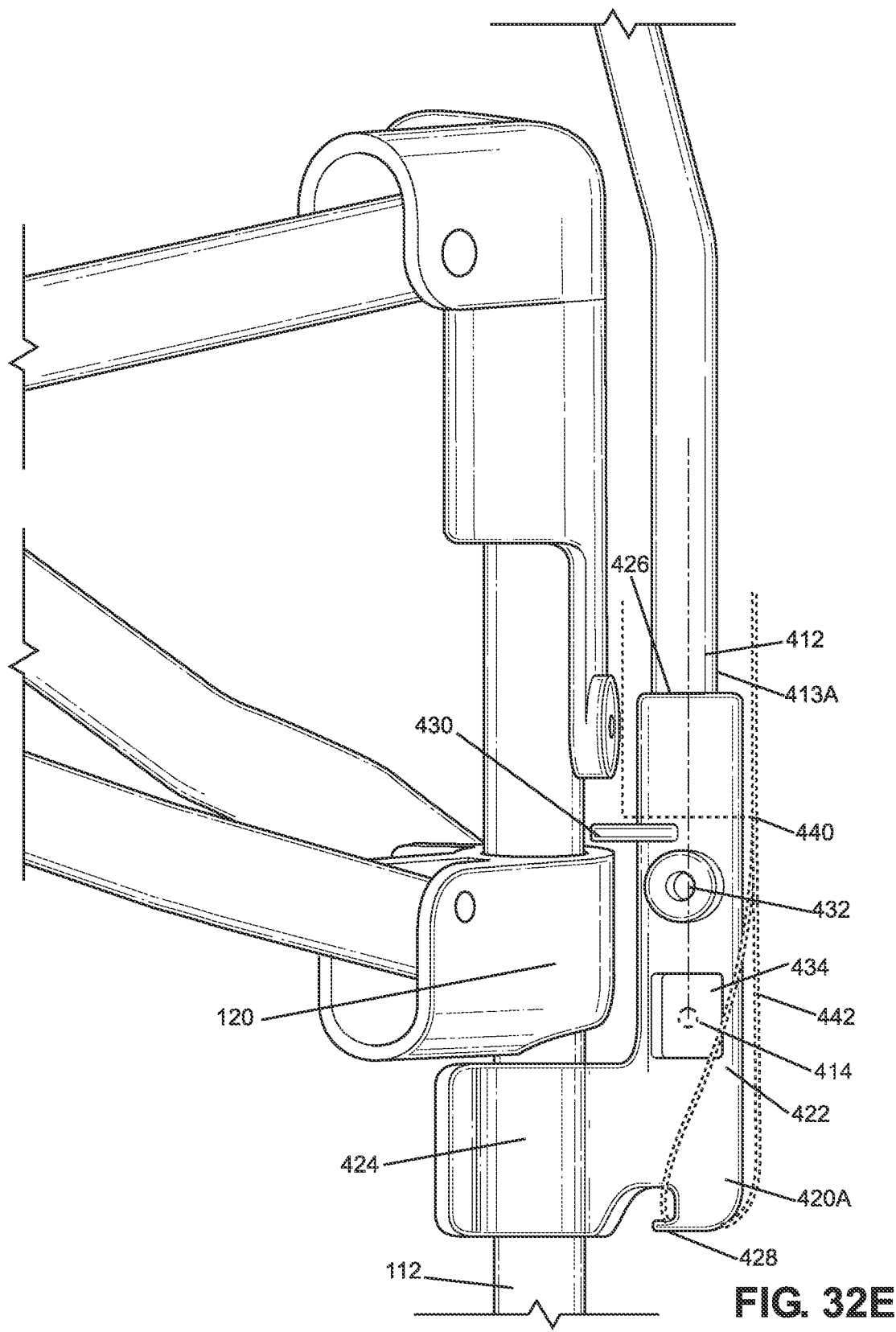
FIG. 32E shows a magnified view of the canopy clip of FIG. 32D.
Figure 32F:
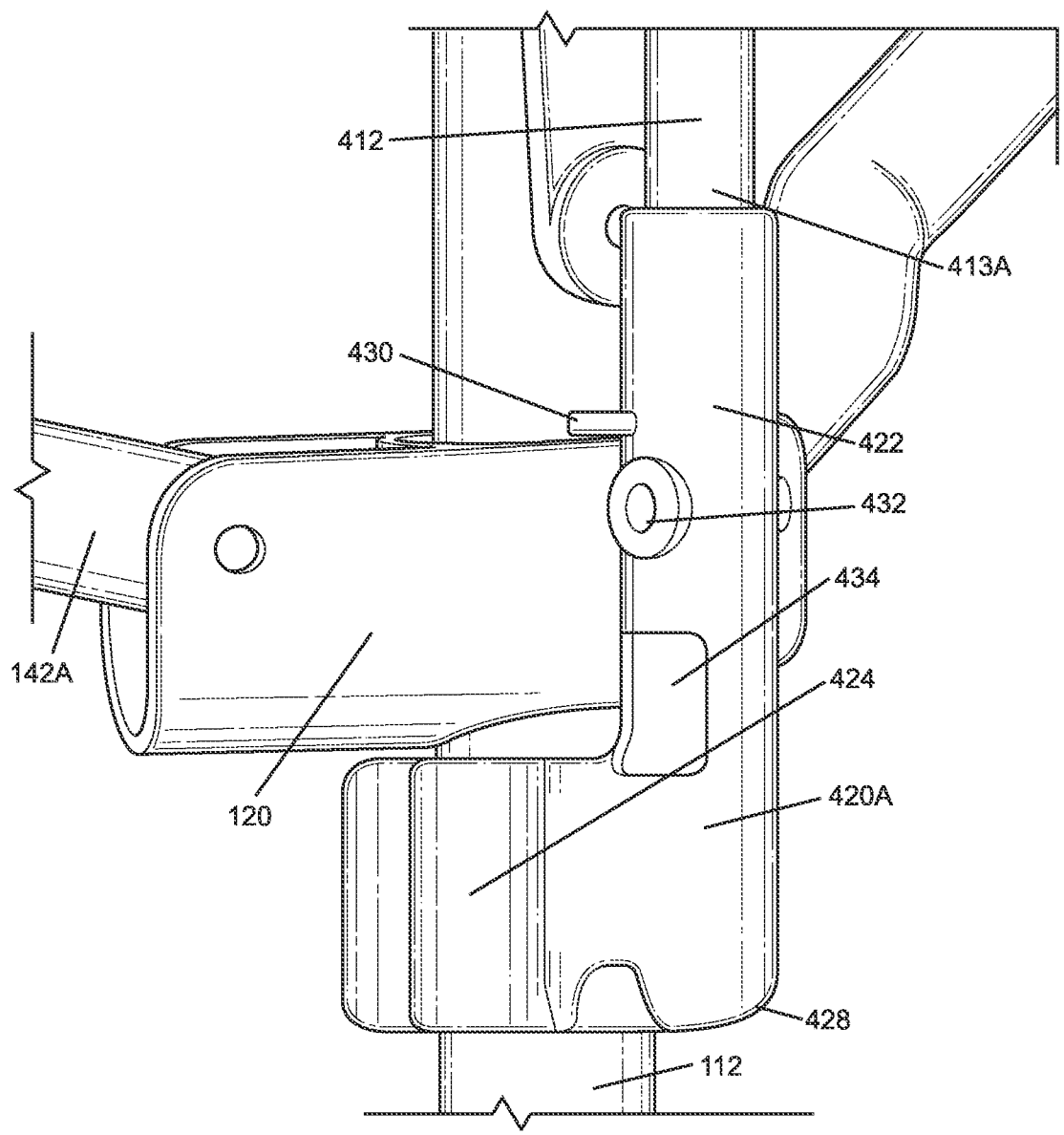
FIG. 32F shows a perspective view of the canopy clip of FIG. 32D.

FIG. 32D shows the canopy clip 420a may be disposed along an exterior portion of the frame 100a (i.e., outside the interior space 102 of the frame 100a) proximate to the slider 120 and the top portion 108 of the frame 100a when the canopy clip 420a is coupled to the leg support assembly 110a. FIGS. 32E and 32F show the canopy clip 420a may include a base 422 with snap-fit features 424 that form a snap-fit connector to directly couple the canopy clip 420a to the leg tube 112 of one leg support assembly 110a. Thus, the canopy cover assembly 400a may be mounted to the frame 100a without the use of any tools. Furthermore, the canopy cover assembly 400a may be coupled to the frame 100a without making any alterations or modifications to the frame 100a. In this manner, the canopy cover assembly 400a may not be limited for installation with only the frame 100a, but instead the canopy cover assembly 400a may be mounted onto the frames of other playards (e.g., other frames with six leg support assemblies). Said in another way, the canopy cover assembly 400a may be a universally compatible accessory that the caregiver may separately purchase and/or install onto their playard.

Figure 33B:
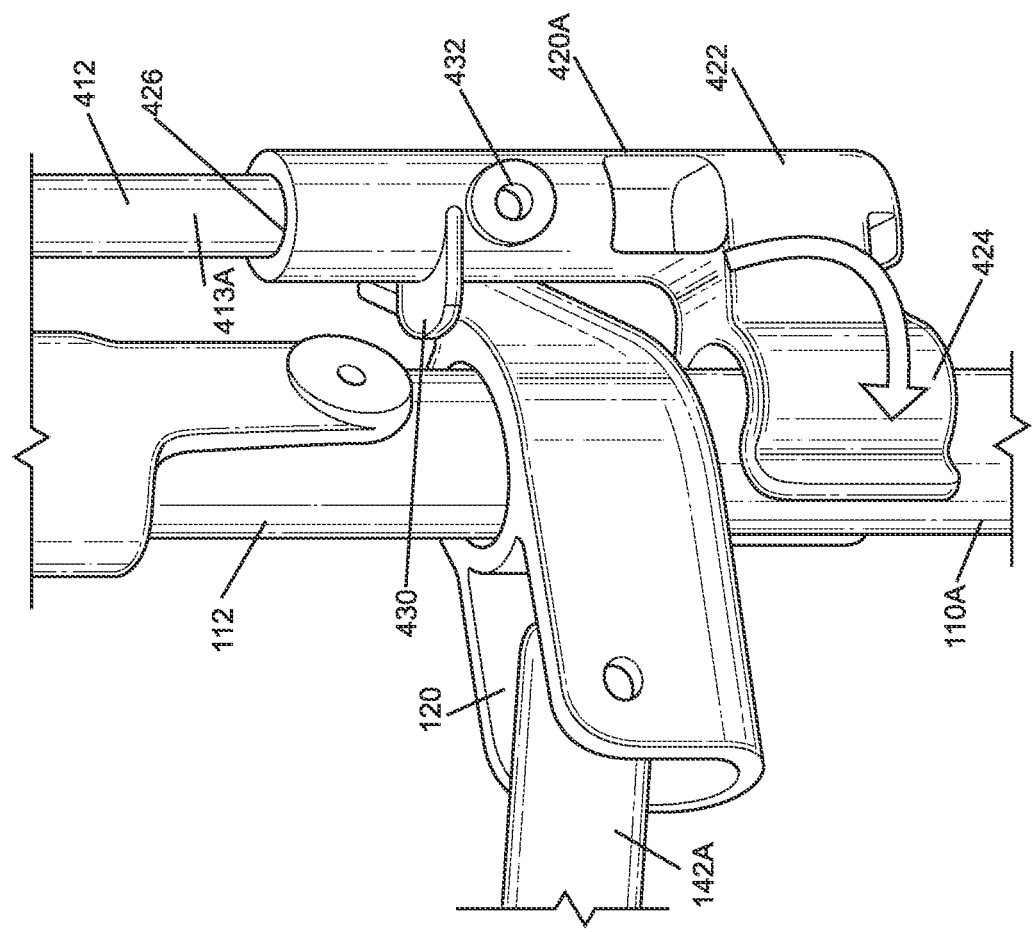
FIG. 33B shows a perspective view of the canopy clip of FIG. 32D where one lead-in feature is hooked onto the leg tube first and the canopy clip is rotated such that the other lead-in feature contacts the leg tube.
Figure 33A:
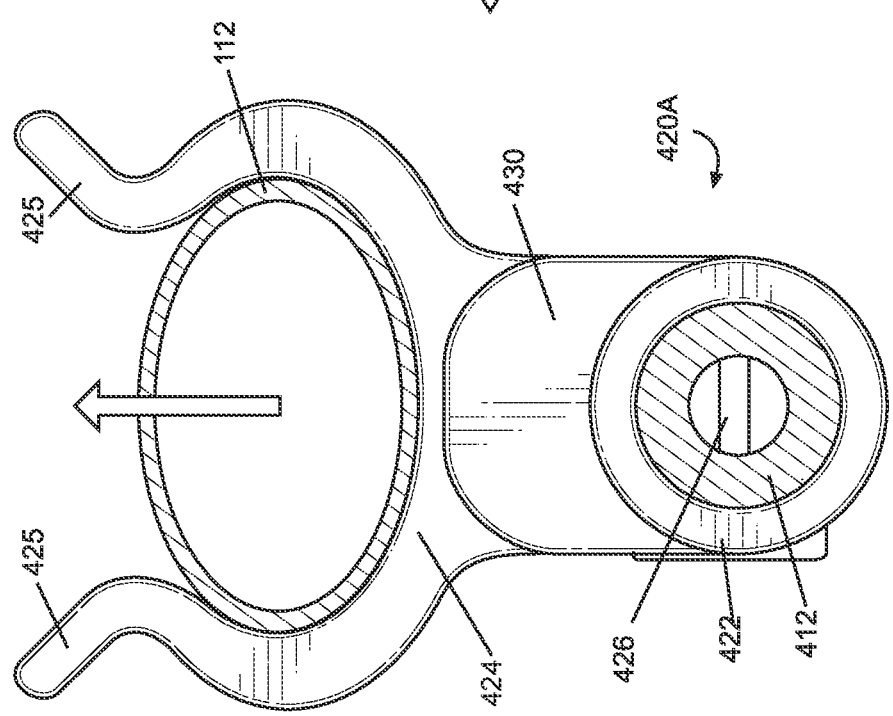
FIG. 33A shows a top view of the canopy clip of FIG. 32D being pressed onto the leg tube.

The snap-fit features 424 may generally be shaped to conform with the cross-sectional shape of the leg tube 112 to ensure the canopy clip 420a is securely coupled to the leg tube 112. For example, FIG. 33A shows the snap-fit features 424 may form an oval-shaped channel that matches the oval-shaped cross-section of the leg tube 112. In some implementations, the asymmetric cross-section of the leg tube 112 (e.g., the oval-shaped cross section) may ensure the canopy clip 420a only couples to the leg tube 112 with a desired orientation and/or prevents unwanted rotation of the canopy clip 420a when coupled to the leg tube 112. In this manner, the canopy bow 4112 may be repeatedly and/or reliably positioned and/or oriented with respect to the frame 100a such that the canopy cover 440, when placed onto the canopy support assembly 410, provides the desired coverage and/or aesthetic appearance. However, it should be appreciated that in other implementations, the shape of the snap-fit features 424 may be tailored to match the shape of the leg tubes most commonly used in various playard products (e.g., a circular-shaped leg tube). The snap-fit features 424 may further include lead-in features 425 to align the canopy clip 420a to the leg tube 112 and/or to deflect the snap-fit features 424 outwards to facilitate engagement with the leg tube 112.

In some implementations, the caregiver may thus align and press the canopy clip 420a along the arrow shown in FIG. 33A to engage the snap-fit features 424 to the leg tube 112. In some implementations, the caregiver may instead hook one of the snap-fit features 424 (e.g., via the corresponding lead-in feature 425) onto the leg tube 112 and then rotate the opposing side of the canopy clip 420a such that the other snap-fit feature 424 engages the leg tube 112 (e.g., via the corresponding lead-in feature 425) as shown in FIG.

33B. Compared to conventional canopy cover assemblies, the canopy cover assembly 400*a* may be more securely and reliably coupled to the frame 100*a* by directly coupling the canopy clip 420*a* to the leg tube 112 instead of a portion of the frame covered by soft goods. Thus, the canopy cover assembly 400*a* may be less susceptible to being removed accidentally by, for example, wind or the child 50 when placed into the partially enclosed space 301.

FIGS. 32E and 32F further show the canopy clip 420*a* may include a canopy bow opening 426 (e.g., also referred to herein as a "canopy bow socket 426") formed, in part, on the base 422 to receive a first end 413*a* of the canopy bow 412. Once the first end 413*a* of the canopy bow 412 is inserted into the canopy bow opening 426, a fastener may be inserted through the opening 432 disposed on the side of the base 422 to securely couple the canopy bow 412 to the canopy clip 420*a*. In some implementations, the canopy clip 420*a* may alternatively utilize an integral snap finger to couple the canopy bow 412 to the canopy clip 420*a* via a snap-fit connection.

In some implementations, a portion of the canopy bow 412 may be disposed outside the interior space 102 of the frame 102 and positioned proximate to the top portion 108 of the frame 100*a* when coupled to the canopy clip 420*a*. For example, FIG. 32D shows a portion of the canopy bow 412 may be in substantially parallel or parallel alignment with the leg tube 112 and positioned next to the corner 130. By positioning the canopy bow 412 to overlap with the top portion 108 of the frame 100*a*, the canopy bow 412 is less susceptible to being pulled into the partially enclosed space 301 of the playard 1000*a* by the child 50 compared to conventional playards with canopy cover assemblies. For example, the canopy bow 412 may be more difficult to reach since the child 50 has to extend their arms over the corners 130 of the frame 100*a* to grab the canopy bow 412. Additionally, even if the child 50 manages to grab onto the canopy bow 412, they have less leverage to pull the canopy cover assembly 400*a* into the playard 1000*a* due to the canopy bow 412 overlapping the top portion 108 of the frame 100*a* and the canopy clip 420*a* positioned on an exterior portion of the frame 100*a*.

The canopy clip 420*a* may further include an alignment rib 430 that protrudes outwards from the base 422 towards the frame 100*a*. The alignment rib 430 may be used, in part, as an alignment feature to position the canopy clip 420*a* onto the leg support assembly 110*a*. For example, FIGS. 42D-F show the alignment rib 430 may be disposed between the top surface of the slider 120 and the bottom surface of the corner 130 such that the snap-fit features 424 are disposed just below the slider 120 when the canopy clip 420*a* is coupled to the leg tube 112. In some implementations, the alignment rib 430 may also prevent the canopy clip 420*a* from sliding downwards along the leg tube 112. For example, FIG. 32E shows the alignment rib 430 may contact the top surface of the slider 120 if the canopy clip 420*a* moves down along the leg tube 112.

In some implementations, the canopy cover 440 may be laid directly over and onto the canopy support assemblies 410. The canopy cover 440 may include one or more tethers 442 to pull and/or hold the canopy cover 440 taut along the canopy bows 412 of the canopy support assemblies 410. For example, FIG. 32E shows each tether 442 may be looped around a hook 428 disposed at the bottom of the base 422 of the canopy clip 420*a*.

The canopy bow 412, the canopy clip 420*a*, and/or the hub 450*a* may be formed from various materials including, but not limited to plastic and fiberglass. In some implementations, the canopy bow 412 may be formed as a single, mechanically compliant component that may bent into the desired shape to couple the canopy bow 412 to the hub 450*a* and/or the canopy clip 420*a*. In some implementations, the canopy bow 412 may be an assembly of components (e.g., tubes) coupled together via one or more shock cords or bungee cords. The tubes may be fitted to one another to form an assembly of tubes that mechanically function as a single, continuous rod. For example, FIG. 32E shows the canopy bow 412 may include an elastic cord 414 that passes through the canopy bow 412 to hold the various sections of the canopy bow 412 together. As shown, the elastic cord 414 may be terminated with a knot, which may be accessed by the caregiver through an opening 434 on the base 422 of the canopy clip 420*a*.

j As described above, the canopy cover assembly 400*a* may include a hub 450*a* that couples the second ends 413*b* of each canopy bow 412 together to form a structure that covers the interior space 102 of the frame 100*a*. In some implementations, the canopy bows 412 may be coupled to the hub 450*a* prior to purchase by a consumer (e.g., the canopy cover assembly 400*a* may be assembled at a factory) or by a caregiver when installing the canopy cover assembly 400*a* onto the playard 1000*a* for the first time. In other words, the canopy bows 412 may remain coupled to the hub 450*a* for subsequent installations of the canopy cover assembly 400*a* such that the caregiver only needs to couple the respective canopy clips 420*a* to corresponding leg tubes 112 for setup.

Figure 34A:
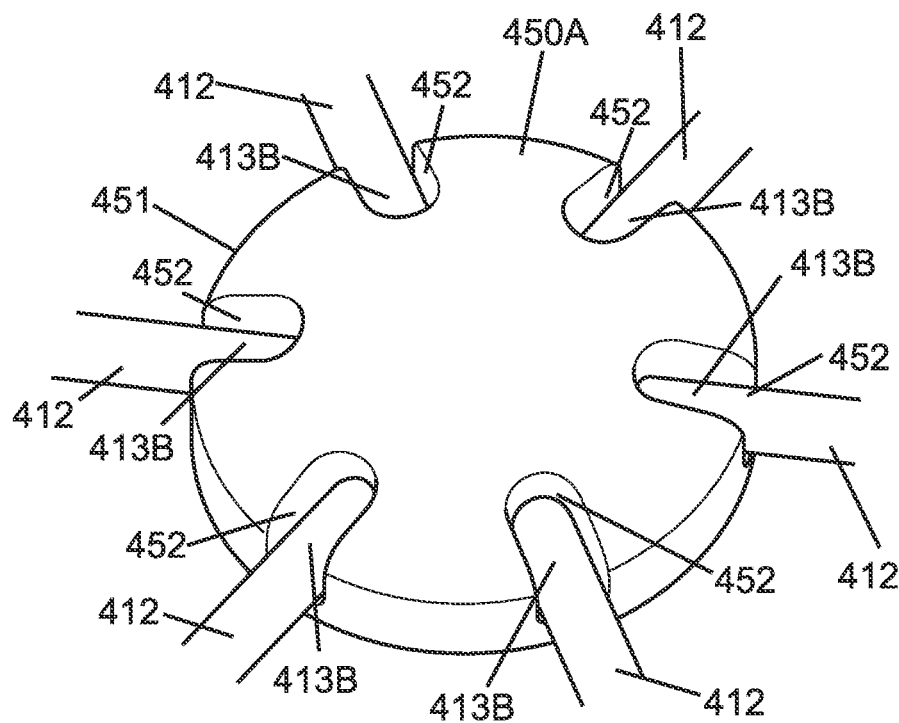
FIG. 34A shows a top perspective view of a hub in the canopy cover assembly of FIG. 32A.
Figure 34B:
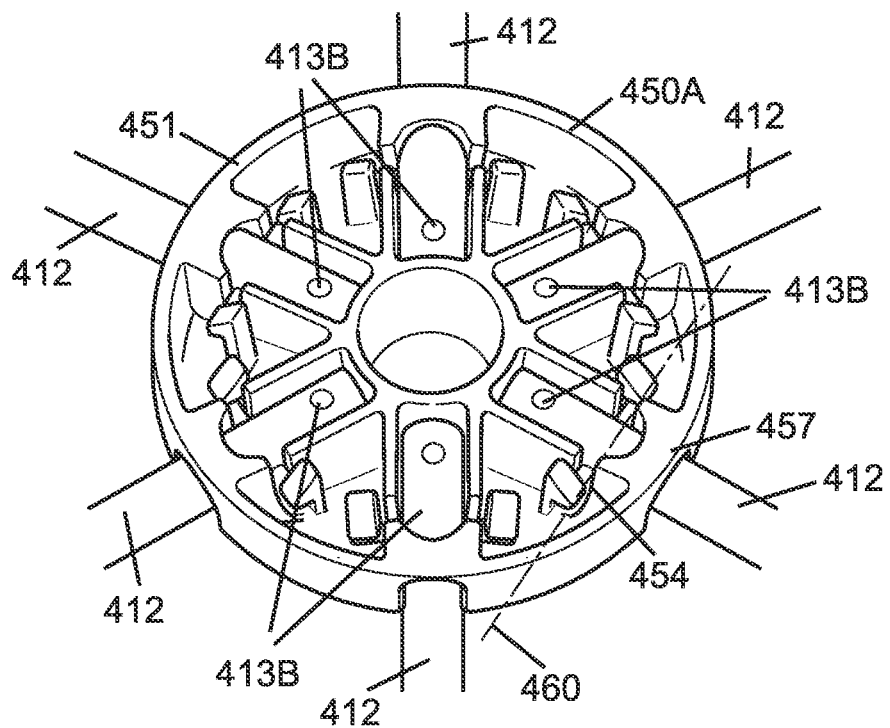
FIG. 34B shows a bottom perspective view of the hub of FIG. 34A.

In some implementations, the canopy bow 412 may be rigidly coupled to the hub 450*a* (i.e., the second 413*b* of the canopy bow 412 may not translate and/or rotate relative to the hub 450*a*). Thus, the canopy bows 412 of the canopy support assemblies 410 may be bent to facilitate attachment of the respective canopy clips 420*a* to the frame 100*a*. In some implementations, the second end 413*b* of the canopy bow 412 may be rotatably coupled to the hub 450*a* so that the canopy support assemblies 410 may be folded into a more compact structure for storage while remaining coupled to the hub 450*a*. For example, FIGS. 34A and 34B show the hub 450*a* may include a base 451 with multiple openings 452 to receive the second ends 413*b* of each canopy bow 412. The openings 452 may be aligned, in part, according to the relative locations of the leg support assemblies 110*a* of the frame 100*a* in the unfolded configuration. For example, the hub 450*a* may have six openings 452 disposed evenly around the periphery of the base 451 to align with the six leg support assemblies 110*a*, which may be arranged to form a hexagonal-shaped interior space 102.

Once the second end 413*b* of the canopy bow 412 is inserted into the opening 452, a pin 454 coupled to the second end 413*b* may be held in a corresponding slot 453 formed in the base 451 via, for example, a snap-fit connector. This allows the second end 413*b* of the canopy bow 412 to rotate relative to the base 451 via rotation of the pin 454 within the slot 453 about a rotation axis 460 as shown in FIG. 34B. In some implementations, the pin 454 may be integrally formed into the canopy bow 412. In some implementations, the pin 454 may be a separate component that is inserted through openings along the sides of the canopy bow 412 near the second end 413*b*.

The base 451 may further include a lip 457 to constrain the range of rotational motion of the canopy bow 412 relative to the hub 450*a*. For example, FIG. 34B shows the lip 457 may be disposed along the bottom side of the base 451, which causes the canopy bow 412 to bend when the canopy clip 420*a* attached to the first end 413*a* of the canopy bow 412 is positioned below the hub 450a. However, the canopy support assemblies 410 may be allowed to rotate such that the second end 413b of each canopy bow 412 is inserted through the opening 452 from the top side of the base 451 (i.e., the canopy clip 420a is positioned above the hub 450a). In this manner, the canopy cover assembly 400a may be folded for storage and/or transport separately or together with the playard 1000a.

Figure 35A:
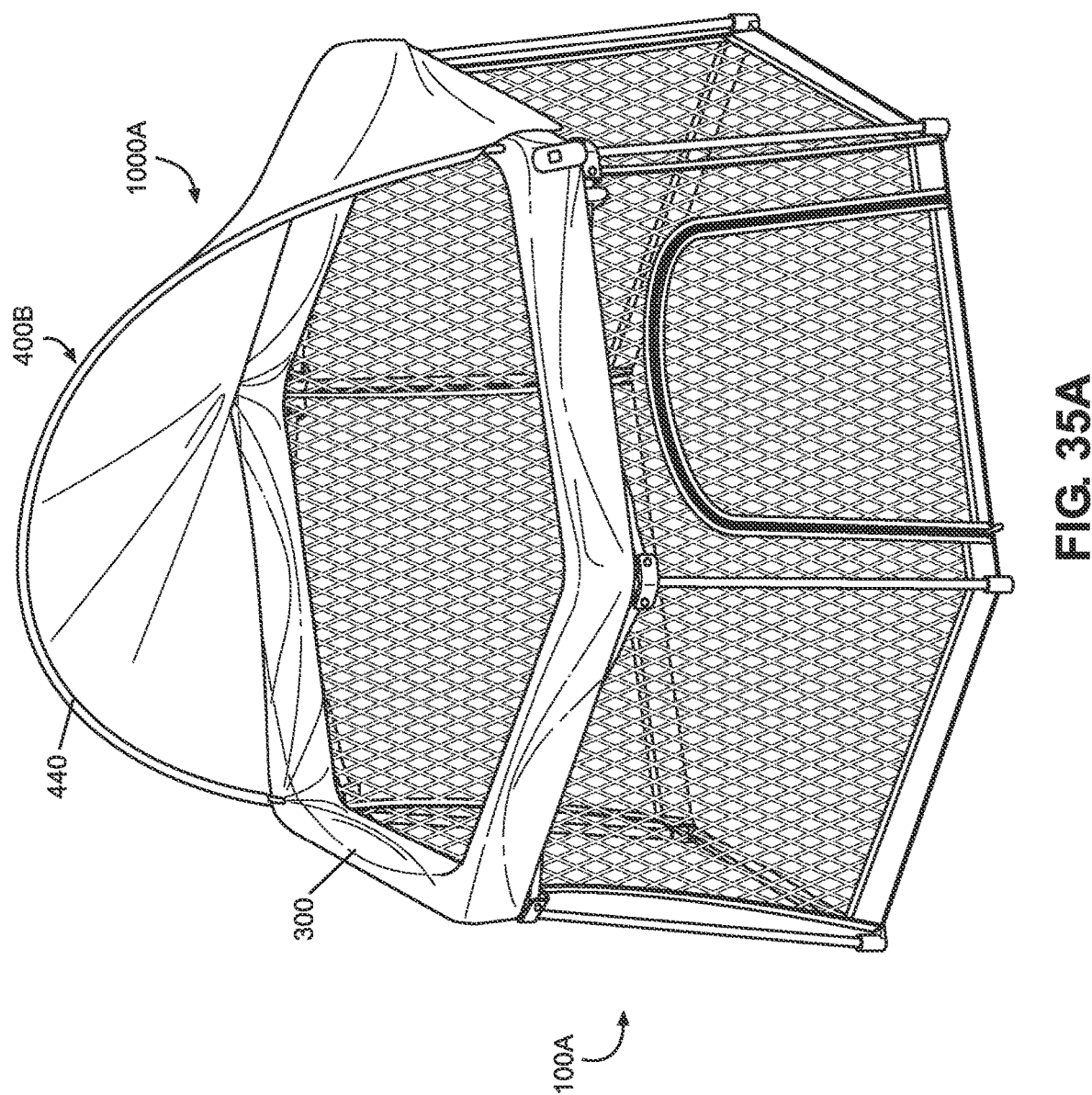
FIG. 35A shows a top, front perspective view of the playard of FIG. 2A with an exemplary canopy cover assembly that covers half the interior space of the playard and does not include a hub.
Figure 35B:
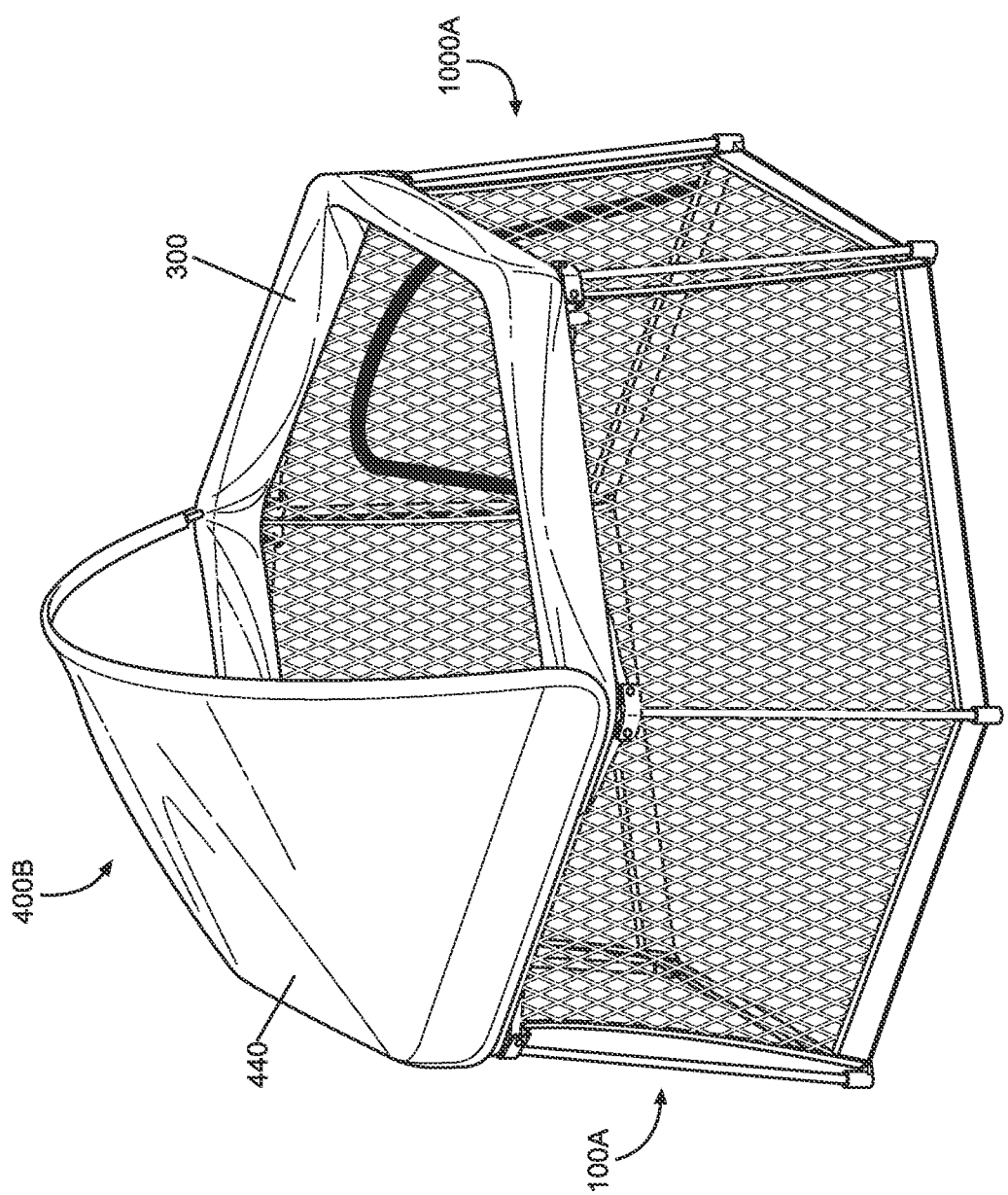
FIG. 35B shows a top, side perspective view of the playard and the canopy cover assembly of FIG. 35A.

FIGS. 35A and 35B show the playard 1000a with the frame 100a and soft goods 300 and another exemplary canopy cover assembly 400b with the canopy cover 440 installed onto the playard 1000a. In this example, the canopy cover assembly 400b may cover half the interior space 102 (i.e., the canopy cover assembly 400b is a half canopy cover).

Figure 36A:
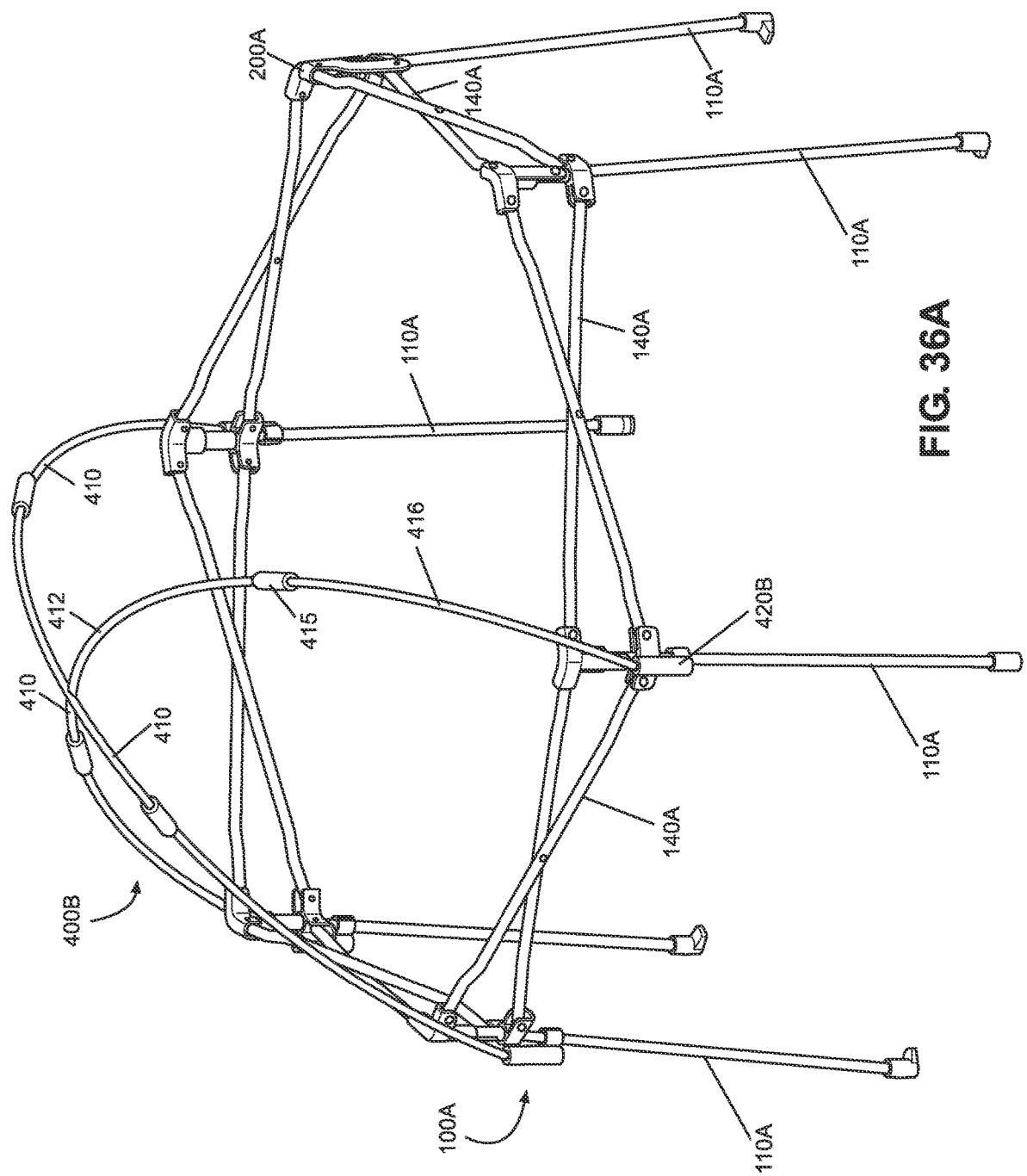
FIG. 36A shows a top perspective view of the playard and the canopy cover assembly of FIG. 35A with the canopy cover removed.
Figure 36B:
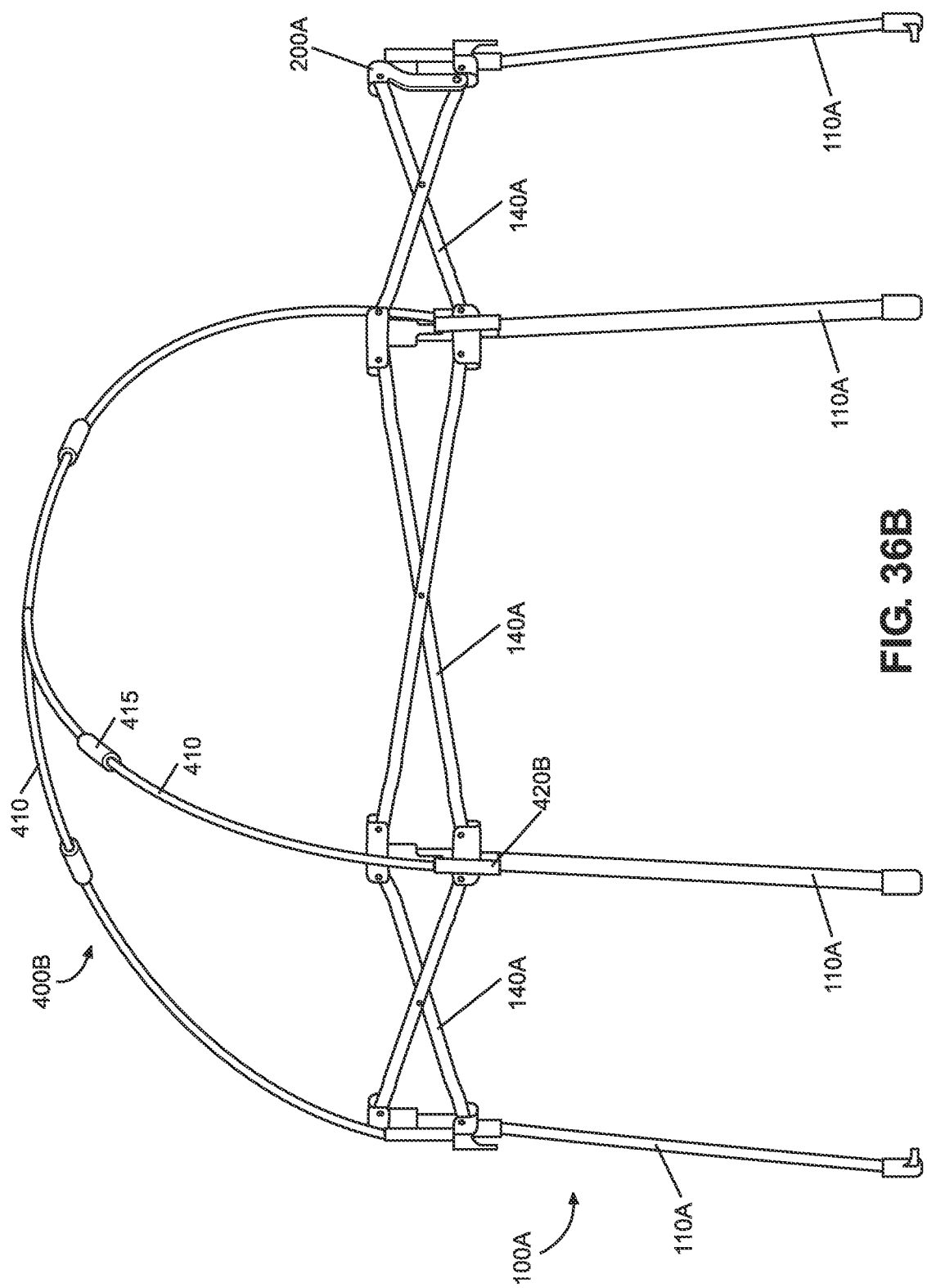
Figure 36C:
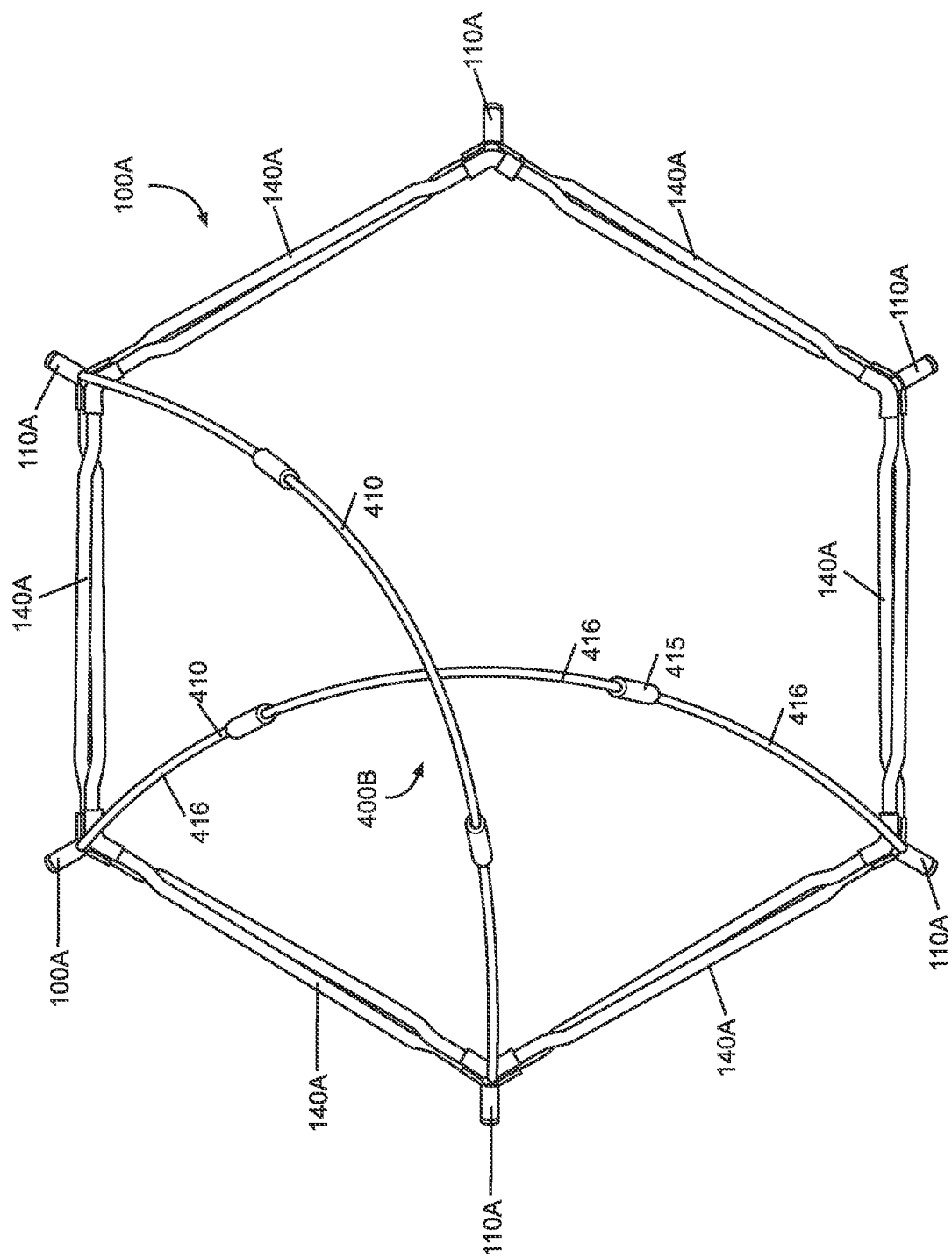

FIGS. 36A-36E show the canopy cover assembly 400b may once again include multiple canopy support assemblies 410 coupled to the frame 100a to provide a support structure that defines the desired shape of the canopy cover 440 when mounted to the canopy support assemblies 410. Compared to the canopy cover assembly 400a, however, the canopy support assemblies 410 of the canopy cover assembly 400b may include a canopy bow 412 that is directly coupled to two canopy clips 420b mounted to different leg support assemblies 110a of the frame 100a instead of a central hub. For example, FIGS. 36A and 36C show the canopy cover assembly 400b may include two canopy support assemblies 410 where the canopy bow 412 of each canopy support assembly 410 is coupled to two non-adjacent leg support assemblies 110a. The canopy bows 412 may overlap and/or cross one another as shown in FIG. 36C.

In this example, the canopy bow 412 may include multiple bow sections 416 coupled together via connectors 415. The connector 415 may be a tubular-shaped component that receives respective ends of two bow sections 416. In some implementations, each bow section 416 may be coupled to the connector 415 via a fastener inserted through a corresponding opening on the connectors 415 and/or an integral snap finger.

Figure 36D:
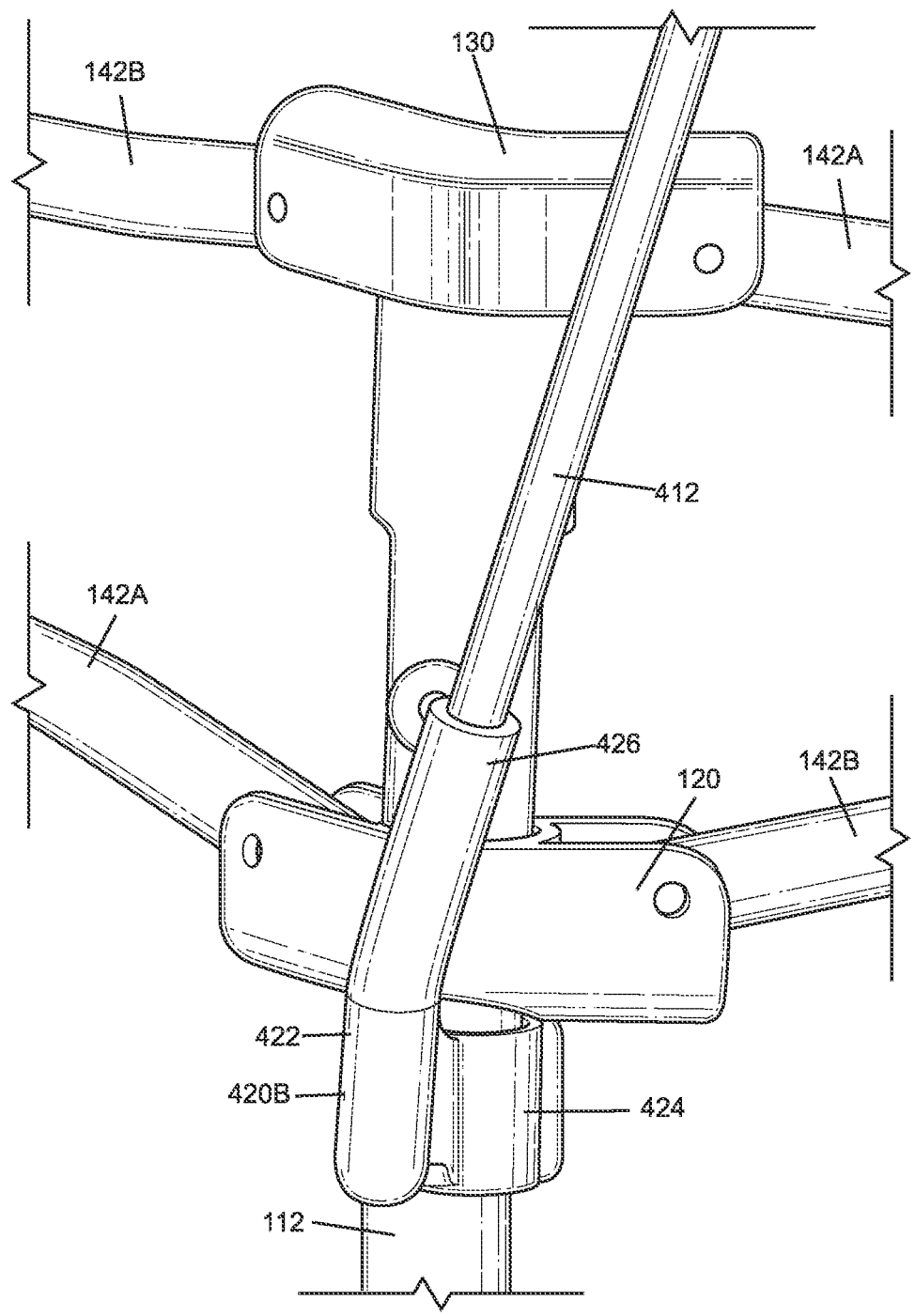
Figure 36E:
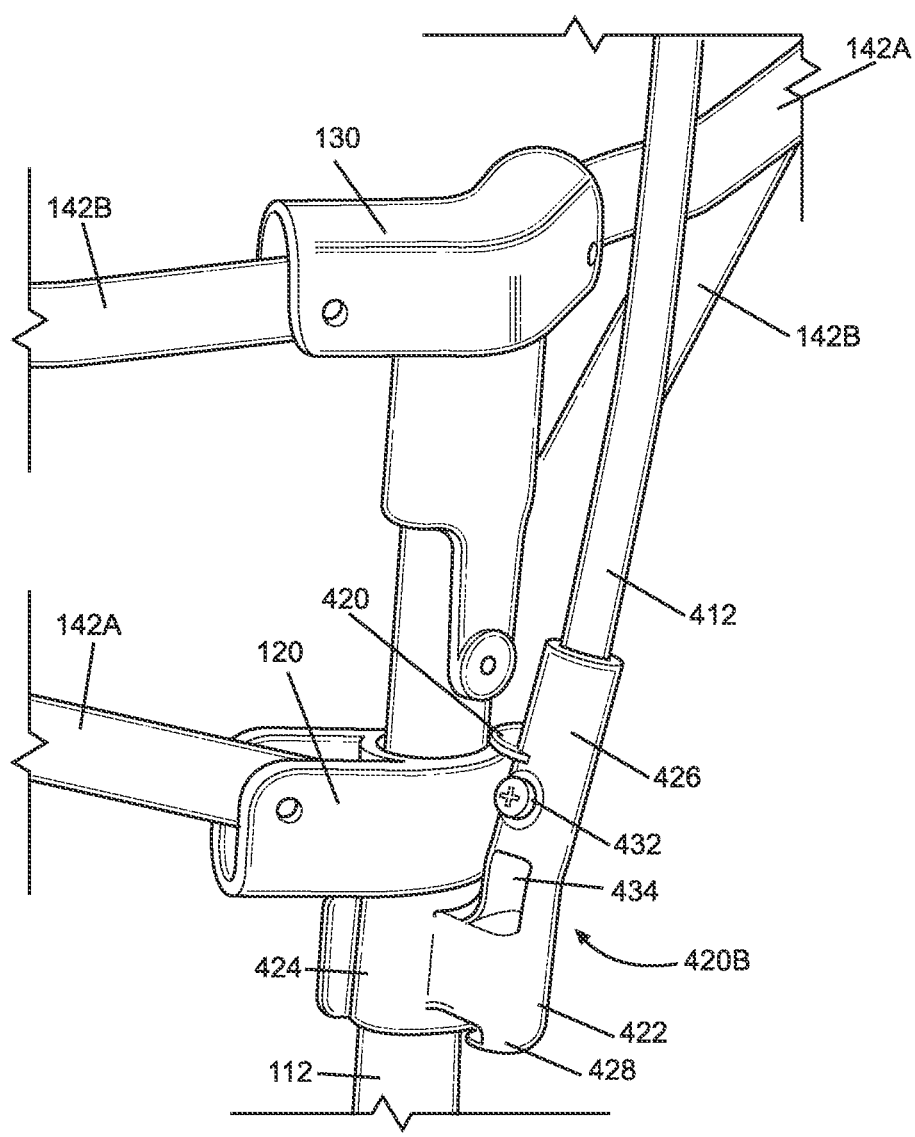

The canopy clip 420b may incorporate several of the same features as the canopy clip 420a described above. For example, FIGS. 36D and 36E show the canopy clip 420b may include a base 422 with snap-fit features 424, a canopy bow opening 426 to receive one end of the canopy bow 412, a mounting hole 432 to securely couple the canopy bow 412 to the canopy clip 420b, an opening 434 to access the elastic cord in the canopy bow 412, and a hook 428 to secure the tether 442 of the canopy cover 440 to the canopy clip 420. Compared to the canopy clip 420a, the canopy bow opening 426 of the canopy clip 420b may be tilted such that the portion of the canopy bow 412 coupled to the canopy clip 420b is oriented an angle relative to the leg tube 112 of the leg support assembly 110a to ensure the canopy bow 412 extends over a center portion of the interior space 102 as shown in FIG. 36C.

Figure 37A:
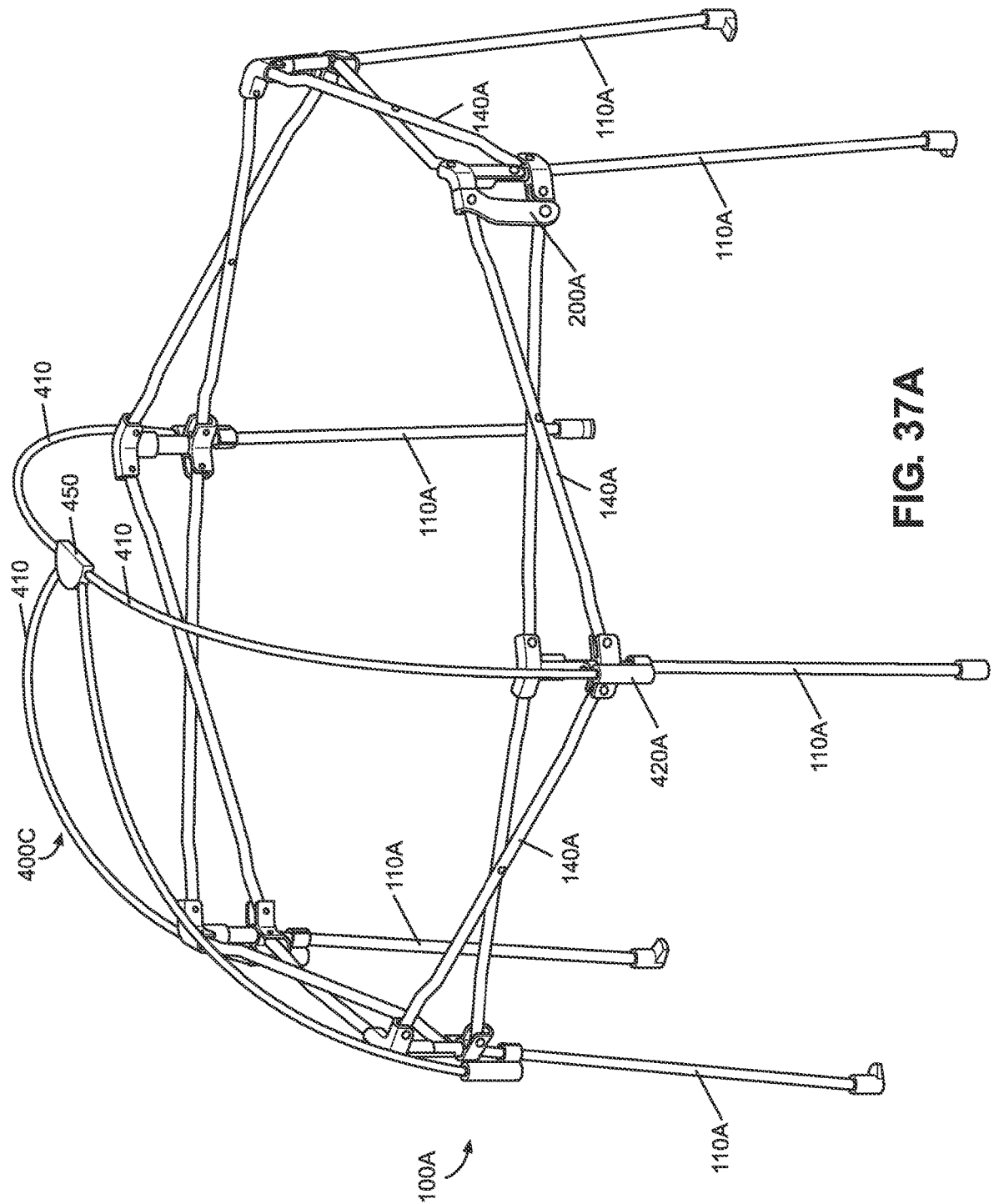
Figure 37B:
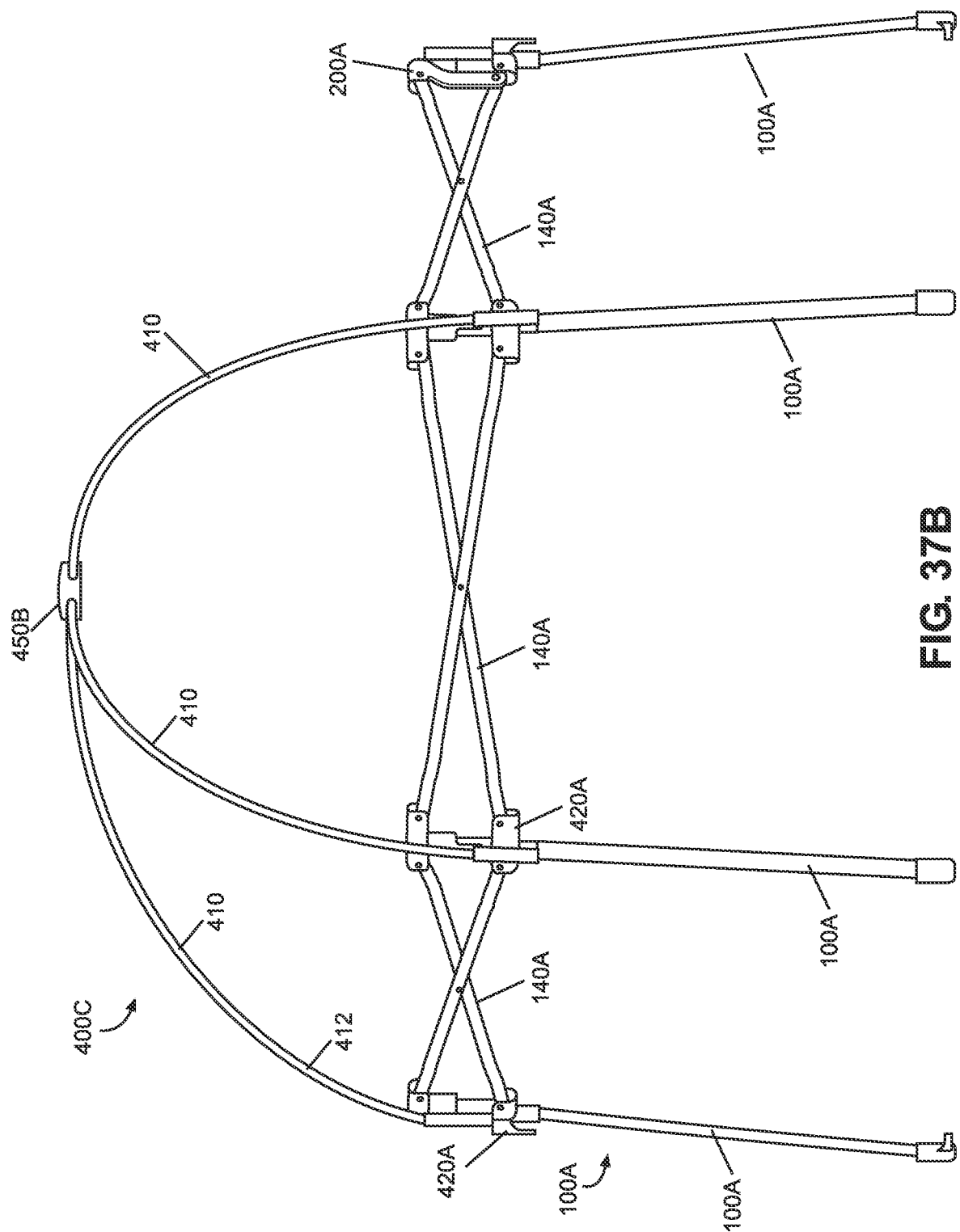

FIGS. 37A-37C show another exemplary canopy cover assembly 400c without the canopy cover 440 coupled to the frame 100a of the playard 1000a. The canopy cover assembly 400c may also cover half the interior space 102 similar to the canopy cover assembly 400b. However, the canopy support assemblies 410 of the canopy cover assembly 400c may be joined together by a hub 450b in the canopy cover assembly 400a. As shown, the canopy support assemblies 410 may include the canopy bows 412 and canopy clips 420a described above. In this example, the canopy support assemblies 410 may couple to enough leg support assemblies 110a to cover half the interior space 102 as shown in FIG. 37C.

Figure 38B:
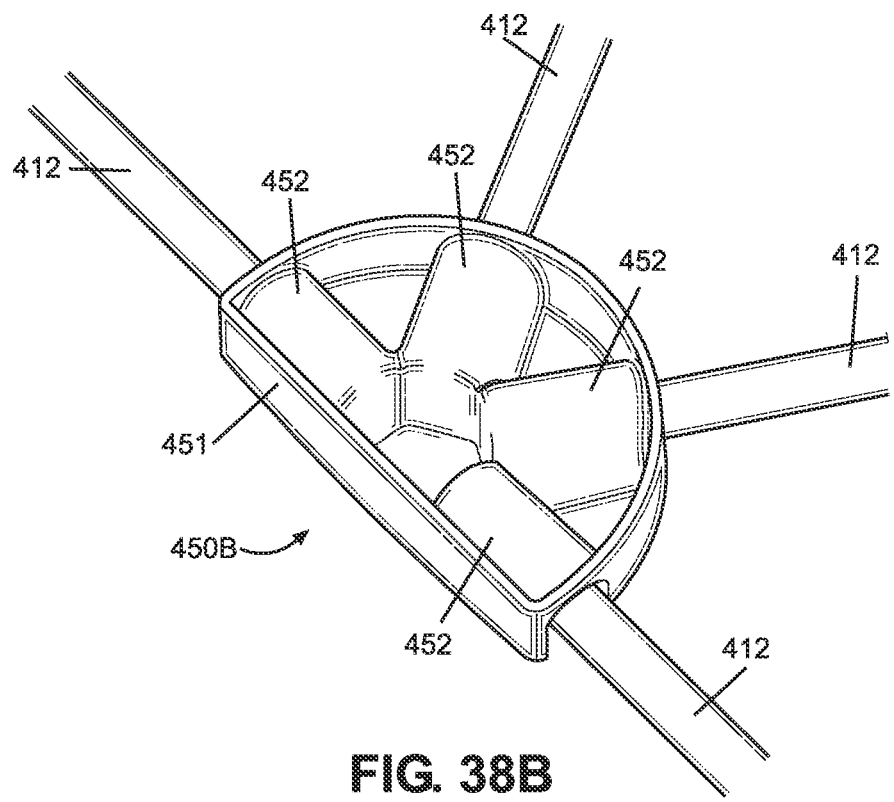

FIGS. 38A and 38B show the hub 450b may once again include a base 451 with openings 452 to receive the second ends 413b of each canopy bow 412. As shown, the openings 452 may be formed as sockets that rigidly couple the second ends 413b to the hub 450a such that the second end 413b of each canopy bow 412 is translationally and rotationally constrained to the hub 450b. In some implementations, the second end 413b may be coupled to the hub 450b via a fastener and/or a snap-fit connection.

Figure 39A:
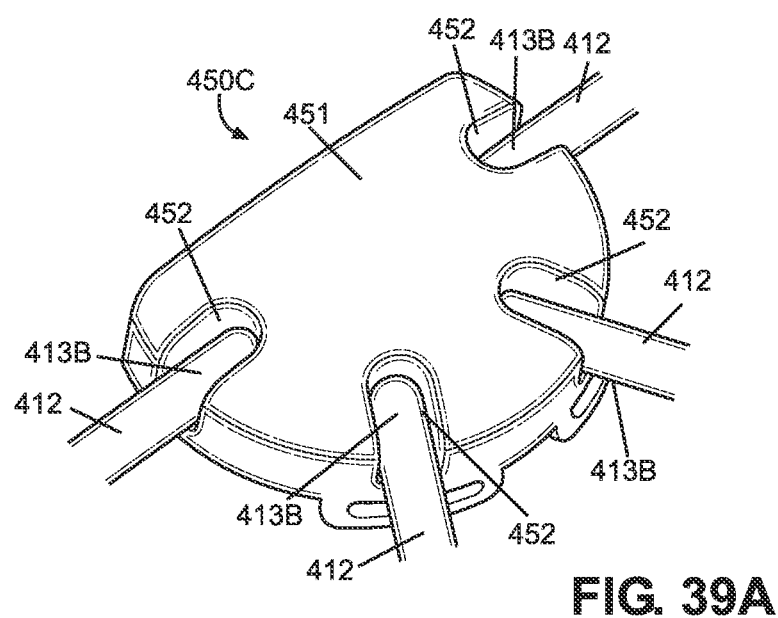
Figure 39B:
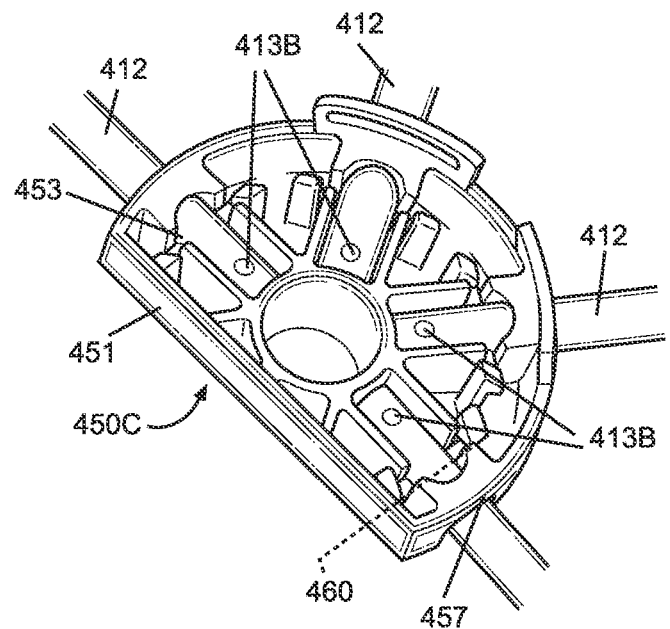

FIGS. 39A and 39B show another hub 450c for the canopy cover assembly 400c, which allows the second end 413b of the canopy bow 412 to be rotatable relative to the base 451 so that the canopy cover assembly 400c may be folded. The hub 450c may incorporate several of the same features as the hub 450a described above. For example, the base 451 may include a slot 453 to receive a pin 454 mounted to the second end 413b of the canopy bow 412. The slot 453 and the pin 454 may allow the canopy bow 412 to rotate about the axis 460. The base 451 may further include a lip 457 disposed on a bottom side of the base 451 to limit the rotational motion of the canopy bow 412.

FIGS. 40A and 40B show yet another hub 450d for the canopy cover assembly 400c. As shown, the hub 450d may include a base 451 with an opening 456 that extends along the curved side of the base 451. The opening 456 may be shaped to receive the second ends 413b of multiple canopy bows 412 as shown in FIG. 40A. The base 451 may further include holes 455 on the top and bottom sides of the base 451 to couple the second end 413b of each canopy bow 412 to the base 451. In some implementations, a pin (not shown) may be inserted through the opening 455 and corresponding openings (not shown) on the canopy bow 412 such that the second end 413b of each canopy bow 412 may rotate about an axis 461 as shown in FIG. 40A. This, in turn, may enable the canopy cover assembly 400c to be folded by rotating each of the canopy bows 412 about a corresponding axis 461 to one side of the hub 451 such that the canopy bows 412 are approximately parallel or parallel with one another. In some implementations, a fastener may instead be inserted through the openings 455 to rigidly couple each canopy bow 412 to the hub 450d (i.e., the second end 413b of the canopy bow 412 does not rotate relative to the base 451).

Conclusion

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A frame for a foldable playard, the frame having a compact folded configuration for storage of the frame and a deployed unfolded configuration to support the foldable playard, in an upright position on a ground surface, to contain a child in an interior space of the foldable playard, the frame comprising:

a plurality of leg support assemblies extending upward from the ground surface when the frame is in the deployed unfolded configuration, each leg support assembly of the plurality of leg support assemblies having an oval-shaped cross-section and comprising:
a bottom end supported by the ground surface; and
a top portion opposite to the bottom end; and
a plurality of X-frame assemblies coupled to the plurality of leg support assemblies, each X-frame assembly of the plurality of X-frame assemblies being coupled to respective top portions of adjacent leg support assemblies of the plurality of leg support assemblies when the frame is in the deployed unfolded configuration such that, in the deployed unfolded configuration of the frame:
the plurality of X-frame assemblies forms a top perimeter structure of the frame outlining the interior space of the foldable playard; and
the plurality of X-frame assemblies does not significantly impede visibility of the child when the child is in the interior space of the foldable playard,
wherein the plurality of X-frame assemblies constitutes the only interconnection in the frame between respective pairs of leg support assemblies of the plurality of leg support assemblies.

2. The frame of claim 1, wherein a first X-frame assembly of the plurality of X-frame assemblies is coupled to a first top portion of a first leg support assembly of the plurality of leg support assemblies, and wherein the frame further comprises: one latch mechanism coupled to the first X-frame assembly to constrain movement of the first X-frame assembly and thereby maintain the frame in the deployed unfolded configuration, the one latch mechanism being disposed proximate to the first top portion of the first leg support assembly.

3. The frame of claim 1, wherein each leg support assembly of the plurality of leg support assemblies comprises: a leg tube having a top end; a corner coupled to the top end of the leg tube; and a slider slidably coupled to the leg tube such that the slider is disposed proximate to the corner in the top portion of the leg support assembly when the foldable playard is in the unfolded configuration, wherein: respective sliders in the plurality of leg support assemblies are identical; and respective corners in the plurality of leg support assemblies are identical.

4. The frame of claim 3, wherein: the plurality of leg support assemblies comprises: a first leg support assembly comprising a first corner and a first slider; and a second leg support assembly comprising a second corner and a second slider; and the plurality of X-frame assemblies comprises a first X-frame assembly disposed between and coupled to the first leg support assembly and the second leg support assembly, the first X-frame assembly comprising: a first X-tube rotatably coupled to the first corner of the first leg support assembly and the second slider of the second leg support assembly; and a second X-tube rotatably coupled to the second corner of the second leg support assembly and the first slider of the first leg support assembly, the second X-tube being rotatably coupled to the first X-tube.

5. The frame of claim 4, wherein: respective leg tubes of the first leg support assembly and the second leg support assembly have identical lengths (L); the first X-tube and the second X-tube of the first X-frame assembly are positioned within respective top portions of the first leg support assembly and the second leg support assembly when the frame is in the deployed unfolded configuration; and the respective top portions of the first leg support assembly and the second leg support assembly constitute less than or equal to 20% of the identical lengths.

6. The frame of claim 5, wherein: the first X-frame assembly is coupled to a first top portion of the first leg support assembly; the frame further comprises one latch mechanism coupled to the first X-frame assembly to constrain movement of the first X-frame assembly and thereby maintain the frame in the deployed unfolded configuration, the one latch mechanism being disposed proximate to the first top portion of the first leg support assembly; and the frame comprises only the one latch mechanism to maintain the frame in the deployed unfolded configuration.

7. The foldable playard of claim 1, wherein each leg support assembly of the plurality of leg support assemblies comprises:
a leg tube having a top end;
a corner coupled to the top end of the leg tube; and
a slider slidably coupled to the leg tube, and
the foldable playard further comprises:
a plurality of canopy support assemblies disposed, in part, above the interior space, each canopy support assembly comprising:
a canopy bow partially disposed above the interior space; and
a canopy clip disposed outside the interior space proximate to at least one leg support assembly of the plurality of leg support assemblies,
the canopy clip comprising:
at least one snap feature directly coupled to the leg tube; and
a canopy bow opening configured to receive a portion of the canopy bow to couple the canopy bow to the canopy clip; and
a canopy cover supported by respective canopy bows of the plurality of canopy support assemblies to cover at least a portion of the interior space.

8. The foldable playard of claim 7, wherein the at least one snap feature is configured to engage the leg tube below the sliders, and the canopy clip is configured to be connected to an exterior portion of at least one of the plurality of leg support assemblies.

9. The foldable playard of claim 3, wherein bottom portions of the leg tubes are mechanically unconstrained.

10. The foldable playard of claim 1, wherein the plurality of leg support assemblies include leg tubes that are tilted at an angle relative to a ground support surface when the frame is in the deployed unfolded configuration.

11. The foldable playard of claim 10, wherein the angle is 2-10 degrees.

12. The frame of claim 1, wherein the leg support assemblies each include a leg tube and the top portion of each leg tube comprises 30 percent or less of an overall length of the leg tube.

13. The frame of claim 1, wherein the leg support assemblies each include a leg tube and the top portion of each leg tube comprises 20 percent or less of an overall length of the leg tube.

14. A frame for a foldable playard, the frame having a compact folded configuration for storage of the frame and a deployed unfolded configuration to support the foldable playard, in an upright position on a ground surface, to contain a child in an interior space of the foldable playard, the frame comprising:
a plurality of leg support assemblies extending upward from the ground surface when the frame is in the deployed unfolded configuration, each leg support assembly of the plurality of leg support assemblies having an oval-shaped cross-section and comprising: a bottom end supported by the ground surface; and
a top portion opposite to the bottom end; and a plurality of X-frame assemblies coupled to the plurality of leg support assemblies, each X-frame assembly of the plurality of X-frame assemblies being coupled to respective top portions of adjacent leg support assemblies of the plurality of leg support assemblies when the frame is in the deployed unfolded configuration such that, in the deployed unfolded configuration of the frame: the plurality of X-frame assemblies forms a top perimeter structure of the frame outlining the interior space of the foldable playard; and
the plurality of X-frame assemblies does not significantly impede visibility of the child when the child is in the interior space of the foldable playard, wherein the plurality of X-frame assemblies constitutes the only interconnection in the frame between respective pairs of leg support assemblies of the plurality of leg support assemblies, wherein each leg support assembly of the plurality of leg support assemblies comprises: a leg tube having a top end; a corner coupled to the top end of the leg tube; and a slider slidably coupled to the leg tube such that the slider is disposed proximate to the corner in the top portion of the leg support assembly when the foldable playard is in the unfolded configuration, wherein: respective sliders in the plurality of leg support assemblies are identical; and respective corners in the plurality of leg support assemblies are identical;
wherein: the plurality of leg support assemblies comprises: a first leg support assembly comprising a first corner and a first slider; and a second leg support assembly comprising a second corner and a second slider; and the plurality of X-frame assemblies comprises a first X-frame assembly disposed between and coupled to the first leg support assembly and the second leg support assembly, the first X-frame assembly comprising: a first X-tube rotatably coupled to the first corner of the first leg support assembly and the second slider of the second leg support assembly; and a second X-tube rotatably coupled to the second corner of the second leg support assembly and the first slider of the first leg support assembly, the second X-tube being rotatably coupled to the first X-tube;

wherein: respective leg tubes of the first leg support assembly and the second leg support assembly have identical lengths (L); the first X-tube and the second X-tube of the first X-frame assembly are positioned within respective top portions of the first leg support assembly and the second leg support assembly when the frame is in the deployed unfolded configuration; and the respective top portions of the first leg support assembly and the second leg support assembly constitute less than or equal to 20% of the identical lengths;

wherein: the first X-frame assembly is coupled to a first top portion of the first leg support assembly; the frame further comprises one latch mechanism coupled to the first X-frame assembly to constrain movement of the first X-frame assembly and thereby maintain the frame in the deployed unfolded configuration, the one latch mechanism being disposed proximate to the first top portion of the first leg support assembly; and the frame comprises only the one latch mechanism to maintain the frame in the deployed unfolded configuration; and wherein the one latch mechanism directly couples together the first corner of the first leg support assembly and the second X-tube of the first X-frame assembly when the latch mechanism is in a locked configuration.

15. A foldable playard defining an interior space when in in an unfolded configuration, the foldable playard comprising:

a plurality of leg support assemblies, each leg support assembly comprising:

a leg tube, disposed along a side edge of the interior space, having a top end disposed at a top vertex of the interior space;

a corner coupled to the top end of the leg tube; and a slider slidably coupled to the leg tube such that the slider is disposed proximate to the corner when the foldable playard is in the unfolded configuration;

a plurality of X-frame assemblies positioned at respective side faces of the interior space, each X-frame assembly of the plurality of X-frame assemblies being coupled to adjacent leg support assemblies, each X-frame assembly of the plurality of X-frame assemblies being coupled to respective top portions of adjacent leg support assemblies of the plurality of leg support assemblies such that when the foldable playard is in the unfolded configuration the plurality of X-frame assemblies forms a top perimeter structure of the foldable playard outlining the interior space of the foldable playard, each of the leg support assemblies include a leg tube; and a plurality of canopy support assemblies disposed, in part, above the interior space, each canopy support assembly comprising:

a canopy bow disposed, in part, above the interior space; and a canopy clip disposed outside the interior space proximate to a first leg support assembly of the plurality of leg support assemblies, the canopy clip comprising: one or more snap features directly coupled to the leg tube of the first leg support assembly; and a canopy bow opening to receive a portion of the canopy bow to couple the canopy bow to the canopy clip; and a canopy cover, supported by respective canopy bows of the plurality of canopy support assemblies, to cover at least a portion of the interior space.

16. The foldable playard of claim 15, wherein the canopy bow is partially disposed outside the interior space proximate to the corner and the slider.

17. The foldable playard of claim 15 wherein respective pairs of leg support assemblies are only coupled together via one X-frame assembly of the plurality of X-frame assemblies.

18. The foldable playard of claim 15, wherein bottom portions of the leg tubes are mechanically unconstrained.

19. The foldable playard of claim 15, wherein the leg tubes are tilted at an angle relative to a ground support surface when the frame is in the unfolded configuration.

20. The foldable playard of claim 19, wherein the angle is 2-10 degrees.

21. The foldable playard of claim 15, wherein the snap features are configured to engage the leg tubes below the sliders.

22. The foldable playard of claim 15, wherein the canopy clip is configured to be connected to an exterior portion of at least one of the plurality of leg support assemblies.

23. The foldable playard of claim 15, wherein the top portion of each leg assembly comprises 30 percent or less of an overall length of the leg tube.

24. The foldable playard of claim 15, wherein the top portion of each leg assembly comprises 20 percent or less of an overall length of the leg tube.

* * * * *